United States Patent
Carson et al.

(10) Patent No.: US 12,091,393 B2
(45) Date of Patent: Sep. 17, 2024

(54) SMALL MOLECULE VACCINE ADJUVANT FOR ENHANCING OR PROLONGING IMMUNE RESPONSE

(71) Applicant: The Regents of the University of California, Oakland, CA (US)

(72) Inventors: Dennis Carson, La Jolla, CA (US); Mary Patricia Corr, San Diego, CA (US); Howard B. Cottam, Escondido, CA (US); Tomoko Hayashi, San Diego, CA (US); Nikunj Shukla, San Diego, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 639 days.

(21) Appl. No.: 17/287,914

(22) PCT Filed: Oct. 22, 2019

(86) PCT No.: PCT/US2019/057496
§ 371 (c)(1),
(2) Date: Apr. 22, 2021

(87) PCT Pub. No.: WO2020/086625
PCT Pub. Date: Apr. 30, 2020

(65) Prior Publication Data
US 2021/0380546 A1 Dec. 9, 2021

Related U.S. Application Data

(60) Provisional application No. 62/748,885, filed on Oct. 22, 2018.

(51) Int. Cl.
*C07D 277/44* (2006.01)
*A61K 39/39* (2006.01)
*A61K 39/00* (2006.01)

(52) U.S. Cl.
CPC ............ *C07D 277/44* (2013.01); *A61K 39/39* (2013.01); *A61K 2039/55511* (2013.01)

(58) Field of Classification Search
CPC .............................. C07D 277/44; A61K 39/39
(Continued)

(56) References Cited

U.S. PATENT DOCUMENTS

| 4,689,338 A | 8/1987 | Gerster |
| 4,929,624 A | 5/1990 | Gerster et al. |

(Continued)

FOREIGN PATENT DOCUMENTS

| AU | 2007257423 | 5/2012 |
| AU | 2006283524 B2 | 3/2013 |

(Continued)

OTHER PUBLICATIONS

Janovick JA, Spicer TP, Smith E, Bannister TD, Kenakin T, Scampavia L, Conn PM. Receptor antagonism/agonism can be uncoupled from pharmacoperone activity. Molecular and cellular endocrinology. Oct. 15, 2016;434:176-85. (Year: 2016).*

(Continued)

*Primary Examiner* — Jeffrey S Lundgren
*Assistant Examiner* — Heather Dahlin
(74) *Attorney, Agent, or Firm* — SCHWEGMAN LUNDBERG & WOESSNER, P.A.

(57) ABSTRACT

Compounds of formulae (I)-(VD):

$$A^1\text{-}Q\text{-}L^1\text{-}A^2\text{-}L^2\text{-}Z \qquad \text{Formula I}$$

are useful for enhancing or prolonging an immune response, such as, in a vaccine as an adjuvant or a co-adjuvant.

17 Claims, 30 Drawing Sheets

(58) Field of Classification Search
USPC .................................................. 514/365
See application file for complete search history.

(56) References Cited

U.S. PATENT DOCUMENTS

| | | | |
|---|---|---|---|
| 4,938,949 | A | 7/1990 | Borch et al. |
| 5,037,986 | A | 8/1991 | Gerster |
| 5,175,296 | A | 12/1992 | Gerster |
| 5,238,944 | A | 8/1993 | Wick et al. |
| 5,352,784 | A | 10/1994 | Nikolaides et al. |
| 5,367,076 | A | 11/1994 | Gerster |
| 5,395,937 | A | 3/1995 | Nikolaides et al. |
| 5,444,065 | A | 8/1995 | Nikolaides et al. |
| 5,624,677 | A | 4/1997 | El-Rashidy et al. |
| 5,627,281 | A | 5/1997 | Nikolaides et al. |
| 5,648,516 | A | 7/1997 | Nikolaides et al. |
| 5,693,811 | A | 12/1997 | Lindstrom |
| 5,736,553 | A | 4/1998 | Wick et al. |
| 5,741,908 | A | 4/1998 | Gerster et al. |
| 5,998,619 | A | 12/1999 | Gerster et al. |
| 6,038,505 | A | 3/2000 | Probst et al. |
| 6,039,969 | A | 3/2000 | Tomai et al. |
| 6,083,505 | A | 7/2000 | Miller et al. |
| 6,150,523 | A | 11/2000 | Gerster et al. |
| 6,200,592 | B1 | 3/2001 | Tomai et al. |
| 6,245,776 | B1 | 6/2001 | Skwiercynski et al. |
| 6,329,381 | B1 | 12/2001 | Kurimoto et al. |
| 6,333,331 | B1 | 12/2001 | Moschel et al. |
| 6,372,725 | B1 | 4/2002 | Zilch et al. |
| 6,437,131 | B1 | 8/2002 | Gerster et al. |
| 6,486,168 | B1 | 11/2002 | Skwierczynski et al. |
| 6,534,654 | B2 | 3/2003 | Gerster et al. |
| 6,552,192 | B1 | 4/2003 | Hanus et al. |
| 6,610,319 | B2 | 8/2003 | Tomai et al. |
| 6,613,902 | B2 | 9/2003 | Gerster et al. |
| 6,624,305 | B2 | 9/2003 | Gerster |
| 6,696,076 | B2 | 2/2004 | Tomai et al. |
| 6,706,728 | B2 | 3/2004 | Hedenstrom et al. |
| 6,716,840 | B2 | 4/2004 | Chu et al. |
| 6,733,764 | B2 | 5/2004 | Martin |
| 6,734,187 | B1 | 5/2004 | Tanaka et al. |
| 6,897,314 | B2 | 5/2005 | Gerster et al. |
| 6,960,582 | B2 | 11/2005 | Boyce et al. |
| 7,001,609 | B1 | 2/2006 | Matson et al. |
| 7,037,929 | B1 | 5/2006 | Pevarello et al. |
| 7,157,465 | B2 | 1/2007 | Isobe et al. |
| 7,189,727 | B2 | 3/2007 | Boyce |
| 7,238,700 | B2 | 7/2007 | Palle et al. |
| 7,241,890 | B2 | 7/2007 | Kasibhatla et al. |
| 7,521,454 | B2 | 4/2009 | Isobe et al. |
| 7,576,068 | B2 | 8/2009 | Averett |
| 7,754,728 | B2 | 7/2010 | Isobe et al. |
| 7,777,041 | B2 * | 8/2010 | Carayon et al. ..... C07D 405/00 546/207 |
| 7,968,544 | B2 | 6/2011 | Graupe et al. |
| 8,211,863 | B2 | 7/2012 | Averett |
| 8,357,374 | B2 | 1/2013 | Carson et al. |
| 8,729,088 | B2 | 5/2014 | Carson et al. |
| 8,790,655 | B2 | 7/2014 | Carson |
| 8,846,697 | B2 | 9/2014 | Carson et al. |
| 9,050,376 | B2 | 6/2015 | Carson et al. |
| 9,173,931 | B2 | 11/2015 | Jessouroun et al. |
| 9,359,360 | B2 | 6/2016 | Carson et al. |
| 9,505,768 | B2 | 11/2016 | Carson et al. |
| 11,697,851 | B2 | 7/2023 | Barrett et al. |
| 2002/0127224 | A1 | 9/2002 | Chen |
| 2002/0193595 | A1 | 12/2002 | Chu et al. |
| 2003/0003505 | A1 | 1/2003 | Cook |
| 2003/0187261 | A1 | 10/2003 | Havlicek et al. |
| 2003/0191086 | A1 | 10/2003 | Hanus et al. |
| 2004/0023211 | A1 | 2/2004 | Groen et al. |
| 2004/0091491 | A1 | 5/2004 | Kedl et al. |
| 2004/0132748 | A1 | 7/2004 | Isobe et al. |
| 2004/0202663 | A1 | 10/2004 | Hu et al. |
| 2004/0209899 | A1 | 10/2004 | Palle et al. |
| 2004/0248895 | A1 | 12/2004 | Chu et al. |
| 2004/0265351 | A1 | 12/2004 | Miller et al. |
| 2005/0004038 | A1 | 1/2005 | Lyon et al. |
| 2005/0004144 | A1 | 1/2005 | Carson et al. |
| 2005/0038027 | A1 | 2/2005 | Boyce |
| 2005/0042272 | A1 | 2/2005 | Hou et al. |
| 2005/0049263 | A1 | 3/2005 | Kasibhatla et al. |
| 2005/0059613 | A1 | 3/2005 | Memarzadeh et al. |
| 2005/0158325 | A1 | 7/2005 | Hammerbeck et al. |
| 2005/0054590 | A1 | 10/2005 | Averett |
| 2005/0266067 | A1 | 12/2005 | Sengupta et al. |
| 2006/0052403 | A1 | 3/2006 | Isobe et al. |
| 2006/0063223 | A1 | 3/2006 | Berahovich et al. |
| 2006/0110746 | A1 | 5/2006 | Andre et al. |
| 2007/0037832 | A1 | 2/2007 | Isobe et al. |
| 2007/0087009 | A1 | 4/2007 | Burdin |
| 2007/0100146 | A1 | 5/2007 | Dzwiniel |
| 2007/0161582 | A1 | 7/2007 | Mijikovic et al. |
| 2007/0173483 | A1 | 7/2007 | Kasibhatla et al. |
| 2007/0173530 | A1 | 7/2007 | Mitchell et al. |
| 2007/0190071 | A1 | 8/2007 | Kurimoto et al. |
| 2007/0292418 | A1 | 12/2007 | Fields et al. |
| 2008/0008682 | A1 | 1/2008 | Chong et al. |
| 2008/0125446 | A1 | 5/2008 | Kasibhatla et al. |
| 2008/0214580 | A1 | 9/2008 | Neagu et al. |
| 2009/0047249 | A1 | 2/2009 | Graupe et al. |
| 2009/0053186 | A1 | 2/2009 | Hu et al. |
| 2009/0069289 | A1 | 3/2009 | Neagu et al. |
| 2009/0099212 | A1 | 4/2009 | Zablocki et al. |
| 2009/0105212 | A1 | 4/2009 | Isobe et al. |
| 2009/0118263 | A1 | 5/2009 | Hashimoto et al. |
| 2009/0202484 | A1 | 8/2009 | Chong et al. |
| 2009/0202626 | A1 | 8/2009 | Carson et al. |
| 2009/0263470 | A1 | 10/2009 | Coller et al. |
| 2009/0324551 | A1 | 12/2009 | Carson et al. |
| 2010/0029585 | A1 | 2/2010 | Howbert et al. |
| 2010/0210598 | A1 | 8/2010 | Carson et al. |
| 2011/0098248 | A1 | 4/2011 | Halcomb et al. |
| 2011/0098294 | A1 | 4/2011 | Carson et al. |
| 2011/0150836 | A1 | 6/2011 | Halcomb et al. |
| 2011/0306671 | A1 | 12/2011 | Carson et al. |
| 2011/0319442 | A1 | 12/2011 | Leoni et al. |
| 2012/0003298 | A1 | 1/2012 | Barberis et al. |
| 2012/0009247 | A1 | 1/2012 | Maj et al. |
| 2012/0083473 | A1 | 4/2012 | Holldack et al. |
| 2012/0128715 | A1 | 5/2012 | Levy et al. |
| 2012/0148660 | A1 | 6/2012 | Carson et al. |
| 2012/0177681 | A1 | 7/2012 | Singh et al. |
| 2013/0156807 | A1 | 6/2013 | Carson et al. |
| 2013/0165455 | A1 | 6/2013 | Carson et al. |
| 2013/0190494 | A1 | 7/2013 | Carson et al. |
| 2013/0302278 | A1 | 11/2013 | Noelle et al. |
| 2014/0255368 | A1 | 9/2014 | Kim et al. |
| 2014/0302120 | A1 | 10/2014 | Carson et al. |
| 2015/0197527 | A1 | 7/2015 | Carson et al. |
| 2015/0203844 | A1 | 7/2015 | Marban et al. |
| 2015/0366962 | A1 | 12/2015 | Carson et al. |
| 2016/0193313 | A1 | 7/2016 | Kim et al. |
| 2016/0199499 | A1 | 7/2016 | Carson et al. |
| 2017/0165359 | A1 | 6/2017 | Berzofsky et al. |
| 2017/0342504 | A1 | 11/2017 | Barrett et al. |
| 2018/0110784 | A1 | 4/2018 | Carson et al. |
| 2018/0169224 | A1 | 6/2018 | Mcneel et al. |
| 2018/0177816 | A1 | 6/2018 | Shiku et al. |
| 2020/0071668 | A1 | 3/2020 | Kim et al. |
| 2020/0087625 | A1 | 3/2020 | Carson et al. |
| 2020/0261562 | A1 | 8/2020 | Vinetz |
| 2021/0038742 | A1 | 2/2021 | Huang et al. |
| 2021/0187087 | A1 | 6/2021 | Mcneel et al. |
| 2022/0152188 | A1 | 5/2022 | Carson et al. |
| 2022/0305121 | A1 | 9/2022 | Carson et al. |
| 2023/0365570 | A1 | 11/2023 | Carson et al. |

FOREIGN PATENT DOCUMENTS

| | | |
|---|---|---|
| AU | 2008227128 B2 | 3/2013 |
| AU | 2009210655 B2 | 8/2013 |
| AU | 2010214112 B2 | 4/2015 |
| AU | 2020236254 A1 | 10/2021 |

(56) References Cited

FOREIGN PATENT DOCUMENTS

| | | |
|---|---|---|
| CA | 3132994 A1 | 9/2020 |
| CN | 101304748 A | 11/2008 |
| CN | 101790380 B | 7/2013 |
| CN | 102439011 B | 5/2016 |
| CN | 114401738 A | 4/2022 |
| DE | 1810053 | 2/1970 |
| EA | 019768 B1 | 6/2014 |
| EP | 0145340 A2 | 6/1985 |
| EP | 0310950 A1 | 4/1989 |
| EP | 0389302 A1 | 9/1990 |
| EP | 0394026 A1 | 10/1990 |
| EP | 0553202 A1 | 8/1993 |
| EP | 0575549 A1 | 12/1993 |
| EP | 0636031 A1 | 2/1995 |
| EP | 0681570 A1 | 11/1995 |
| EP | 0708773 A1 | 5/1996 |
| EP | 0912564 A1 | 5/1999 |
| EP | 0912565 A1 | 5/1999 |
| EP | 0938315 A1 | 9/1999 |
| EP | 1035123 A1 | 9/2000 |
| EP | 1035123 B1 | 8/2003 |
| EP | 1386923 A1 | 2/2004 |
| EP | 1550662 A1 | 7/2005 |
| EP | 1939202 A1 | 7/2008 |
| EP | 2396328 | 12/2011 |
| EP | 1931352 B1 | 4/2016 |
| EP | 3908316 A1 | 11/2021 |
| HK | 1170226 A | 2/2013 |
| HK | 1138767 B | 5/2014 |
| HK | 1177886 B | 7/2016 |
| JP | 11193282 A | 7/1999 |
| JP | 11269177 A | 10/1999 |
| JP | 2004137157 A | 5/2004 |
| JP | 2005046160 A | 2/2005 |
| JP | 2005505504 A | 2/2005 |
| JP | 200589334 A | 4/2005 |
| JP | 2005089334 A | 4/2005 |
| JP | 2005126374 A | 5/2005 |
| JP | 2006519784 A | 8/2006 |
| JP | 2007504232 A | 3/2007 |
| JP | 2009504803 A | 2/2009 |
| JP | 2009510096 A | 3/2009 |
| JP | 2010518082 A | 5/2010 |
| JP | 2012517428 A | 8/2012 |
| JP | 2013525431 A | 6/2013 |
| JP | 2014129425 A | 7/2014 |
| KR | 1020220035870 A | 3/2022 |
| WO | WO-9215581 A1 | 9/1992 |
| WO | WO-9320847 A1 | 10/1993 |
| WO | WO-9817279 A1 | 4/1998 |
| WO | WO-9848805 A1 | 11/1998 |
| WO | WO-9928321 A1 | 6/1999 |
| WO | WO-1999028321 A1 | 6/1999 |
| WO | WO-0043394 A1 | 7/2000 |
| WO | WO-0144259 A1 | 6/2001 |
| WO | WO-0144260 A2 | 6/2001 |
| WO | WO-0149688 A1 | 7/2001 |
| WO | WO-0224225 A1 | 3/2002 |
| WO | WO-0230399 A2 | 4/2002 |
| WO | WO-03077944 A1 | 9/2003 |
| WO | WO-2004029054 A1 | 4/2004 |
| WO | WO-2004066947 A2 | 8/2004 |
| WO | WO-2005025583 A2 | 3/2005 |
| WO | WO-2005060966 A1 | 7/2005 |
| WO | WO-2005092892 A1 | 10/2005 |
| WO | WO-2006062945 A2 | 6/2006 |
| WO | WO-2006065234 A1 | 6/2006 |
| WO | WO-2006100226 A1 | 9/2006 |
| WO | WO-2006117670 A1 | 11/2006 |
| WO | WO-2007024707 A2 | 3/2007 |
| WO | WO-2007024707 A3 | 3/2007 |
| WO | WO-2007034817 A1 | 3/2007 |
| WO | WO-2007034917 A1 | 3/2007 |
| WO | WO-2007038720 A2 | 4/2007 |
| WO | WO-2007128158 A1 | 11/2007 |
| WO | WO-2007142755 A2 | 12/2007 |
| WO | WO-2007142755 A3 | 12/2007 |
| WO | WO-2008005555 A1 | 1/2008 |
| WO | WO-2008115319 A2 | 9/2008 |
| WO | WO-2008115319 A3 | 9/2008 |
| WO | WO-2009005687 A1 | 1/2009 |
| WO | WO-2009099650 A2 | 8/2009 |
| WO | WO-2009099650 A3 | 8/2009 |
| WO | WO-2009099650 A4 | 8/2009 |
| WO | WO-2009143457 A2 | 11/2009 |
| WO | WO-2010033074 A1 | 3/2010 |
| WO | WO-2010077310 A2 | 7/2010 |
| WO | WO-2010093436 A2 | 8/2010 |
| WO | WO-2010093436 A3 | 8/2010 |
| WO | WO-2010077310 A3 | 11/2010 |
| WO | WO-2011139348 A3 | 9/2011 |
| WO | WO-2011134668 A1 | 11/2011 |
| WO | WO-2011134669 A1 | 11/2011 |
| WO | WO-2011139348 A2 | 11/2011 |
| WO | WO-2011139348 A9 | 11/2011 |
| WO | WO-2014052828 A1 | 4/2014 |
| WO | WO-2015023858 A2 | 2/2015 |
| WO | WO-2015023858 A3 | 2/2015 |
| WO | WO-2016164640 A1 | 10/2016 |
| WO | WO-2016168680 A1 | 10/2016 |
| WO | WO-2018183930 A1 | 10/2018 |
| WO | WO-2019212356 A1 | 11/2019 |
| WO | WO-2020086625 A1 | 4/2020 |
| WO | WO-2020186229 A1 | 9/2020 |
| WO | 2021034729 | 2/2021 |
| WO | WO-2022076473 A1 | 4/2022 |
| WO | 2023212095 | 11/2023 |

OTHER PUBLICATIONS

Opoku-Temeng C, Naclerio GA, Mohammad H, Dayal N, Abutaleb NS, Seleem MN, Sintim HO. N-(1, 3, 4-oxadiazol-2-yl) benzamide analogs, bacteriostatic agents against methicillin-and vancomycin-resistant bacteria. European Journal of Medicinal Chemistry. Jul. 15, 2018;155:797-805. (Year: 2018).*

Mitchell LA, Hansen RJ, Beaupre AJ, Gustafson DL, Dow SW. Optimized dosing of a CCR2 antagonist for amplification of vaccine immunity. International immunopharmacology. Feb. 1, 2013;15(2):357-63. (Year: 2013).*

Alumasa JN, Manzanillo PS, Peterson ND, Lundrigan T, Baughn AD, Cox JS, Keiler KC. Ribosome rescue inhibitors kill actively growing and nonreplicating persister *Mycobacterium tuberculosis* cells. ACS Infectious Diseases. Sep. 8, 2017;3(9):634-44. (Year: 2017).*

"International Application Serial No. PCT US2019 057496, Invitation to Pay Add'l Fees and Partial Search Report mailed Jan. 9, 2020", 2 pgs.

"International Application Serial No. PCT US2019 057496, International Search Report mailed Feb. 27, 2020", 4 pgs.

"International Application Serial No. PCT US2019 057496, Written Opinion mailed Feb. 27, 2020", 7 pgs.

"PubChem-CID-4371238", (Sep. 14, 2005), 11 pages.

"International Application Serial No. PCT US2020 046568, Invitation to Pay Additional Fees and Partial Search Report mailed Oct. 27, 2020", 2 pgs.

"PubChem CID 100446926", [Online] Retrieved from the Internet: URL: https: pubchem.ncbi.nlm.nih.gov compound100446926, [Accessed Dec. 8, 2020], (Dec. 11, 2015), 7 pgs.

"International Application Serial No. PCT US2020 046568, International Search Report mailed Jan. 12, 2021", 4 pgs.

"International Application Serial No. PCT US2020 046568, Written Opinion mailed Jan. 12, 2021", 6 pgs.

"International Application Serial No. PCT US2019 056284, International Preliminary Report on Patentability mailed May 6, 2021", 9 pgs.

Bhunia, Debabrata, "Design, Synthesis, and Evaluation of Novel 1,2,3-Triazole-Tethered Glycolipids as Vaccine Adjuvants", Arch. Pharm. Chem. Life Sci. vol. 348, (2015), 15 pages.

(56) References Cited

OTHER PUBLICATIONS

Chan, "Structure-Activity Relationship Studies to Identify Affinity Probes in Bis-aryl Sulfonamides That Prolong Immune Stimuli", Journal of Medicinal Chemistry vol. 62, (Oct. 11, 2019), 9521-9540.
Chan, Michael, "Identification of Biologically Active Pyrimido[5,4-b]indoles That Prolong NF-kappa-B Activation without Intrinsic Activity", ACS Comb Sci. vol. 19(8), (2017), 26 pages.
Yoo, Euna, "Exploration of Toll-like Receptor 7 and 8 Agonists as Potential Vaccine Adjuvants", PhD Diss., University of Kansas, [Online] Retrieved from the Internet: URL: https: kuscholarworks.ku.edu handle 1808 23923?show=full, (May 7, 2017), 281 pgs.
"International Application Serial No. PCT US2021 053648, International Preliminary Report on Patentability mailed Apr. 20, 2023", 7 pgs.
"U.S. Appl. No. 16/495,083, Final Office Action mailed May 16, 2023", 8 pgs.
"International Application Serial No. PCT US2023 020041, Invitation to Pay Additional Fees mailed Jul. 10, 2023", 2 pgs.
"U.S. Appl. No. 16/495,083, Response filed Jul. 17, 2023 to Final Office Action mailed May 16, 2023", 9 pgs.
"U.S. Appl. No. 16/495,083, Advisory Action mailed Jul. 26, 2023", 3 pgs.
"U.S. Appl. No. 16/495,083, Non Final Office Action mailed Sep. 15, 2023", 7 pgs.
"International Application Serial No. PCT US2023 020041, International Search Report mailed Sep. 20, 2023", 4 pgs.
"International Application Serial No. PCT US2023 020041, Written Opinion mailed Sep. 20, 2023", 7 pgs.
"Methylphenyl)sulfonylamino]pyrrolidine-2-carbolic acid", Pubmed Compound Record for CID 21133169 U.S. National Library of Medicine, [Online]. Retrieved from the Internet: https: pubchem.ncbi.nlm.nih.gov compound 21133169, (Dec. 5, 2007), 1-1 0.
Adlard, A., "A novel systemically administered Toll-like receptor 7 agonist potentiates the effect of ionizing radiation in murine solid tumor models", Inter. J of Cancer v.135, 820-829, 2014., (2014), 11 pgs.
De, St. Groth, "T cell activation: in vivo veritas", Immunology and Cell Biology, 82, (2004), 1 pg.
Hansson, M.G., "Commentary Isolated Stem Cells-Patentable as Cultural Artifacts?", Stem Cells, V.25, (2007), 1507-1510.
Lee, "Acetyl-GoA promotes glioblastoma cell adhesion and migration through Ca2+-NFAT signaling", Genes and Development vol. 32, (Apr. 19, 2018), 497-511.
Sato-Kaneko, Fumi, "A Dual Adjuvant System for Intranasal Boosting of Local and Systemic Immunity for Influenza Vaccination", Vaccines 2022, 10, 1694, 17 pgs., https: doi.org 10.3390 vaccines10101694, (Oct. 11, 2022), 17 pgs.
U.S. Appl. No. 12/027,960 U.S. Pat. No. 8,357,374, filed Feb. 7, 2008, Conjugates of Synthetic TLR Agonists and Uses Therefor.
U.S. Appl. No. 13/736,545 U.S. Pat. No. 8,790,655, filed Jan. 8, 2013, Conjugates of Synthetic TLR Agonists and Uses Therefor.
U.S. Appl. No. 14/309,245 U.S. Pat. No. 9,050,376, filed Jun. 19, 2014, Conjugates of Synthetic TLR Agonists and Uses Therefor.
U.S. Appl. No. 12/367,172, filed Feb. 6, 2009, Treatment of Bladder Diseases With a TLR7 Activator.
U.S. Appl. No. 12/302,738 U.S. Pat. No. 8,846,697 filed Dec. 17, 2010, Purine Analogs.
U.S. Appl. No. 13/791,175, filed Mar. 8, 2013, Purine Analogs.
U.S. Appl. No. 12/704,343 U.S. Pat. No. 8,729,088 filed Feb. 11, 2010, Toll-Like Receptor Modulators and Treatment of Diseases.
U.S. Appl. No. 13/140,613, filed Sep. 1, 2011, Amide Derivatives of Ethacrynic Acid.
U.S. Appl. No. 13/695,385, filed Feb. 12, 2013, Uses of Phospholipid Conjugates of Synthetic TLR7 Agonists.
U.S. Appl. No. 14/912,043, filed Feb. 12, 2016, Uses of Phospholipid Conjugates of Synthetic TLR7 Agonists.
U.S. Appl. No. 15/565,097, filed Oct. 6, 2017, Synthetic TLR4 And TLR7 Ligands to Prevent, Inhibit or Treat Liver Disease.
U.S. Appl. No. 15/604,400, filed May 24, 2017, Early Ovarian Cancer Detection Diagnostic Test Based on MRNA Isoforms.
U.S. Appl. No. 16/495,083, filed Sep. 17, 2019, Methods for Isolating, Expanding and Administering Cancer Specific CD8+ T Cells.
U.S. Appl. No. 17/438,934, filed Sep. 13, 2021, TLR4-TLR7 Ligand Formulations as Vaccine Adjuvants.
U.S. Appl. No. 17/635,983, filed Feb. 16, 2022, N-Aryl Sulfonamide Derivatives as Vaccine Adjuvant.
"8H-Purin-8-one, 6-amino-2-(butylthio)-7,9-dihydro-9-(phenylmethyl)-", CAS Registry No. 226906-70-3, (2012), 1 pg.
"8H-Purin-8-one, 6-amino-2-(cyclohexylthio)-7,9-dihydro-9-(phenylmethyl)-", CAS Registry No. 226906-76-9, 1 pg.
"8H-Purin-8-one, 6-amino-2-(ethylthio)-7,9-dihydro-9-(phenylmethyl)-", CAS Registry No. 226906-67-8, 1 pg.
"8H-Purin-8-one, 6-amino-7,9-dihydro-2-(methylthio)-9-(phenylmethyl)-", CAS Registry No. 226906-66-7, 1 pg.
"8H-Purin-8-one, 6-amino-7,9-dihydro-2-(pentylthio)-9-(phenylmethyl)-", CAS Registry No. 226906-73-6, 1 pg.
"8H-Purin-8-one, 6-amino-7,9-dihydro-2-[(1-methylethyl)thio]-9-(phenylmethyl)-", CAS Registry No. 226906-69-0, 1 pg.
"8H-Purin-8-one, 6-amino-7,9-dihydro-2-[(1-methylpropyl)thio]-9-(phenylmethyl)-", CAS Registry No. 226906-72-5, 1 pg.
"8H-Purin-8-one, 6-amino-7,9-dihydro-2-[(2-methylbutyl)thio]-9-(phenylmethyl)-", CAS Registry No. 226906-75-8, 1 pg.
"8H-Purin-8-one, 6-amino-7,9-dihydro-2-[(2-methylpropyl)thio]-9-(phenylmethyl)-", CAS Registry No. 226906-71-4, 1 pg.
"8H-Purin-8-one, 6-amino-7,9-dihydro-2-[(3-methylbutyl)thio]-9-(phenylmethyl)-", CAS Registry No. 226906-74-7, 1 pg.
"8H-Purin-8-one, 6-amino-7,9-dihydro-9-(phenylmethyl)-2-(phenylthio)-", CAS Registry No. 226906-77-0, 1 pg.
"8H-Purin-8-one, 6-amino-7,9-dihydro-9-(phenylmethyl)-2-(propylthio)-", CAS Registry No. 226906-68-9, 1 pg.
"U.S. Appl. No. 12/027,960, Amendment Under 37 C.F.R. Sec. 1.312 filed Nov. 1, 2012", 7 pgs.
"U.S. Appl. No. 12/027,960, Non Final Office Action mailed Apr. 10, 2012", 16 pgs.
"U.S. Appl. No. 12/027,960, Notice of Allowance mailed Aug. 1, 2012", 10 pgs.
"U.S. Appl. No. 12/027,960, Preliminary Amendment mailed Dec. 8, 2010", 21 pgs.
"U.S. Appl. No. 12/027,960, PTO Response to 312 Amendment mailed Nov. 14, 2012", 2 pgs.
"U.S. Appl. No. 12/027,960, Response filed Jul. 10, 2012 to Non Final Office Action mailed Apr. 10, 2012", 8 pgs.
"U.S. Appl. No. 12/027,960, Response filed Oct. 24, 2011 to Restriction Requirement mailed Sep. 23, 2011", 21 pgs.
"U.S. Appl. No. 12/027,960, Restriction Requirement mailed Sep. 23, 2011", 9 pgs.
"U.S. Appl. No. 12/064,529, Final Office Action mailed Sep. 20, 2012", 14 pgs.
"U.S. Appl. No. 12/064,529, Non Final Office Action mailed Apr. 9, 2012", 15 pgs.
"U.S. Appl. No. 12/064,529, Preliminary Amendment filed Feb. 22, 2008", 11 pgs.
"U.S. Appl. No. 12/064,529, Response filed Jul. 9, 2012 to Non Final Office Action mailed Apr. 9, 2012", 11 pgs.
"U.S. Appl. No. 12/064,529, Response filed Oct. 24, 2011 to Restriction Requirement mailed Aug. 24, 2011", 9 pgs.
"U.S. Appl. No. 12/064,529, Restriction Requirement mailed Aug. 24, 2011", 9 pgs.
"U.S. Appl. No. 12/302,738, Final Office Action mailed Oct. 3, 2013", 11 pgs.
"U.S. Appl. No. 12/302,738, Non Final Office Action mailed Jan. 2, 2013", 10 pgs.
"U.S. Appl. No. 12/302,738, Notice of Allowance mailed Apr. 22, 2014", 7 pgs.
"U.S. Appl. No. 12/302,738, Notice of Allowance mailed Dec. 27, 2013", Examiner Interview Summary, 9 pgs.
"U.S. Appl. No. 12/302,738, Preliminary Amendment filed Nov. 26, 2008", 8 pgs.
"U.S. Appl. No. 12/302,738, Response filed Jun. 26, 2013 to Non Final Office Action mailed Jan. 2, 2013", 10 pgs.
"U.S. Appl. No. 12/302,738, Response filed Nov. 19, 2012 to Restriction Requirement mailed Oct. 19, 2012", 7 pgs.

(56) References Cited

OTHER PUBLICATIONS

"U.S. Appl. No. 12/302,738, Response filed Dec. 3, 2013 to Final Office Action mailed Oct. 3, 2013", 8 pgs.
"U.S. Appl. No. 12/302,738, Restriction Requirement mailed Oct. 19, 2012", 7 pgs.
"U.S. Appl. No. 12/367,172, Final Office Action mailed Jan. 18, 2012", 15 pgs.
"U.S. Appl. No. 12/367,172, Final Office Action mailed Apr. 13, 2012", 21 pgs.
"U.S. Appl. No. 12/367,172, Final Office Action mailed Apr. 21, 2015", 19 pgs.
"U.S. Appl. No. 12/367,172, Non Final Office Action mailed May 27, 2011", 20 pgs.
"U.S. Appl. No. 12/367,172, Non Final Office Action mailed Jul. 1, 2014", 20 pgs.
"U.S. Appl. No. 12/367,172, Response filed Mar. 8, 2011 to Restriction Requirement mailed Dec. 8, 2010", 11 pgs.
"U.S. Appl. No. 12/367,172, Response filed Aug. 13, 2012 to Final Office Action mailed Apr. 13, 2012", 9 pgs.
"U.S. Appl. No. 12/367,172, Response filed Nov. 16, 2011 to Non Final Office Action mailed May 27, 2011", 6 pgs.
"U.S. Appl. No. 12/367,172, Response filed Dec. 29, 2014 to Non Final Office Action mailed Jul. 1, 2014", 7 pgs.
"U.S. Appl. No. 12/367,172, Restriction Requirement mailed Dec. 8, 2010", 6 pgs.
"U.S. Appl. No. 12/704,343, Advisory Action mailed Apr. 5, 2013", 3 pgs.
"U.S. Appl. No. 12/704,343, Examiner Interview Summary mailed Feb. 7, 2013", 3 pgs.
"U.S. Appl. No. 12/704,343, Examiner Interview Summary mailed Feb. 25, 2013", 3 pgs.
"U.S. Appl. No. 12/704,343, Final Office Action mailed May 10, 2013", 7 pgs.
"U.S. Appl. No. 12/704,343, Final Office Action mailed Dec. 7, 2012", 9 pgs.
"U.S. Appl. No. 12/704,343, Non Final Office Action mailed Jul. 16, 2012", 14 pgs.
"U.S. Appl. No. 12/704,343, Notice of Allowance mailed Jan. 3, 2014", 11 pgs.
"U.S. Appl. No. 12/704,343, Notice of Allowance mailed Aug. 2, 2013", 10 pgs.
"U.S. Appl. No. 12/704,343, Response filed Feb. 27, 2013 to Final Office Action mailed Dec. 7, 2012", 9 pgs.
"U.S. Appl. No. 12/704,343, Response filed Jun. 5, 2012 to Restriction Requirement mailed May 7, 2012", 7 pgs.
"U.S. Appl. No. 12/704,343, Response filed Jul. 10, 2013 to Final Office Action mailed May 10, 2013", 8 pgs.
"U.S. Appl. No. 12/704,343, Response filed Oct. 16, 2012 to Non Final Office Action mailed Jul. 16, 2012", 12 pgs.
"U.S. Appl. No. 12/704,343, Restriction Requirement mailed May 7, 2012", 7 pgs.
"U.S. Appl. No. 13/140,613, Restriction Requirement mailed Oct. 5, 2012", 10 pgs.
"U.S. Appl. No. 13/682,208, Advisory Action mailed Oct. 30, 2015", 10 pgs.
"U.S. Appl. No. 13/682,208, Advisory Action mailed Dec. 31, 2015", 8 pgs.
"U.S. Appl. No. 13/682,208, Examiner Interview Summary mailed Sep. 11, 2014", 4 pgs.
"U.S. Appl. No. 13/682,208, Final Office Action mailed May 23, 2014", 17 pgs.
"U.S. Appl. No. 13/682,208, Final Office Action mailed Aug. 4, 2015", 19 pgs.
"U.S. Appl. No. 13/682,208, Non Final Office Action mailed Nov. 5, 2014", 11 pgs.
"U.S. Appl. No. 13/682,208, Non Final Office Action mailed Nov. 7, 2013", 13 pgs.
"U.S. Appl. No. 13/682,208, Notice of Allowance mailed Jan. 29, 2016", 11 pgs.
"U.S. Appl. No. 13/682,208, Preliminary Amendment filed Nov. 20, 2012", 7 pgs.
"U.S. Appl. No. 13/682,208, PTO Response to Rule 312 Communication mailed May 13, 2016", 2 pgs.
"U.S. Appl. No. 13/682,208, Response filed Jan. 4, 2016 to Advisory Action mailed Dec. 31, 2015", 6 pgs.
"U.S. Appl. No. 13/682,208, Response filed Feb. 7, 2014 to Non Final Office Action mailed Nov. 7, 2013", 9 pgs.
"U.S. Appl. No. 13/682,208, Response filed May 5, 2015 to Non Final Office Action mailed Nov. 5, 2014", 9 pgs.
"U.S. Appl. No. 13/682,208, Response filed Aug. 7, 2013 to Restriction Requirement mailed Jun. 6, 2013", 8 pgs.
"U.S. Appl. No. 13/682,208, Response filed Sep. 23, 2014 to Final Office Action mailed May 23, 2014", 9 pgs.
"U.S. Appl. No. 13/682,208, Response filed Sep. 28, 2015 to Final Office Action mailed Aug. 4, 2015", 10 pgs.
"U.S. Appl. No. 13/682,208, Response filed Nov. 25, 2015 to Advisory Action mailed Oct. 30, 2015", 14 pgs.
"U.S. Appl. No. 13/682,208, Restriction Requirement mailed Jun. 6, 2013", 9 pgs.
"U.S. Appl. No. 13/695,385, Final Office Action mailed Oct. 28, 2014", 24 pgs.
"U.S. Appl. No. 13/695,385, Non Final Office Action mailed Feb. 4, 2014", 20 pgs.
"U.S. Appl. No. 13/695,385, Response filed May 5, 2014 to Non Final Office Action mailed Feb. 4, 2014", 8 pgs.
"U.S. Appl. No. 13/695,385, Response filed Sep. 24, 2013 to Restriction Requirement mailed Aug. 2, 2013", 7 pgs.
"U.S. Appl. No. 13/695,385, Restriction Requirement mailed Aug. 2, 2013", 7 pgs.
"U.S. Appl. No. 13/736,545, Notice of Allowance mailed Mar. 18, 2014", 6 pgs.
"U.S. Appl. No. 13/736,545, Notice of Allowance mailed Aug. 2, 2013", 9 pgs.
"U.S. Appl. No. 13/736,545, Preliminary Amendment filed Mar. 6, 2013", 3 pgs.
"U.S. Appl. No. 13/791,175, Examiner Interview Summary mailed Jun. 2, 2015", 2 pgs.
"U.S. Appl. No. 13/791,175, Final Office Action mailed Nov. 20, 2014", 12 pgs.
"U.S. Appl. No. 13/791,175, Final Office Action mailed Dec. 26, 2013", 12 pgs.
"U.S. Appl. No. 13/791,175, Non Final Office Action mailed Jun. 7, 2013", 10 pgs.
"U.S. Appl. No. 13/791,175, Non Final Office Action mailed Jul. 21, 2014", 11 pgs.
"U.S. Appl. No. 13/791,175, Preliminary Amendment filed Mar. 8, 2013", 4 pgs.
"U.S. Appl. No. 13/791,175, Response filed Jun. 26, 2014 to Final Office Action mailed Dec. 26, 2013", 9 pgs.
"U.S. Appl. No. 13/791,175, Response filed Oct. 21, 2014 to Non Final Office Action mailed Jul. 21, 2014", 7 pgs.
"U.S. Appl. No. 13/791,175, Response filed Nov. 1, 2013 to Non Final Office Action mailed Jun. 7, 2013", 8 pgs.
"U.S. Appl. No. 14/309,245, Notice of Allowance mailed Jan. 20, 2015", 12 pgs.
"U.S. Appl. No. 14/912,043, Non Final Office Action mailed Aug. 19, 2016", 12 pgs.
"U.S. Appl. No. 14/912,043, Preliminary Amendment filed Feb. 17, 2016", 6 pgs.
"U.S. Appl. No. 15/565,097, Advisory Action mailed Mar. 8, 2019", 3 pgs.
"U.S. Appl. No. 15/565,097, Final Office Action mailed Jan. 8, 2019", 10 pgs.
"U.S. Appl. No. 15/565,097, Non Final Office Action mailed Sep. 10, 2018", 9 pgs.
"U.S. Appl. No. 15/565,097, Non Final Office Action mailed Sep. 13, 2019", 8 pgs.
"U.S. Appl. No. 15/565,097, Preliminary Amendment filed Oct. 11, 2017", 11 pgs.
"U.S. Appl. No. 15/565,097, Response filed Feb. 28, 2019 to Final Office Action mailed Jan. 8, 2019", 11 pgs.

(56) References Cited

OTHER PUBLICATIONS

"U.S. Appl. No. 15/565,097, Response filed Apr. 8, 2019 to Advisory Action mailed Mar. 8, 2019", 15 pgs.
"U.S. Appl. No. 15/565,097, Response filed May 11, 2018 to Restriction Requirement mailed Apr. 20, 2018", 9 pgs.
"U.S. Appl. No. 15/565,097, Response filed Dec. 6, 2018 to Non Final Office Action mailed Sep. 10, 2018", 12 pgs.
"U.S. Appl. No. 15/565,097, Restriction Requirement mailed Apr. 20, 2018", 6 pgs.
"U.S. Appl. No. 15/604,400, Advisory Action mailed Jan. 12, 2021", 3 pgs.
"U.S. Appl. No. 15/604,400, Final Office Action mailed Jun. 2, 2022", 11 pgs.
"U.S. Appl. No. 15/604,400, Final Office Action mailed Oct. 28, 2020", 19 pgs.
"U.S. Appl. No. 15/604,400, Non Final Office Action mailed Mar. 20, 2020", 20 pgs.
"U.S. Appl. No. 15/604,400, Non Final Office Action mailed Sep. 2, 2021", 11 pgs.
"U.S. Appl. No. 15/604,400, Notice of Allowance mailed Feb. 24, 2023", 5 pgs.
"U.S. Appl. No. 15/604,400, Notice of Allowance mailed Oct. 28, 2022", 11 pgs.
"U.S. Appl. No. 15/604,400, Response filed Jan. 28, 2021 to Advisory Action mailed Jan. 12, 2021", 11 pgs.
"U.S. Appl. No. 15/604,400, Response filed Feb. 2, 2022 to Non Final Office Action mailed Sep. 2, 2021", 9 pgs.
"U.S. Appl. No. 15/604,400, Response Filed Jul. 2, 2019 to Restriction Requirement mailed Feb. 6, 2019", 7 pgs.
"U.S. Appl. No. 15/604,400, Response filed Jul. 20, 2020 to Non Final Office Action mailed Mar. 20, 2020", 9 pgs.
"U.S. Appl. No. 15/604,400, Response filed Oct. 4, 2022 to Final Office Action mailed Jun. 2, 2022", 10 pgs.
"U.S. Appl. No. 15/604,400, Response filed Dec. 16, 2019 to Restriction Requirement mailed Oct. 31, 2019", 6 pgs.
"U.S. Appl. No. 15/604,400, Response filed Dec. 28, 2020 to Final Office Action mailed Oct. 28, 2020", 10 pgs.
"U.S. Appl. No. 15/604,400, Restriction Requirement mailed Feb. 6, 2019", 8 pgs.
"U.S. Appl. No. 15/604,400, Restriction Requirement mailed Oct. 31, 2019", 6 pgs.
"U.S. Appl. No. 16/495,083, Advisory Action mailed Dec. 30, 2022", 3 pgs.
"U.S. Appl. No. 16/495,083, Final Office Action mailed Sep. 19, 2022", 6 pgs.
"U.S. Appl. No. 16/495,083, Non Final Office Action mailed Jun. 30, 2022", 7 pgs.
"U.S. Appl. No. 16/495,083, Response filed Jan. 19, 2023 to Advisory Action mailed Dec. 30, 2022", 8 pgs.
"U.S. Appl. No. 16/495,083, Response filed May 31, 2022 to Restriction Requirement mailed Apr. 1, 2022", 6 pgs.
"U.S. Appl. No. 16/495,083, Response filed Aug. 16, 2022 to Non Final Office Action mailed Jun. 30, 2022", 7 pgs.
"U.S. Appl. No. 16/495,083, Response filed Dec. 8, 2022 to Final Office Action mailed Sep. 19, 2022", 8 pgs.
"U.S. Appl. No. 16/495,083, Restriction Requirement mailed Apr. 1, 2022", 4 pgs.
"U.S. Appl. No. 13/695,385, Preliminary Amendment filed Oct. 30, 2012", 7 pgs.
"Aromatic Ions (Chemgapedia)", [online]. [retrieved on Dec. 3, 2012]. Retrieved From Internet: <URL: http://www.chemgapedia.de/vsengine/vlu/vsc/en/ch/12/oc/vlu_organik/aromaten/aromaten/aromaten_gesamt.vlu/Page/vsc/en/ch/12/oc/aromaten/aromaten/ar_ionen/ar_ionen.vscml.html>, (2012), 2 pgs.
"Australia Application Serial No. 2008227128, First Examiner Report mailed Jul. 6, 2012", 2 pgs.
"Australian Application Serial No. 2006283524, Office Action mailed Mar. 27, 2008", 1 pg.
"Australian Application Serial No. 2006283524, Office Action mailed Aug. 3, 2011", 4 pgs.
"Australian Application Serial No. 2006283524, Preliminary Amendment mailed Mar. 3, 2008", 18 pgs.
"Australian Application Serial No. 2006283524, Response filed May 19, 2008 to Office Action mailed Mar. 27, 2008", 10 pgs.
"Australian Application Serial No. 2006283524, Response filed Aug. 2, 2012 to Examiner Report mailed Aug. 3, 2011", 34 pgs.
"Australian Application Serial No. 2007257423, Office Action mailed Jun. 6, 2011", 2 pgs.
"Australian Application Serial No. 2007257423, Office Action mailed Sep. 22, 2010", 4 pgs.
"Australian Application Serial No. 2007257423, Office Action mailed Oct. 20, 2011", 2 pgs.
"Australian Application Serial No. 2007257423, Response filed May 31, 2011 to Office Action mailed Sep. 22, 2010", 16 pgs.
"Australian Application Serial No. 2007257423, Response filed Sep. 13, 2011 to Office Action mailed Jun. 6, 2011", 12 pgs.
"Australian Application Serial No. 2007257423, Response filed Dec. 19, 2011 to Office Action mailed Oct. 20, 2011", 5 pgs.
"Australian Application Serial No. 2008227128, Preliminary Amendment filed Sep. 7, 2009", 45 pgs.
"Australian Application Serial No. 2008227128, Secondary Amendment filed Jan. 9, 2012", 16 pgs.
"Australian Application Serial No. 2009210655, Office Action mailed Apr. 19, 2013", 3 pgs.
"Australian Application Serial No. 2009210655, Response filed Jul. 18, 2013 to First Examiner Report mailed Apr. 19, 2013", 19 pgs.
"Australian Application Serial No. 2010214112 Response filed Feb. 27, 2015 to First Examiner Report mailed May 23, 2014", 16 pgs.
"Australian Application Serial No. 2010214112, First Examiner Report mailed May 23, 2014", 6 pgs.
"Bioassay Record NCI Yeast Anticancer Drug Screen", PUBCHEM, Data for the sgs1 mgt1 strain, PubChem AID 161, <https://pubchem.ncbi.nlm.nih.gov/bioassay/16>, (Aug. 15, 2004), 8 pgs.
"Brazil Application Serial No. PI1008383-9, Office Action mailed Oct. 23, 2018", W/ English translation, 7 pgs.
"Brazilian Application Serial No. PI 0807196-9, Amendment filed Mar. 2, 2011", w/English Claims, 19 pgs.
"Brazilian Application Serial No. PI 0807196-9, Office Action mailed Jun. 11, 2019", w/ English Translation, 9 pgs.
"Brazilian Application Serial No. PI 0807196-9, Response filed Sep. 5, 2019 to Office Action mailed Jun. 11, 2019", w/ English Claims, 26 pgs.
"Brazilian Application Serial No. PI0807196-9, Office Action mailed Apr. 8, 2021", w/ English translation, 11 pgs.
"Brazilian Patent Application Serial No. PI0907907, Amendment filed Dec. 27, 2011", w/ English Claims, 11 pgs.
"Canadian Application Serial No. 2,620,182, Office Action mailed Aug. 24, 2012", 5 pgs.
"Canadian Application Serial No. 2,653,941, Office Action May 10, 2011", 3 pgs.
"Canadian Application Serial No. 2,653,941, Office Action mailed Feb. 8, 2012", 2 pgs.
"Canadian Application Serial No. 2,653,941, Office Action mailed Aug. 23, 2010", 5 pgs.
"Canadian Application Serial No. 2,653,941, Response filed Feb. 23, 2011 to Office Action mailed Aug. 23, 2010", 20 pgs.
"Canadian Application Serial No. 2,653,941, Response filed Aug. 2, 2012 to Office Action mailed Feb. 8, 2012", 7 pgs.
"Canadian Application Serial No. 2,653,941, Response filed Nov. 9, 2011 to Office Action mailed May 10, 2011", 15 pgs.
"Canadian Application Serial No. 2,677,733 Response filed Feb. 16, 2015 to Office Action mailed Aug. 25, 2014", 6 pgs.
"Canadian Application Serial No. 2,677,733, Office Action mailed Jan. 6, 2016", 3 pgs.
"Canadian Application Serial No. 2,677,733, Office Action mailed Aug. 25, 2014", 2 pgs.
"Canadian Application Serial No. 2,677,733, Voluntary Amendment filed Aug. 7, 2009", 45 pgs.
"Canadian Application Serial No. 2,713,438, Office Action mailed Feb. 3, 2015", 5 pgs.
"Canadian Application Serial No. 2,752,074, Office Action mailed Jan. 5, 2016", 5 pgs.

(56) References Cited

OTHER PUBLICATIONS

"Chinese Application Serial No. 200680038761.X, Office Action mailed Mar. 22, 2012", (w/ English Translation), 9 pgs.
"Chinese Application Serial No. 200680038761.X, Office Action mailed Apr. 14, 2010", with English translation, 9 pgs.
"Chinese Application Serial No. 200680038761.X, Office Action mailed Jun. 23, 2011", (w/ English Translation), 9 pgs.
"Chinese Application Serial No. 200680038761.X, Response filed Sep. 7, 2011 to Office Action mailed Jun. 23, 2011", (w/ English Translation of Amended Claims), 19 pgs.
"Chinese Application Serial No. 200680038761.X, Response filed Oct. 29, 2010 to Office Action mailed Apr. 14, 2010", (w/ English Translation of Amended Claims), 22 pgs.
"Chinese Application Serial No. 200680038761.X, Response filed Jul. 6, 2012 to Action mailed Mar. 22, 2012", (w/ English Translation), 9 pgs.
"Chinese Application Serial No. 200880011525.8, Office Action mailed Jan. 30, 2012", English Translation Only, 9 pgs.
"Chinese Application Serial No. 200880011525.8, Office Action mailed Jul. 5, 2012", (w/ English Translation), 14 pgs.
"Chinese Application Serial No. 200880011525.8, Office Action mailed Oct. 16, 2012", (w/ English Translation), 13 pgs.
"Chinese Application Serial No. 200880011525.8, Response filed Feb. 27, 2013 to Office Action mailed Oct. 16, 2012", (w/ English Translation of Amended Claims), 10 pgs.
"Chinese Application Serial No. 200880011525.8, Response filed Jun. 13, 2012 to Office Action mailed Jan. 30, 2012", (w/ English Translation of Claims), 14 pgs.
"Chinese Application Serial No. 200880011525.8, Response filed Sep. 20, 2012 to Office Action mailed Jul. 5, 2012", (w/ English Translation of Claims), 12 pgs.
"Chinese Application Serial No. 200880011525.8, Voluntary Amendment filed Dec. 2, 2010", (w/ English Translation of Claims), 12 pgs.
"Chinese Application Serial No. 200980112411.7, Office Action mailed Nov. 5, 2012", (w/ English Translation), 15 pgs.
"Chinese Application Serial No. 200980112411.7, Office Action mailed Nov. 5, 2012", (English Translation), 8 pgs.
"Chinese Application Serial No. 200980112411.7, Rejection Decision mailed Jul. 23, 2013", (w/ English Translation), 14 pgs.
"Chinese Application Serial No. 200980112411.7, Response filed Mar. 19, 2013 to Office Action mailed Nov. 5, 2012", (w/ English Translation), 4 pgs.
"Chinese Application Serial No. 200980112411.7, Response filed Aug. 15, 2012 to Office Action mailed Feb. 2, 2012", (w/ English Translation of Amended Claims), 70 pgs.
"Chinese Application Serial No. 200980112411.7, Voluntary Amendment filed Jan. 31, 2011", (w/ English Translation of Claims), 74 pgs.
"Chinese Application Serial No. 201080016320.6, Office Action mailed Mar. 20, 2014", w/English translation, 14 pgs.
"Chinese Application Serial No. 201080016320.6, Office Action mailed Jun. 10, 2015", w/English Translation, 10 pgs.
"Chinese Application Serial No. 201080016320.6, Office Action mailed Jul. 8, 2013", (w/ English Translation), 16 pgs.
"Chinese Application Serial No. 201080016320.6, Office Action mailed Oct. 21, 2014", W/ English Translation, 12 pgs.
"Chinese Application Serial No. 201080016320.6, Response filed Mar. 5, 2015 to Office Action mailed Oct. 21, 2014", (w/ English Translation of Amended Claims), 10 pgs.
"Chinese Application Serial No. 201080016320.6, Response filed Aug. 4, 2014 to Office Action mailed Mar. 20, 2014", w/ English translation, 7 pgs.
"Chinese Application Serial No. 201080016320.6, Response filed Nov. 25, 2013 to Office Action mailed Jul. 8, 2013", (w/ English Translation of Claims), 12 pgs.
"Chinese Application Serial No. 201180033022.2 Response filed Jan. 6, 2015 to Non-Final Office Action mailed Sep. 30, 2014", With the English claims, 7 pgs.
"Chinese Application Serial No. 201180033022.2, Office Action mailed Jan. 13, 2014", w/English translation, 12 pgs.
"Chinese Application Serial No. 201180033022.2, Office Action mailed Apr. 28, 2015", w/English Translation, 14 pgs.
"Chinese Application Serial No. 201180033022.2, Office Action mailed Aug. 22, 2014", w/English Translation, 18 pgs.
"Chinese Application Serial No. 201180033022.2, Response filed May 28, 2014 to Office Action mailed Jan. 13, 2014", w/English claims, 9 pgs.
"Chinese Application Serial No. 201180033022.2, Voluntary Amendment filed Sep. 12, 2013", w/English translation, 13 pgs.
"Chinese Application Serial No. 200980112411.7, Office Action Mailed Feb. 2, 2012", w/ English Translation, 9 pgs.
"Definition: Micelle", Merriam-Webster, [Online]. Retrieved from the Internet: <URL:http://www.merriam-webster.com/dictionary/micelle>, (Accessed on Jun. 25, 2014), 1 pg.
"Eurasian Application Serial No. 201001264, Office Action mailed Sep. 12, 2012", (w/ English Summary), 2 pgs.
"Eurasian Application Serial No. 201101165, Office Action mailed Dec. 12, 2012", (w/ English Translation), 7 pgs.
"Eurasian Application Serial No. 200901078—Pending Claims", 2 pgs.
"Eurasian Application Serial No. 200901078, Office Action mailed Jan. 29, 2013", (w/ English Translation), 4 pgs.
"Eurasian Application Serial No. 200901078, Office Action mailed Apr. 2, 2012", w/English Translation, 3 pgs.
"Eurasian Application Serial No. 200901078, Office Action mailed May 26, 2011", (w/ English Translation), 5 pgs.
"Eurasian Application Serial No. 200901078, Office Action mailed Sep. 18, 2012", (w/ English Translation), 4 pgs.
"Eurasian Application Serial No. 200901078, Office Action mailed Sep. 21, 2011", (w/ English Translation), 4 pgs.
"Eurasian Application Serial No. 200901078, Response filed Jan. 16, 2013 to Office Action mailed Sep. 18, 2012", (w/ English Translation of Claims), 68 pgs.
"Eurasian Application Serial No. 200901078, Response filed Jul. 29, 2013 to Office Action mailed Jan. 29, 2013", (w/ English Translation of Claims), 138 pgs.
"Eurasian Application Serial No. 200901078, Response filed Sep. 13, 2011 to Office Action mailed May 11, 2011", (w/ English Translation of Claims), 13 pgs.
"Eurasian Application Serial No. 201001264, Office Action mailed Mar. 20, 2013", (w/ English Translation), 3 pgs.
"Eurasian Application Serial No. 201001264, Office Action mailed Jul. 10, 2014", w/English Claims, 3 pgs.
"Eurasian Application Serial No. 201001264, Office Action mailed Sep. 26, 2013", (w/ English Translation), 3 pgs.
"Eurasian Application Serial No. 201001264, Response filed Apr. 24, 2014 to Office Action mailed Sep. 26, 2013", w/English claims, 4 pgs.
"Eurasian Application Serial No. 201001264, Response filed Jun. 5, 2013 to Office Action mailed Mar. 20, 2013", (w/ English Translation of Amended Claims), 11 pgs.
"Eurasian Application Serial No. 201001264, Response filed Dec. 19, 2012 to Office Action mailed Sep. 12, 2012", (w/ English Translation of Amended Claims), 16 pgs.
"Eurasian Application Serial No. 201101165, Office Action mailed Jun. 28, 2013", (w/ English Translation), 3 pgs.
"Eurasian Application Serial No. 201101165, Response filed Apr. 9, 2013 to Office Action mailed Dec. 12, 2012", (w/ English Translation), 11 pgs.
"Eurasian Application Serial No. 201101165, Response filed Oct. 28, 2013 to Office Action mailed Jun. 28, 2013", (w/ English Translation of Amended Claims), 10 pgs.
"Eurasian Patent Application Serial No. 200901078, Response filed Mar. 21, 2012 to Office Action mailed Sep. 21, 2011", (w/ English Translation of Claims), 8 pgs.
"Eurasian Patent Application Serial No. 200901078, Response filed Aug. 2, 2012 to Office Action mailed Apr. 2, 2012", (w/ English Translation of Claims), 4 pgs.
"European Application Serial No. 12004181.9, European Search Report mailed Sep. 13, 2012", 8 pgs.

(56) References Cited

OTHER PUBLICATIONS

"European Application Serial No. 06813535.9, Examination Notification Art. 94(3) mailed Sep. 24, 2013", 4 pgs.
"European Application Serial No. 06813535.9, Extended Search Report mailed Oct. 24, 2011", 6 pgs.
"European Application Serial No. 06813535.9, Response filed Apr. 4, 2014 to Examination Notification Art. 94(3) mailed Sep. 24, 2013", 70 pgs.
"European Application Serial No. 06813535.9, Response filed May 14, 2012 to Extended Search Report mailed Oct. 24, 2011", 18 pgs.
"European Application Serial No. 06813535.9, Voluntary Amendment filed Apr. 22, 2008", 9 pgs.
"European Application Serial No. 07755916.9, Examination Notification Art. 94(3) mailed Aug. 15, 2013", 4 pgs.
"European Application Serial No. 07755916.9, Office Action mailed Mar. 25, 2014", 1 pg.
"European Application Serial No. 07755916.9, Office Action mailed Nov. 11, 2011", 1 pg.
"European Application Serial No. 07755916.9, Response filed May 18, 2012 to Extended Search Report mailed Oct. 25, 2011", 11 pgs.
"European Application Serial No. 07755916.9, Response filed May 23, 2014 to Examination Notification Art. 94(3) mailed Aug. 15, 2013", 13 pgs.
"European Application Serial No. 07755916.9, Response filed May 23, 2014 to Office Action mailed Mar. 25, 2014", 10 pgs.
"European Application Serial No. 07755916.9, Supplemental Search Report mailed Oct. 25, 2011", 9 pgs.
"European Application Serial No. 08799591.6, Office Action mailed May 21, 2012", 4 pgs.
"European Application Serial No. 08799591.6, Office Action mailed Jun. 4, 2010", 4 pgs.
"European Application Serial No. 08799591.6, Response filed Sep. 20, 2012 to Office Action mailed May 21, 2012", 31 pgs.
"European Application Serial No. 08799591.6, Response filed Nov. 22, 2011 to Office Action mailed May 17, 2011", 26 pgs.
"European Application Serial No. 08799591.6, Response filed Dec. 2, 2010 to Office Action mailed Jun. 4, 2010", 20 pgs.
"European Application Serial No. 09709019.5, Examination Notification Art. 94(3) mailed Apr. 22, 2015", 6 pgs.
"European Application Serial No. 09709019.5, Examination Notification Art. 94(3) mailed Oct. 9, 2013", 6 pgs.
"European Application Serial No. 09709019.5, Extended European Search Report mailed Feb. 15, 2011", 8 pgs.
"European Application Serial No. 09709019.5, Extended European Search Report mailed Feb. 15, 2011", 7 pgs.
"European Application Serial No. 09709019.5, Notification of Loss of Rights mailed Oct. 21, 2011", 2 pgs.
"European Application Serial No. 09709019.5, Office Action mailed Mar. 19, 2013", 5 pgs.
"European Application Serial No. 09709019.5, Response filed Sep. 25, 2013 to Examination Notification Art. 94(3) mailed Mar. 19, 2013", 25 pgs.
"European Application Serial No. 09709019.5, Response filed Dec. 7, 2011 to Communication pursuant to 70(2) and 70a(2) EPC and the Notification of Loss of Rights mailed Oct. 21, 2011", 41 pgs.
"European Application Serial No. 10706399.2, Communication pursuant to Rules 16(1) and 162 EPC mailed Sep. 27, 2011", 2 pgs.
"European Application Serial No. 10706399.2, Examination Notification Art. 94(3) mailed Jun. 11, 2015", 6 pgs.
"European Application Serial No. 10706399.2, Examination Notification mailed Apr. 17, 2013", 4 pgs.
"European Application Serial No. 10706399.2, Examination Notification mailed Oct. 2, 2012", 6 pgs.
"European Application Serial No. 10706399.2, Response filed Mar. 21, 2013 to Examination Notification mailed Oct. 2, 2012", 11 pgs.
"European Application Serial No. 10706399.2, Response filed Aug. 13, 2013 to Examination Notification Art. 94(3) mailed Apr. 17, 2013", 12 pgs.
"European Application Serial No. 11777689.8, Amendment filed Mar. 12, 2014", 11 pgs.
"European Application Serial No. 11777689.8, Communication pursuant to Rules 70(2) and 70a(2) EPC mailed Nov. 6, 2013", 1 pg.
"European Application Serial No. 11777689.8, Examination Notification Art. 94(3) mailed Oct. 8, 2014", 6 pgs.
"European Application Serial No. 11777689.8, Response filed Mar. 12, 2014 to Communication pursuant to Rules 70(2) and 70a(2) EPC mailed Nov. 6, 2013", 11 pgs.
"European Application Serial No. 11777689.8, Supplementary European Search Report mailed Oct. 18, 2013", 5 pgs.
"European Application Serial No. 12004181.9 Response Filed Dec. 15, 2014 to Non-Final Office Action Mailed Jul. 18, 2014", 138 pgs.
"European Application Serial No. 12004181.9, Communication mailed Oct. 22, 2012", 2 pgs.
"European Application Serial No. 12004181.9, Communication pursuant to Rule 112(1) EPC mailed May 31, 2013", 1 pg.
"European Application Serial No. 12004181.9, Examination Notification Art. 94(3) mailed Jul. 18, 2014", 4 pgs.
"European Application Serial No. 12004181.9, Examination Notification Art. 94(3) mailed Sep. 2, 2013", 5 pgs.
"European Application Serial No. 12004181.9, Response filed Mar. 7, 2014 to Examination Notification Art. 94(3) mailed Sep. 2, 2013", 10 pgs.
"European Application Serial No. 12004181.9, Response filed Jul. 31, 2013 to Communication pursuant to Rule 112(1) EPC mailed May 31, 2013 and Communication mailed Oct. 22, 2012", 9 pgs.
"European Application Serial No. 13001458.2, Communication Pursuant to Article 94(3) EPC mailed Mar. 22, 2016", 5 pgs.
"European Application Serial No. 13001458.2, Communication pursuant to Rules 70(2) and 70a(2) EPC mailed Jul. 1, 2013", 1 pg.
"European Application Serial No. 13001458.2, Examination Notification Art. 94(3) mailed Apr. 14, 2014", 5 pgs.
"European Application Serial No. 13001458.2, Extended European Search Report mailed Apr. 22, 2013", 5 pgs.
"European Application Serial No. 13001458.2, Response filed Oct. 20, 2014 to Examination Notification Art. 94(3) mailed Apr. 14, 2014", 28 pgs.
"European Application Serial No. 13001458.2, Response filed Dec. 16, 2013 to Communication pursuant to Rules 70(2) and 70a(2) EPC mailed Jul. 1, 2013", 8 pgs.
"European Application Serial No. 13001957.3, Extended European Search Report mailed Jan. 28, 2014", 17 pgs.
"European Application Serial No. 13001957.3, Office Action mailed Mar. 3, 2014", 2 pgs.
"European Application Serial No. 13001957.3, Response filed Aug. 20, 2014 Extended European Search Report mailed Jan. 28, 2014", Includes Response Office Action mailed Mar. 3, 2014, 7 pgs.
"European Application Serial No. 20770127.7, Extended European Search Report mailed Feb. 27, 2023.", 10 pgs.
"European Application Serial No. 20770127.7, Response to Communication pursuant to Rules 161(2) and 162 EPC filed Mar. 8, 2022", 22 pgs.
"European Application Serial No. 08799591.6, Examination Notification Art. 94(3) mailed May 17, 2011", 5 pgs.
"I. Pharmaceutical Importance of Crystallin Hydrates", [online]. [retrieved on May 30, 2008]. Retrieved from the Internet: <URL:http://www.netlibrary.com/nlreader.dll?bookid=12783&filename=Page_126.html>, (2008), 126-127.
"Indian Application Serial No. 10156/DELNP/2012, Amendment filed Dec. 26, 2012", 14 pgs.
"Indian Application Serial No. 10156/DELNP/2012, First Examination Report mailed Oct. 25, 2017", (W/ English Translation), 5 pgs.
"Indian Application Serial No. 2064/DELNP/2008, Examination Report mailed Aug. 21, 2012", 5 pgs.
"Indian Application Serial No. 5675/DELNP/2009 Response filed Mar. 18, 2015 to First Examination Report mailed Sep. 11, 2014", 6 pgs.
"Indian Application Serial No. 5675/DELNP/2009, First Examiner Report mailed Sep. 11, 2014", 2 pgs.
"Indian Application Serial No. 5675/DELNP/2009, Voluntary Amendment filed Feb. 18, 2011", 7 pgs.
"Indian Application Serial No. 6293/DELNP/2010, First Examiner Report mailed Dec. 22, 2016", 8 pgs.

(56) References Cited

OTHER PUBLICATIONS

"Indian Application Serial No. 6531-DELNP-2011, First Examiner Report mailed on Jun. 23, 2017", 7 pgs.
"Indian Application Serial No. 6531-DELNP-2011, Response filed Feb. 6, 2020 to Hearing of Jan. 28, 2020", 34 pgs.
"Indian Application Serial No. 6531-DELNP-2011, Response Filed Sep. 8, 2017 to First Examiner Report mailed on Jun. 23, 2017", (W/ English Claims), 19 pgs.
"International Application Serial No. PCT/US06/32371, International Preliminary Report on Patentability mailed Mar. 6, 2008", 6 pgs.
"International Application Serial No. PCT/US06/32371, International Search Report mailed Jul. 23, 2007", 3 pgs.
"International Application Serial No. PCT/US06/32371, Written Opinion mailed Jul. 23, 2007", 16 pgs.
"International Application Serial No. PCT/US2007/009840, International Preliminary Report on Patentability mailed Dec. 18, 2008", 9 pgs.
"International Application Serial No. PCT/US2007/009840, International Search Report mailed Aug. 5, 2008", 4 pgs.
"International Application Serial No. PCT/US2007/009840, Written Opinion mailed Aug. 5, 2008", 7 pgs.
"International Application Serial No. PCT/US2008/001631, International Preliminary Examination Report mailed Aug. 20, 2009", 12 pgs.
"International Application Serial No. PCT/US2008/001631, International Search Report mailed Jan. 21, 2009", 6 pgs.
"International Application Serial No. PCT/US2008/001631, Written Opinion mailed Jan. 21, 2009", 9 pgs.
"International Application Serial No. PCT/US2009/000771, International Preliminary Report on Patentability mailed Aug. 19, 2010", 8 pgs.
"International Application Serial No. PCT/US2009/000771, International Search Report mailed Aug. 28, 2009", 4 pgs.
"International Application Serial No. PCT/US2009/000771, Written Opinion mailed Aug. 28, 2009", 5 pgs.
"International Application Serial No. PCT/US2009/006584, International Preliminary Report on Patentability mailed Jun. 30, 2011", 8 pgs.
"International Application Serial No. PCT/US2009/006584, Search Report mailed Sep. 8, 2010", 5 pgs.
"International Application Serial No. PCT/US2009/006584, Written Opinion mailed Sep. 8, 2010", 6 pgs.
"International Application Serial No. PCT/US2010/000369, International Preliminary Report on Patentability dated Jun. 28, 2011", 13 pgs.
"International Application Serial No. PCT/US2010/000369, International Search Report mailed Sep. 21, 2010", 6 pgs.
"International Application Serial No. PCT/US2010/000369, Partial International Search Report mailed Jul. 5, 2010", 6 pgs.
"International Application Serial No. PCT/US2010/000369, Response filed Dec. 21, 2010 to Written Opinion mailed Sep. 21, 2010", 8 pgs.
"International Application Serial No. PCT/US2010/000369, Written Opinion mailed Feb. 11, 2010", 9 pgs.
"International Application Serial No. PCT/US2010/000369, Written Opinion mailed Sep. 21, 2010", 9 pgs.
"International Application Serial No. PCT/US2011/000757, International Preliminary Report on Patentability, mailed Nov. 15, 2012", 7 pgs.
"International Application Serial No. PCT/US2011/000757, International Search Report mailed Dec. 21, 2011", 5 pgs.
"International Application Serial No. PCT/US2011/000757, Written Opinion mailed Dec. 21, 2011", 6 pgs.
"International Application Serial No. PCT/US2014/051090, International Preliminary Report on Patentability mailed Feb. 25, 2016", 6 pgs.
"International Application Serial No. PCT/US2014/051090, International Search Report mailed Nov. 14, 2014", 4 pgs.
"International Application Serial No. PCT/US2014/051090, Written Opinion mailed Nov. 14, 2014", 4 pgs.

"International Application Serial No. PCT/US2016/026522, International Preliminary Report on Patentability mailed Oct. 19, 2017", 9 pgs.
"International Application Serial No. PCT/US2016/026522, International Search Report mailed Jun. 20, 2016", 5 pgs.
"International Application Serial No. PCT/US2016/026522, Written Opinion mailed Jun. 20, 2016", 7 pgs.
"International Application Serial No. PCT/US2018/025522, International Preliminary Report on Patentability mailed Oct. 10, 2019", 8 pgs.
"International Application Serial No. PCT/US2018/025522, International Search Report mailed Jun. 18, 2018", 3 pgs.
"International Application Serial No. PCT/US2018/025522, Written Opinion mailed Jun. 18, 2018", 6 pgs.
"International Application Serial No. PCT/US2020/022786, International Preliminary Report on Patentability mailed Sep. 23, 2021", 7 pgs.
"International Application Serial No. PCT/US2020/022786, International Search Report mailed Jun. 16, 2020", 3 pgs.
"International Application Serial No. PCT/US2020/022786, Written Opinion mailed Jun. 16, 2020", 5 pgs.
"International Application Serial No. PCT/US2020/046568, International Preliminary Report on Patentability mailed Mar. 3, 2022", 8 pgs.
"International Application Serial No. PCT/US2021/053648, International Search Report mailed Mar. 9, 2022", 5 pgs.
"International Application Serial No. PCT/US2021/053648, Invitation to Pay Additional Fees mailed Dec. 9, 2021", 3 pgs.
"International Application Serial No. PCT/US2021/053648, Written Opinion mailed Mar. 9, 2022", 5 pgs.
"Isolation/Modification/Labeling Product Sheet", Interchim Inc, (Jan. 15, 2000), 1-23.
"Israel Application Serial No. 207246, Office Action mailed May 27, 2014", 2 pgs.
"Israel Application Serial No. 207246, Office Action mailed Feb. 10, 2013", (English Translation), 2 pgs.
"Israel Application Serial No. 207246, Response filed Jun. 10, 2013 to Office Action mailed Feb. 10, 2013", (w/ English Translation of Claims), 7 pgs.
"Israeli Application Serial No. 200240, Examiner Report mailed Aug. 5, 2013", (English Translation), 3 pgs.
"Israeli Application Serial No. 200240, Examiner Report mailed Aug. 28, 2012", (English Translation), 4 pgs.
"Israeli Application Serial No. 200240, Response filed Nov. 25, 2013 to Examiner Report mailed Aug. 5, 2013", w/ English translation, 8 pgs.
"Israeli Application Serial No. 200240, Response filed Dec. 17, 2012", 5 pgs.
"Israeli Application Serial No. 200240, Response filed Dec. 17, 2012 to Examiner Report mailed Aug. 28, 2012", (w/ English Translation of Claims), 4 pgs.
"Israeli Application Serial No. 207246, Office Action mailed Jun. 29, 2015", 3 pgs.
"Israeli Application Serial No. 214572, Office Action mailed Jan. 2, 2014", (English Translation), 2 pgs.
"Israeli Application Serial No. 214572, Office Action mailed Feb. 7, 2014", 2 pgs.
"Israeli Application Serial No. 214572, Office Action mailed Jul. 9, 2013", (English Translation), 3 pgs.
"Israeli Application Serial No. 214572, Office Action mailed Nov. 13, 2012", EN Office Action only, 2 pgs.
"Israeli Application Serial No. 214572, Response filed Apr. 28, 2014 to Office Action mailed Jan. 2, 2014", English claims, 10 pgs.
"Israeli Application Serial No. 214572, Response filed Nov. 3, 2013 to Office Action mailed Jul. 9, 2013", (English Translation of Claims), 5 pgs.
"Israeli Application Serial No. 214572, Response filed Dec. 30, 2014 to Office Action mailed Jul. 3, 2014", 4 pgs.
"Israeli Application Serial No. 214572, Response filed Dec. 30, 2014 to Office Action mailed Jul. 9, 2013", English claims only, 4 pgs.
"Japanese Application Serial No. 2008-528017, Office Action mailed May 22, 2012", (w/ English Transation), 7 pgs.

(56) References Cited

OTHER PUBLICATIONS

"Japanese Application Serial No. 2008-528017, Preliminary Amendment filed Aug. 12, 2009", w/English Claims, 26 pgs.

"Japanese Application Serial No. 2008-528017, Response filed Nov. 20, 2012 to Office Action mailed May 22, 2012", (w/ English Translation of Amended Claims), 19 pgs.

"Japanese Application Serial No. 2009-549102, Office Action mailed May 29, 2013", (w/ English Translation), 5 pgs.

"Japanese Application Serial No. 2009-549102, Office Action mailed Oct. 16, 2012", (w/ English Translation), 10 pgs.

"Japanese Application Serial No. 2009-549102, Response filed Mar. 22, 2013 to Office Action mailed Oct. 16, 2012", (w/ English Translation of Amended Claims), 7 pgs.

"Japanese Application Serial No. 2009-549102, Response filed Aug. 20, 2013 to Office Action mailed May 29, 2013", (w/ English Translation of Amended Claims), 5 pgs.

"Japanese Application Serial No. 2009-549102, Voluntary Amendment filed Feb. 7, 2011", (w/ English Translation of Amended Claims), 24 pgs.

"Japanese Application Serial No. 2010-545884, Amendment filed Jan. 23, 2012", (English Translation), 7 pgs.

"Japanese Application Serial No. 2010-545884, Examiners Decision of Final Refusal mailed Aug. 20, 2014", 6 pgs.

"Japanese Application Serial No. 2010-545884, Office Action mailed Oct. 9, 2013", (w/ English Translation), 5 pgs.

"Japanese Application Serial No. 2010-545884, Response filed Apr. 8, 2014 to Office Action mailed Oct. 9, 2013", w/English claims, 49 pgs.

"Japanese Application Serial No. 2010-545884, Voluntary Amendment filed Oct. 7, 2010", (w/ English Translation), 65 pgs.

"Japanese Application Serial No. 2011-549168, Amendment Filed Dec. 27, 2012", (English Translation of Claims), 6 pgs.

"Japanese Application Serial No. 2011-549168, Office Action mailed Apr. 17, 2015", w/English translation, 5 pgs.

"Japanese Application Serial No. 2011-549168, Office Action mailed Jun. 2, 2014", w/English translation, 13 pgs.

"Japanese Application Serial No. 2011-549168, Response filed Dec. 1, 2014 to Office Action mailed Jun. 2, 2014", W/ English Translation, 19 pgs.

"Japanese Application Serial No. 2011-549168, Response filed Dec. 1, 2014 to Office Action mailed Jun. 2, 2014", w/ English Translation of Amended Claims), 19 pgs.

"Japanese Application Serial No. 2013-507951, Office Action mailed Mar. 6, 2015", 4 pgs.

"Japanese Application Serial No. 2013-507951, Voluntary Amendment filed Mar. 19, 2014", 13 pgs.

"Japanese Application Serial No. 2013-59721, Office Action mailed May 30, 2014", w/English translation, 10 pgs.

"Japanese Application Serial No. 2014-79326, Office Action mailed Mar. 31, 2015", 2 pgs.

"Japanese Patent Application Serial No. 2008-528017, Office Action mailed May 22, 2012", (English Translation), 4 pgs.

"Korean Application Serial No. 10-2009-7018499, Office Action mailed Sep. 17, 2014", 8 pgs.

"Korean Application Serial No. 10-2011-7021190, Office Action mailed Aug. 18, 2016", 11pgs.

"Korean Application Serial No. 10-2010-7019944, Amendment filed Jan. 10, 2014", w/English claims, 31 pgs.

"Mexican Application Serial No. MX/a/2010/008697, Response filed Mar. 28, 2012 to Office Action mailed Nov. 28, 2011", (w/ English Translation of Claims), 22 pgs.

"Mexican Application Serial No. MX/a/2010/008697, Office Action mailed Nov. 28, 2011", (w/ English Translation), 7 pgs.

"Mexican Application Serial No. MX/a/2010/008697, Response filed Jul. 10, 2012 to Office Action mailed May 4, 2012", (w/ English Translation of Claims), 6 pgs.

"Mexican Application Serial No. MX/a/2010/8697, Office Action mailed May 10, 2012", (English Translation), 3 pgs.

"Mexican Application Serial No. MX/a/2011/008500, Office Action mailed Jun. 14, 2013", (English Translation), 1 pg.

"Mexican Application Serial No. MX/a/2011/008500, Response filed Oct. 24, 2013 to Office Action mailed Jun. 14, 2013", (w/ English Translation of Claims), 17 pgs.

"Modulation of cytokine production and enhancement of cell viability by TLR7 and TLR9 ligands during anthrax infection of macrophages", FEMS Immunol. Med. Microbiol., 2006, vol. 47, No. 3, 369-379.

"Singapore Application Serial No. 201005638-0, Response filed Aug. 22, 2012 to Office Action mailed Jun. 27, 2012", 2 pgs.

"Singapore Application Serial No. 201005638-0, Examination Report mailed Dec. 6, 2012", (English Translation), 6 pgs.

"Singapore Application Serial No. 201005638-0, Office Action mailed Jun. 27, 2012", 7 pgs.

"Singapore Application Serial No. 201005638-0, Office Action mailed Nov. 9, 2011", 16 pgs.

"Singapore Application Serial No. 201005638-0, Search Report mailed Oct. 27, 2011", 7 pgs.

"Singapore Application Serial No. 201005638-0, Written Opinion mailed Oct. 27, 2011", 8 pgs.

"Singapore Application Serial No. 201005638-0, Office Action Response filed Mar. 29, 2012 to Office Action mailed Nov. 9, 2011", (English Translation), 91 pgs.

"Substance Record for SID 384153951", PUBCHEM, <https://pubchem.ncbi.nlm.nih.gov/6Ubstance/384153951>, (May 15, 2019), 5 pgs.

"Substance Record for SID 458963136", PUBCHEM, <https://pubchem.ncbi.nlm.nih.gov/substance/458963136>, (Dec. 15, 2021), 6 pgs.

"Synthesis and Immunological Characterization of Tull-Like Receptor 7 Agonistic Conjugates", Bioconjug. Chem., 2009, vol. 20, No. 6, 1194-1200.

"Turkey Application Serial No. 120041819, Office Action mailed Apr. 29, 2016", w/ English translation, 6 pgs.

Admyre, et al., "", Europ. J of Immunology, v.36, (2006), 1772-1781.

Anders, H.-J., et al., "Molecular mechanisms of autoimmunity triggered by microbial infection", Arthritis Research & Therapy, 7(5), (2005), 215-224.

Ang, W. H, et al., "Organometallic ruthenium inhibitors of glutathione-S-transferase P1-1 as anticancer drugs.", ChemMedChem, 2(12), (Dec. 2007), 1799-806.

Baenziger, S., et al., "Triggering TLR7 in mice induces immune activation and lymphoid system disruption, resembling HIV-mediated pathology", Blood, 113(2), (Jan. 8, 2009), 377-388.

Barrett, et al., "Systematic transcriptome analysis reveals tumor-specific isoforms for ovarian cancer diagnosis and therapy", PNAS, (May 26, 2015), E3050-E3057.

Brown, Gordon, "Dectin-1: a signalling non-TLR pattern-recognition receptor", Nature Reviews Immunology, (2006), 33-43.

Bryan, G. T., et al., "Interferon (IFN) and IFN Inducers Protect Mouse Bladder Urothelium Against Carcinogenicity by FANFT", Journal of Cancer Research and Clinical Oncology, 116(Suppl. Part 1), (Abstract A3.106.36), (15th International Cancer Congress, Hamburg, Aug. 16-22, 1990), (1990), p. 308.

Butler, Roslyn S, et al., "Highly fluorescent donor acceptor purines", J. Mater. Chem, 17(19), (2007), 1863-1865.

Carson, D. A., et al., "TLR Agonists", U.S. Appl. No. 60,710,337, filed Aug. 22, 2005, 52 pgs.

Chan, M., et al., "Identification of Substituted Pyrimido[5,4-b]indoles as Selective Toll-Like Receptor 4 Ligands", J. Med. Chem., 56, (2013), 4206-4223.

Chan, M., et al., "Synthesis and Characterization of PEGylated Toll Like Receptor 7 Ligands", Bioconjugate Chem., 22, (2011), 445-454.

Chan, Michael, et al., "Structure-Activity Relationship Studies of Pyrimido[5,4-b]indoles as Selective Toll-Like Receptor 4 Ligands", J Med Chem. Nov. 22, 2017, 60(22) pp. 9142-9161, [Online]. Retrieved from the Internet: <URL: https://www.ncbi.nlm.nih.gov/pmc/articles/PMC5940354/pdf/nihms959842.pdf>, (May 8, 2018), 48 pgs.

Chan, Michael, et al., "Synthesis and Immunological Characterization of Toll-Lke Receptor 7 Agonistic Conjugates", Bioconjugate Chem., 20(6), (2009), 1194-1200.

(56) References Cited

OTHER PUBLICATIONS

Colombo, R., et al., "Combination of intravesical chemotherapy and hyperthermia for the treatment of superficial bladder cancer: preliminary clinical experience", Crit Rev Oncol Hematol., 47(2), (Aug. 2003), 127-39.

David, Charles J, et al., "Alternative pre-mRNA splicing regulation in cancer: pathways and programs unhinged", Genes and Development, vol. 24, [Online] Retrieved from the Internet: <URL: http://www.genesdev.org/cgi/doi/10.1101/gad.1973010>, (2010), 2343-2364.

Dolan, M. E, et al., "Metabolism of O6-benzylguanine, an inactivator of O6-alkylguanine-DNA alkyltransferase.", Cancer Res., 54(19), (Oct. 1, 1994), 5123-30.

Fox, et al., "A nanoliposome delivery system to synergistically trigger TLR4 and TLR7", Journal of Nanobiotechnology vol. 12, (Apr. 26, 2014), 1-9.

Goff, P.H., et al., "Synthetic Toll-Like Receptor 4 (TLR4) and TLR7 Ligands and Influenza Virus Vaccine Adjuvants Induce Rapid, Sustained, and Broadly Protective Responses", Journal of Virology, 89, (Mar. 2015), 3221-3235.

Goff, Peter, et al., "Synthetic Toll-Like Receptor 4 (TLR4) and TLR7 Ligands as Influenza Virus Vaccine Adjuvants Induce Rapid, Sustained, and Broadly Protective Responses", Journal of Virology, vol. 89, No. 6, Mar. 2015., (Mar. 2015), 15 pgs.

Greenwald, R B, et al., "Poly(Ethylene Glycol) Conjugated Drugs and Prodrugs: A Comprehensive review", Critical reviews in therapeutic drug carrier systems vol. 17, No. 2, (Jan. 1, 2000), 101-161.

Hayashi, T., et al., "Mast cell-dependent anorexia and hypothermia induced by mucosal activation of Toll-like receptor 7", Am J Physiol Regul Integr Comp Physiol., 295(1), (2008), R123-32.

Hayashi, T., et al., "Novel Synthetic Toll-Like Receptor 4/MD2 Ligands Attenuate Sterile Inflammation", J. Pharmacol.Exp. Ther., 350, (Aug. 2014), 330-340.

Hemler, Martin E, "Tetraspanin proteins promote multiple cancer stages", Nature Reviews Cancer, vol. 14, (Jan. 2014), 49-60.

Horner, et al., "Optimized conjugation ratios lead to allergen immunostimulatory oligodeoxynucleotide conjugates with retained Immunogenicity and minimal anaphylactogenicity", J Allergy Clin Immunol 110, (2002), 413-42 0.

Hwang, Jae Ryoung, et al., "Upregulation of CD9 in ovarian cancer is related to the induction of TNF-alpha gene expression and constitutive NF-kappa Beta activation", Carcinogenesis Advance Access, (Nov. 16, 2011), 7 pgs.

Jacobson, Kenneth A, et al., "Adenosine analogs with covalently attached lipids have enhanced potency at Al-adenosine receptors", FEBS Letters, 225(1-2), (1987), 97-102.

Jin, G., et al., "Synthesis and immunostimulatory activity of 8-substituted amino 9-benzyladenines as potent Toll-like receptor 7 agonists.", Bioorg Med Chem Lett., 16(17), (Sep. 1, 2006), 4559-4563.

Johnson, John W, et al., "Binding of Liposomes to Human Bladder Tumor Epithelial Cell Lines: Implications for an Intravesical Drug Delivery System for the Treatment of Bladder Cancer", Selective Cancer Therapeutics vol. 5, No. 4, 1989, [Online]. Retrieved from the Internet: <http://online.liebertpub.com/doi/pdf/10.1089/sct.1989.5.147>, (1989), 9 pgs.

Julien, R. M., "Chapter 2: Pharmacodynamics: How Drugs Act", A Primer of Drug Action (Ninth Edition); Worth Publishers, (2001), 37-57.

Kaeppler, U., et al., "A new lead for nonpeptidic active-site-directed inhibitors of the severe acute respiratory syndrome coronavirus main protease discovered by a combination of screening and docking methods.", J Med Chem., 48(22), (Nov. 3, 2005), 6832-42.

Kobayashi, H., et al., "Prepriming: a novel approach to DNA-based vaccination and immunomodulation", Springer Seminars in Immunopathology, 22(Nos. 1-2), (2000), 85-96.

Krawitt, "Autoimmune hepatitis", N Engl J Med. Jan. 5, 2006;354(1):, (2006), 54-66.

Kulikov, V. I, et al., "Lipid derivatives of prostaglandins and nonsteroidal antiinflammatory drugs (a review)", Pharmaceutical Chemistry Journal, 31(4), (1997), 173-177.

Kurimoto, A., et al., "Prodrugs of 9-benzyl-8-hydroxy-2-(2-hydroxyethylthio)adenine: potent interferon inducing agents in monkeys", Chem. Pharm. Bull. 52(4), Retrieved from the Internet: <URL: https://www.jstage.jst.go.jp/article/cpb/52/4/52_4_466/_pdf/-char/ja>, (2004), 466-469.

Kurimoto, A., et al., "Synthesis and evaluation of 2-substituted 8-hydroxyadenines as potent interferon inducers with improved oral bioavailabilities", Bioorg Med Chem., 12(5), (Mar. 1, 2004), 1091-1099.

Kurimoto, A., et al., "Synthesis and structure-activity relationships of 2-amino-8-hydroxyadenines as orally active interferon inducing agents", Bioorg Med Chem., 11(24), (Dec. 1, 2003), 5501-8.

Lam, Andy Ky, et al., "FOXM1b, which is present at elevated levels in cancer cells, has a greater transforming potential than FOXM1c", Frontiers in Oncology, 3(11), (Jan. 2012), 5 pgs.

Lee, J., et al., "Molecular basis for the immunostimulatory activity of guanine nucleoside analogs: Activation of Toll-like receptor 7", Proc. Natl. Acad. Sci., 100(11), (2003), 6646-6651.

Leth-Larsen, Rikke, et al., "Functional Heterogeneity within the CD44 High Human Breast Cancer Stem Cell-Like Compartment Reveals a Gene Signature Predictive of Distant Metastasis", Molecular Medicine, vol. 18, (2012), 1109-21.

Lippard, Stephen J, "The Art of chemistry", Nature, 416, (2002), 587.

Liu, H., et al., "Tumour growth inhibition by an imidazoquinoline is associated with c-Myc down-regulation in urothelial cell carcinoma", BJU International, 101(7), (Apr. 2008), 894-901.

Maeda, D. Y, et al., "Bivalent inhibitors of glutathione S-transferase: the effect of spacer length on isozyme selectivity.", Bioorg Med Chem Lett., 16(14), (Jul. 15, 2006), 3780-3.

Mahajan, S. S, et al., "Optimization of bivalent glutathione S-transferase inhibitors by combinatorial linker design.", J Am Chem Soc., 128(26), (Jul. 5, 2006), 8615-25.

Mayer, R., et al., "A randomized controlled trial of intravesical bacillus calmette-guerin for treatment refractory interstitial cystitis", Journal of Urology, 173(4), (Apr. 2005), 1186-1191.

Metzler, David E, "Biosynthesis of triglycerides and phospholipids", Biochemistry: The Chemical Reactions of Living Cells, (1977), 708.

Miller, R L, et al., "Imiquimod applied topically: a novel immune response modifier and new class of drug", Int J Immunopharmacol., 21(1), (Jan. 1999), 1-14.

Moroishi, et al., "The Hippo Pathway Kinases LATS1/2 Suppress Cancer Immunity' Cell", vol. 167, No. 6, (Dec. 1, 2016), 1525-1539.

Mosmann, T. R., et al., "TH1 and TH2 cells: different patterns of lymphokine secretion lead to different functional properties", Annual Review Immunology, 7, (1989), 145-173.

Rafi, et al., "", BioImpact, v.5, (2015), 117-122.

Reeves, David, et al., "The Contribution of Social Networks to the Health and Self-Management of Patients with Long-Term Conditions: A Longitudinal Study", PLOS One, 9(6): e98340, (Jun. 2014), 12 pgs.

Roh YS, Seki E, "Toll-like receptors in alcoholic liver disease, non-alcoholic steatohepatitis and carcinogenesis", J Gastroenterol Hepatol Suppl 1, (2013), 38-42.

Rohn, S., et al., "Antioxidant activity of protein-bound quercetin", J Agric Food Chem., 52(15), (Jul. 28, 2004), 4725-9.

Sato-Kaneko, F., et al., "A Novel Synthetic Dual Agonistic Liposomal TLR4/7 Adjuvant Promotes Broad Immune Responses in an Influenza Vaccine With Minimal Reactogenicity", Frontiers in Immunology, vol. 11, Article 1207. Jun. 2020., [Online]. Retrieved from the Internet: <URL: https://www.ncbi.nlm.nih.gov/pmc/articles/PMC7318308/pdf/fimmu-11-01207.pdf>, (Jun. 19, 2020), 19 pgs.

Schmidt, Tandrup Signe, et al., "Liposome-Based Adjuvants for Subunit Vaccines: Formulation Strategies for Subunit Antigens and Immunostimulators", Researchgate, Pharmaceutics, vol. 8, No. 1, Mar. 2016, 23 pgs., (Mar. 2016), 23 pgs.

(56) References Cited

OTHER PUBLICATIONS

Schon, M., et al., "Tumor-Selective Induction of Apoptosis and the Small-Molecule Immune Response Modifier Imiquimod", J Natl Cancer Inst, 95(15), (2003), 1138-1149.
Shi, B, et al., "Discovery of glutathione S-transferase inhibitors using dynamic combinatorial chemistry.", J Am Chem Soc., 128(26), (Jul. 5, 2006), 8459-67.
Sidky, Y. A., et al., "Curative effectiveness of the interferon inducing imiquimod as a signal agent in mouse bladder tumors", Proceedings, Eighty-Fourth Meeting of the American Association for Cancer Research, vol. 34, (Abstract 2789) (May 19-22, 1993, Orlando, FL), (Mar. 1993), 467.
Sidky, Y. A, et al., "Effects of Treatment with an Oral Interferon Inducer, Imidazoquinolinamine (R-837), on the Growth of Mouse Bladder Carcinoma FCB", Journal of Interferon Research, 10(Supp 1), (Abstract 116-12) (Annual Meeting of the ISIR, San Francisco, CA, Nov. 14-18, 1990), (Nov., 1990), S123.
Sidky, Y. A., et al., "Effects of treatment with the oral interferon inducer, R-837, on the growth of mouse colon carcinoma, MC-26", Proceedings, 81st Annual Meeting of the American Association for Cancer Research, vol. 31, (Abstract 2574), (Mar. 1990), p. 433.
Sidky, Y. A, et al., "Inhibition of murine tumor growth by an interferon-inducing imidazoquinolinamine", Cancer Research, 52(13), (Jul. 1, 1992), 3528-33.
Sidky, Y. A., et al., "Inhibition of tumor-induced angiogenesis by the interferon inducer Imiquimod", Proceedings, Eighty-Third Annual Meeting of the American Association of Cancer Research, vol. 33, (Abstract 458) (May 20-23, 1992, San Diego, CA), (Mar., 1992), p. 77.
Simons, M. P., et al., "Identification of the Mycobacterial Subcomponents Involved in the Release of Tumor Necrosis Factor-Related Apoptosis-Inducing Ligand from Human Neutrophils", Infection and Immunity, 75(3), (2007), 1265-1271.
Smith, E. B, et al., "Effects of Imiquimod, a toll-like receptor-7 agonist, on cell proliferation and cytokine production in bladder cancer in vitro and in vivo", Journal of Urology, 173(4, Suppl. S), (Apr. 2005), 158.
Smith, Eric B., et al., "Antitumor Effects of Imidazoquinolines in Urothelial Cell Carcinoma of the Bladder", The Journal of Urology, 177(6), (Jun. 2007), 2347-2351.
Spohn, R., et al., "Synthetic lipopeptide adjuvants and Toll-like receptor 2-structure-activity relationships", Vaccine, 22(19), (Jun. 23, 2004), 2494-9.
Staros, E. B., et al., "New Approaches to Understanding its Clinical Significance", Am. J. Clin. Pathol., 123(2), (2005), 305-312.
Takeda, K., et al., "Toll-like receptors", Annu Rev Immunol., 21, (2003), 335-76.
Takeda, K., et al., "Toll-like receptors in innate immunity", International Immunology, 17(1), (2005), 1-14.
Tyagi, P., et al., "Local drug delivery to bladder using technology innovations", Urol Clin North Am., 33(4), (Nov. 2006), 519-530.
Venables, Julian P, et al., "Cancer-associated regulation of alternative splicing", Nature Structural and Molecular Biology, 16(6):670-6, (May 2009), 8 pgs.
Veronese, F. M., et al., "The impact of PEGylation on biological therapies", BioDrugs, 22(5), (2008), 315-329.
Wille-Reece, U., et al., "HIV Gag protein conjugated to a Toll-like receptor 7/8 agonist improves the magnitude and quality of Th1 and CD8+ T cell responses in nonhuman primates", Proc. Natl. Acad. Sci. USA, 102(42), (Oct. 18, 2005), 15190-15194.
Wu, Christina C. N., et al., "Immunotherapeutic activity of a conjugate of a Toll-like receptor 7 ligand", Proc Natl Acad Sci USA., 104(10), (Mar. 6, 2007), 3990-3995.
Yang, Victor C., et al., "Bioconjugates for Effective Drug Targeting", Advanced Drug Delivery Reviews 55 (2003), (2002), 169-170.
Zaks, K, et al., "Efficient Immunization and Cross-Priming by Vaccine Adjuvants Containing TLR3 or TLR9 Agoinst Complexed to Cationic Liposomes", Journal of Immunology, 176(12), (Jun. 15, 2006), 7335-7345.
Zaks, Karen, et al., "Efficient immunization and cross-priming by vaccine adjuvants containing TLR3 or TLR9 agonists complexed to cationic liposomes", J Immunol., 176(12), (Jun. 15, 2006), 7335-45.
"Japanese Application Serial No. 2021-555397, Notification of Reasons for Refusal mailed Jan. 23, 2024", w English Translation, 11 pgs.
"Chinese Application Serial No. 202080034106.7, Office Action mailed Feb. 3, 2024", w English translation, 9 pgs.
"Israel Application Serial No. 286254, Office Action mailed Dec. 17, 2023", 6 pgs.
Chan, M., "Structure-Activity Relationship Studies of Pyrimido[5,4-b]indoles as Selective Toll-Like Receptor 4 Ligands", J. Med. Chem. 60, (2017), 9142-9161.
Goff, P. H., "Synthetic Toll-like receptor 4 (TLR4) and ILR7 ligands as influenza virus vaccine adjuvants induce rapid, sustained, and broadly protective responses", Journal of Virology, vol. 89 No. 6, Mar. 2015. jvi.asm.org 3221, (Mar. 31, 2015), 3221-3235.
Schmidt, Tandrup Signe, "Liposome-Based Adjuvants for Subunit Vaccines: Formulation Strategies for Subunit Antigens and Immunostimulators", Pharmaceutics, vol. 8, No. 1, 22 pgs.
"European Application Serial No. 20770127.7, Response Filed Sep. 20, 2023 to Extended European Search Report mailed Feb. 27, 2023.", 17 pgs.
"U.S. Appl. No. 16/495,083, filed Mar. 15, 2024 to Non Final Office Action mailed Sep. 15, 2023", 5 pgs.
"U.S. Appl. No. 16/495,083, Final Office Action mailed Apr. 4, 2024", 7 pgs.
Hayashi, "Prevention of autoimmune disease by induction of tolerance to Toll-like receptor 7", PNAS, v. 106 2764-2769, (2009), 6 pgs.
Chinese Application Serial No. 202080034106.7, Response filed May 31, 2024 to Office Action mailed Feb. 3, 2024, w/ current English claims, 19 pgs.
Japanese Application Serial No. 2021-555397, Response filed Jun. 7, 2024 to Notification of Reasons for Refusal mailed Jan. 23, 2024, w/ current English claims, 11 pgs.

\* cited by examiner

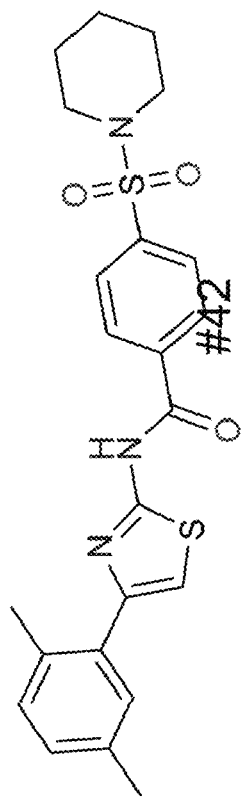
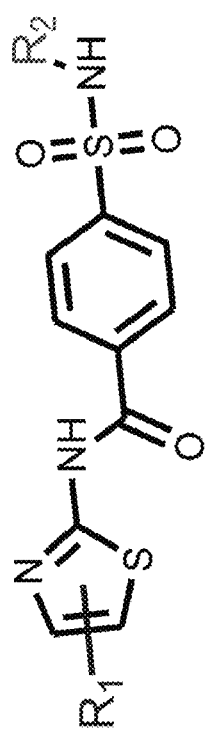
FIG. 1

- Enhance NF-κB activation by multiple TLRs and by TNFα
- Compound alone induces a distinctive RNA pattern
- Particularly strong enhancer of TLR7
- Promote viability of mBMDC and hPBMC
- No reactogenicity

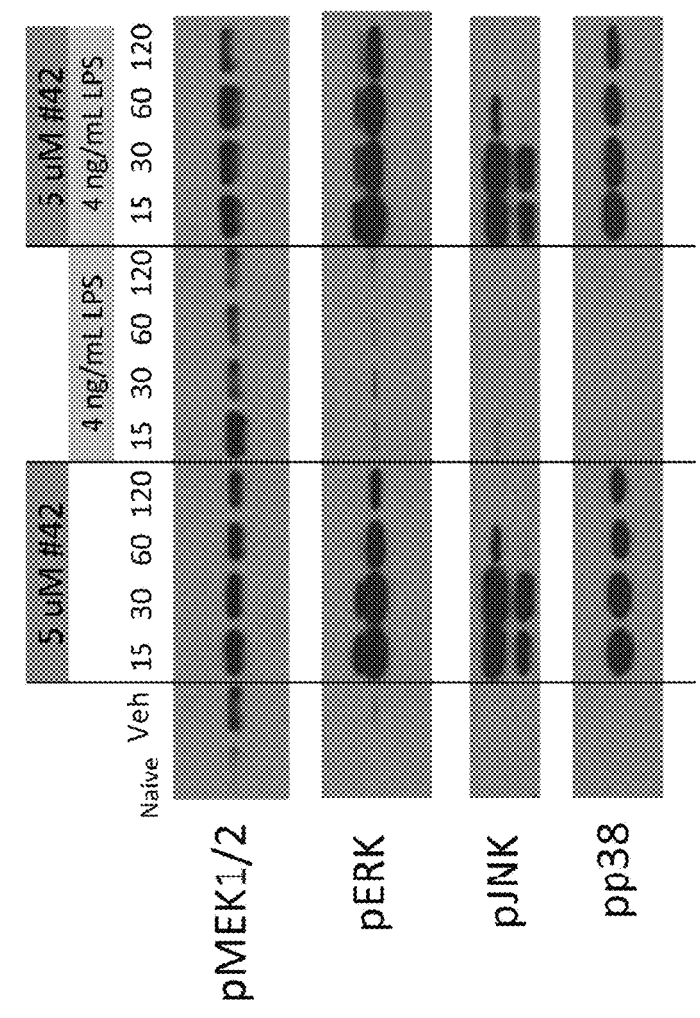
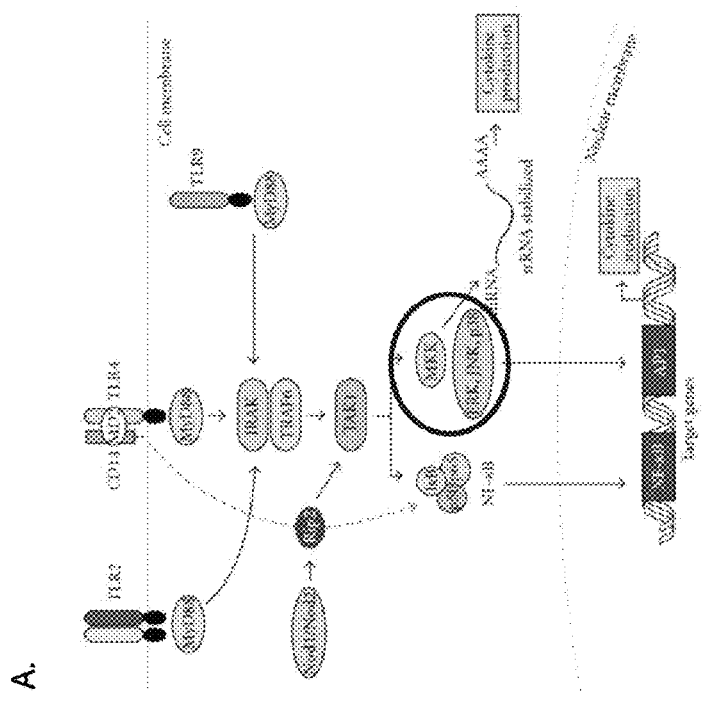
FIG. 10

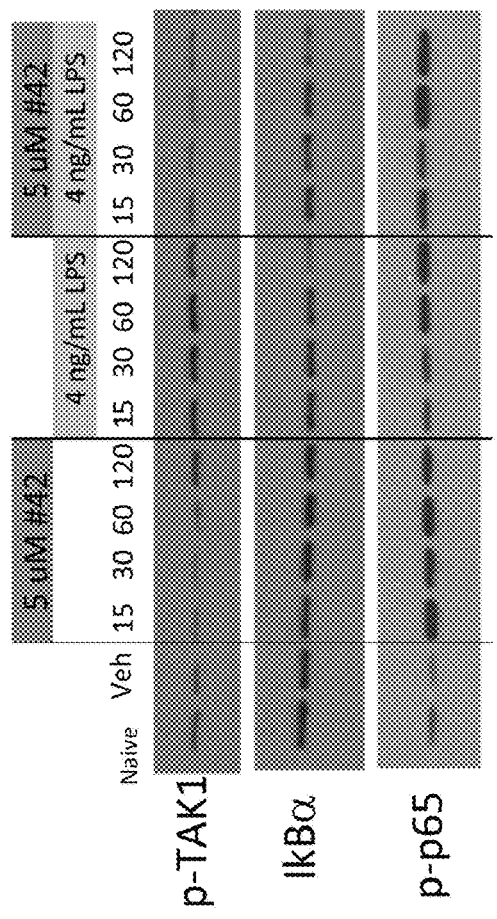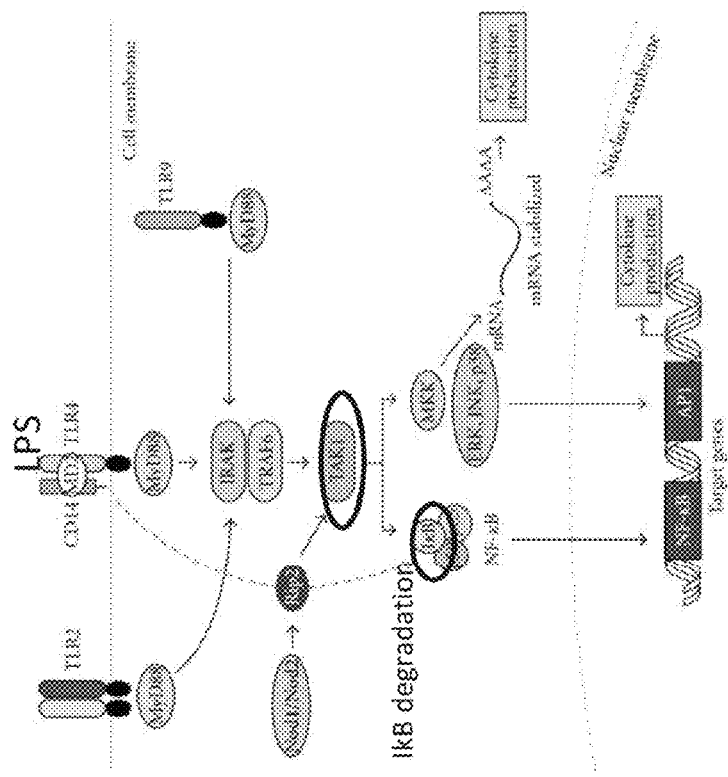
FIG. 11

Compound 42 vs Vehicle: Significantly up-regulated pathways

| | GS follow link to MSigDB | SIZE | ES | NES | NOM p-val | FDR q-val | FWER p-val | LEADING EDGE |
|---|---|---|---|---|---|---|---|---|
| 1 | HALLMARK_TNFA_SIGNALING_VIA_NFKB | 192 | 0.87 | 3.30 | 0.000 | 0.000 | 0.000 | tags=68%, list=7%, signal=72% |
| 2 | HALLMARK_INFLAMMATORY_RESPONSE | 163 | 0.74 | 2.76 | 0.000 | 0.000 | 0.000 | tags=39%, list=7%, signal=41% |
| 3 | HALLMARK_EPITHELIAL_MESENCHYMAL_TRANSITION | 134 | 0.69 | 2.52 | 0.000 | 0.000 | 0.000 | tags=34%, list=9%, signal=36% |
| 4 | HALLMARK_IL2_STAT5_SIGNALING | 167 | 0.66 | 2.46 | 0.000 | 0.000 | 0.000 | tags=38%, list=12%, signal=43% |
| 5 | HALLMARK_HYPOXIA | 169 | 0.65 | 2.45 | 0.000 | 0.000 | 0.000 | tags=32%, list=10%, signal=35% |
| 6 | HALLMARK_KRAS_SIGNALING_UP | 134 | 0.65 | 2.34 | 0.000 | 0.000 | 0.000 | tags=34%, list=12%, signal=38% |
| 7 | HALLMARK_IL6_JAK_STAT3_SIGNALING | 69 | 0.70 | 2.32 | 0.000 | 0.000 | 0.000 | tags=39%, list=12%, signal=44% |
| 8 | HALLMARK_APOPTOSIS | 142 | 0.60 | 2.19 | 0.000 | 0.000 | 0.000 | tags=37%, list=15%, signal=43% |
| 9 | HALLMARK_UV_RESPONSE_UP | 139 | 0.59 | 2.16 | 0.000 | 0.000 | 0.001 | tags=24%, list=7%, signal=25% |
| 10 | HALLMARK_CHOLESTEROL_HOMEOSTASIS | 70 | 0.64 | 2.13 | 0.000 | 0.000 | 0.001 | tags=40%, list=15%, signal=47% |
| 11 | HALLMARK_INTERFERON_GAMMA_RESPONSE | 180 | 0.55 | 2.07 | 0.000 | 0.000 | 0.001 | tags=31%, list=12%, signal=34% |
| 12 | HALLMARK_P53_PATHWAY | 178 | 0.55 | 2.07 | 0.000 | 0.000 | 0.001 | tags=19%, list=5%, signal=20% |
| 13 | HALLMARK_TGF_BETA_SIGNALING | 50 | 0.66 | 2.06 | 0.000 | 0.000 | 0.001 | tags=44%, list=14%, signal=51% |
| 14 | HALLMARK_UV_RESPONSE_DN | 112 | 0.59 | 2.06 | 0.000 | 0.000 | 0.001 | tags=30%, list=10%, signal=33% |
| 15 | HALLMARK_ANDROGEN_RESPONSE | 86 | 0.60 | 2.05 | 0.000 | 0.000 | 0.001 | tags=35%, list=13%, signal=40% |
| 16 | HALLMARK_COAGULATION | 87 | 0.59 | 2.05 | 0.000 | 0.000 | 0.001 | tags=28%, list=11%, signal=31% |
| 17 | HALLMARK_ANGIOGENESIS | 25 | 0.70 | 1.92 | 0.000 | 0.000 | 0.009 | tags=36%, list=10%, signal=40% |
| 18 | HALLMARK_INTERFERON_ALPHA_RESPONSE | 94 | 0.54 | 1.88 | 0.000 | 0.001 | 0.317 | tags=23%, list=10%, signal=26% |
| 19 | HALLMARK_ALLOGRAFT_REJECTION | 141 | 0.50 | 1.86 | 0.000 | 0.001 | 0.319 | tags=18%, list=6%, signal=19% |
| 20 | HALLMARK_COMPLEMENT | 156 | 0.45 | 1.66 | 0.001 | 0.008 | 0.138 | tags=24%, list=12%, signal=27% |
| 21 | HALLMARK_ESTROGEN_RESPONSE_LATE | 141 | 0.44 | 1.64 | 0.006 | 0.009 | 0.168 | tags=28%, list=15%, signal=32% |
| 22 | HALLMARK_ESTROGEN_RESPONSE_EARLY | 141 | 0.42 | 1.57 | 0.003 | 0.019 | 0.320 | tags=24%, list=13%, signal=28% |
| 23 | HALLMARK_KRAS_SIGNALING_DN | 86 | 0.45 | 1.53 | 0.012 | 0.026 | 0.439 | tags=21%, list=10%, signal=23% |
| 24 | HALLMARK_MYOGENESIS | 127 | 0.41 | 1.45 | 0.021 | 0.049 | 0.577 | tags=32%, list=21%, signal=41% |

FIG. 13

LPS+42 vs LPS: Significantly up-regulated pathways

| | GS follow link to MSigDB | SIZE | ES | NES | NOM p-val | FDR q-val | FWER p-val | LEADING EDGE |
|---|---|---|---|---|---|---|---|---|
| 1 | HALLMARK_TNFA_SIGNALING_VIA_NFKB | 192 | 0.72 | 3.10 | 0.000 | 0.000 | 0.000 | tags=48%, list=10%, signal=53% |
| 2 | HALLMARK_EPITHELIAL_MESENCHYMAL_TRANSITION | 134 | 0.58 | 2.35 | 0.000 | 0.000 | 0.000 | tags=41%, list=18%, signal=50% |
| 3 | HALLMARK_IL2_STAT5_SIGNALING | 167 | 0.55 | 2.33 | 0.000 | 0.000 | 0.000 | tags=27%, list=7%, signal=29% |
| 4 | HALLMARK_INFLAMMATORY_RESPONSE | 163 | 0.54 | 2.25 | 0.000 | 0.000 | 0.000 | tags=37%, list=12%, signal=41% |
| 5 | HALLMARK_HYPOXIA | 169 | 0.52 | 2.21 | 0.000 | 0.000 | 0.000 | tags=32%, list=15%, signal=37% |
| 6 | HALLMARK_KRAS_SIGNALING_UP | 134 | 0.53 | 2.15 | 0.000 | 0.000 | 0.001 | tags=38%, list=16%, signal=45% |
| 7 | HALLMARK_UV_RESPONSE_DN | 112 | 0.54 | 2.14 | 0.000 | 0.000 | 0.001 | tags=36%, list=15%, signal=42% |
| 8 | HALLMARK_ANDROGEN_RESPONSE | 86 | 0.53 | 2.04 | 0.000 | 0.000 | 0.001 | tags=31%, list=13%, signal=36% |
| 9 | HALLMARK_TGF_BETA_SIGNALING | 50 | 0.58 | 2.02 | 0.000 | 0.000 | 0.001 | tags=56%, list=25%, signal=74% |
| 10 | HALLMARK_COAGULATION | 87 | 0.52 | 2.00 | 0.000 | 0.000 | 0.001 | tags=41%, list=21%, signal=52% |
| 11 | HALLMARK_ANGIOGENESIS | 25 | 0.59 | 1.77 | 0.005 | 0.003 | 0.028 | tags=48%, list=20%, signal=60% |
| 12 | HALLMARK_PROTEIN_SECRETION | 90 | 0.44 | 1.72 | 0.000 | 0.005 | 0.052 | tags=37%, list=23%, signal=47% |
| 13 | HALLMARK_UV_RESPONSE_UP | 139 | 0.41 | 1.67 | 0.000 | 0.007 | 0.087 | tags=16%, list=6%, signal=17% |
| 14 | HALLMARK_ESTROGEN_RESPONSE_EARLY | 141 | 0.40 | 1.66 | 0.001 | 0.007 | 0.091 | tags=26%, list=15%, signal=30% |
| 15 | HALLMARK_COMPLEMENT | 156 | 0.40 | 1.66 | 0.000 | 0.007 | 0.092 | tags=36%, list=21%, signal=45% |
| 16 | HALLMARK_P53_PATHWAY | 178 | 0.39 | 1.66 | 0.000 | 0.006 | 0.092 | tags=18%, list=9%, signal=19% |
| 17 | HALLMARK_HEDGEHOG_SIGNALING | 25 | 0.55 | 1.63 | 0.012 | 0.008 | 0.120 | tags=32%, list=15%, signal=37% |
| 18 | HALLMARK_APOPTOSIS | 142 | 0.39 | 1.62 | 0.003 | 0.009 | 0.135 | tags=36%, list=20%, signal=45% |
| 19 | HALLMARK_ESTROGEN_RESPONSE_LATE | 141 | 0.37 | 1.57 | 0.007 | 0.014 | 0.222 | tags=16%, list=6%, signal=17% |
| 20 | HALLMARK_GLYCOLYSIS | 170 | 0.34 | 1.45 | 0.008 | 0.040 | 0.529 | tags=24%, list=16%, signal=28% |

FIG. 14

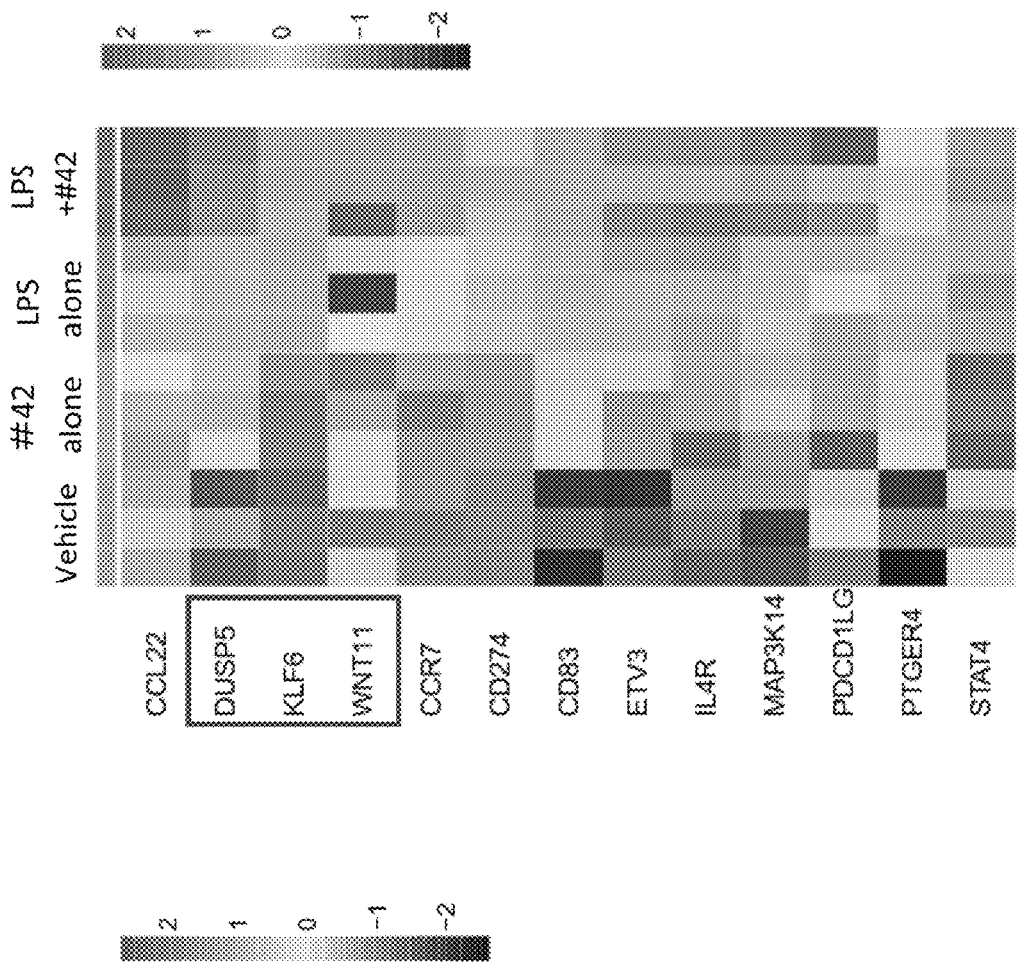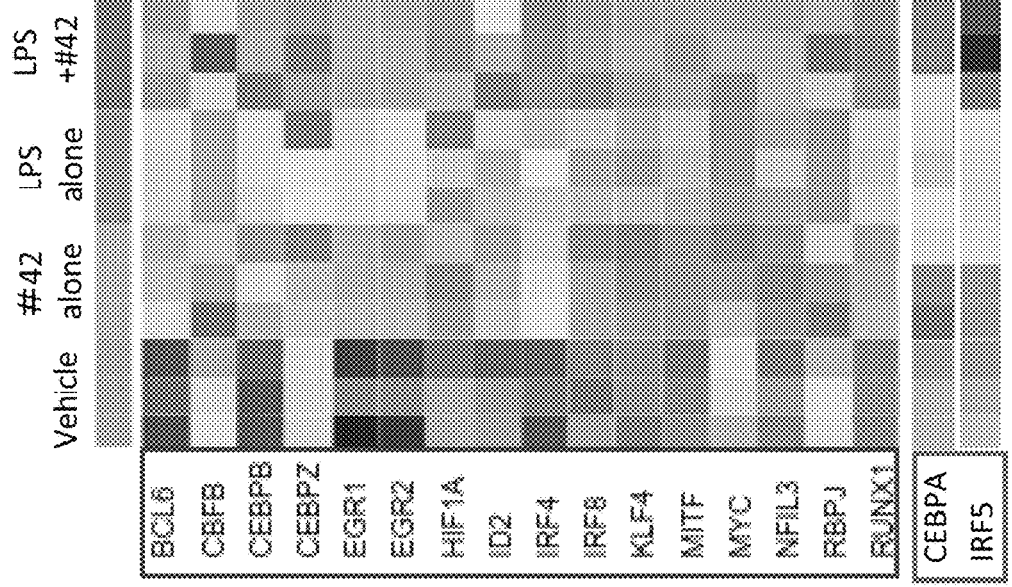
FIG. 15

Summary of #42 associated results in THP-1 Protein level  
Cytokine production    shown by ELISA When compared without #42  
"+" = up-regulated  
"−" = down-regulated  
"=" = similar

| treatment | hIL-8 | TNFa | hIl-1b | note |
|---|---|---|---|---|
| #42 alone | = | + | = | |
| #42+LPS | + | + | + | hIL-8 induced by LPS+#42 was suppressed with JNKI |
| #42+TNFa | + | N/A | N/A | |
| #42+IL-1b | + | N/A | N/A | |

Co-stimulatory markers    shown by FACs

| treatment | CD40 | CD80 | CD86 | note |
|---|---|---|---|---|
| #42 alone | + | = | = | CD40 induced by #42 was suppressed with JNKI |
| #42+LPS | + | = | + | CD40 induced by LPS+#42 was suppressed with JNKI |

Gene translation level  
    Gene expression    shown by Quantigene with time course

| treatment | IL-1b | IL-6 | IL-23 | CCL5 | CCL2 | IL-8 | CD86 |
|---|---|---|---|---|---|---|---|
| #42 alone | N/A | N/A | N/A | N/A | N/A | N/A | N/A |
| #42+LPS | + | + | + | + | + | + | + |

Pathway analysis    shown by RNA seq at 5hr

| treatment | TNFA pathway | EMT | IL-2 /STAT5 | hyosisla | Cell death | IL-6/JAK /STAT3 | KRAS signaling | Cell cycle |
|---|---|---|---|---|---|---|---|---|
| #42 alone | + | + | + | + | + | + | + | + |
| #42+LPS | + | + | + | + | + | = | + | + |

Transcription    shown by RNA seq at 5hr  
Shown by heatmap

Signal transduction  
    NFkB pathway    shown by FRET and SEAP

| treatment | 5hr | 16 or 20hr |
|---|---|---|
| #42 alone | + | + |
| #42+LPS | = | + |
| #42+TNFa | = | + |

NFkB nuclear pathway    shown by immunofluorescence staining

| treatment | 2hr and 4 hrs | 6hr and 8hr |
|---|---|---|
| #42 alone | + | = |
| #42+LPS | = | + |

NFkB phosphorylation    shown by WB with time course

| treatment | p-NFkB (2-8hr) | p-NFkB (24hr) |
|---|---|---|
| #42 alone | + | + |
| #42+LPS | = | + |

MAPK activation    shown by WB with time course

| treatment | JNK | P38 | Erk1/1 | MEK1/2 |
|---|---|---|---|---|
| #42 alone | + | + | + | + |
| #42+LPS | + | + | + | + |

FIG. 22

Summary of #42 associated results in BMDC Protein level
Cytokine production    shown by ELISA When compared without #42
"+" = up-regulated
"−" = down-regulated
"=" = similar

| treatment | IL-12 | IL-6 | TNFa | note |
|---|---|---|---|---|
| #42 alone | = | = | = | |
| #42+LPS | + | + | + | NFkb cannonical pathway |
| #42+Pam3C | + | + | N/A | NFkb cannonical pathway |
| #42+1V270 | + | + | N/A | NFkb cannonical pathway |
| #42+Dectin | N/A | N/A | = | NFkb non cannonical pathway |

Co-stmulatory markers   shown by FACs

| treatment | CD40 | CD80 | CD83 | CD86 | MHCH |
|---|---|---|---|---|---|
| #42 alone | = | = | = | = | = |
| #42+LPS | + | = | + | + | = |
| #42+MPLA | + | + | N/A | + | + |
| #42+TNFa | = | = | + | = | = |

Gene translation level
Gene expression        shown by Quantigene

| treatment | IL-1b | IL-6 | IL-12 | CCL22 | CXC110 | SOCS1 | CD40 | CD86 |
|---|---|---|---|---|---|---|---|---|
| #42 alone | N/A | N/A | N/A | N/A | N/A | N/A | N/A | N/A |
| #42+LPS 4h | = | − | + | = | = | = | = | = |
| #42+LPS 10h | − | − | + | = | + | = | + | = |

Signal transduction
  N/A

FIG. 23

Summary of #42 associated results in PBMC Protein level
Cytokine production    shown by ELISA

| treatment | hIL-8 |
|---|---|
| #42 alone | = |
| #42+LPS | + |

Summary of #42 associated results in mouse Protein level
anti-OVA antibody production       shown by ELISA

| treatment | IgG1 | IgG2 | IgG2/IgG1 ratio |
|---|---|---|---|
| #42 alone | + | + | + |
| #42+LPS | = | = | + |
| #42+MPLA | + | = | = |

OVA specific T cell response       shown by ELISPOT and ELISA

| treatment | class I peptide | class II peptide | OVA |
|---|---|---|---|
| #42 alone | + | + | = |
| #42+LPS | + | + | + |

FIG. 24

Summary of #42 associated results in THP-1 Protein level    When compared without #42

Cytokine production    shown by ELISA

| treatment | hIL-8 | TNFa | hIL-1b | note |
|---|---|---|---|---|
| #42 alone | = | + | = | |
| #42+LPS | + | + | + | hIL-8 induced by LPS+#42 was suppressed with JNKI |
| #42+TNFa | + | N/A | N/A | |
| #42+IL-1b | + | N/A | N/A | |

Co-stimulatory markers   shown by FACs

| treatment | CD40 | CD80 | CD86 | note |
|---|---|---|---|---|
| #42 alone | + | = | = | CD40 induced by #42 was suppressed with JNKI |
| #42+LPS | + | = | + | CD40 induced by LPS+#42 was suppressed with JNKI |

Gene translation level
Gene expression    shown by Quantigene with time course

| treatment | IL-1b | IL-6 | IL-23 | CCL5 | CCL2 | IL-8 | CD86 |
|---|---|---|---|---|---|---|---|
| #42 alone | N/A | N/A | N/A | N/A | N/A | N/A | N/A |
| #42+LPS | + | + | + | + | + | + | + |

Pathway analysis   shown by RNA seq at 5hr

| treatment | TNFA pathway | EMT | IL-2 /STAT5 | hyosisla | Cell death | IL-6/JAK /STAT3 | KRAS signaling | Cell cycle |
|---|---|---|---|---|---|---|---|---|
| #42 alone | + | + | + | + | + | + | = | + |
| #42+LPS | + | + | + | + | + | + | + | + |

FIG. 25A

Transcription factors   shown by RNA seq at 5hr

| treatment | Bcl5 | CBFB | CEBPB | CEBPZ | EGR1/2 | HIF1a | ID2 | IRF4/8 | MITF | MYC | NFIL3 | RBPJ | RUNX1 | MAFB | SPIB | STAT3 | STAT5 |
|---|---|---|---|---|---|---|---|---|---|---|---|---|---|---|---|---|---|
| #42 alone | + | + | + | + | + | + | + | + | + | + | + | + | + | + | + | = | = |
| #42+LPS | + | + | + | + | + | = | + | + | + | + | + | + | + | = | = | − | + |

Signal transduction

NFkB pathway   shown by FRET and SEAP

| treatment | 5hr | 16 or 20hr |
|---|---|---|
| #42 alone | + | + |
| #42+LPS | = | + |
| #42+TNFa | = | + |

NFkB pathway   shown by immunofluorescence staining

| treatment | 2hr and 4 hrs | 6hr and 8hr |
|---|---|---|
| #42 alone | + | = |
| #42+LPS | = | + |

NFkB pathway   shown by WB with time course

| treatment | p-NFkB (2-8hr) | p-NFkB (24hr) |
|---|---|---|
| #42 alone | + | + |
| #42+LPS | = | + |

MAPK activation   shown by WB with time course

| treatment | JNK | P38 | Erk1/1 | MEK1/2 |
|---|---|---|---|---|
| #42 alone | + | + | + | + |
| #42+LPS | + | + | + | + |

FIG. 25B

Summary of #42 associated results in THP-1 Protein level        When compared without #42

Cytokine production   shown by ELISA

| treatment | hIL-8 | TNFa | hIL-1b | note |
|---|---|---|---|---|
| #42 alone | = | + | = | |
| #42+LPS | + | + | + | hIL-8 induced by LPS+#42 was suppressed with JNKI |
| #42+TNFa | + | N/A | N/A | |
| #42+IL-1b | + | N/A | N/A | |

Co-stimulatory markers   shown by FACs

| treatment | CD40 | CD80 | CD86 | note |
|---|---|---|---|---|
| #42 alone | + | = | = | CD40 induced by #42 was suppressed with JNKI |
| #42+LPS | + | = | + | CD40 induced by LPS+#42 was suppressed with JNKI |

Gene translation level
Gene expression   shown by Quantigene with time course

| treatment | IL-1b | IL-6 | IL-23 | CCL5 | CCL2 | IL-8 | CD86 |
|---|---|---|---|---|---|---|---|
| #42 alone | N/A | N/A | N/A | N/A | N/A | N/A | N/A |
| #42+LPS | + | + | + | + | + | + | + |

Pathway analysis   shown by RNA seq at 5hr

| treatment | TNFA pathway | EMT | IL-2 /STAT5 | hyosisla | Cell death | IL-6/JAK /STAT3 | KRAS signaling | Cell cycle |
|---|---|---|---|---|---|---|---|---|
| #42 alone | + | + | + | + | + | + | + | + |
| #42+LPS | + | + | + | + | = | = | + | + |

Transcription factors   shown by RNA seq at 5hr

| treatment | Bc15 | CBFB | CEBPB | CEBPZ | EGR1/2 | HIF1a | ID2 | IRF4/8 | MiTF | MYC | NFIL3 | RBPJ | RUNXI | MAFB | SPIB | STAT3 | STAT5 |
|---|---|---|---|---|---|---|---|---|---|---|---|---|---|---|---|---|---|
| #42 alone | + | + | + | + | + | + | + | + | + | + | + | + | + | = | = | = | = |
| #42+LPS | + | + | + | + | + | = | + | + | + | + | + | + | + | + | + | = | + |

Signal transduction
NFkB pathway   shown by FRET and SEAP

| treatment | 5hr | 16 or 20hr |
|---|---|---|
| #42 alone | + | + |
| #42+LPS | = | + |
| #42+TNFa | = | + |

FIG. 25C

SMALL MOLECULE VACCINE ADJUVANT FOR ENHANCING OR PROLONGING IMMUNE RESPONSE

CROSS-REFERENCE TO RELATED APPLICATIONS

This application is a U.S. National Stage Filing under 35 U.S.C. 371 from International Application No. PCT/US2019/057496, filed on Oct. 22, 2019, and published as WO 2020/086625 A1 on Apr. 30, 2020, which claims the benefit of the filing date of U.S. application No. 62/748,855, filed on Oct. 22, 2018, the disclosure of each of which is incorporated by reference herein.

STATEMENT OF GOVERNMENT RIGHTS

This invention was made with government support under grant number HHSN272201400051C awarded by the National Institutes of Health. The government has certain rights in the invention.

SUMMARY

Compounds described in this disclosure are useful for enhancing and/or prolonging an immune response, such as, in a vaccine as an adjuvant or a co-adjuvant. In one embodiment, the compounds combined with other adjuvants to broaden, enhance, and/or prolong the immune stimulation which should make the vaccine more effective as there are no approved co-adjuvants used at the present time, and only a few non-approved co-adjuvants that have been reported. The sulfonamide derivatives disclosed herein appear to be quite potent. One example of an adjuvant is a sulfonamide, which may enhance NFkB activation and/or enhance cytokine production when combined with one or more TLR ligands, one or more MAP kinases (e.g., combined with MAP kinase alone), and/or in combination with another adjuvant such as LPS. For example, compound #42 (designated as compound 1 in Scheme 1) enhanced cytokine production induced by a TLR ligand but not by Dectin1, enhanced co-stimulatory molecule expression induced by LPS and MPLA, prolonged NF-κB phosphorylation and nuclear localization induced by LPS and phosphorylation of JNK, P38 and Erk1/2.

The disclosure provides for a compound having the structure of Formula I, or a salt thereof,

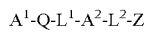

$A^1$-Q-$L^1$-$A^2$-$L^2$-Z      Formula I wherein
A1 is an alkyl, aryl, aryloxy, arylamino, arylthiol, arylmethyl, or arylcarbonyl;
Q is a divalent heterocyclic aryl;
L1 is a divalent group selected from amide, carbamate, urea, thioamide, thiocarbamate, thiourea, or a dithiocarbamate;
A2 is a divalent aryl or heteroaryl;
L2 is a divalent sulfone, sulfoxide, thioether, carbonyl, amide, ester, or aminomethyl; and
Z is an alkylamine, arylamine, dialkylamine, diarylamine, N,N-alkylarylamine, or a cyclic amine.

The disclosure provides a method of enhancing or prolonging an immune response, comprising: administering to a mammal in need thereof a vaccine, an effective amount of at least two adjuvants, at least one adjuvant and one or more TLR ligands, or at least one adjuvant and at least one MAP kinase, wherein at least one adjuvant comprises a compound of formula (I)-(VI). In one embodiment, the mammal is a human. In one embodiment, one of the adjuvants comprises LPS or MPLA. In one embodiment, at least one of the TLR ligands comprises a compound of formula (VII). In one embodiment, at least two adjuvants are administered. In one embodiment, at least one adjuvant and one or more TLR ligands are administered. In one embodiment, at least one adjuvant and at least one MAP kinase are administered.

Further provided is a method of enhancing or prolonging an immune response, comprising: administering to a mammal in need thereof an effective amount of at least one adjuvant and at least one MAP kinase, wherein at least one adjuvant comprises a compound of formula (I)-(VI). Also provided is a method of enhancing or prolonging an immune response, comprising: administering to a mammal in need thereof an effective amount of at least two adjuvants, wherein at least one adjuvant comprises a sulfonamide derivative. In addition, a method of enhancing or prolonging an immune response, comprising: administering to a mammal in need thereof an effective amount of at least one adjuvant and one or more TLR ligands, wherein at least one adjuvant comprises a sulfonamide derivative. In one embodiment, the vaccine and the sulfonamide derivative and at least one other agent are administered concurrently. In one embodiment, the vaccine and the sulfonamide derivative and at least one other agent are subcutaneously, dermally or orally administered The disclosure also provides a method of enhancing or prolonging an immune response, comprising: administering to a mammal in need thereof an effective amount of a composition comprising at least one adjuvant and at least one MAP kinase, wherein at least one adjuvant comprises a sulfonamide derivative. Further provided is a method of enhancing or prolonging an immune response, comprising: administering to a mammal in need thereof an effective amount of a composition comprising at least two adjuvants, wherein at least one adjuvant comprises a sulfonamide derivative. Also provided is a method of enhancing or prolonging an immune response, comprising: administering to a mammal in need thereof an effective amount of a composition comprising at least one adjuvant and one or more TLR ligands, wherein at least one adjuvant comprises a sulfonamide derivative.

BRIEF DESCRIPTION OF THE FIGURES

FIG. 1. An exemplary aminothiazole scaffold (left) and an exemplary compound (#42 right; also referred to as compound 1) with formula (I) useful in the disclosed compositions and methods is provided. The compounds of formula (I)-(IV) may enhance NF-kB activation and/or enhance cytokine production when combined with one or more TLR ligands.

FIGS. 10A-10B. Expression induced in MAPK signaling pathway by compound 42, LPS or a combination thereof.

FIGS. 11A-11B. Expression induced in NF-kB signaling pathway by compound 42, LPS or a combination thereof.

FIG. 13. Pathways upregulated by compound 42 versus vehicle.

FIG. 14. Pathways upregulated by compound 42 and LPS versus LPS.

FIGS. 15A-15B. Heat map of expression of transcription factors (A) or tolerogenic factors (B) in THP-1 cells after exposure to vehicle, LPS, compound 42 or a combination of LPS and compound 42.

FIG. 22. Protein expression levels, gene expression levels or signal transduction in THP-1 cells treated with #42, #42 and LPS or TNF-alpha or IL-1b.

FIG. 23. Protein expression levels, gene expression levels or signal transduction in BDMC cells treated with #42, #42 and LPS, Pam3C, IV270, Dectin, TNF-alpha or MPLA.

FIG. 24. Results in PBMCs and mouse.

FIG. 25. Cytokine production, gene expression levels, pathway analysis, transcription factors and signal transduction in THP-1 cells treated with #42, #42 and LPS or TNF-alpha or IL-1b.

DETAILED DESCRIPTION

Definitions

Figure 2:
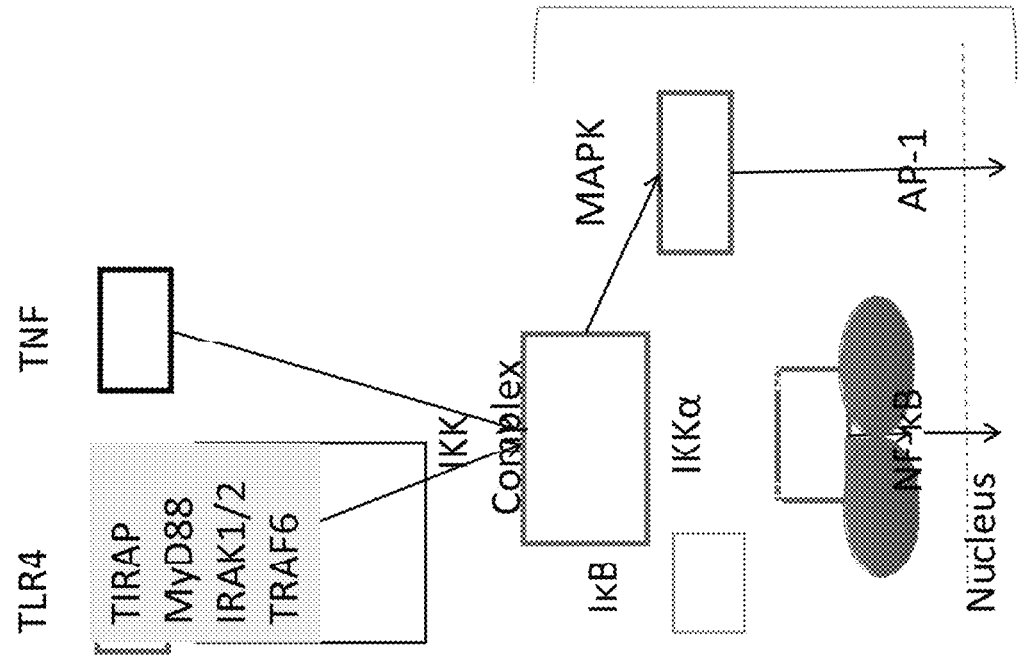
FIG. 2. Pathways for activating NF-kB. In one embodiment, a compound of formula (I)-(IV) induces a distinctive RNA expression profile, is an enhancer of TLR7, promotes viability of bone marrow dendritic cells (BMDC) and/or PMBCs, e.g., human BMDCs and/or human PBMCs, enhances multiple TLRs and/or TNFalpha, and/or does not induce immunoreactivity.

A composition is comprised of "substantially all" of a particular compound, or a particular form a compound (e.g., an isomer) when a composition comprises at least about 90%, and at least about 95%, 99%, and 99.9%, of the particular composition on a weight basis. A composition comprises a "mixture" of compounds, or forms of the same compound, when each compound (e.g., isomer) represents at least about 10% of the composition on a weight basis. A TLR7 agonist, or a conjugate thereof, can be prepared as an acid salt or as a base salt, as well as in free acid or free base forms. In solution, certain of the compounds may exist as zwitterions, wherein counter ions are provided by the solvent molecules themselves, or from other ions dissolved or suspended in the solvent.

The term "toll-like receptor agonist" (TLR agonist) refers to a molecule that binds to a TLR. Synthetic TLR agonists are chemical compounds that are designed to bind to a TLR and activate the receptor.

A "phospholipid" or analog thereof as the term is used herein refers to a glycerol mono- or diester or diether bearing a phosphate group bonded to a glycerol hydroxyl group with an alkanolamine group being bonded as an ester to the phosphate group, of the general formula

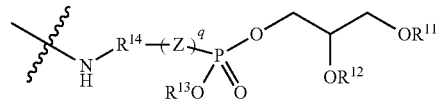

wherein $R^{11}$ and $R^{12}$ are each independently a hydrogen, a $C_8$-$C_{25}$ alkyl group or a $C_8$-$C_{25}$ acyl group, provided that at least one of $R^{11}$ and $R^{12}$ is an alkyl or an acyl group; $R^{13}$ is a negative charge or a hydrogen, and $R^{14}$ is a $C_1$-$C_8$ n-alkyl or branched alkyl group which can be substituted or unsubstituted, wherein optionally one of the carbon atoms of the $R^{14}$ alkyl group may be replaced by NH, S, or O; Z is O, S, or NH, and q is 0 or 1; wherein a wavy line indicates a position of bonding, wherein an absolute configuration at the carbon atom bearing $OR^{12}$ is R, S, or any mixture thereof.

$R^{13}$ is a negative charge or a hydrogen, depending upon pH. When $R_{13}$ is a negative charge, a suitable counterion, such as a sodium ion, can be present. In one embodiment, $R^{14}$ is substituted or unsubstituted $C_1$-$C_7$ alkyl chain wherein one of the carbons may be substituted with a heteroatom selected from N or S. For example, the alkanolamine moiety can be an ethanolamine moiety, such that m=1. It is also understood that the NH group can be protonated and positively charged, or unprotonated and neutral, depending upon pH. For example, the phospholipid can exist as a zwitterion with a negatively charged phosphate oxy anion and a positively charged protonated nitrogen atom. The carbon atom bearing $OR^{12}$ is a chiral carbon atom, so the molecule can exist as an R isomer, an S isomer, or any mixture thereof. When there are equal amounts of R and S isomers in a sample of the compound of formula (I), the sample is referred to as a "racemate." For example in the commercially available product 1,2-dioleoyl-sn-glycero-3-phosphoethanolamine, as used in Example I below, the $R^3$ group is of the chiral structure

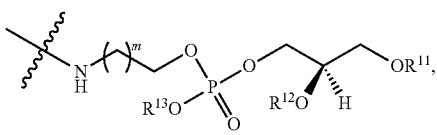

which is of the R absolute configuration (where m is absent or is a $C_1$-$C_8$ n-alkyl or branched alkyl group which can be substituted or unsubstituted, wherein optionally one of the carbon atoms of the $R^{14}$ alkyl group may be replaced by NH or S but optionally does not form a NH—NH group with the amine).

A phospholipid can be either a free molecule, or covalently linked to another group for example as shown

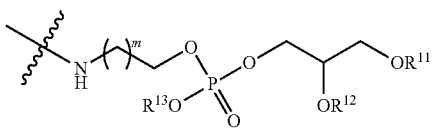

wherein a wavy line indicates a point of bonding (where m is absent or is a $C_1$-$C_8$ n-alkyl or branched alkyl group which can be substituted or unsubstituted, wherein optionally one of the carbon atoms of the $R^{14}$ alkyl group may be replaced by NH or S but does not form a NH—NH group with the amine).

Accordingly, when a substituent group, such as $R^3$ of the compound of formula (I) herein, is stated to be a phospholipid or analog thereof what is meant that a phospholipid or phospholipid analog group is bonded as specified by the structure to another group, such as to an N-benzyl heterocyclic ring system as disclosed herein. The point of attachment of the phospholipid group can be at any chemically feasible position unless specified otherwise, such as by a structural depiction. For example, in the phospholipid structure shown above, the point of attachment to another chemical moiety can be via the ethanolamine nitrogen atom, for example as an amide group by bonding to a carbonyl group of the other chemical moiety, for example

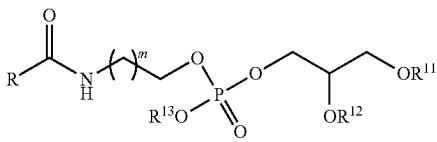

wherein R represents the other chemical moiety to which the phospholipid is bonded. In this bonded, amide derivative, the $R^{13}$ group can be a proton or can be a negative charge associated with a counterion, such as a sodium ion. The acylated nitrogen atom of the alkanolamine group is no longer a basic amine, but a neutral amide, and as such is not protonated at physiological pH.

An "acyl" group as the term is used herein refers to an organic structure bearing a carbonyl group through which the structure is bonded, e.g., to glycerol hydroxyl groups of a phospholipid, forming a "carboxylic ester" group. Examples of acyl groups include fatty acid groups such as oleoyl groups, that thus form fatty (e.g., oleoyl) esters with the glycerol hydroxyl groups. Accordingly, when $R^{11}$ or $R^{12}$, but not both, are acyl groups, the phospholipid shown above is a mono-carboxylic ester, and when both $R^{11}$ and $R^{12}$ are acyl groups, the phospholipid shown above is a di-carboxylic ester.

An "alkyl" group includes straight or branched $C_{8-24}$ alkyl groups which may be substituted. An alkyl group, when bonded to the glyceryl moiety, forms a glyceryl ether. In various embodiments, the compound of formula (I) can be a glyceryl mono- or di-ester. When the compound is a mono-ester, one of $R^{11}$ and $R^{12}$ is an acyl and the other is hydrogen. In other embodiments, the compound of formula (I) can be a glyceryl mono- or di-ether. When the compound is a mono-ether, one of $R^{11}$ and $R^{12}$ is an alkyl and the other is hydrogen. In other embodiments, the compound of formula (I) can be a mixed glyceryl ester-ether, where one of $R^{11}$ and $R^{12}$ is an acyl and the other is an alkyl group.

It is to be understood that a compound or a sat thereof may exhibit the phenomenon of tautomerism whereby two chemical compounds that are capable of facile interconversion by exchanging a hydrogen atom between two atoms, to either of which it forms a covalent bond. Since the tautomeric compounds exist in mobile equilibrium with each other they may be regarded as different isomeric forms of the same compound. It is to be understood that the formulae drawings within this specification can represent only one of the possible tautomeric forms. However, it is also to be understood that any tautomeric form is encompassed, and is not to be limited merely to any one tautomeric form utilized within the formulae drawings. The formulae drawings within this specification can represent only one of the possible tautomeric forms and it is to be understood that the specification encompasses all possible tautomeric forms of the compounds drawn not just those forms which it has been convenient to show graphically herein. For example, tautomerism may be exhibited by a pyrazolyl group bonded as indicated by the wavy line. While both substituents would be termed a 4-pyrazolyl group, it is evident that a different nitrogen atom bears the hydrogen atom in each structure.

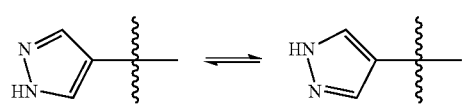 [SMILES: *c1cn[nH]c1 ; *c1cn[nH]c1]

Such tautomerism can also occur with substituted pyrazoles such as 3-methyl, 5-methyl, or 3,5-dimethylpyrazoles, and the like. Another example of tautomerism is amido-imido (lactam-lactim when cyclic) tautomerism, such as is seen in heterocyclic compounds bearing a ring oxygen atom adjacent to a ring nitrogen atom. For example, the equilibrium:

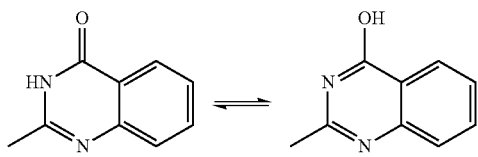

is an example of tautomerism. Accordingly, a structure depicted herein as one tautomer is intended to also include the other tautomer.

Optical Isomerism

It will be understood that when compounds described herein contain one or more chiral centers, the compounds may exist in, and may be isolated as pure enantiomeric or diastereomeric forms or as racemic mixtures. Included is any possible enantiomers, diastereomers, racemates or mixtures thereof of the compounds described herein.

The isomers resulting from the presence of a chiral center comprise a pair of non-superimposable isomers that are called "enantiomers." Single enantiomers of a pure compound are optically active, i.e., they are capable of rotating the plane of plane polarized light. Single enantiomers are designated according to the Cahn-Ingold-Prelog system. The priority of substituents is ranked based on atomic weights, a higher atomic weight, as determined by the systematic procedure, having a higher priority ranking. Once the priority ranking of the four groups is determined, the molecule is oriented so that the lowest ranking group is pointed away from the viewer. Then, if the descending rank order of the other groups proceeds clockwise, the molecule is designated (R) and if the descending rank of the other groups proceeds counterclockwise, the molecule is designated (S). In the example in Scheme 14, the Cahn-Ingold-Prelog ranking is A>B>C>D. The lowest ranking atom D is oriented away from the viewer.

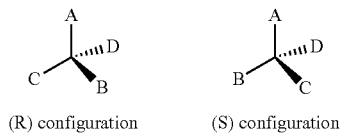

(R) configuration    (S) configuration

Diastereomers as well as their racemic and resolved, diastereomerically and enantiomerically pure forms and salts thereof are meant to be encompassed. Diastereomeric pairs may be resolved by known separation techniques including normal and reverse phase chromatography, and crystallization.

"Isolated optical isomer" means a compound which has been substantially purified from the corresponding optical isomer(s) of the same formula. In some embodiments, the isolated isomer is at least about 80%, e.g., at least 90%, 98% or 99% pure, by weight.

Isolated optical isomers may be purified from racemic mixtures by well-known chiral separation techniques. According to one such method, a racemic mixture of a compound, or a chiral intermediate thereof, is separated into 99% wt. % pure optical isomers by HPLC using a suitable chiral column, such as a member of the series of DAICEL® CHIRALPAK® family of columns (Daicel Chemical Industries, Ltd., Tokyo, Japan). The column is operated according to the manufacturer's instructions.

As used herein, "pharmaceutically acceptable salts" refer to derivatives of the disclosed compounds where the parent compound is modified by making acid or base salts thereof. Examples of pharmaceutically acceptable salts include, but are not limited to, mineral or organic acid salts of basic residues such as amines; alkali or organic salts of acidic residues such as carboxylic acids; and the like. The pharmaceutically acceptable salts include the conventional non-toxic salts or the quaternary ammonium salts of the parent compound formed, for example, from non-toxic inorganic or organic acids. For example, such conventional non-toxic salts include those derived from inorganic acids such as hydrochloric, hydrobromic, sulfuric, sulfamic, phosphoric, nitric and the like; and the salts prepared from organic acids such as acetic, propionic, succinic, glycolic, stearic, lactic, malic, tartaric, citric, ascorbic, pamoic, maleic, hydroxymaleic, phenylacetic, glutamic, benzoic, behenic, salicylic, sulfanilic, 2-acetoxybenzoic, fumaric, toluenesulfonic, methanesulfonic, ethane disulfonic, oxalic, isethionic, and the like.

The pharmaceutically acceptable salts of the compounds described herein can be synthesized from the parent compound, which contains a basic or acidic moiety, by conventional chemical methods. Generally, such salts can be prepared by reacting the free acid or base forms of these compounds with a stoichiometric amount of the appropriate base or acid in water or in an organic solvent, or in a mixture of the two; generally, nonaqueous media like ether, ethyl acetate, ethanol, isopropanol, or acetonitrile may be employed. Lists of suitable salts are found in *Remington's Pharmaceutical Sciences,* 17th ed., Mack Publishing Company, Easton, PA, p. 1418 (1985), the disclosure of which is hereby incorporated by reference.

The compounds of the formulas described herein can be solvates, and in some embodiments, hydrates. The term "solvate" refers to a solid compound that has one or more solvent molecules associated with its solid structure. Solvates can form when a compound is crystallized from a solvent. A solvate forms when one or more solvent molecules become an integral part of the solid crystalline matrix upon solidification. The compounds of the formulas described herein can be solvates, for example, ethanol solvates. Another type of a solvate is a hydrate. A "hydrate" likewise refers to a solid compound that has one or more water molecules intimately associated with its solid or crystalline structure at the molecular level. Hydrates can form when a compound is solidified or crystallized in water, where one or more water molecules become an integral part of the solid crystalline matrix.

The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication commensurate with a reasonable benefit/risk ratio.

The following definitions are used, unless otherwise described: halo or halogen is fluoro, chloro, bromo, or iodo. Alkyl, alkoxy, alkenyl, alkynyl, etc. denote both straight and branched groups; but reference to an individual radical such as "propyl" embraces only the straight chain radical, a branched chain isomer such as "isopropyl" being specifically referred to. Aryl denotes a phenyl radical or an ortho-fused bicyclic carbocyclic radical having about nine to ten ring atoms in which at least one ring is aromatic. Het can be heteroaryl, which encompasses a radical attached via a ring carbon of a monocyclic aromatic ring containing five or six ring atoms consisting of carbon and one to four heteroatoms each selected from the group consisting of nonperoxide oxygen, sulfur, and N(X) wherein X is absent or is H, O, ($C_1$-$C_4$)alkyl, phenyl or benzyl, as well as a radical of an ortho-fused bicyclic heterocycle of about eight to ten ring atoms derived therefrom, particularly a benz-derivative or one derived by fusing a propylene, trimethylene, or tetramethylene diradical thereto.

It will be appreciated by those skilled in the art that compounds described herein having a chiral center may exist in and be isolated in optically active and racemic forms. Some compounds may exhibit polymorphism. It is to be understood that any racemic, optically-active, polymorphic, or stereoisomeric form, or mixtures thereof, of a compound described herein, which possess the useful properties described herein, it being well known in the art how to prepare optically active forms (for example, by resolution of the racemic form by recrystallization techniques, by synthesis from optically-active starting materials, by chiral synthesis, or by chromatographic separation using a chiral stationary phase) and how to determine agonist activity using the standard tests described herein, or using other similar tests which are well known in the art. It is also understood by those of skill in the art that the compounds described herein include their various tautomers, which can exist in various states of equilibrium with each other.

The terms "treat" and "treating" as used herein refer to (i) preventing a pathologic condition from occurring (e.g., prophylaxis); (ii) inhibiting the pathologic condition or arresting its development; (iii) relieving the pathologic condition; and/or (iv) ameliorating, alleviating, lessening, and removing one or more symptoms of a condition. A candidate molecule or compound described herein may be in an amount in a formulation or medicament, which is an amount that can lead to a biological effect, or lead to protection from, ameliorating, alleviating, lessening, relieving, diminishing or a disease condition, e.g., infection, for example. These terms also are applicable to reducing a titer of a microorganism (microbe) or infectious agent in a system (e.g., cell, tissue, or subject) infected with a microbe, reducing the rate of microbial propagation, reducing the duration of infection of an infectious agent, delaying or attenuating an infection by an infectious agent, reducing the number of symptoms or an effect of a symptom associated with the microbial infection, and/or removing detectable amounts of the microbe from the system. Examples of symptoms include but are not limited weight loss, fever, malaise, weakness, dehydration, failure or diminished organ or organ system function (e.g., pulmonary function). Examples of microbes include but are not limited to viruses, bacteria and fungi.

The term "therapeutically effective amount" as used herein refers to an amount of a compound, or an amount of a combination of compounds, to treat or prevent a disease or disorder or a microbial infection, or to treat or prevent a symptom of the disease or disorder or microbial infection, in a subject. As used herein, the terms "subject" and "patient" generally refers to an individual who will receive or who has received treatment (e.g., administration of a compound) according to a method described herein.

The term "elderly" as used herein refers to a subject that is typically 65 years old or greater. Elderly may in include a subject that is at least 50 years old or at least 55 years old, or at least 60 years old. Elderly as used herein refers to any subject that is more prone to infection by an infectious agent and/or has a reduced capacity to prevent, control or alleviate an infection by an infectious agent due in whole or part to aging.

The term "young child" as used herein refers to a subject that is typically under the age of 5 years.

"Stable compound" and "stable structure" are meant to indicate a compound that is sufficiently robust to survive isolation to a useful degree of purity from a reaction mixture, and formulation into an efficacious therapeutic agent. Only stable compounds are contemplated.

Formulas (I)-(VI)

The present disclosure provides a compound having the structure of Formula I, or a salt thereof, $$A^1\text{-}Q\text{-}L^1\text{-}A^2\text{-}L^2\text{-}Z \qquad \text{Formula I}$$

A1 is an alkyl, aryl, aryloxy, arylamino, arylthiol, arylmethyl, or arylcarbonyl; Q is a divalent heterocyclic aryl; L1 is a divalent group selected from amide, carbamate, urea, thioamide, thiocarbamate, thiourea, or a dithiocarbamate; A2 is a divalent aryl or heteroaryl; L2 is a divalent sulfone, sulfoxide, thioether, carbonyl, amide, ester, or aminomethyl; and Z is an alkylamine, arylamine, dialkylamine, diarylmine, N,N-alkylarylamine, or a cyclic amine. In various embodiments, Q is other than pyridine, imidazole, dithiazole. In various embodiments, Q is other than a divalent 2,5-thiazole. In various embodiments, Q is a divalent 2,4-thiazole.

In various embodiments, A1 is an aryl; Q is a divalent thiazole; L1 is a divalent amide; A2 is a divalent aryl; L2 is a divalent sulfone, sulfoxide, thioether, or carbonyl; and Z is an alkylamine, arylamine, dialkylamine, diarylmine, N,N-alkylarylamine, or a non-aromatic cyclic amine.

In various embodiments, A1 is a phenyl or naphthyl; Q is a divalent thiazole; L1 is a divalent amide; A2 is a phenylene; L2 is a divalent sulfone; and Z is a dialkylamine or a non-aromatic heterocyclic amine.

In various embodiments, A1 has the structure

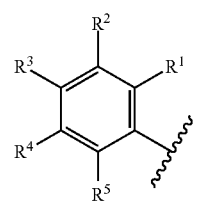

Formula A

Each of R1, R2, R3, R4, and R5 is independently H, fluoro, chloro, bromo, iodo, azido, hydroxyl, amino, thio, trifluoromethyl, trifluoromethoxy, cyano, nitroso, nitro, carboxy, sulfonate, phosphate, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthiol, arylsulfinyl, arylsulfonyl, arylamino, N,N-alkylarylamino, arylcarbonyl, or aminosulfonyl, or any adjacent two of R1, R2, R3, R4, and R5 form a fused aryl ring together with the carbon atoms to which they are attached. In some embodiments, at least one of R1, R2, R3, R4, and R5 is other than H. In various embodiments, R3 is H. In some embodiments, R2 and R5 are each independently fluoro, chloro, bromo, iodo, alkyl, alkenyl, or alkynyl. In some embodiments, R2 and R5 are each independently fluoro, chloro, bromo, iodo, alkyl, alkenyl, or alkynyl, and R1, R3 and R4 are H. In some embodiments, R4 and R5 are each independently fluoro, chloro, bromo, iodo, alkyl, alkenyl, or alkynyl. In some embodiments, R4 and R5 are each independently fluoro, chloro, bromo, iodo, alkyl, alkenyl, or alkynyl, and R1, R2 and R4 are H. In some embodiments, R1 is methyl; R2 is methyl; R4 is methyl; R5 is methyl; or any combination thereof.

In various embodiments, A1 has the structure

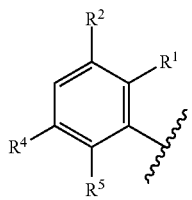

Formula B

Each of R1, R2, R4, and R5 is independently H, fluoro, chloro, bromo, iodo, azido, hydroxyl, amino, thio, trifluoromethyl, trifluoromethoxy, cyano, nitroso, nitro, carboxy, sulfonate, phosphate, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl, or any adjacent two of R1, R2, R4, and R5 form a fused aryl ring together with the carbon atoms to which they are attached; at least one of R1 and R5 is other than H; and at least two of R1, R2, R4, and R5 is other than H. In some embodiments, each of R1, R2, R4, and R5 is independently H, fluoro, chloro, bromo, iodo, azido, hydroxyl, amino, thio, trifluoromethyl, trifluoromethoxy, cyano, nitroso, nitro, carboxy, sulfonate, phosphate, methyl, vinyl, ethynyl, C2-C10 alkyl, C3-C10 alkenyl, C3-C10 alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl, or any adjacent two of R1, R2, R4, and R5 form a fused aryl ring together with the carbon atoms to which they are attached; at least one of R1 and R5 is other than H; and at least two of R1, R2, R4, and R5 is other than H. In further embodiments, each of R1, R2, R4, and R5 is independently H, methyl, fluoro, chloro, bromo, iodo, azido, trifluoromethyl, trifluoromethoxy, cyano, methyl, vinyl, ethynyl, C2-C10 alkyl, C3-C10 alkenyl, C3-C10 alkynyl, or any adjacent two of R1, R2, R4, and R5 form a fused benzo ring together with the carbon atoms to which they are attached; at least one of R1 and R5 is other than H; and at least two of R1, R2, R4, and R5 is other than H.

In various embodiments, A1 has the structure

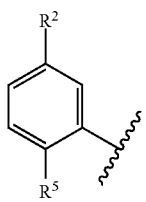

Formula C

Each of R2 and R5 is independently methyl, fluoro, chloro, bromo, iodo, azido, trifluoromethyl, trifluoromethoxy, cyano, methyl, vinyl, ethynyl, C2-C10 alkyl, C3-C10 alkenyl, C3-C10 alkynyl. In various embodiments, each of R2 and R5 is independently methyl or bromo.

In various embodiments, Q is a divalent heteroaryl linking A1 and L1. For example, Q can be a linking heteroaryl that is an imidazole, pyrazole, thiazole, oxazole, thiadiazole, triazole, pyridine, pyrimidine, pyridazine, or pyrazine, which can be divalently linking any of the various positions. In various embodiments, Q is bound to A1 at the 2, 3, 4, 5 or, if present, 6 position, of the heteroaryl. In various embodiments, Q is bound to L1 at the 2, 3, 4, 5 or, if present, 6 position, of the heteroaryl. For example, Q may be bound to A1 at the 5 position and L1 at the 2 position of a heteroaryl such as thiazole, imidazole, 1,2,4-thiadiazole, a 1,2,4-triazole, pyridine, pyrimidine, or pyrazine. Q can be substituted or unsubstituted. In various embodiments, Q has the structure:

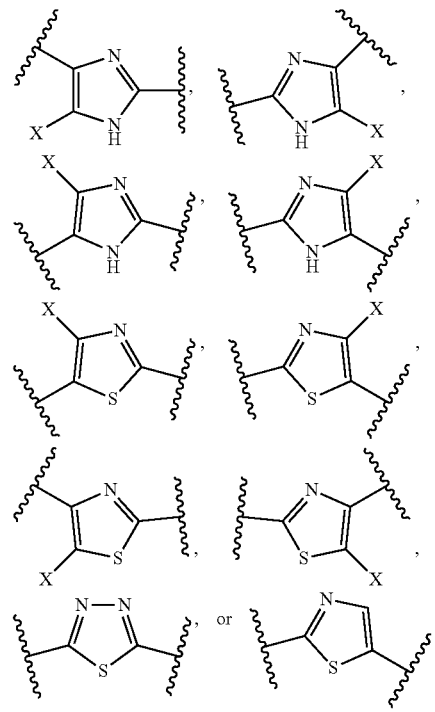

In various further embodiments, Q has the structure

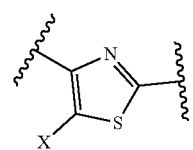

Formula D

X is H, fluoro, chloro, bromo, iodo, azido, trifluoromethyl, trifluoromethoxy, cyano, nitro, carboxy, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsuffinyl, arylsulfonyl, arylamino, N,N-alkylarylamino, arylcarbonyl, or aminosulfonyl. In some embodiments, X is H, methyl, vinyl, ethynyl, C2-C10 alkyl, C3-C10 alkenyl, C3-C10 alkynyl, alkyloxy, alkylthio, alkylamino, dialkylamino, or aryl. In some further embodiments, X is a linear alkyl, linear alkenyl, linear alkynyl, linear alkyloxy, or linear alkylthio. In various embodiments, X is a C1-C3 alkyl. In various embodiments, X is a C3-C10 alkynyl. In various embodiments, X is a terminally substituted alkynyl, e.g., having a terminal hydroxyl group. In various embodiments, X is an unsubstituted alkyl or an unsubstituted alkynyl. In various embodiments, X is other than alkylthio. In various embodiments, X is other than alkyloxy. In various embodiments, X is other than aryl. In various embodiments, X is other than heterocyclyl. In various embodiments, X is other than dialkylamino. In various embodiments, X is H.

In various further embodiments, Q is trivalent. In such embodiments, Q is bound to L1 at one position, but is bound to A1 at two positions: one position on the heteroaryl ring and one position on the substituent X, which serves as a divalent linking substituent when Q is trivalent. In some embodiments, Q is trivalent and X is an alkylene linker, or phenylene linker, or a bond. In some embodiments, Q is trivalent and X is a methylene, ethylene, propylene, or butylene.

In various embodiments, L1 can be an amide with the nitrogen bound to A1 or with the nitrogen bound to A2, for example, L1 can have the structure

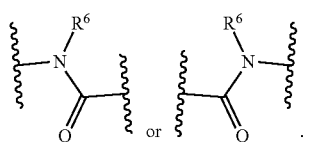

R6 is H, alkyl, alkenyl, or alkynyl. In various embodiments, R6 is H, methyl, or alkynyl. In various embodiments R6 is H. In various embodiments, R6 is an amide linkage in which the nitrogen portion of the amide is linked to Q and the carbonyl portion of the amide is linked to A2. L1 can be an amide with the nitrogen bound to A1 or with the nitrogen bound to A2, for example, L1 can have the structure In various embodiments, L1 can be an unsubstituted amide with the nitrogen bound to A1 or with the nitrogen bound to A2, for example, L1 can have the structure

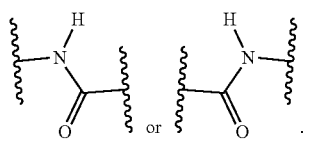

In various embodiments, L1 is

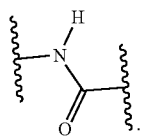

In various embodiments, A2 has the structure

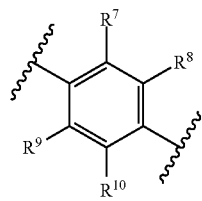

Formula E1

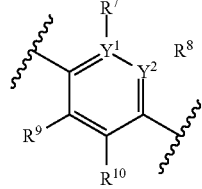

Formula E2

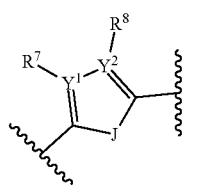

Formula E3

Y1 is C or N, and if Y1 is N then R7 is absent; Y2 is C or N, and if Y2 is N then R8 is absent; J is O or S; and each of R7, R8, R9, and R10 is independently H, fluoro, chloro, bromo, iodo, azido, hydroxyl, amino, thio, trifluoromethyl, trifluoromethoxy, cyano, nitroso, nitro, carboxy, sulfonate, phosphate, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthiol, arylsulfinyl, arylsulfonyl, arylamino, N,N-alkylarylamino, arylcarbonyl, or aminosulfonyl, or any adjacent two of R7, R8, R9, and R10 form a fused aryl ring together with the carbon atoms to which they are attached. In various embodiments, A2 is a 1,2-phenylene, 1,3-phenylene, or a 1,4-phenylene. In various embodiments, A2 is unsubstituted.

In various embodiments, A2 is a 1,4-phenylene having the structure

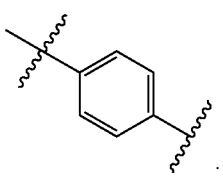 [SMILES: *c1ccc(*)cc1]

In various embodiments, L1 is a divalent sulfone linkage having the structure

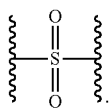

In various embodiments, Z has the structure

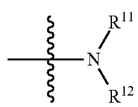

Formula F

R11 and R12 are each independently H, alkyl, alkenyl, alkynyl, or aryl, or R11 and R12 form a cyclic amine together with the nitrogen atom to which they are attached. In some embodiments, R11 and R12 are each independently alkyl, or R11 and R12 form a morpholine, aziridine, azetidine, azepine, pyrrolidine, or piperidine ring together with the nitrogen atom to which R11 and R12 are attached. In various embodiments, R11 and R12 are other than H. In various embodiments, R11 and R12 are other than aryl. In various embodiments, R11 and R12 are other than alkynyl. In various embodiments, one of R11 and R12 is alkynyl. In various embodiments, R11 and R12 are other than cycloalkyl. In yet further embodiments, R11 and R12, taken together, are other than piperazine. In some embodiments, R11 and R12, taken together are an unsubstituted piperidine, or a substituted piperidine. In some embodiments, R11 and R12, taken together are a 2-substituted piperidine, 3-substituted piperidine, 4-substituted piperidine, a disubstituted piperidine, a trisubstituted piperidine, or a piperidine fused to an aryl ring. In some embodiments, R11 and R12, taken together are a piperidine substituted with a diazetine. In some embodiments, R11 and R12, taken together are a piperidine substituted with an alkynyl. In some embodiments, R11 and R12, taken together are a piperazine N-substituted with an alkynyl.

In various embodiments, Z has the structure

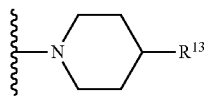

Formula G

R13 is H, fluoro, chloro, bromo, iodo, azido, trifluoromethyl, trifluoromethoxy, cyano, nitro, carboxy, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl.

The present disclosure also provides a compound having the structure of Formula II, or a salt thereof.

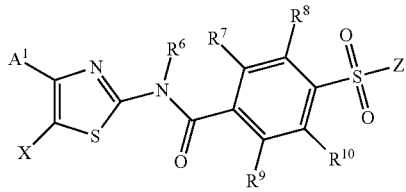

Formula II

A1 is an alkyl, aryl, aryloxy, arylamino, arylthiol, arylcarbonyl; X is H, fluoro, chloro, bromo, iodo, azido, trifluoromethyl, trifluoromethoxy, cyano, nitro, carboxy, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl; and Z is an alkylamine, arylamine, dialkylamine, diarylmine, N,N-alkylarylamine, or a cyclic amine.

In various embodiments, A1 is an alkyl, aryl, aryloxy, arylamino, arylthiol, arylcarbonyl; X is H, fluoro, chloro, bromo, iodo, azido, trifluoromethyl, trifluoromethoxy, cyano, nitro, carboxy, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl; and Z is an alkylamine, arylamine, dialkylamine, diarylmine, N,N-alkylarylamine, or a cyclic amine. In some further embodiments, A1 is an aryl, Z is a dialkylamine or a cyclic amine, or both.

In various embodiments, X is H, methyl, vinyl, ethynyl, C2-C10 alkyl, C3-C10 alkenyl, C3-C10 alkynyl, or C1-C10 alkyloxy. In further embodiments, X is a linear alkyl, linear alkenyl, linear alkynyl, linear alkyloxy.

In further embodiments, A1 has the structure

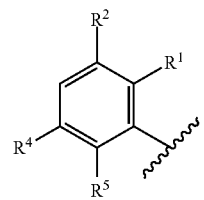

Formula B

Each of R1, R2, R4, and R5 is independently H, methyl, fluoro, chloro, bromo, iodo, azido, trifluoromethyl, trifluoromethoxy, cyano, methyl, vinyl, ethynyl, C2-C10 alkyl, C3-C10 alkenyl, C3-C10 alkynyl, or any adjacent two of R1, R2, R4, and R5 form a fused benzo ring together with the carbon atoms to which they are attached; at least one of R1 and R5 is other than H; and at least two of R1, R2, R4, and R5 is other than H.

In yet further embodiments, A1 has the structure

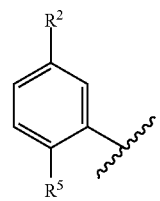

Formula C

Each of R2 and R5 is independently methyl, fluoro, chloro, bromo, iodo, azido, trifluoromethyl, trifluoromethoxy, cyano, methyl, vinyl, ethynyl, C2-C10 alkyl, C3-C10 alkenyl, or C3-C10 alkynyl.

In various embodiments, Z has the structure

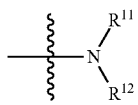

R11 and R12 are each independently alkyl, or R11 and R12 form a morpholine, aziridine, azetidine, azepine, pyrrolidine, or piperidine ring together with the nitrogen atom to which R11 and R12 are attached.

In further embodiments, Z has the structure

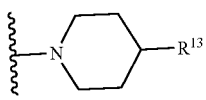

Formula G

R13 is H, methyl, vinyl, ethynyl, C2-C10 alkyl, C3-C10 alkenyl, C3-C10 alkynyl, C1-C10 alkyloxy, or a geminally-bound diazirine.

The present disclosure also provides a compound having the structure of Formula III, or a salt thereof.

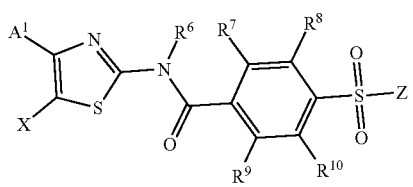

Formula III

A1 is an alkyl, aryl, aryloxy, arylamino, arylthiol, arylcarbonyl; X is H, fluoro, chloro, bromo, iodo, azido, trifluoromethyl, trifluoromethoxy, cyano, nitro, carboxy, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl; and Z is an alkylamine, arylamine, dialkylamine, diarylmine, N,N-alkylarylamine, or a cyclic amine.

In various embodiments, A1 is an alkyl, aryl, aryloxy, arylamino, arylthiol, arylcarbonyl; X is H, fluoro, chloro, bromo, iodo, azido, trifluoromethyl, trifluoromethoxy, cyano, nitro, carboxy, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl; and Z is an alkylamine, arylamine, dialkylamine, diarylmine, N,N-alkylarylamine, or a cyclic amine. In some further embodiments, A1 is an aryl, Z is a dialkylamine or a cyclic amine, or both.

In various embodiments, X is H, methyl, vinyl, ethynyl, C2-C10 alkyl, C3-C10 alkenyl, C3-C10 alkynyl, or C1-C10 alkyloxy. In further embodiments, X is a linear alkyl, linear alkenyl, linear alkynyl, linear alkyloxy.

In further embodiments, A1 has the structure

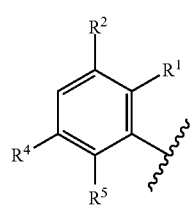

Formula B

Each of R1, R2, R4, and R5 is independently H, methyl, fluoro, chloro, bromo, iodo, azido, trifluoromethyl, trifluoromethoxy, cyano, methyl, vinyl, ethynyl, C2-C10 alkyl, C3-C10 alkenyl, C3-C10 alkynyl, or any adjacent two of R1, R2, R4, and R5 form a fused benzo ring together with the carbon atoms to which they are attached; at least one of R1 and R5 is other than H; and at least two of R1, R2, R4, and R5 is other than H.

In yet further embodiments, A1 has the structure

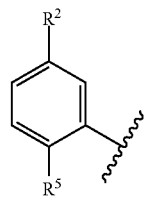

Formula C

Each of R2 and R5 is independently methyl, fluoro, chloro, bromo, iodo, azido, trifluoromethyl, trifluoromethoxy, cyano, methyl, vinyl, ethynyl, C2-C10 alkyl, C3-C10 alkenyl, or C3-C10 alkynyl.

In various embodiments, Z has the structure

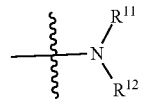

R11 and R12 are each independently alkyl, or R11 and R12 form a morpholine, aziridine, azetidine, azepine, pyrrolidine, or piperidine ring together with the nitrogen atom to which R11 and R12 are attached.

In further embodiments, Z has the structure

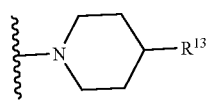

Formula G

R13 is H, methyl, vinyl, ethynyl, C2-C10 alkyl, C3-C10 alkenyl, C3-C10 alkynyl, C1-C10 alkyloxy, or a geminally-bound diazirine.

The present disclosure also provides a compound having the structure of Formula IV, or a salt thereof.

Formula IV

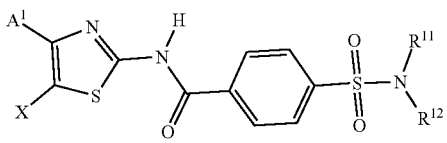

A1 is an aryl; X is H, fluoro, chloro, bromo, iodo, azido, trifluoromethyl, trifluoromethoxy, cyano, nitro, carboxy, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl; and R11 and R12 are each independently alkyl, or R11 and R12 form a morpholine, aziridine, azetidine, azepine, pyrrolidine, or piperidine ring together with the nitrogen atom to which R11 and R12 are attached.

The present disclosure also provides a compound having the structure of Formula V, or a salt thereof.

Formula V

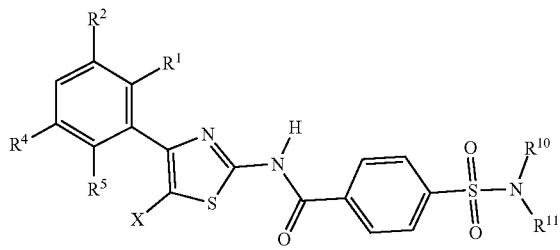

X is H, fluoro, chloro, bromo, iodo, azido, trifluoromethyl, trifluoromethoxy, cyano, nitro, carboxy, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl.

Each of R1, R2, R4, and R5 is independently H, methyl, fluoro, chloro, bromo, iodo, azido, trifluoromethyl, trifluoromethoxy, cyano, methyl, vinyl, ethynyl, C2-C10 alkyl, C3-C10 alkenyl, C3-C10 alkynyl, or any adjacent two of R1, R2, R4, and R5 form a fused benzo ring together with the carbon atoms to which they are attached; at least one of R1 and R5 is other than H; at least two of R1, R2, R4, and R5 is other than H; and R11 and R12 are each independently alkyl, or R11 and R12 form a morpholine, aziridine, azetidine, azepine, pyrrolidine, or piperidine ring together with the nitrogen atom to which R11 and R12 are attached.

The present disclosure also provides a compound having the structure of Formula VI, or a salt thereof.

Formula VI

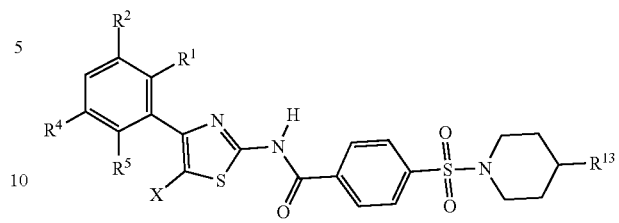

X is H, fluoro, chloro, bromo, iodo, azido, trifluoromethyl, trifluoromethoxy, cyano, nitro, carboxy, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl; and R13 is H, methyl, vinyl, ethynyl, C2-C10 alkyl, C3-C10 alkenyl, C3-C10 alkynyl, C1-C10 alkyloxy, or a geminally-bound diazirine. In some embodiments, X is H, methyl, vinyl, ethynyl, C2-C10 alkyl, C3-C10 alkenyl, C3-C10 alkynyl, or C1-C10 alkyloxy. In further embodiments, X is a linear alkyl, linear alkenyl, linear alkynyl, linear alkyloxy.

The present disclosure also provides a photoaffinity probe comprising one or more of the compounds described herein. In various embodiments, the photoaffinity probe contains one or more alkyne, which may be a terminal alkyne; one or more azide; or both. For example, in various embodiments, at least one of R1, R2, R3, R4, R5, X, R6, R7, R8, R9, R10, R11, R12, and R13, if present, is an alkyne. In various further embodiments, at least one of R1, R2, R3, R4, R5, X, R7, R8, R9, R10, and R13, if present, is an azide. In some embodiments, at least one of R1, R2, R4, R5, X, and R13 is an azide; at least one of R1, R2, R4, R5, X, and R13 is an alkyne; or both. In some embodiments, one of R1, R2, R4, R5, X, and R13 is an azide and one of R1, R2, R4, R5, X, and R13 is an alkyne.

The present disclosure also provides a compound having the structure:

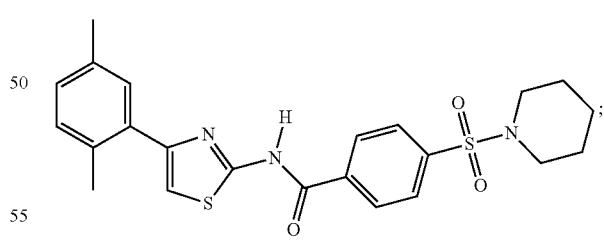

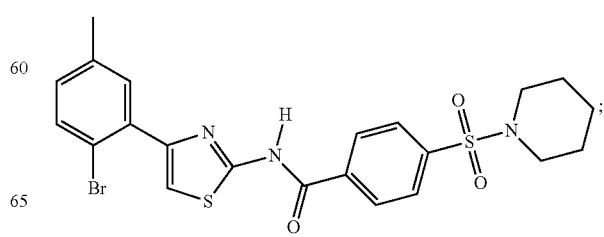

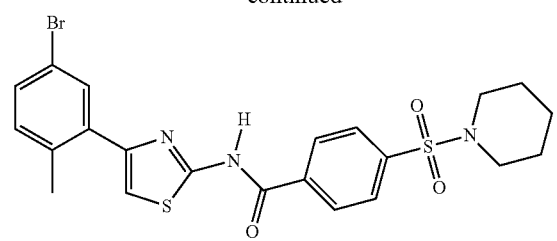
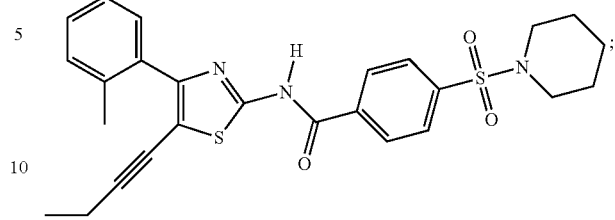
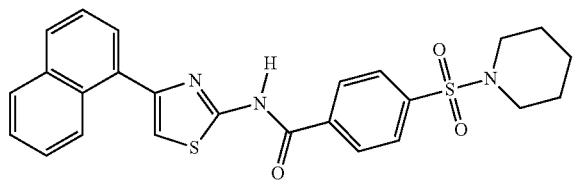
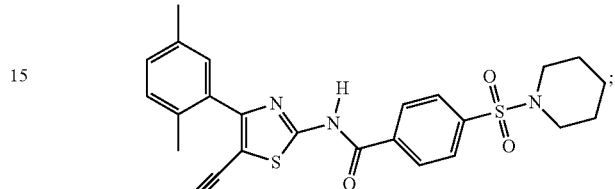
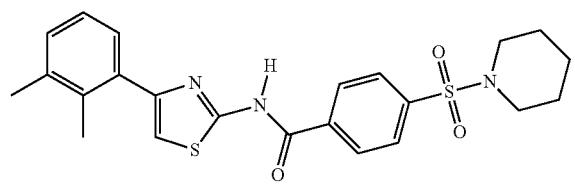
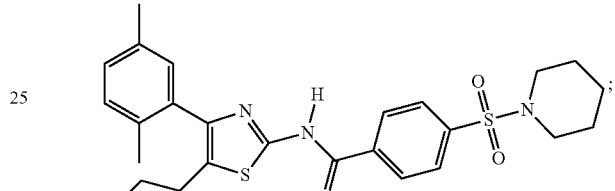
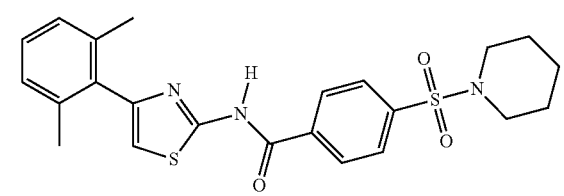
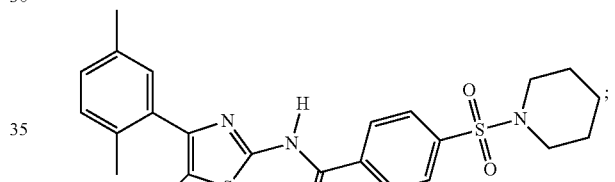
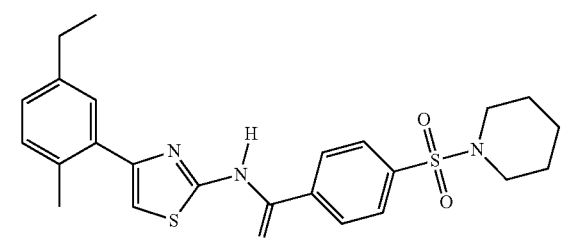
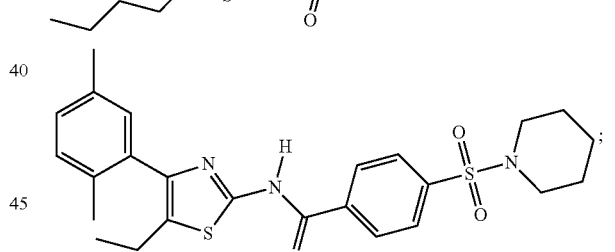
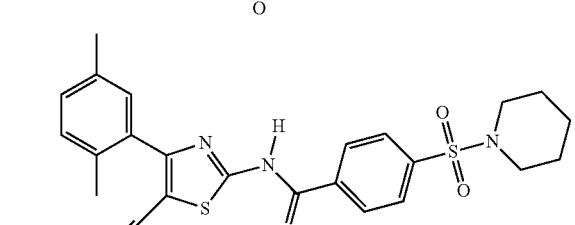
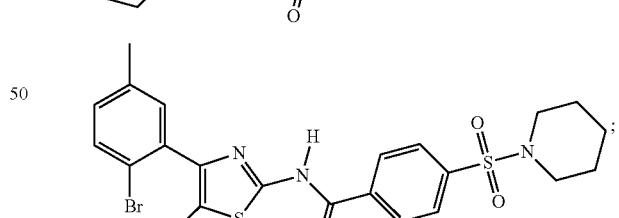
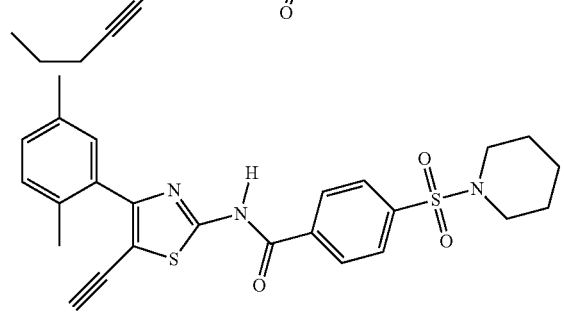
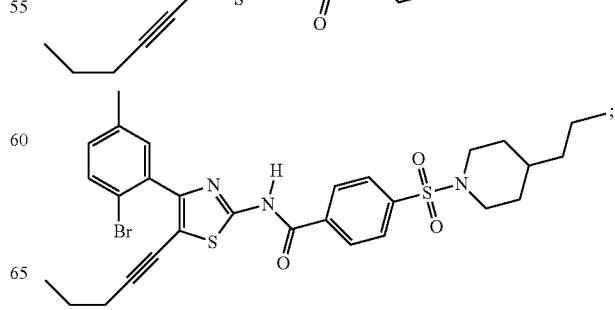

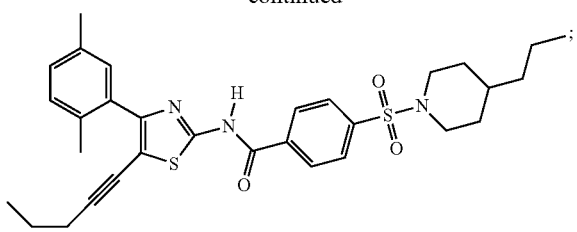
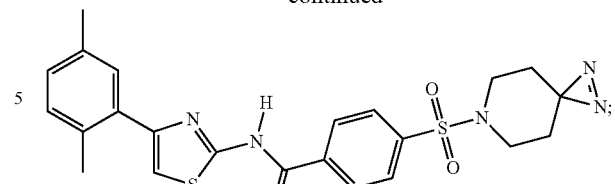
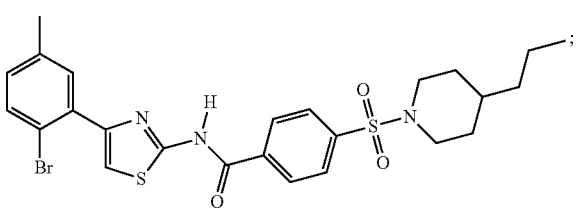
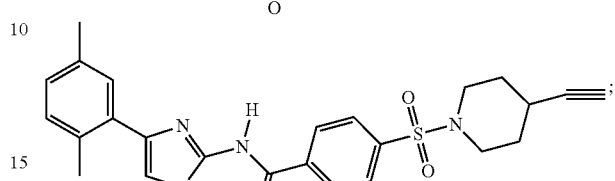
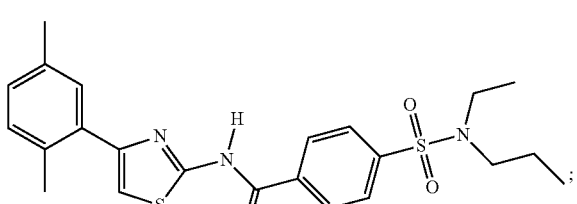
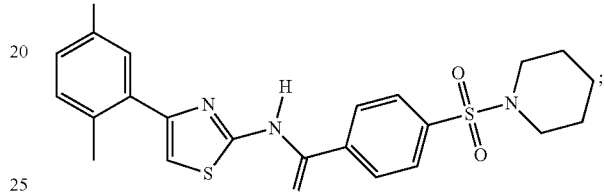
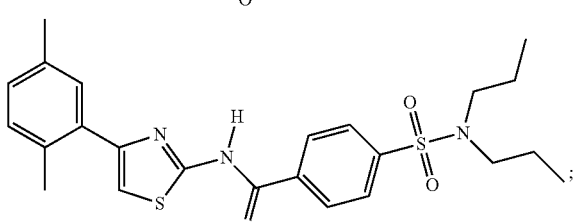
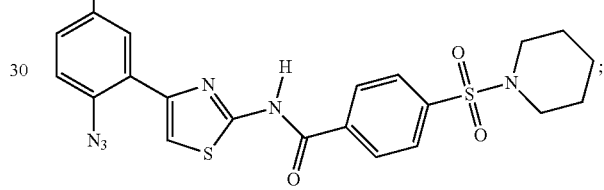
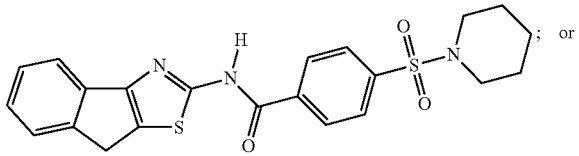
; or
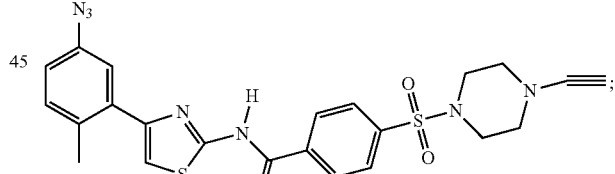
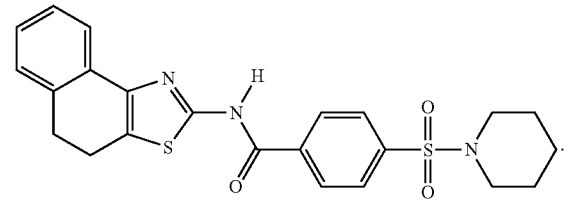
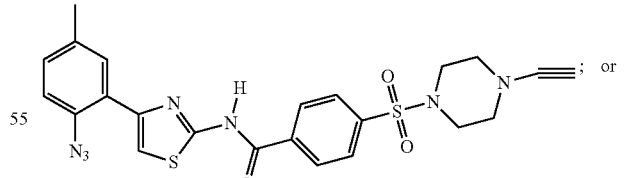
; or
The present disclosure also provides a compound having the structure:
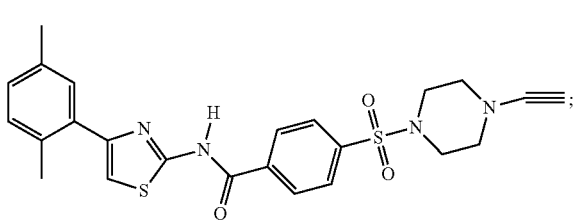
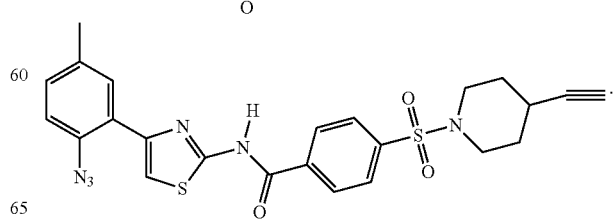

The present disclosure also provides a vaccine adjuvant, pharmaceutical composition, or photoaffinity probe, comprising one or more of the compounds described herein. For example, the photoaffinity probe can comprise a compound having an azide and an alkyne substituent. As another example, the present disclosure provides a composition comprising a TLR ligand and one or more of the compounds described herein.

The term "alkyl" as used herein refers to substituted or unsubstituted straight chain, branched or cyclic, saturated mono- or bi-valent groups having from 1 to 20 carbon atoms, 10 to 20 carbon atoms, 12 to 18 carbon atoms, 6 to about 10 carbon atoms, 1 to 10 carbons atoms, 1 to 8 carbon atoms, 2 to 8 carbon atoms, 3 to 8 carbon atoms, 4 to 8 carbon atoms, 5 to 8 carbon atoms, 1 to 6 carbon atoms, 2 to 6 carbon atoms, 3 to 6 carbon atoms, or 1 to 3 carbon atoms. Examples of straight chain mono-valent ($C_1$-$C_{20}$)-alkyl groups include those with from 1 to 8 carbon atoms such as methyl (i.e., $CH_3$), ethyl, n-propyl, n-butyl, n-pentyl, n-hexyl, n-heptyl, n-octyl groups. Examples of branched mono-valent ($C_1$-$C_{20}$)-alkyl groups include isopropyl, isobutyl, sec-butyl, t-butyl, neopentyl, and isopentyl. Examples of straight chain bi-valent ($C_1$-$C_{20}$)-alkyl groups include those with from 1 to 6 carbon atoms such as —$CH_2$—, —$CH_2CH_2$—, —$CH_2CH_2CH_2$—, —$CH_2CH_2CH_2CH_2$—, and —$CH_2CH_2CH_2CH_2CH_2$—. Examples of branched bi-valent alkyl groups include —$CH(CH_3)CH_2$— and —$CH_2CH(CH_3)CH_2$—. Examples of cyclic alkyl groups include cyclopropyl, cyclobutyl, cyclopentyl, cyclohexyl, cyclooctyl, bicyclo[1.1.1]pentyl, bicyclo[2.1.1]hexyl, bicyclo[2.2.1]heptyl, and adamantyl. Cycloalkyl groups further include substituted and unsubstituted polycyclic cycloalkyl groups such as, but not limited to, norbornyl, adamantyl, bornyl, camphenyl, isocamphenyl, and carenyl groups, and fused rings such as, but not limited to, decalinyl, and the like. For example, cycloalkyl includes an adamantyl substituted by one, two, three, four, or more substituents, e.g., at the tertiary bridgehead positions at the methylene bridges. In some embodiments, alkyl includes a combination of substituted and unsubstituted alkyl.

As an example, alkyl, and also ($C_1$)alkyl, includes methyl and substituted methyl. As a particular example, ($C_1$)alkyl includes benzyl. As a further example, alkyl can include methyl and substituted ($C_2$-$C_8$)alkyl. Alkyl can also include substituted methyl and unsubstituted ($C_2$-$C_8$)alkyl. In some embodiments, alkyl can be methyl and $C_2$-$C_8$ linear alkyl. In some embodiments, alkyl can be methyl and $C_2$-$C_8$ branched alkyl. The term methyl is understood to be —$CH_3$, which is not substituted. The term methylene is understood to be —$CH_2$—, which is not substituted. For comparison, the term ($C_1$)alkyl is understood to be a substituted or an unsubstituted —$CH_3$ or a substituted or an unsubstituted —$CH_2$—. Representative substituted alkyl groups can be substituted one or more times with any of the groups listed herein, for example, cycloalkyl, heterocyclyl, aryl, amino, haloalkyl, hydroxy, cyano, carboxy, nitro, thio, alkoxy, and halogen groups. As further example, representative substituted alkyl groups can be substituted one or more fluoro, chloro, bromo, iodo, amino, amido, alkyl, alkoxy, alkylamido, alkenyl, alkynyl, alkoxycarbonyl, acyl, formyl, arylcarbonyl, aryloxycarbonyl, aryloxy, carboxy, haloalkyl, hydroxy, cyano, nitroso, nitro, azido, trifluoromethyl, trifluoromethoxy, thio, alkylthio, arylthiol, alkylsulfonyl, alkylsulfinyl, dialkylaminosulfonyl, sulfonic acid, carboxylic acid, dialkylamino and dialkylamido. In some embodiments, representative substituted alkyl groups can be substituted from a set of groups including amino, hydroxy, cyano, carboxy, nitro, thio and alkoxy, but not including halogen groups. Thus, in some embodiments alkyl can be substituted with a non-halogen group. For example, representative substituted alkyl groups can be substituted with a fluoro group, substituted with a bromo group, substituted with a halogen other than bromo, or substituted with a halogen other than fluoro. In some embodiments, representative substituted alkyl groups can be substituted with one, two, three or more fluoro groups or they can be substituted with one, two, three or more non-fluoro groups. For example, alkyl can be trifluoromethyl, difluoromethyl, or fluoromethyl, or alkyl can be substituted alkyl other than trifluoromethyl, difluoromethyl or fluoromethyl. Alkyl can be haloalkyl or alkyl can be substituted alkyl other than haloalkyl.

The term "alkenyl" as used herein refers to substituted or unsubstituted straight chain, branched or cyclic, saturated mono- or bi-valent groups having at least one carbon-carbon double bond and from 2 to 20 carbon atoms, 10 to 20 carbon atoms, 12 to 18 carbon atoms, 6 to about 10 carbon atoms, 2 to 10 carbons atoms, 2 to 8 carbon atoms, 3 to 8 carbon atoms, 4 to 8 carbon atoms, 5 to 8 carbon atoms, 2 to 6 carbon atoms, 3 to 6 carbon atoms, 4 to 6 carbon atoms, 2 to 4 carbon atoms, or 2 to 3 carbon atoms. The double bonds can be trans or cis orientation. The double bonds can be terminal or internal. The alkenyl group can be attached via the portion of the alkenyl group containing the double bond, e.g., vinyl, propen-1-yl and buten-1-yl, or the alkenyl group can be attached via a portion of the alkenyl group that does not contain the double bond, e.g., penten-4-yl. Where specified, the parent moiety should be understood to be attached to the alkenyl group at a vinylic position of the double bond rather than a non-vinylic position. For example, where an aromatic ring is substituted with a π-conjugated alkenyl group, it should be understood to be substituted at the vinyl position rather than a non-vinylic position. As a further example, an aromatic ring substituted with a π-conjugated propenyl group would be understood to be a propen-1-yl or a propen-2-yl group rather than a propen-3-yl group. Examples of mono-valent ($C_2$-$C_{20}$)-alkenyl groups include those with from 1 to 8 carbon atoms such as vinyl, propenyl, propen-1-yl, propen-2-yl, butenyl, buten-1-yl, buten-2-yl, sec-buten-1-yl, sec-buten-3-yl, pentenyl, hexenyl, heptenyl and octenyl groups. Examples of branched mono-valent ($C_2$-$C_{20}$)-alkenyl groups include isopropenyl, iso-butenyl, sec-butenyl, t-butenyl, neopentenyl, and isopentenyl. Examples of straight chain bi-valent ($C_2$-$C_{20}$)alkenyl groups include those with from 2 to 6 carbon atoms such as —CHCH—, —$CHCHCH_2$—, —$CHCHCH_2CH_2$—, and —$CHCHCH_2CH_2CH_2$—. Examples of branched bi-valent alkyl groups include —$C(CH_3)CH$— and —$CHC(CH_3)CH_2$—. Examples of cyclic alkenyl groups include cyclopentenyl, cyclohexenyl and cyclooctenyl. For example, alkenyl can be vinyl and substituted vinyl. For example, alkenyl can be vinyl and substituted ($C_3$-$C_8$)alkenyl. Alkenyl can also include substituted vinyl and unsubstituted ($C_3$-$C_8$) alkenyl. Representative substituted alkenyl groups can be substituted one or more times with any of the groups listed herein, for example, monoalkylamino, dialkylamino, cyano, acetyl, amido, carboxy, nitro, alkylthio, alkoxy, and halogen groups. As further example, representative substituted alkenyl groups can be substituted one or more fluoro, chloro, bromo, iodo, amino, amido, alkyl, alkoxy, alkylamido, alkenyl, alkynyl, alkoxycarbonyl, acyl, formyl, arylcarbonyl, aryloxycarbonyl, aryloxy, carboxy, haloalkyl, hydroxy, cyano, nitroso, nitro, azido, trifluoromethyl, trifluoromethoxy, thio, alkylthio, arylthiol, alkylsulfonyl, alkylsulfinyl, dialkylaminosulfonyl, sulfonic acid, carboxylic acid, dialkylamino and dialkylamido. In some embodiments, representative substituted alkenyl groups can be substituted from a set of groups including monoalkylamino, dialkylamino, cyano, acetyl, amido, carboxy, nitro, alkylthio and alkoxy, but not including halogen groups. Thus, in some embodiments alkenyl can be substituted with a non-halogen group. In some embodiments, representative substituted alkenyl groups can be substituted with a fluoro group, substituted with a bromo group, substituted with a halogen other than bromo, or substituted with a halogen other than fluoro. For example, alkenyl can be 1-fluorovinyl, 2-fluorovinyl, 1,2-difluorovinyl, 1,2,2-trifluorovinyl, 2,2-difluorovinyl, trifluoropropen-2-yl, 3,3,3-trifluoropropenyl, 1-fluoropropenyl, 1-chlorovinyl, 2-chlorovinyl, 1,2-dichlorovinyl, 1,2,2-trichlorovinyl or 2,2-dichlorovinyl. In some embodiments, representative substituted alkenyl groups can be substituted with one, two, three or more fluoro groups or they can be substituted with one, two, three or more non-fluoro groups.

The term "alkynyl" as used herein, refers to substituted or unsubstituted straight and branched chain alkyl groups, except that at least one triple bond exists between two carbon atoms. Thus, alkynyl groups have from 2 to 50 carbon atoms, 2 to 20 carbon atoms, 10 to 20 carbon atoms, 12 to 18 carbon atoms, 6 to about 10 carbon atoms, 2 to 10 carbons atoms, 2 to 8 carbon atoms, 3 to 8 carbon atoms, 4 to 8 carbon atoms, 5 to 8 carbon atoms, 2 to 6 carbon atoms, 3 to 6 carbon atoms, 4 to 6 carbon atoms, 2 to 4 carbon atoms, or 2 to 3 carbon atoms. Examples include, but are not limited to ethynyl, propynyl, propyn-1-yl, propyn-2-yl, butynyl, butyn-1-yl, butyn-2-yl, butyn-3-yl, butyn-4-yl, pentynyl, pentyn-1-yl, hexynyl, Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "aryl" as used herein refers to substituted or unsubstituted univalent groups that are derived by removing a hydrogen atom from an aromatic ring group. The "aryl" group can be a cyclic aromatic hydrocarbon, having from 6 to 20 carbon atoms, 10 to 20 carbon atoms, 12 to 20 carbon atoms, 6 to about 10 carbon atoms or 6 to 8 carbon atoms. The "aryl" group can also be an aromatic heterocyclyl group or a heteroaryl group. Thus, the aryl group can be a hydrocarbon group or it can be an aromatic heterocycle containing at least one non-carbon atom, e.g., N, O, or S, and having from 1 to 19 carbon atoms, 3 to 19 carbon atoms, 11 to 19 carbon atoms, 1 to about 9 carbon atoms, 2 to about 9 carbon atoms, 3 to about 9 carbon atoms, 4 to about 9 carbon atoms, or 6 to 8 carbon atoms. Examples of (C$_6$-C$_{20}$)aryl groups include phenyl, napthalenyl, azulenyl, biphenylyl, indacenyl, fluorenyl, phenanthrenyl, triphenylenyl, pyrenyl, naphthacenyl, chrysenyl, anthracenyl groups. Examples include substituted phenyl, substituted napthalenyl, substituted azulenyl, substituted biphenylyl, substituted indacenyl, substituted fluorenyl, substituted phenanthrenyl, substituted triphenylenyl, substituted pyrenyl, substituted naphthacenyl, substituted chrysenyl, and substituted anthracenyl groups. Examples also include unsubstituted phenyl, unsubstituted napthalenyl, unsubstituted azulenyl, unsubstituted biphenylyl, unsubstituted indacenyl, unsubstituted fluorenyl, unsubstituted phenanthrenyl, unsubstituted triphenylenyl, unsubstituted pyrenyl, unsubstituted naphthacenyl, unsubstituted chrysenyl, and unsubstituted anthracenyl groups. Aryl includes phenyl groups and also non-phenyl aryl groups. From these examples, it is clear that the term (C$_6$-C$_{20}$)aryl encompasses mono- and polycyclic (C$_6$-C$_{20}$)aryl groups, including fused and non-fused polycyclic (C$_6$-C$_{20}$)aryl groups.

The term "heterocyclyl" as used herein refers to substituted aromatic, unsubstituted aromatic, substituted non-aromatic, and unsubstituted non-aromatic rings containing 3 or more atoms in the ring, of which, one or more is a heteroatom such as, but not limited to, N, O, and S. The term "heteroaryl" is a fully aromatic heterocyclyl and thus a subset of the term heterocyclyl. The term "heteroaryl" is also a subset of the term "aryl." The term "heterocycloalkenyl" refers to a heterocyclyl group containing an olefin within a non-aromatic ring, such that the olefin is the point of connection to the parent moiety. A heterocyclyl group can thus be a heterocycloalkyl, heterocycloalkenyl, or a heteroaryl, or if polycyclic, any combination thereof. In some embodiments, heterocyclyl groups include 3 to about 20 ring members, whereas other such groups have 3 to about 15 ring members. In some embodiments, heterocyclyl groups include heterocyclyl groups that include 3 to 8 carbon atoms (C$_3$-C$_8$), 3 to 6 carbon atoms (C$_3$-C$_6$) or 6 to 8 carbon atoms (C$_6$-C$_8$). A heterocyclyl group designated as a C$_2$-heterocyclyl can be a 5-membered ring with two carbon atoms and three heteroatoms, a 6-membered ring with two carbon atoms and four heteroatoms and so forth. Likewise, a C4-heterocyclyl can be a 5-membered ring with one heteroatom, a 6-membered ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase heterocyclyl group includes fused ring species including those that include fused aromatic and non-aromatic groups. Representative heterocyclyl groups include, but are not limited to piperidynyl, pyrrolidinyl, piperazinyl, and morpholinyl. For example, heterocyclyl groups include, without limitation:

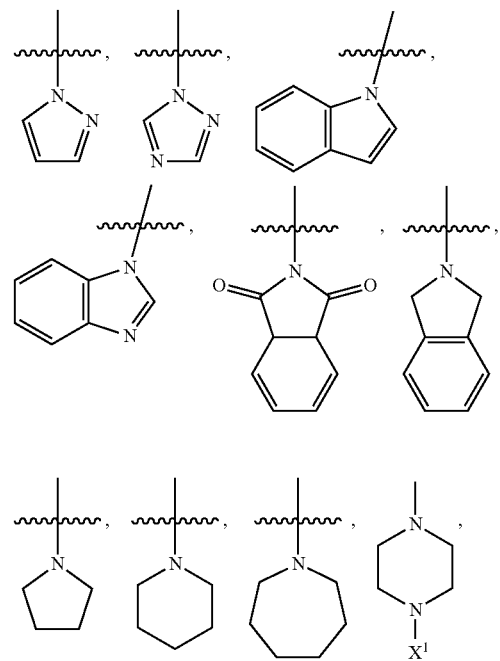

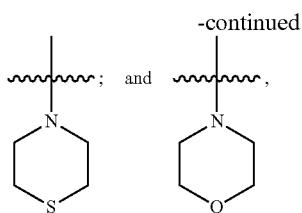

wherein $X^1$ represents H, $(C_1-C_{20})$alkyl, $(C_6-C_{20})$aryl or an amine protecting group (e.g., a t-butyloxycarbonyl group) and wherein the heterocyclyl group can be substituted or unsubstituted. Representative heteroaryl groups include furanyl, pyridinyl, pyrazinyl, pyrimidinyl, triazinyl, thiophenyl, tetrahydrofuranyl, pyrrolyl, oxazolyl, imidazolyl, triazyolyl, tetrazolyl, benzoxazolinyl, and benzimidazolinyl groups. In some embodiments, the heteroaryl is a 5-membered heteroaryl. In some embodiments, the heteroaryl is other than piperazine, pyridine, pyrimidine, pyridazine, pyrazine, or fused derivatives thereof. A cyclic amine is an example of a non-aromatic heterocyclyl ring. Specific examples of a cyclic amine include, without limitation:

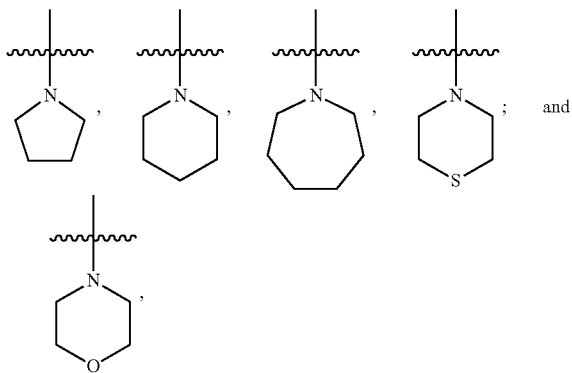

each of which may be optionally substituted, e.g., at C2, C3, C4, or C5.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. Thus, alkyoxy also includes an oxygen atom connected to an alkyenyl group and oxygen atom connected to an alkynyl group.

For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The term "aryloxy" as used herein refers to an oxygen atom connected to an aryl group as are defined herein. The point of substitution to the parent moiety is at the oxygen atom.

The term "arylcarbonyl" as used herein refers to a carbonyl (CO) group connected to an aryl group as are defined herein. The point of substitution to the parent moiety is at the carbonyl group.

The term "heteroarylcarbonyl" as used herein refers to a carbonyl (CO) group connected to an heteroaryl group as are defined herein. The point of substitution to the parent moiety is at the carbonyl group.

The term and "arylalkyl" as used herein refers to alkyl groups as defined herein in which a hydrogen or carbon bond of an alkyl group is replaced with a bond to an aryl group as defined herein. Representative aralkyl groups include benzyl, biphenylmethyl and phenylethyl groups and fused (cycloalkylaryl)alkyl groups such as 4-ethyl-indanyl. Aralkenyl groups are alkenyl groups as defined herein in which a hydrogen or carbon bond of an alkenyl group is replaced with a bond to an aryl group as defined herein. The point of substitution to the parent moiety is at the alkyl group.

The terms "halo," "halogen," or "halide" group, as used herein, by themselves or as part of another substituent, mean, unless otherwise stated, a fluorine, chlorine, bromine, or iodine atom.

The term "amino" as used herein refers to a substituent of the form $-NH_2$, $-NHR$, $-NR_2$, $-NR_3^+$, wherein each R is independently selected, and protonated forms of each, except for $-NR_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The term "acyl" as used herein refers to a group containing a carbonyl moiety wherein the group is bonded via the carbonyl carbon atom. The carbonyl carbon atom is also bonded to another carbon atom, which can be part of a substituted or unsubstituted alkyl, alkenyl, alkynyl, alkoxy, aryl, cycloalkyl, heterocyclyl, group or the like.

The term "formyl" as used herein refers to a group containing an aldehyde moiety. The point of substitution to the parent moiety is at the carbonyl group.

The term "alkoxycarbonyl" as used herein refers to a group containing a carbonyl moiety wherein the group is bonded via the carbonyl carbon atom. The carbonyl carbon atom is also bonded to an oxygen atom which is further bonded to an alkyl group. Alkoxycarbonyl also includes the group where a carbonyl carbon atom is also bonded to an oxygen atom which is further bonded to an alkyenyl group. Alkoxycarbonyl also includes the group where a carbonyl carbon atom is also bonded to an oxygen atom which is further bonded to an alkynyl group. In a further case, which is included in the definition of alkoxycarbonyl as the term is defined herein, and is also included in the term "aryloxycarbonyl," the carbonyl carbon atom is bonded to an oxygen atom which is bonded to an aryl group instead of an alkyl group.

The term "alkylamido" as used herein refers to a group containing a carbonyl moiety wherein the group is bonded via the carbonyl carbon atom. The carbonyl carbon atom is also bonded to a nitrogen group which is bonded to one or more alkyl groups. In a further case, which is also an alkylamido as the term is defined herein, the carbonyl carbon atom is bonded to a nitrogen atom which is bonded to one or more aryl group instead of, or in addition to, the one or more alkyl group. In a further case, which is also an alkylamido as the term is defined herein, the carbonyl carbon atom is bonded to a nitrogen atom which is bonded to one or more alkenyl group instead of, or in addition to, the one or more alkyl and or/aryl group. In a further case, which is also an alkylamido as the term is defined herein, the carbonyl carbon atom is bonded to a nitrogen atom which is bonded to one or more alkynyl group instead of, or in addition to, the one or more alkyl, alkenyl and/or aryl group.

The term "carboxy" as used herein refers to a group containing a carbonyl moiety wherein the group is bonded via the carbonyl carbon atom. The carbonyl carbon atom is also bonded to a hydroxy group or oxygen anion so as to result in a carboxylic acid or carboxylate. Carboxy also includes both the protonated form of the carboxylic acid and the salt form. For example, carboxy can be understood as COOH or $CO_2H$.

The term "alkylthio" as used herein refers to a sulfur atom connected to an alkyl, alkenyl, or alkynyl group as defined herein. The point of substitution to the parent moiety is at the sulfur atom.

The term "arylthio" as used herein refers to a sulfur atom connected to an aryl group as defined herein. The point of substitution to the parent moiety is at the sulfur atom.

The term "alkylsulfonyl" as used herein refers to a sulfonyl group connected to an alkyl, alkenyl, or alkynyl group as defined herein. The point of substitution to the parent moiety is at the sulfonyl group.

The term "alkylsulfinyl" as used herein refers to a sulfinyl group connected to an alkyl, alkenyl, or alkynyl group as defined herein. The point of substitution to the parent moiety is at the sulfinyl group.

The term "dialkylaminosulfonyl" as used herein refers to a sulfonyl group connected to a nitrogen further connected to two alkyl groups, as defined herein, and which can optionally be linked together to form a ring with the nitrogen. This term also includes the group where the nitrogen is further connected to one or two alkenyl groups in place of the alkyl groups. The point of substitution to the parent moiety is at the sulfonyl group.

The term "dialkylamino" as used herein refers to an amino group connected to two alkyl groups, as defined herein, and which can optionally be linked together to form a ring with the nitrogen. This term also includes the group where the nitrogen is further connected to one or two alkenyl groups in place of the alkyl groups. In various embodiments, the point of substitution to the parent moiety is at the nitrogen atom.

The term "dialkylamido" as used herein refers to an amido group connected to two alkyl groups, as defined herein, and which can optionally be linked together to form a ring with the nitrogen. This term also includes the group where the nitrogen is further connected to one or two alkenyl groups or alkynyl groups in place of the alkyl groups. The point of substitution to the parent moiety is at the amido group.

Each of the various substituent groups described herein can be substituted or unsubstituted. The term "substituted" as used herein refers to a group that is substituted with one or more groups (substituents) including, but not limited to, the following groups: deuterium (D), halogen (e.g., F, Cl, Br, and I), R, OR, OC(O)N(R)$_2$, CN, NO, NO$_2$, ONO$_2$, azido, CF$_3$, OCF$_3$, methylenedioxy, ethylenedioxy, (C$_3$-C$_{20}$)heteroaryl, N(R)$_2$, Si(R)$_3$, SR, SOR, SO$_2$R, SO$_2$N(R)$_2$, SO$_3$R, P(O)(OR)$_2$, OP(O)(OR)$_2$, C(O)R, C(O)C(O)R, C(O)CH$_2$C(O)R, C(S)R, C(O)OR, OC(O)R, C(O)N(R)$_2$, C(O)N(R)OH, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen, (C$_1$-C$_{20}$)alkyl or (C$_6$-C$_{20}$)aryl. Substituted also includes a group that is substituted with one or more groups including, but not limited to, the following groups: fluoro, chloro, bromo, iodo, amino, amido, alkyl, alkoxy, alkylamido, alkenyl, alkynyl, alkoxycarbonyl, acyl, formyl, arylcarbonyl, aryloxycarbonyl, aryloxy, carboxy, haloalkyl, hydroxy, cyano, nitroso, nitro, azido, trifluoromethyl, trifluoromethoxy, thio, alkylthio, arylthiol, alkylsulfonyl, alkylsulfinyl, dialkylaminosulfonyl, sulfonic acid, carboxylic acid, dialkylamino and dialkylamido. Where there are two or more adjacent substituents, the substituents can be linked to form a carbocyclic or heterocyclic ring. Such adjacent groups can have a vicinal or germinal relationship, or they can be adjacent on a ring in, e.g., an ortho-arrangement. Each instance of substituted is understood to be independent. For example, a substituted aryl can be substituted with bromo and a substituted heterocycle on the same compound can be substituted with alkyl.

As used herein, the term "salts" includes "pharmaceutically acceptable salts" as well as other salts. "Salts" refers to derivatives of the disclosed compounds wherein the parent compound is modified by making acid or base salts thereof. Examples of salts include alkali salts and alkali earth salts of an ionized form of the disclosed compounds. For example, a lithium salt, sodium salt, potassium salt, calcium salt, or magnesium salt. The disclosed compounds may be a salt comprising a cationic metal and an anionic organic compound, for example, a compound having an oxyanion and a sodium cation. Examples of pharmaceutically acceptable salts include, but are not limited to, mineral or organic acid salts of basic groups such as amines; and alkali or organic salts of acidic groups such as carboxylic acids. Pharmaceutically acceptable salts include the conventional non-toxic salts or the quaternary ammonium salts of the parent compound formed, for example, from non-toxic inorganic or organic acids. For example, such conventional non-toxic salts include those derived from inorganic acids such as hydrochloric, hydrobromic, sulfuric, sulfamic, phosphoric, and nitric; and the salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicylic, sulfanilic, 2-acetoxybenzoic, fumaric, toluenesulfonic, methanesulfonic, ethane disulfonic, oxalic, and isethionic, and the like.

Pharmaceutically acceptable salts can be synthesized from the parent compound which contains a basic or acidic moiety by conventional chemical methods. In some instances, such salts can be prepared by reacting the free acid or base forms of these compounds with a stoichiometric (or larger) amount of the appropriate base or acid in water or in an organic solvent, or in a mixture of the two; generally, nonaqueous media like ether, ethyl acetate, ethanol, isopropanol, or acetonitrile are preferred. Lists of suitable salts are found in Remington's Pharmaceutical Sciences, 17th ed., Mack Publishing Company, Easton, Pa., 1985, the disclosure of which is hereby incorporated by reference.

As used herein, the term "pharmaceutically acceptable carrier" includes any of the standard pharmaceutical carriers, such as a phosphate buffered saline solution, water, emulsions such as an oil/water or water/oil emulsion, and various types of wetting agents. The term also encompasses any of the agents approved by a regulatory agency of the US Federal government or listed in the US Pharmacopeia for use in animals, including humans. When the active compound is mixed with a carrier, or when the carrier serves as a diluent, it can be solid, semi-solid, or liquid material that acts as a vehicle, excipient, or medium for the active compound. The active compound can be adsorbed on a granular solid carrier, for example contained in a sachet. Some examples of suitable carriers are water, salt solutions, alcohols, polyethylene glycols, polyhydroxyethoxylated castor oil, peanut oil, olive oil, gelatin, lactose, terra alba, sucrose, dextrin, magnesium carbonate, sugar, cyclodextrin, amylose, magnesium stearate, talc, gelatin, agar, pectin, acacia, stearic acid or lower alkyl ethers of cellulose, silicic acid, fatty acids, fatty acid amines, fatty acid monoglycerides and diglycerides, pentaerythritol fatty acid esters, polyoxyethylene, hydroxymethylcellulose and polyvinylpyrrolidone. Similarly, the carrier or diluent can include any sustained release material known in the art, such as glyceryl monostearate or glyceryl distearate, alone or mixed with a wax.

Useful dosages of the compounds of a formula of the invention can be determined by comparing their in vitro activity, and in vivo activity in models. Methods for the extrapolation of effective dosages in mice, and other animals, to humans are known to the art; for example, see U.S. Pat. No. 4,938,949. The pharmaceutical compositions and compounds described herein can generally be administered in the form of a dosage unit (e.g. tablet, capsule, etc.) in an amount from, for example, about 1 ng/kg of body weight to about 0.5 g/kg of body weight, or from about 1μ/kg of body weight to about 500 mg/kg of body weight, or from about 10μ/kg of body weight to about 250 mg/kg of body weight, most preferably from about 20μ/kg of body weight to about 100 mg/kg of body weight. Those skilled in the art will recognize that the particular quantity of pharmaceutical composition and/or compounds described herein administered to an individual will depend upon a number of factors including the biological effect desired and the condition of the subject.

Exemplary TLR7 Agonists and Conjugates and Uses Thereof

In various embodiments are provided methods to prevent or inhibit infection by an infectious agent in a mammal. The methods include administering to a mammal in need thereof an effective amount of a composition comprising an amount of a compound of Formula (VII):

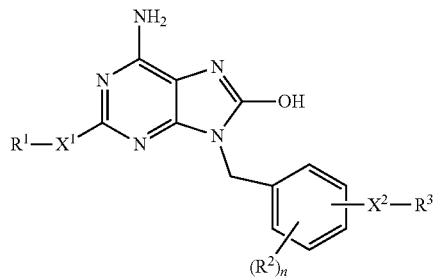

Formula VII wherein $X^1$ is —O—, —S—, or —NR$^c$—;

$R^1$ is hydrogen, $(C_1-C_{10})$alkyl, substituted $(C_1-C_{10})$alkyl, $C_{6-10}$aryl, or substituted $C_{6-10}$aryl, $C_{5-9}$heterocyclic, substituted $C_{5-9}$heterocyclic;

$R^c$ is hydrogen, $C_{1-10}$alkyl, or substituted $C_{1-10}$alkyl; or $R^c$ and $R^1$ taken together with the nitrogen to which they are attached form a heterocyclic ring or a substituted heterocyclic ring;

each $R^2$ is independently —OH, $(C_1-C_6)$alkyl, substituted $(C_1-C_6)$alkyl, $(C_1-C_6)$alkoxy, substituted $(C_1-C_6)$alkoxy, —C(O)—$(C_1-C_6)$alkyl (alkanoyl), substituted —C(O)—$(C_1-C_6)$alkyl, —C(O)—$(C_6-C_{10})$aryl (aroyl), substituted —C(O)—$(C_6-C_{10})$aryl, —C(O)OH (carboxyl), —C(O)O$(C_1-C_6)$alkyl (alkoxycarbonyl), substituted —C(O)O$(C_1-C_6)$alkyl, —NR$^a$R$^b$, —C(O)NR$^a$R$^b$ (carbamoyl), halo, nitro, or cyano, or $R^2$ is absent;

each $R^a$ and $R^b$ is independently hydrogen, $(C_1-C_6)$alkyl, substituted $(C_1-C_6)$alkyl, $(C_3-C_8)$cycloalkyl, substituted $(C_3-C_8)$cycloalkyl, $(C_1-C_6)$alkoxy, substituted $(C_1-C_6)$alkoxy, $(C_1-C_6)$alkanoyl, substituted $(C_1-C_6)$alkanoyl, aryl, aryl$(C_1-C_6)$alkyl, Het, Het $(C_1-C_6)$alkyl, or $(C_1-C_6)$alkoxycarbonyl;

wherein the substituents on any alkyl, aryl or heterocyclic groups are hydroxy, $C_{1-6}$alkyl, hydroxy$C_{1-6}$alkylene, $C_{1-6}$alkoxy, $C_{3-8}$cycloalkyl, $C_{1-6}$alkoxy$C_{1-6}$alkylene, amino, cyano, halo, or aryl;

n is 0, 1, 2, 3 or 4;

$X^2$ is a bond or a linking group; and $R^3$ is, in one embodiment, a phospholipid, or analog thereof comprising one or two alkyl ethers or carboxylic esters of the glyceryl moiety; $R^3$ is in some embodiments hydrogen, C1-C10 alkyl, substituted C1-C10 alkyl, C1-C10 alkoxy, substituted C1-C10 alkoxy, C1-C10 alkyl C1-C10 alkoxy, substituted C1-C10 alkyl C1-C10 alkoxy, C5-C10 aryl, substituted C5-C10 aryl, C5-C9 heterocyclic, substituted C5-C9 heterocyclic, C3-C9 carbocyclic or substituted C3-C9 carbocyclic; in some embodiments, $R^3$ may be a macromolecule comprising a gram-positive bacteria, peptide of a gram-positive bacterium, protein of a gram-positive bacterium, carbohydrate of a gram-positive bacterium, or an adjuvant such as a heterologous protein or peptide, i.e., from a source other than the gram-positive bacteria, such as a host cell protein or peptide, e.g., albumin or ovalbumin, or a heterologous lipid, heterologous nucleic acid, bead, such as a polystyrene bead, a nanoparticle or dendrimer;

or a tautomer thereof;

or a pharmaceutically acceptable salt or solvate thereof.

For example, $R^3$ can comprise a group of formula

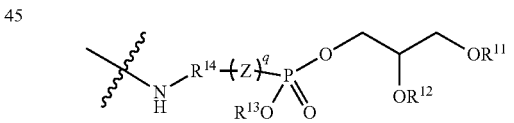

wherein $R^{11}$ and $R^{12}$ are each independently a hydrogen, a $C_8-C_{25}$ alkyl group or a $C_8-C_{25}$ acyl group, provided that at least one of $R^{11}$ and $R^{12}$ is an alkyl or an acyl group; $R^{13}$ is a negative charge or a hydrogen, and $R^{14}$ is a $C_1-C_8$ n-alkyl or branched alkyl group which can be substituted or unsubstituted, wherein optionally one of the carbon atoms of the alkyl group is replaced by NH, S, or O; Z is O, S, or NH, and q is 0 or 1;

wherein a wavy line indicates a position of bonding, wherein an absolute configuration at the carbon atom bearing OR$^{12}$ is R, S, or any mixture thereof.

An absolute configuration at the carbon atom bearing OR$^{12}$ is R, S, or any mixture thereof. In one embodiment, $R^{14}$ is substituted or unsubstituted $C_1-C_7$ alkyl chain wherein one of the carbons may be substituted with a heteroatom selected from N or S.

or

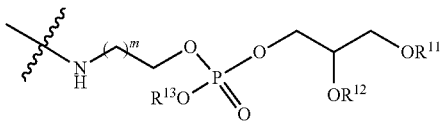

wherein $R^{11}$ and $R^{12}$ are each independently a hydrogen, an alkyl group or an acyl group, $R^{13}$ is a negative charge or a hydrogen, and m is 0 to 8, wherein a wavy line indicates a position of bonding, wherein an absolute configuration at the carbon atom bearing $OR^{12}$ is R, S, or any mixture thereof. In one embodiment, m is absent. In one embodiment, m is a $C_1$-$C_8$ n-alkyl or branched alkyl group which can be substituted or unsubstituted, wherein optionally one of the carbon atoms of the $R^{14}$ alkyl group may be replaced by NH or S.

For example, m can be 1, providing a glycerophosphatidylethanolamine. More specifically, $R^{11}$ and $R^{12}$ can each be oleoyl groups.

In various embodiments, the phospholipid of $R^3$ can comprise two carboxylic esters and each carboxylic ester includes one, two, three or four sites of unsaturation, epoxidation, hydroxylation, or a combination thereof.

In various embodiments, the phospholipid of $R^3$ can comprise two alkyl ethers which may include one, two, three or four sites of unsaturation, epoxidation, hydroxylation, or a combination thereof, or is saturated. In various embodiments, the phospholipid analog of $R^3$ can comprise two glyceryl alkyl ether groups, and the alkyl ethers may be the same or different. More specifically, each ether of the phospholipid analog can be a C17 or C19 saturated alkyl. Alternatively, each ether of the phospholipid analog can be a C18 saturated alkyl.

In various embodiments, the phospholipid of $R^3$ can comprise two carboxylic esters and the carboxylic esters of are the same or different. More specifically, each carboxylic ester of the phospholipid can be a C17 carboxylic ester with a site of unsaturation at C8-C9. Alternatively, each carboxylic ester of the phospholipid can be a C18 carboxylic ester with a site of unsaturation at C9-C10.

In various embodiments, $X^2$ can be a bond or a chain having one to about 10 atoms in a chain wherein the atoms of the chain are selected from the group consisting of carbon, nitrogen, sulfur, and oxygen, wherein any carbon atom can be substituted with oxo, and wherein any sulfur atom can be substituted with one or two oxo groups. The chain can be interspersed with one or more cycloalkyl, aryl, heterocyclyl, or heteroaryl rings.

In various embodiments, $X^2$ can be carbonyl (e.g., C(O)), or can be

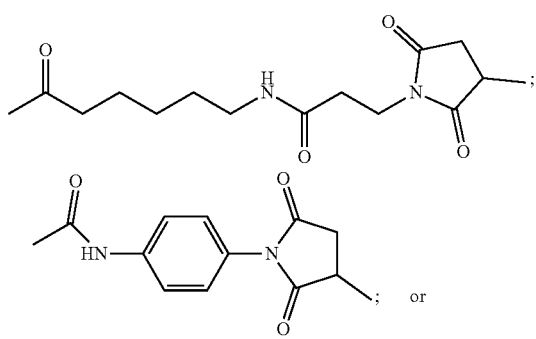

In various embodiments, $X^2$ can be

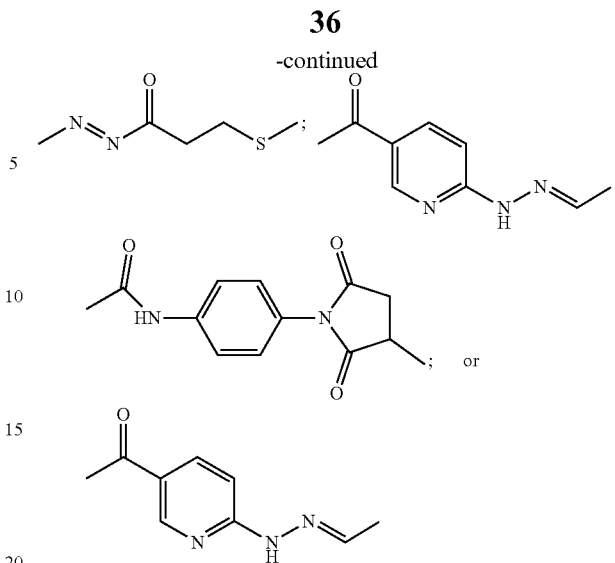

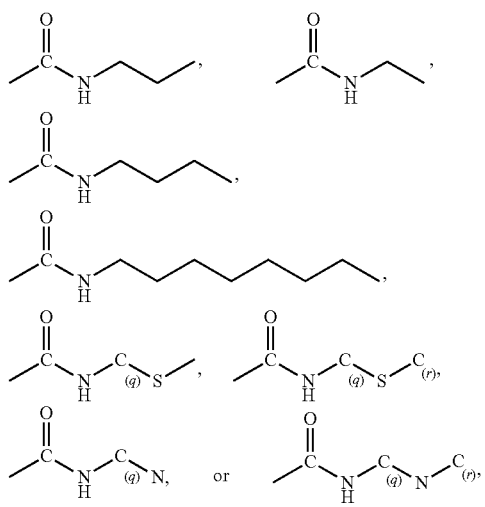

where q=0 to 8 in various embodiments.

In various embodiments, $R^3$ can be dioleoylphosphatidyl ethanolamine (DOPE). In various embodiments $R^3$ is not DOPE.

In various embodiments, $R^3$ can be 1,2-dioleoyl-sn-glycero-3-phospho ethanolamine and $X^2$ can be C(O).

In various embodiments, $X^1$ can be oxygen.

In various embodiments, $X^1$ can be sulfur, or can be —$NR^c$— where $R^c$ is hydrogen, $C_{1-6}$ alkyl or substituted $C_{1-6}$ alkyl, where the alkyl substituents are hydroxy, $C_{3-6}$cycloalkyl, $C_{1-6}$alkoxy, amino, cyano, or aryl. More specifically, $X^1$ can be —NH—.

In various embodiments, $R^1$ and $R^c$ taken together can form a heterocyclic ring or a substituted heterocyclic ring. More specifically, $R^1$ and $R^c$ taken together can form a substituted or unsubstituted morpholino, piperidino, pyrrolidino, or piperazino ring.

In various embodiments $R^1$ can be a C1-C10 alkyl substituted with C1-6 alkoxy.

In various embodiments, $R^1$ can be hydrogen, $C_{1-4}$alkyl, or substituted $C_{1-4}$alkyl. More specifically, $R^1$ can be hydrogen, methyl, ethyl, propyl, butyl, hydroxy$C_{1-4}$alkylene, or $C_{1-4}$alkoxy$C_{1-4}$alkylene. Even more specifically, $R^1$ can be hydrogen, methyl, ethyl, methoxyethyl, or ethoxyethyl.

In various embodiments, $R^2$ can be absent, or $R^2$ can be halogen or $C_{1-4}$alkyl. More specifically, $R^2$ can be chloro, bromo, methyl, or ethyl.

In various embodiments, $X^1$ can be O, $R^1$ can be $C_{1-4}$alkoxy-ethyl, n can be 1, $R^2$ can be hydrogen, $X^2$ can be carbonyl, and $R^3$ can be 1,2-dioleoylphosphatidyl ethanolamine (DOPE).

In various embodiments, the compound of Formula (VII) can be:

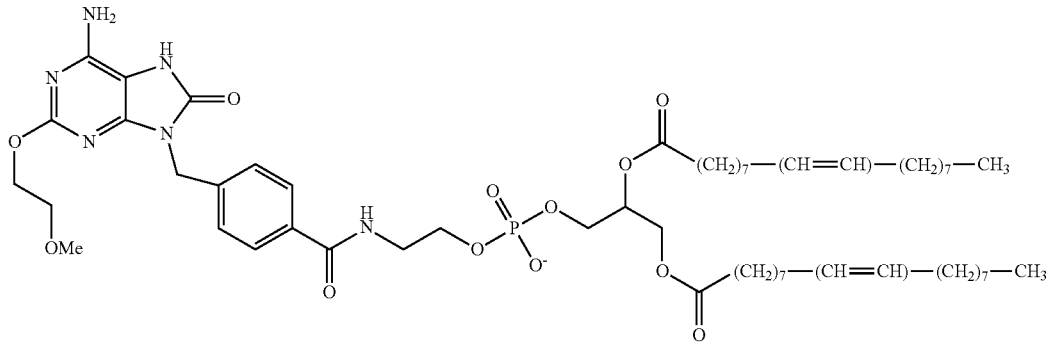

In various embodiments, the compound of formula II can be the R-enantiomer of the above structure:

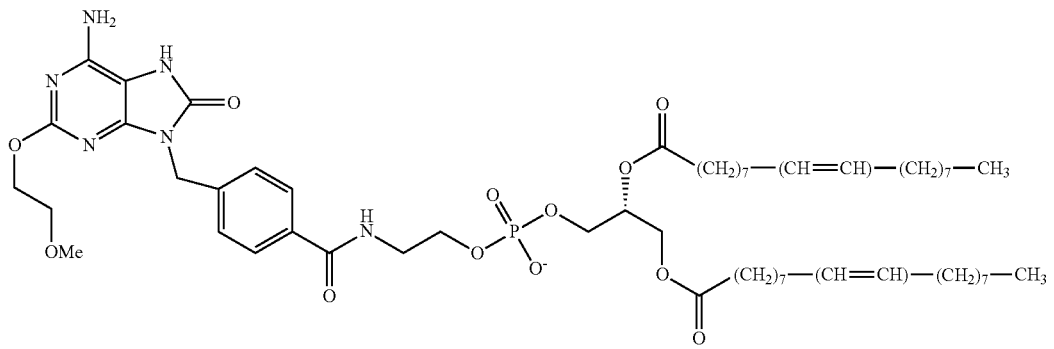

In various embodiments, the compound of formula (VII) can be the phospholipid analog conjugate of formula

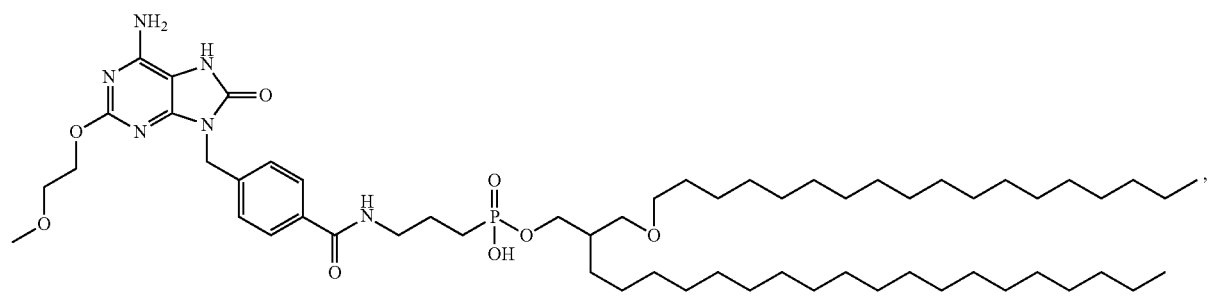 [SMILES: CCCCCCCCCCCCCCCCCCCC(COCCCCCCCCCCCCCCCCCC)COP(=O)(O)CCCNC(=O)c1ccc(Cn2c(=O)[nH]c3c(N)nc(OCCOC)nc32)cc1]

wherein a phosphonate analog of a phospholipid, having a glyceryl diether group bonded thereto, is conjugated to the benzyladenine moiety via an carboxamide group.

In some embodiments, the composition comprises nanoparticles comprising a compound of formula (I)-(VI). In some embodiments, the composition comprises nanoparticles comprising a compound of formula (VII) optionally in combination with a compound of formula (I)-(VI). In various embodiments, a phospholipid conjugate such as 1V270 can be incorporated into a nanoparticle such as those described in WO 2010/083337, the disclosure of which is incorporated by reference herein.

As used herein, a nanoparticle has a diameter of about 30 nm to about 600 nm, or a range with any integer between 30 and 600, e.g., about 40 nm to about 250 nm, including about 40 to about 80 or about 100 nm to about 150 nm in diameter.

The nanoparticles may be formed by mixing a compound of formula (VII), which may spontaneously form nanoparticles, or by mixing a compound of formula (VII) with a preparation of lipids, such as phospholipids including but not limited to phosphatidylcholine, phosphatidylserine or cholesterol, thereby forming a nanoliposome. In certain embodiments, a composition forms particles of about 10 nanometers to about 1000 nanometers, and sometimes, a composition forms particles with a mean, average or nominal size of about 100 nanometers to about 400 nanometers.

In various embodiments, a phospholipid conjugate such as 1V270 can be prepared in the form of a nanoparticulate suspension of the phospholipid conjugate in combination with a lipid and/or a phospholipid in an aqueous medium (e.g., a nanoliposome). A nanoliposome is a submicron bilayer lipid vesicle (see Chapter 2 by Mozafari in: Liposomes, Methods in Molecular Biology, vol. 605, V. Weissing (ed.), Humana Press, the disclosure of which is incorporated by reference herein). Nanoliposomes provide more surface area and may increase solubility, bioavailability and targeting.

Optionally, a compound of formula (VII), a lipid preparation and a glycol such as propylene glycol are combined.

Lipids are fatty acid derivatives with various head group moieties. Triglycerides are lipids made from three fatty acids and a glycerol molecule (a three-carbon alcohol with a hydroxyl group [OH] on each carbon atom). Mono- and diglycerides are glyceryl mono- and di-esters of fatty acids. Phospholipids are similar to triglycerides except that the first hydroxyl of the glycerol molecule has a polar phosphate-containing group in place of the fatty acid. Phospholipids are amphiphilic, possessing both hydrophilic (water soluble) and hydrophobic (lipid soluble) groups. The head group of a phospholipid is hydrophilic and its fatty acid tail (acyl chain) is hydrophobic. The phosphate moiety of the head group is negatively charged.

In addition to lipid and/or phospholipid molecules, nanoliposomes may contain other molecules such as sterols in their structure. Sterols are important components of most natural membranes, and incorporation of sterols into nanoliposome bilayers can bring about major changes in the properties of these vesicles. The most widely used sterol in the manufacture of the lipid vesicles is cholesterol (Chol). Cholesterol does not by itself form bilayer structures, but it can be incorporated into phospholipid membranes in very high concentrations, for example up to 1:1 or even 2:1 molar ratios of cholesterol to a phospholipid such as phosphatidylcholine (PC) (11). Cholesterol is used in nanoliposome structures in order to increase the stability of the vesicles by modulating the fluidity of the lipid bilayer. In general, cholesterol modulates fluidity of phospholipid membranes by preventing crystallization of the acyl chains of phospholipids and providing steric hindrance to their movement. This contributes to the stability of nanoliposomes and reduces the permeability of the lipid membrane to solutes.

Physicochemical properties of nanoliposomes depend on several factors including pH, ionic strength and temperature. Generally, lipid vesicles show low permeability to the entrapped material. However, at elevated temperatures, they undergo a phase transition that alters their permeability. Phospholipid ingredients of nanoliposomes have an important thermal characteristic, i.e., they can undergo a phase transition (Tc) at temperatures lower than their final melting point (Tm). Also known as gel to liquid crystalline transition temperature, Tc is a temperature at which the lipidic bilayer loses much of its ordered packing while its fluidity increases. Phase transition temperature of phospholipid compounds and lipid bilayers depends on the following parameters: polar head group; acyl chain length; degree of saturation of the hydrocarbon chains; and nature and ionic strength of the suspension medium. In general, Tc is lowered by decreased chain length, by unsaturation of the acyl chains, as well as presence of branched chains and bulky head groups (e.g. cyclopropane rings).

Hydrated phospholipid molecules arrange themselves in the form of bilayer structures via Van-der Waals and hydrophilic/hydrophobic interactions. In this process, the hydrophilic head groups of the phospholipid molecules face the water phase while the hydrophobic region of each of the monolayers face each other in the middle of the membrane. It should be noted that formation of liposomes and nanoliposomes is not a spontaneous process and sufficient energy must be put into the system to overcome an energy barrier. In other words, lipid vesicles are formed when phospholipids such as lecithin are placed in water and consequently form bilayer structures, once adequate amount of energy is supplied. Input of energy (e.g. in the form of sonication, homogenisation, heating, etc.) results in the arrangement of the lipid molecules, in the form of bilayer vesicles, to achieve a thermodynamic equilibrium in the aqueous phase.

For example, a composition comprising a compound such as 1V270 as a mixture with a lipid such as cholesterol or a phospholipid such as phosphatidylcholine can be dispersed into a nanoparticulate form where lipid or phospholipid nanoparticles contain the TLR7 ligand conjugate associated therewith.

For example, a nanoparticulate/nanoliposome composition can be prepared using 1V270 and the phophatidylcholine preparation Phosal 50 PG®. 1V270 can be dissolved in Phosal 50 PG (Phospholipid Gmbh, Cologne, Germany) to make a 20× concentrated solution. The Phosal 50 PG-1V270 mixture can be further diluted (1:19) with nanopure water to make a 5% Phosal 50 PG:water suspension. The suspension can be vortexed vigorously and sonicated in a sonicating bath for 10 minutes. The suspension can be further sonicated with a probe sonicater (Branson Sonifier Cell Disrupter 185) at 30% power for a total of 30 seconds at 10 second intervals with 10 seconds rest between so as to not overheat the suspension. Finally, the suspension can be passed through a 100 nm filter with syringe extruder a total of 10 times back and forth. The final nanoparticles can be analyzed with a Malvern Zetasizer to check size distribution. The resulting particles may be referred to as nanoliposomes (a submicron bilayer lipid vesicle) (see Chapter 2 by Mozafari in: Liposomes, Methods in Molecular Biology, vol. 605, V. Weissing (ed.), Humana Press, the disclosure of which is incorporated by reference herein). Nanoliposomes provide more surface area and may increase solubility, bioavailability and targeting.

Nanoparticles are generally stable over time. The particle size of UV-1V270 in PBS is relatively constant with an average of about 110 nm regardless of concentration.

In cases where compounds are sufficiently basic or acidic to form acid or base salts, use of the compounds as salts may be appropriate. Examples of acceptable salts are organic acid addition salts formed with acids which form a physiological acceptable anion, for example, tosylate, methanesulfonate, acetate, citrate, malonate, tartarate, succinate, benzoate, ascorbate, α-ketoglutarate, and α-glycerophosphate. Suitable inorganic salts may also be formed, including hydrochloride, sulfate, nitrate, bicarbonate, and carbonate salts.

Acceptable salts may be obtained using standard procedures well known in the art, for example by reacting a sufficiently basic compound such as an amine with a suitable acid affording a physiologically acceptable anion. Alkali metal (for example, sodium, potassium or lithium) or alkaline earth metal (for example calcium) salts of carboxylic acids can also be made.

Alkyl includes straight or branched $C_{1-10}$ alkyl groups, e.g., methyl, ethyl, propyl, butyl, pentyl, isopropyl, isobutyl, 1-methylpropyl, 3-methylbutyl, hexyl, and the like.

Lower alkyl includes straight or branched $C_{1-6}$ alkyl groups, e.g., methyl, ethyl, propyl, 1-methylethyl, butyl, 1-methylpropyl, 2-methylpropyl, 1,1-dimethylethyl, pentyl, 1-methylbutyl, 2-methylbutyl, 3-methylbutyl, 1,1-dimethylpropyl, 1,2-dimethylpropyl, 2,2-dimethylpropyl, and the like.

The term "alkylene" refers to a divalent straight or branched hydrocarbon chain (e.g., ethylene: —$CH_2$—$CH_2$—).

$C_{3-7}$ Cycloalkyl includes groups such as, cyclopropyl, cyclopentyl, cyclohexyl, cycloheptyl, and the like, and alkyl-substituted $C_{3-7}$ cycloalkyl group, e.g., straight or branched $C_{1-6}$ alkyl group such as methyl, ethyl, propyl, butyl or pentyl, and $C_{5-7}$ cycloalkyl group such as, cyclopentyl or cyclohexyl, and the like.

Lower alkoxy includes $C_{1-6}$ alkoxy groups, such as methoxy, ethoxy or propoxy, and the like.

Lower alkanoyl includes $C_{1-6}$ alkanoyl groups, such as formyl, acetyl, propanoyl, butanoyl, pentanoyl or hexanoyl, and the like.

$C_{7-11}$ aroyl, includes groups such as benzoyl or naphthoyl; Lower alkoxycarbonyl includes $C_{2-7}$ alkoxycarbonyl groups, such as methoxycarbonyl, ethoxycarbonyl or propoxycarbonyl, and the like.

Lower alkylamino group means amino group substituted by $C_{1-6}$ alkyl group, such as, methylamino, ethylamino, propylamino, butylamino, and the like.

Di(lower alkyl)amino group means amino group substituted by the same or different and $C_{1-6}$ alkyl group (e.g., dimethylamino, diethylamino, ethylmethylamino).

Lower alkylcarbamoyl group means carbamoyl group substituted by $C_{1-6}$ alkyl group (e.g., methylcarbamoyl, ethylcarbamoyl, propylcarbamoyl, butylcarbamoyl).

Di(lower alkyl)carbamoyl group means carbamoyl group substituted by the same or different and $C_{1-6}$ alkyl group (e.g., dimethylcarbamoyl, diethylcarbamoyl, ethylmethylcarbamoyl).

Halogen atom means halogen atom such as fluorine atom, chlorine atom, bromine atom or iodine atom.

Aryl refers to a $C_{6-10}$ monocyclic or fused cyclic aryl group, such as phenyl, indenyl, or naphthyl, and the like.

Heterocyclic or heterocycle refers to monocyclic saturated heterocyclic groups, or unsaturated monocyclic or fused heterocyclic group containing at least one heteroatom, e.g., 0-3 nitrogen atoms $NR^c$, 0-1 oxygen atom (—O—), and 0-1 sulfur atom (—S—). Non-limiting examples of saturated monocyclic heterocyclic group includes 5 or 6 membered saturated heterocyclic group, such as tetrahydrofuranyl, pyrrolidinyl, morpholinyl, piperidyl, piperazinyl or pyrazolidinyl. Non-limiting examples of unsaturated monocyclic heterocyclic group includes 5 or 6 membered unsaturated heterocyclic group, such as furyl, pyrrolyl, pyrazolyl, imidazolyl, thiazolyl, thienyl, pyridyl or pyrimidinyl. Non-limiting examples of unsaturated fused heterocyclic groups includes unsaturated bicyclic heterocyclic group, such as indolyl, isoindolyl, quinolyl, benzothizolyl, chromanyl, benzofuranyl, and the like. A Het group can be a saturated heterocyclic group or an unsaturated heterocyclic group, such as a heteroaryl group.

Other Molecules Useful in the Compositions or Methods

Exemplary TLR4 agonists include but are not limited to aminoalkyl glucosaminide phosphates and MPLA, exemplary TLR2 agonisys include but are not limited to Pam2CSK4, Pam3CSK4, FSL-1, HKLM, LPS-PG (LPS *P. gingivalis*), LTA-SA standard (LTA *S. aureus*), PGN-SA (PGN *S. aureus*), MALP or Zymosan; exemplary TLR7 agonists include but are not limited to Imiquimod, Imidazoquinoline or Resiquimod; exemplary MAP kinases include but are not limited to MAPK1 (ERK2), MAPK3 (ERK1), MAPK7 (ERK5), MAPK8 (JNK1), MAPK9 (JNK2), MAPK10 (JNK3), MAPK11 (p38-beta), MAPK12 (p38-gamma), MAPK13 (p38-delta), MAPK14 (p38-alpha), MAPK4 (ERK4: atypical MAPK), MAPK6 (ERK3: atypical MAPK), MAPK15 (ERK7/ERK8: atypical MAPK), NLK (Nemo-like kinase: atypical MAPK), ERK1/2 kinases, ERK1/2 pathway, JNK kinases, p38 MAP kinases or ASK1 (MAP3K5).

Routes of Administration

Administration of compositions described herein can be via any of suitable route of administration.

One non-limiting example of a route of administration of a compound to the respiratory system. The respiratory system includes the nasal cavity and associated sinuses, the nasopharynx, oropharynx, larynx, trachea, bronchi, bronchioles, respiratory bronchioles, alveolar ducts and alveolar sacs. In specific embodiments the compounds described herein are administered to the lungs or the nasal cavity.

Pulmomary administration can be used for delivery to the lungs and other regions of the respiratory system. Pulmonary administration includes, but is not limited to, aerosol inhalation via nasal (intranasal) or oral routes and intratracheal instillation.

Aerosol inhalation is by any means by which an aerosol can be introduced into the respiratory system, including, but not limited to, pressurized metered dose inhalers, dry power inhalers and nebulisers (e.g., liquid spray and suspension spray) for oral route or any device suitable for intranasal administration.

In addition, in some embodiments, are provided various dosage formulations for inhalation delivery. For example, formulations may be designed for aerosol use in devices such as metered-dose inhalers, dry powder inhalers and nebulizers.

Intratracheal instillation can be carried out by delivering a solution into the lungs via a device, such as a syringe.

Intranasal administration which can be employed to effect pulmonary administration can be used specifically for administration to the nasal cavity and sinuses. Devises for intranasal administration include, but are not limited to, liquid drop devices, spray devices, dry powder devices and aerosol devices. Intranasal administration can also be by nasal gel or insuffulations.

Formulation of the compounds described herein as aerosols (solid or liquid particles), liquids, powders, gels, nanoparticles may be obtained using standard procedures well known in the art.

The compositions may also be administered parenterally, for example, intravenously, intra-arterially, intraperitoneally, intrathecally, intraventricularly, intraurethrally, intrasternally, intracranially, intramuscularly, or subcutaneously. Such administration may be as a single bolus injection, multiple injections, or as a short- or long-duration infusion. Implantable devices (e.g., implantable infusion pumps) may also be employed for the periodic parenteral delivery over time of equivalent or varying dosages of the particular formulation. For such parenteral administration, the compounds may be formulated as a sterile solution in water or another suitable solvent or mixture of solvents. The solution may contain other substances such as salts, sugars (particularly glucose or mannitol), to make the solution isotonic with blood, buffering agents such as acetic, critric, and/or phosphoric acids and their sodium salts, and preservatives.

The compositions can be formulated as pharmaceutical compositions and administered to a mammalian host, such as a human patient in a variety of forms adapted to the chosen route of administration, e.g., by pulmonary routes, orally or parenterally, by intravenous, intramuscular, topical or subcutaneous routes.

Thus, the present compositions may be systemically administered, e.g., orally, in combination with a pharmaceutically acceptable vehicle such as an inert diluent or an assimilable edible carrier. They may be enclosed in hard or soft shell gelatin capsules, may be compressed into tablets, or may be incorporated directly with the food of the patient's diet. For oral therapeutic administration, the compostions may be combined with one or more excipients and used in the form of ingestible tablets, buccal tablets, troches, capsules, elixirs, suspensions, syrups, wafers, and the like. Such compositions and preparations should contain at least 0.1% of active compound. The percentage of the compositions and preparations may, of course, be varied and may conveniently be between about 2 to about 60% of the weight of a given unit dosage form. The amount of adjuvants in such useful compositions is such that an effective dosage level will be obtained.

The tablets, troches, pills, capsules, and the like may also contain the following: binders such as gum tragacanth, acacia, corn starch or gelatin; excipients such as dicalcium phosphate; a disintegrating agent such as corn starch, potato starch, alginic acid and the like; a lubricant such as magnesium stearate; and a sweetening agent such as sucrose, fructose, lactose or aspartame or a flavoring agent such as peppermint, oil of wintergreen, or cherry flavoring may be added. When the unit dosage form is a capsule, it may contain, in addition to materials of the above type, a liquid carrier, such as a vegetable oil or a polyethylene glycol. Various other materials may be present as coatings or to otherwise modify the physical form of the solid unit dosage form. For instance, tablets, pills, or capsules may be coated with gelatin, wax, shellac or sugar and the like. A syrup or elixir may contain the active compound, sucrose or fructose as a sweetening agent, methyl and propylparabens as preservatives, a dye and flavoring such as cherry or orange flavor. Of course, any material used in preparing any unit dosage form should be pharmaceutically acceptable and substantially non-toxic in the amounts employed. In addition, the adjuvants or other agents may be incorporated into sustained-release preparations and devices.

The compositions may also be administered intravenously or intraperitoneally by infusion or injection. Solutions of the compositions can be prepared in water, optionally mixed with a nontoxic surfactant. Dispersions can also be prepared in glycerol, liquid polyethylene glycols, triacetin, and mixtures thereof and in oils. Under ordinary conditions of storage and use, these preparations contain a preservative to prevent the growth of microorganisms.

The pharmaceutical dosage forms suitable for injection or infusion can include sterile aqueous solutions or dispersions or sterile powders comprising the active ingredient which are adapted for the extemporaneous preparation of sterile injectable or infusible solutions or dispersions, optionally encapsulated in liposomes. In all cases, the ultimate dosage form should be sterile, fluid and stable under the conditions of manufacture and storage. The liquid carrier or vehicle can be a solvent or liquid dispersion medium comprising, for example, water, ethanol, a polyol (for example, glycerol, propylene glycol, liquid polyethylene glycols, and the like), vegetable oils, nontoxic glyceryl esters, and suitable mixtures thereof. The proper fluidity can be maintained, for example, by the formation of liposomes, by the maintenance of the required particle size in the case of dispersions or by the use of surfactants. The prevention of the action of microorganisms during storage can be brought about by various antibacterial and antifungal agents, for example, parabens, chlorobutanol, phenol, sorbic acid, thimerosal, and the like. In many cases, it may be useful to include isotonic agents, for example, sugars, buffers or sodium chloride. Prolonged absorption of the injectable compositions can be brought about by the use in the compositions of agents delaying absorption, for example, aluminum monostearate and gelatin.

Sterile injectable solutions are prepared by incorporating compound(s) in the required amount in the appropriate solvent with various of the other ingredients enumerated above, as required, followed by filter sterilization. In the case of sterile powders for the preparation of sterile injectable solutions, one method of preparation includes vacuum drying and the freeze drying techniques, which yield a powder of the active ingredient plus any additional desired ingredient present in the previously sterile-filtered solutions.

For topical administration, the compounds may be applied in pure form, e.g., when they are liquids. However, it will generally be desirable to administer them to the skin as compositions or formulations, in combination with a dermatologically acceptable carrier, which may be a solid or a liquid.

Useful solid carriers include finely divided solids such as talc, clay, microcrystalline cellulose, silica, alumina and the like. Useful liquid carriers include water, alcohols or glycols or water-alcohol/glycol blends, in which the present compounds can be dissolved or dispersed at effective levels, optionally with the aid of non-toxic surfactants. Adjuvants such as fragrances and antimicrobial agents can be added to optimize the properties for a given use. The resultant liquid compositions can be applied from absorbent pads, used to impregnate bandages and other dressings, or sprayed onto the affected area using pump-type or aerosol sprayers.

Thickeners such as synthetic polymers, fatty acids, fatty acid salts and esters, fatty alcohols, modified celluloses or modified mineral materials can also be employed with liquid carriers to form spreadable pastes, gels, ointments, soaps, and the like, for application directly to the skin of the user.

Examples of useful dermatological compositions which can be used to deliver compounds to the skin are known to the art; for example, see Jacquet et al. (U.S. Pat. No. 4,608,392), Geria (U.S. Pat. No. 4,992,478), Smith et al. (U.S. Pat. No. 4,559,157) and Wortzman (U.S. Pat. No. 4,820,508).

Useful dosages can be determined by comparing their in vitro activity, and in vivo activity in animal models. Methods for the extrapolation of effective dosages in mice, and other animals, to humans are known to the art; for example, see U.S. Pat. No. 4,938,949. The ability of a compound to act as a TLR agonist may be determined using pharmacological models which are well known to the art, including the procedures disclosed by Lee et al., *Proc. Natl. Acad. Sci. USA*, 100: 6646 (2003).

Generally, the concentration of the active compound in a liquid composition, such as a lotion, will be from about 0.1-25 wt-%, e.g., from about 0.5-10 wt-%. The concentration in a semi-solid or solid composition such as a gel or a powder will be about 0.1-5 wt-%, e.g., about 0.5-2.5 wt-%.

The active ingredient may be administered to achieve peak plasma concentrations of the active compound of from about 0.5 to about 75 μM, e.g., about 1 to 50 μM, such as about 2 to about 30 μM. This may be achieved, for example, by the intravenous injection of a 0.05 to 5% solution of the active ingredient in saline, or orally administered as a bolus containing about 1-100 mg of the active ingredient. Desirable blood levels may be maintained by continuous infusion to provide about 0.01-5.0 mg/kg/hr or by intermittent infusions containing about 0.4-15 mg/kg of the active ingredient(s).

The amount of the active compound, or an active salt or derivative thereof, required for use in treatment will vary not only with the particular salt selected but also with the route of administration, the nature of the condition being treated and the age and condition of the patient and will be ultimately at the discretion of the attendant physician or clinician. In general, however, a suitable dose will be in the range of from about 0.5 to about 100 mg/kg, e.g., from about 10 to about 75 mg/kg of body weight per day, such as 3 to about 50 mg per kilogram body weight of the recipient per day, for instance in the range of 6 to 90 mg/kg/day, e.g., in the range of 15 to 60 mg/kg/day. More than one dose (e.g., 2, 3, 4, 5, 6, 7, 8, 9, 10, 11, 12, 13, 14, 15, 16, 17, 18, 19, 20, 21, 22, 23, 24, 25, 26, 27, or 28, or, for example, 35, 42, 49, 56, 63, or 70) may be determined by a physician or clinician to be required. Doses may be administered before, after, or before and after exposure to the infectious agent as determined by a physician or clinician based on the above discussed factors and other relevant factors. Scheduling of administration of doses (e.g., consecutive days, alternate days, multiple doses in one day) can also be determined by a physician or clinician based on the above discussed factors and other relevant factors.

The duration of treatment can be for a predetermined period of time. For example, 1, 2, 3, 4, 5, 6, 7 or more days, one week, two weeks, three weeks, four weeks or more. Alternatively, the duration of treatment can be for a period of time until the infectious agent is no longer detectable in the subject or the infectious agent is present at a level that does not result in symptoms or until there is an elimination or reduction in the number or severity of symptoms typically exhibited by a subject infected with a specific infectious agent. The duration of treatment can be determined by a physician or clinician based on the above discussed factors and other relevant factors.

The active compounds may be conveniently administered in unit dosage form; for example, containing 5 to 1000 mg, conveniently 10 to 750 mg, most conveniently, 50 to 500 mg of active ingredient per unit dosage form.

The desired dose may conveniently be presented in a single dose or as divided doses administered at appropriate intervals, for example, as two, three, four or more sub-doses per day. The sub-dose itself may be further divided, e.g., into a number of discrete loosely spaced administrations; such as multiple inhalations from an insufflator or by application of a plurality of drops into the eye. The dose, and perhaps the dose frequency, will also vary according to the age, body weight, condition, and response of the individual patient. In general, the total daily dose range for an active agent for the conditions described herein, may be from about 50 mg to about 5000 mg, in single or divided doses. In some embodiments, a daily dose range should be about 100 mg to about 4000 mg, e.g., about 1000-3000 mg, in single or divided doses, e.g., 750 mg every 6 hr of orally administered compound. This can achieve plasma levels of about 500-750 uM, which can be effective to kill cancer cells. In managing the patient, the therapy should be initiated at a lower dose and increased depending on the patient's global response.

In some embodiments the compound is not administered with a solvent or preservative such as DMSO or ethanol, which may have toxic effects, e.g., in humans.

The present disclosure describes various compounds useful for enhancing or prolonging an immune response, as vaccine adjuvants, and as photoaffinity probes.

Exemplary Embodiments

In one embodiment, a compound is provided having the structure of Formula I, or a salt thereof, $$A^1\text{-}Q\text{-}L^1\text{-}A^2\text{-}L^2\text{-}Z$$ Formula I wherein
A1 is an alkyl, aryl, aryloxy, arylamino, arylthiol, arylmethyl, or arylcarbonyl;
Q is a divalent heterocyclic aryl;
L1 is a divalent group selected from amide, carbamate, urea, thioamide, thiocarbamate, thiourea, or a dithiocarbamate;
A2 is a divalent aryl or heteroaryl;
L2 is a divalent sulfone, sulfoxide, thioether, carbonyl, amide, ester, or aminomethyl; and
Z is an alkylamine, arylamine, dialkylamine, diarylmine, N,N-alkylarylamine, or a cyclic amine.

In one embodiment, A1 is an aryl; Q is a divalent thiazole; L1 is a divalent amide; A2 is a divalent aryl; L2 is a divalent sulfone, sulfoxide, thioether, or carbonyl; and Z is an alkylamine, arylamine, dialkylamine, diarylmine, N,N-alkylarylamine, or a non-aromatic cyclic amine. In one embodiment, A1 is a phenyl or naphthyl; Q is a divalent thiazole; L1 is a divalent amide; A2 is a phenylene; L2 is a divalent sulfone; and Z is a dialkylamine or a non-aromatic cyclic amine. In one embodiment, A1 has the structure

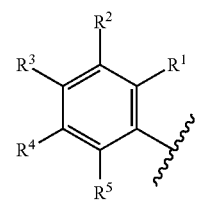

Formula A each of R1, R2, R3, R4, and R5 is independently H, fluoro, chloro, bromo, iodo, azido, hydroxyl, amino, thio, trifluoromethyl, trifluoromethoxy, cyano, nitroso, nitro, carboxy, sulfonate, phosphate, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthiol, arylsulfinyl, arylsulfonyl, arylamino, N,N-alkylarylamino, arylcarbonyl, or aminosulfonyl, or any adjacent two of R1, R2, R3, R4, and R5 form a fused aryl ring together with the carbon atoms to which they are attached. In one embodiment, A1 has the structure

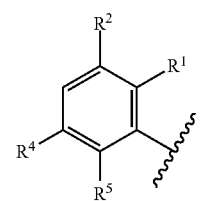

Formula B each of R1, R2, R4, and R5 is independently H, fluoro, chloro, bromo, iodo, azido, hydroxyl, amino, thio, trifluoromethyl, trifluoromethoxy, cyano, nitroso, nitro, carboxy, sulfonate, phosphate, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl, or any adjacent two of R1, R2, R4, and R5 form a fused aryl ring together with the carbon atoms to which they are attached;

at least one of R1 and R5 is other than H; and at least two of R1, R2, R4, and R5 is other than H. In one embodiment, each of R1, R2, R4, and R5 is independently H, fluoro, chloro, bromo, iodo, azido, trifluoromethyl, trifluoromethoxy, cyano, methyl, vinyl, ethynyl, C2-C10 alkyl, C3-C10 alkenyl, C3-C10 alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl, or any adjacent two of R1, R2, R4, and R5 form a fused aryl ring together with the carbon atoms to which they are attached; at least one of R1 and R5 is other than H; and at least two of R1, R2, R4, and R5 is other than H. In one embodiment, each of R1, R2, R4, and R5 is independently H, methyl, fluoro, chloro, bromo, iodo, azido, trifluoromethyl, trifluoromethoxy, cyano, methyl, vinyl, ethynyl, C2-C10 alkyl, C3-C10 alkenyl, C3-C10 alkynyl, or any adjacent two of R1, R2, R4, and R5 form a fused benzo ring together with the carbon atoms to which they are attached;

at least one of R1 and R5 is other than H; and at least two of R1, R2, R4, and R5 is other than H. In one embodiment, A1 has the structure Formula C

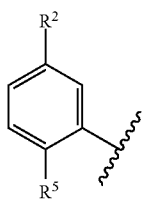

each of R2 and R5 is independently methyl, fluoro, chloro, bromo, iodo, azido, trifluoromethyl, trifluoromethoxy, cyano, methyl, vinyl, ethynyl, C2-C10 alkyl, C3-C10 alkenyl, C3-C10 alkynyl. In one embodiment, each of R2 and R5 is independently methyl or bromo.

In one embodiment, Q has the structure

Formula D

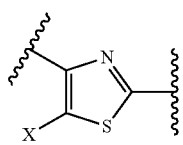

X is H, fluoro, chloro, bromo, iodo, azido, trifluoromethyl, trifluoromethoxy, cyano, nitro, carboxy, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl.

In one embodiment, X is H, methyl, vinyl, ethynyl, C2-C10 alkyl, C3-C10 alkenyl, C3-C10 alkynyl, alkyloxy, alkylthio, alkylamino, dialkylamino, or aryl.

In one embodiment, X is a linear alkyl, linear alkenyl, linear alkynyl, linear alkyloxy, or linear alkylthio.

In one embodiment, L1 has the structure

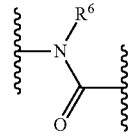

R6 is H, alkyl, alkenyl, or alkynyl. In one embodiment, L1 has the structure

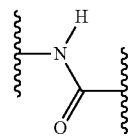

In one embodiment, A2 has the structure

Formula E1

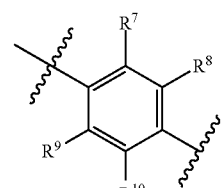

Formula E2

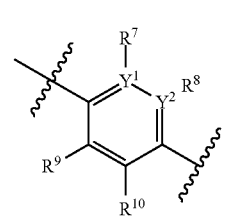

Formula E3

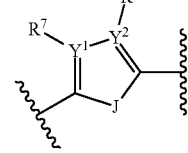

Y1 is C or N, and if Y1 is N then R7 is absent;
Y2 is C or N, and if Y2 is N then R8 is absent;
J is O or S; and
each of R7, R8, R9, and R10 is independently H, fluoro, chloro, bromo, iodo, azido, hydroxyl, amino, thio, trifluoromethyl, trifluoromethoxy, cyano, nitroso, nitro, carboxy, sulfonate, phosphate, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthiol, arylsulfinyl, arylsulfonyl, arylamino, N,N-alkylarylamino, arylcarbonyl, or aminosulfonyl, or any adjacent two of R7, R8, R9, and R10 form a fused aryl ring together with the carbon atoms to which they are attached.

In one embodiment, A2 is a 1,4-phenylene having the structure

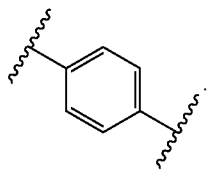 [SMILES: *c1ccc(*)cc1]

In one embodiment, L1 is a divalent sulfone linkage having the structure

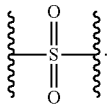

In one embodiment, Z has the structure

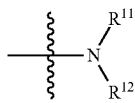

Formula F

R11 and R12 are each independently H, alkyl, alkenyl, alkynyl, or aryl, or R11 and R12 form a cyclic amine together with the nitrogen atom to which they are attached. In one embodiment, Z has the structure

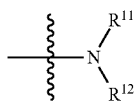

Formula F

R11 and R12 are each independently alkyl, or R11 and R12 form a morpholine, aziridine, azetidine, azepine, pyrrolidine, or piperidine ring together with the nitrogen atom to which R11 and R12 are attached. In one embodiment, Z has the structure

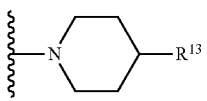

Formula G

R13 is H, fluoro, chloro, bromo, iodo, azido, trifluoromethyl, trifluoromethoxy, cyano, nitro, carboxy, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl.

In one embodiment, the compound has the structure of Formula II

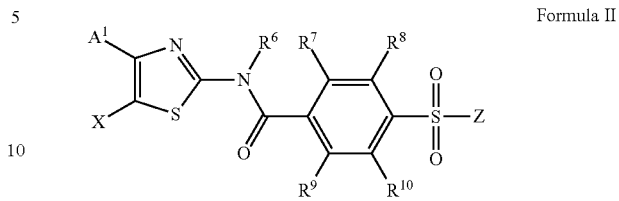

Formula II wherein
A1 is an alkyl, aryl, aryloxy, arylamino, arylthiol, arylcarbonyl;
R6 is H, alkyl, alkenyl, or alkynyl;
each of R7, R8, R9, and R10 is independently H, fluoro, chloro, bromo, iodo, azido, hydroxyl, amino, thio, trifluoromethyl, trifluoromethoxy, cyano, nitroso, nitro, carboxy, sulfonate, phosphate, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthiol, arylsulfinyl, arylsulfonyl, arylamino, N,N-alkylarylamino, arylcarbonyl, or aminosulfonyl, or any adjacent two of R7, R8, R9, and R10 form a fused aryl ring together with the carbon atoms to which they are attached;
X is H, fluoro, chloro, bromo, iodo, azido, trifluoromethyl, trifluoromethoxy, cyano, nitro, carboxy, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsuffinyl, arylsulfonyl, arylamino, N,N-alkylarylamino, arylcarbonyl, or aminosulfonyl; and
Z is an alkylamine, arylamine, dialkylamine, diarylmine, N,N-alkylarylamine, or a cyclic amine.

In one embodiment, the compound has structure of Formula III

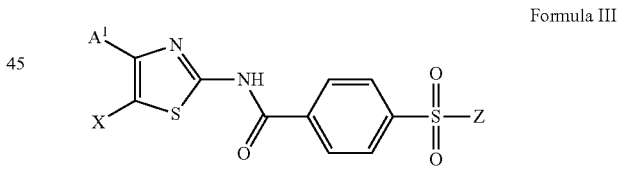

Formula III wherein
A1 is an alkyl, aryl, aryloxy, arylamino, arylthiol, arylcarbonyl;
X is H, fluoro, chloro, bromo, iodo, azido, trifluoromethyl, trifluoromethoxy, cyano, nitro, carboxy, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl; and
Z is an alkylamine, arylamine, dialkylamine, diarylmine, N,N-alkylarylamine, or a cyclic amine. In one embodiment, A1 is an aryl. In one embodiment, Z is a dialkylamine or a cyclic amine. In one embodiment, X is H, methyl, vinyl, ethynyl, C2-C10 alkyl, C3-C10 alkenyl, C3-C10 alkynyl, or C1-C10 alkyloxy. In one embodiment, X is a linear alkyl, linear alkenyl, linear alkynyl, linear alkyloxy. In one embodiment, A1 has the structure

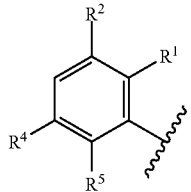

Formula B each of R1, R2, R4, and R5 is independently H, methyl, fluoro, chloro, bromo, iodo, azido, trifluoromethyl, trifluoromethoxy, cyano, methyl, vinyl, ethynyl, C2-C10 alkyl, C3-C10 alkenyl, C3-C10 alkynyl, or any adjacent two of R1, R2, R4, and R5 form a fused benzo ring together with the carbon atoms to which they are attached;

at least one of R1 and R5 is other than H; and at least two of R1, R2, R4, and R5 is other than H. In one embodiment, A1 has the structure

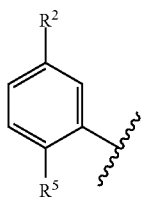

Formula C each of R2 and R5 is independently methyl, fluoro, chloro, bromo, iodo, azido, trifluoromethyl, trifluoromethoxy, cyano, methyl, vinyl, ethynyl, C2-C10 alkyl, C3-C10 alkenyl, or C3-C10 alkynyl. In one embodiment, Z has the structure

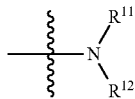

R11 and R12 are each independently alkyl, or R11 and R12 form a morpholine, aziridine, azetidine, azepine, pyrrolidine, or piperidine ring together with the nitrogen atom to which R11 and R12 are attached. In one embodiment, Z has the structure

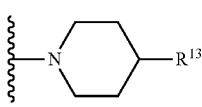

Formula G

R13 is H, methyl, vinyl, ethynyl, C2-C10 alkyl, C3-C10 alkenyl, C3-C10 alkynyl, C1-C10 alkyloxy, or a geminally-bound diazirine.

In one embodiment, the compound has the structure of Formula IV

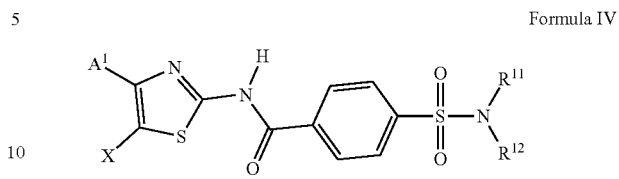

Formula IV wherein

A1 is an aryl;

X is H, fluoro, chloro, bromo, iodo, azido, trifluoromethyl, trifluoromethoxy, cyano, nitro, carboxy, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl; and R11 and R12 are each independently alkyl, or R11 and R12 form a morpholine, aziridine, azetidine, azepine, pyrrolidine, or piperidine ring together with the nitrogen atom to which R11 and R12 are attached.

In one embodiment, the compound has the structure of Formula V

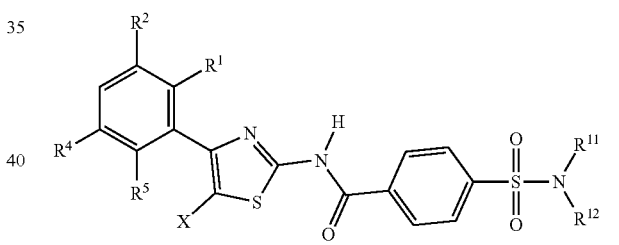

Formula V wherein

X is H, fluoro, chloro, bromo, iodo, azido, trifluoromethyl, trifluoromethoxy, cyano, nitro, carboxy, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl;

each of R1, R2, R4, and R5 is independently H, methyl, fluoro, chloro, bromo, iodo, azido, trifluoromethyl, trifluoromethoxy, cyano, methyl, vinyl, ethynyl, C2-C10 alkyl, C3-C10 alkenyl, C3-C10 alkynyl, or any adjacent two of R1, R2, R4, and R5 form a fused benzo ring together with the carbon atoms to which they are attached;

at least one of R1 and R5 is other than H;

at least two of R1, R2, R4, and R5 is other than H; and

R11 and R12 are each independently alkyl, or R11 and R12 form a morpholine, aziridine, azetidine, azepine, pyrrolidine, or piperidine ring together with the nitrogen atom to which R11 and R12 are attached.

In one embodiment, the compound has the structure of Formula VI

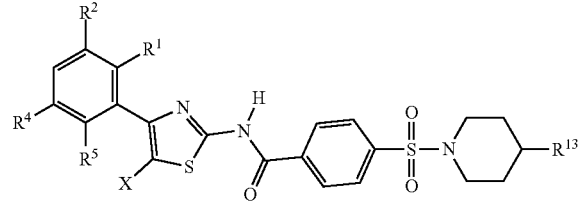

Formula VI wherein

X is H, fluoro, chloro, bromo, iodo, azido, trifluoromethyl, trifluoromethoxy, cyano, nitro, carboxy, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl;

each of R1, R2, R4, and R5 is independently H, methyl, fluoro, chloro, bromo, iodo, azido, trifluoromethyl, trifluoromethoxy, cyano, methyl, vinyl, ethynyl, C2-C10 alkyl, C3-C10 alkenyl, C3-C10 alkynyl, or any adjacent two of R1, R2, R4, and R5 form a fused benzo ring together with the carbon atoms to which they are attached;

at least one of R1 and R5 is other than H;

at least two of R1, R2, R4, and R5 is other than H; and

R13 is H, methyl, vinyl, ethynyl, C2-C10 alkyl, C3-C10 alkenyl, C3-C10 alkynyl, C1-C10 alkyloxy, or a geminally-bound diazirine. In one embodiment, X is H, methyl, vinyl, ethynyl, C2-C10 alkyl, C3-C10 alkenyl, C3-C10 alkynyl, or C1-C10 alkyloxy. In one embodiment, X is a linear alkyl, linear alkenyl, linear alkynyl, linear alkyloxy.

In one embodiment, at least one of R1, R2, R3, R4, R5, X, R6, R7, R8, R9, R10, R11, R12, and R13, if present, is an alkyne. In one embodiment, at least one of R1, R2, R3, R4, R5, X, R7, R8, R9, R10, and R13, if present, is an azide. In one embodiment, at least one of R1, R2, R4, R5, X, and R13 is an azide. In one embodiment, at least one of R1, R2, R4, R5, X, and R13 is an alkyne. In one embodiment, one of R1, R2, R4, R5, X, and R13 is an azide and one of R1, R2, R4, R5, X, and R13 is an alkyne.

In one embodiment the compound has the structure:

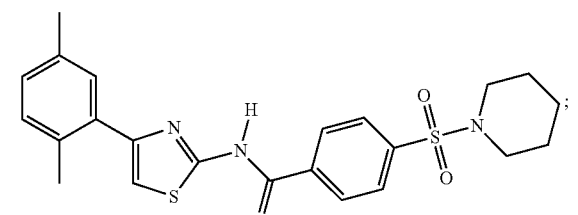

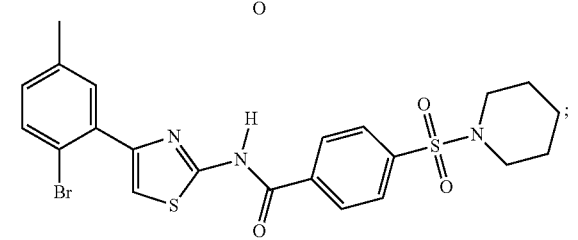

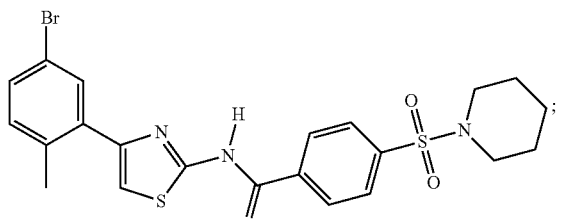

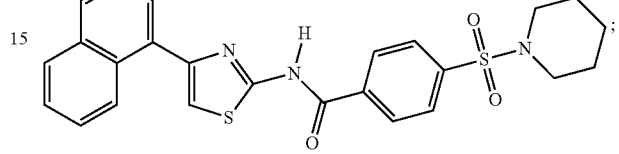

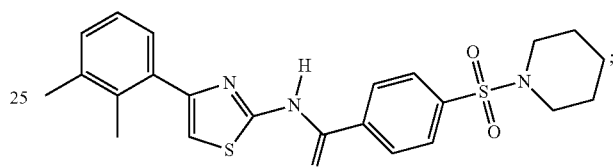

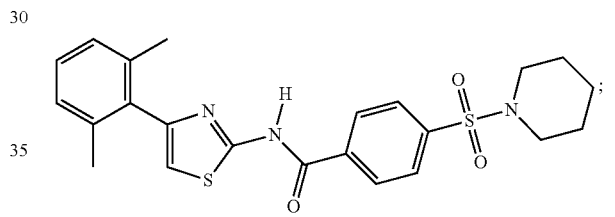

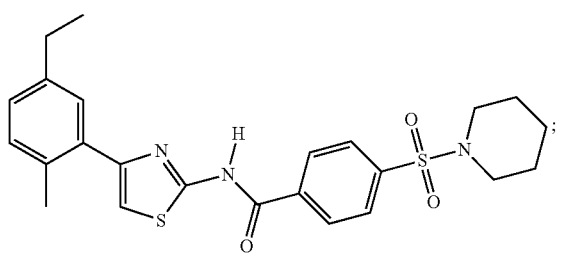

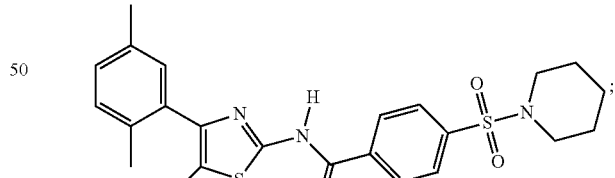

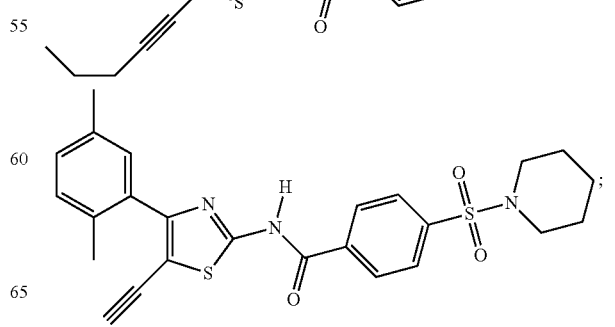

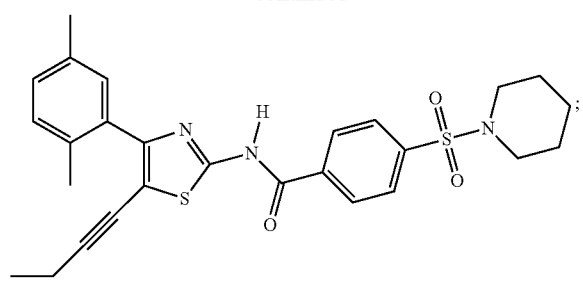
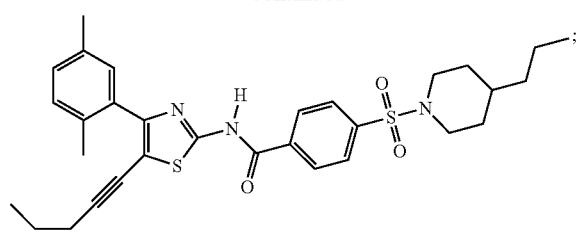
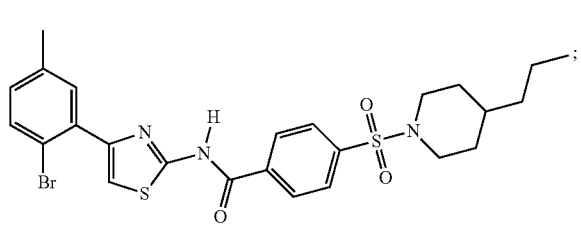
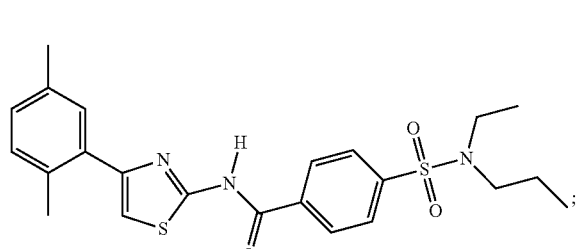
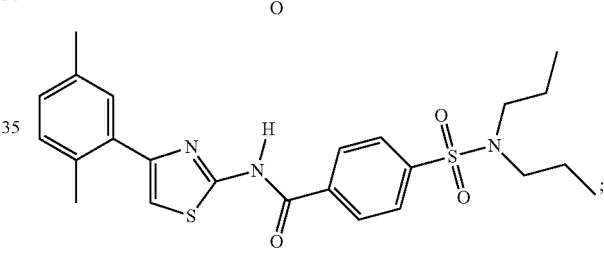
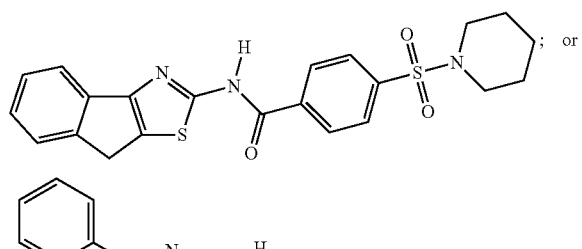
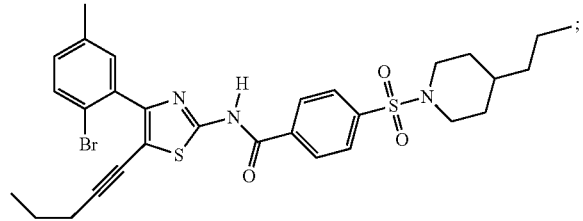
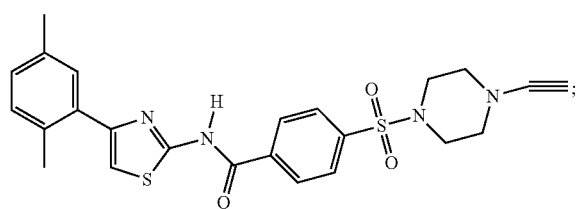
In one embodiment, the compound has the structure:

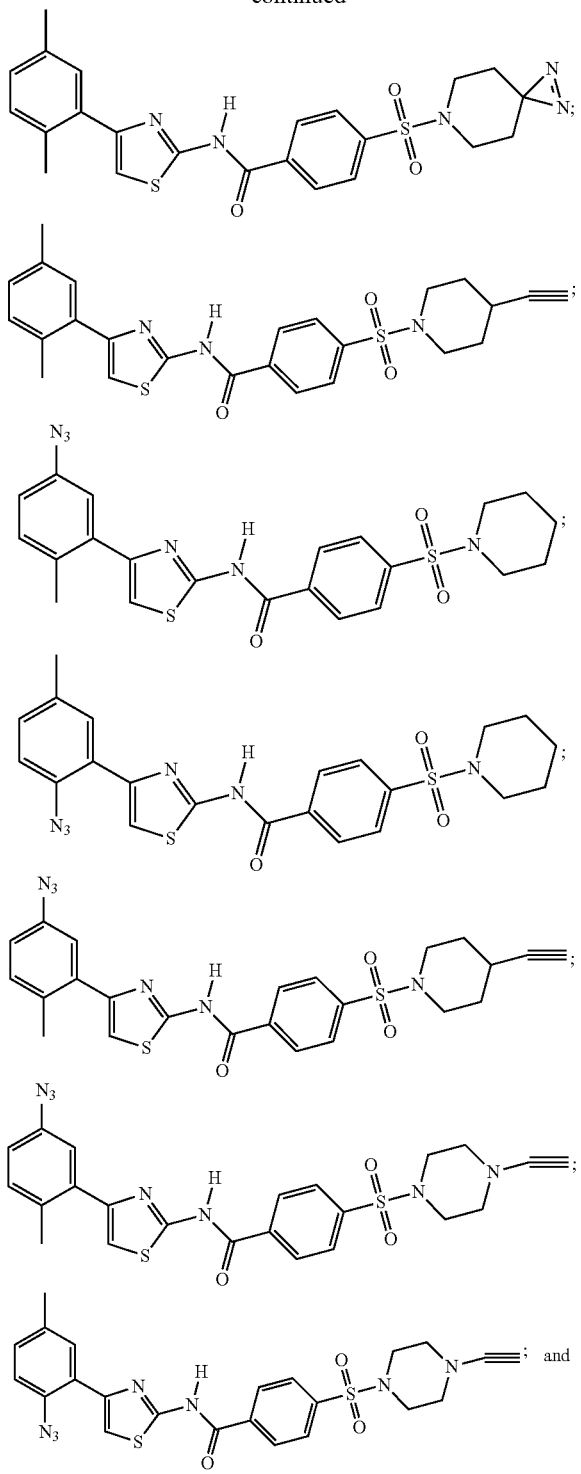

In one embodiment, the compounds (formulas (I)-(VI)) are useful as a vaccine adjuvant.

In one embodiment, the compounds (formulas (I)-(VI)) may be in a pharmaceutical composition comprising a pharmaceutically acceptable carrier.

In one embodiment, a composition may include the compounds (formulas (I)-(VI)) and a TLR ligand.

In one embodiment, the compound (formulas (I)-(VI)) is employed as a photoaffinity probe wherein the compound comprises an azide and an alkyne substituent.

In one embodiment, a method of enhancing or prolonging an immune response in a mammal is provided, comprising: administering to a mammal in need thereof a vaccine or an immunogenic moiety and an effective amount of a compound of formula (I)-(VI). In one embodiment, at least one (different) adjuvant is also administered, e.g., one or more TLR ligands, for example, a TLR2, TLR4 or TLR7 ligand, or at least one MAP kinase. In one embodiment, the vaccine and one of formula (I)-(VI) are co-administered. In one embodiment, the vaccine and one of formula (I)-(VI) are sequentially administered. In one embodiment, the vaccine and the TLR ligand are co-administered. In one embodiment, the mammal is a human.

In one embodiment, a method of enhancing or prolonging an immune response in a mammal is provided comprising: administering to the mammal an effective amount of a composition comprising a compound of formula (I)-(VI). In one embodiment, an adjuvant, MAP kinase or at least one TLR ligand is also administered. In one embodiment, at least one immunogenic moiety is administered.

The invention will be further described by the following non-limiting examples.

Example 1

Figure 3:
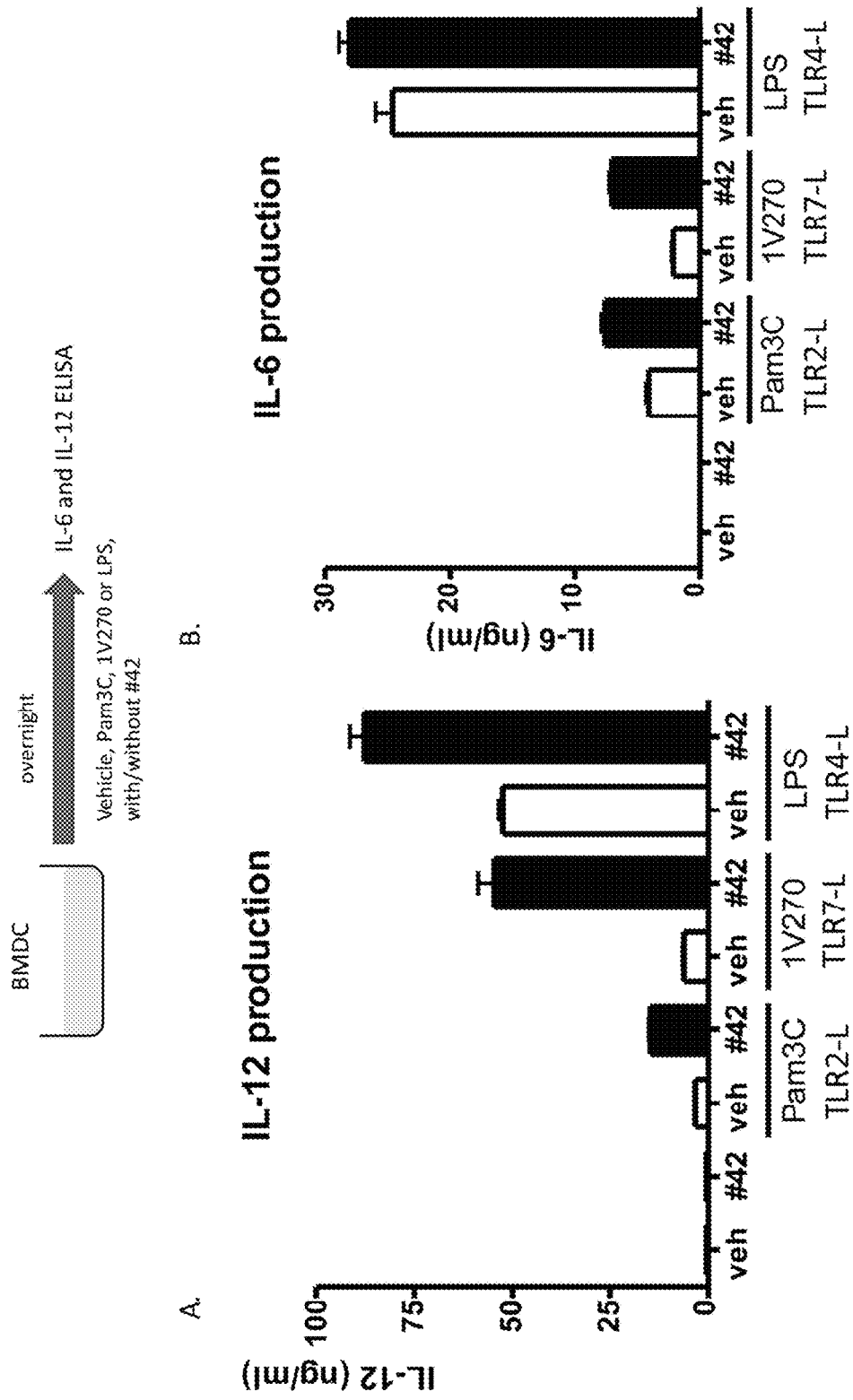
FIGS. 3A-3B. IL-12 (A) and IL-6 (B) production induced by a TLR agonist and compound 42 in BDMCs.
Figure 4:
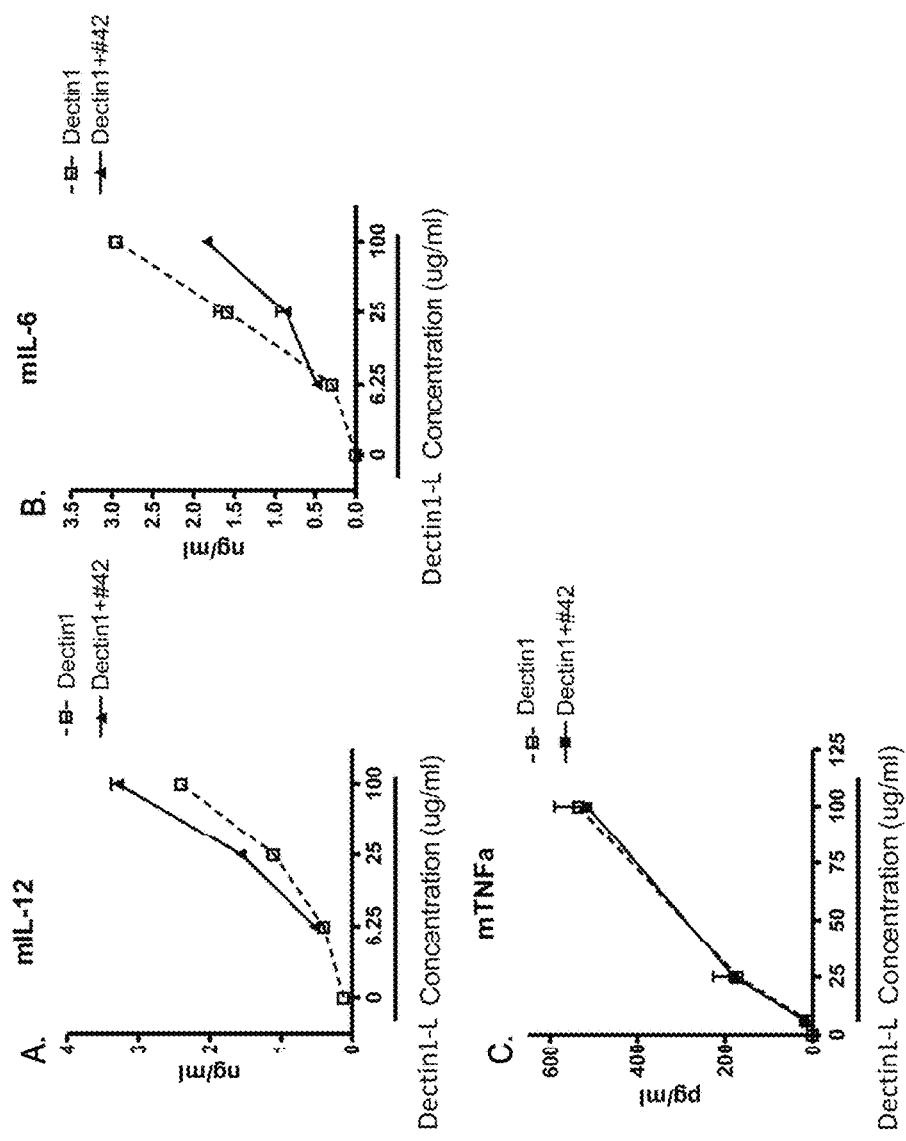
FIGS. 4A-4C. mIL-12 (A), mIL-6 (B) and mTNFalpha (C) are induced by Dectin1, a NF-kappaB canonical and alternative pathway activator, but are not enhanced by compound 42.
Figure 5:
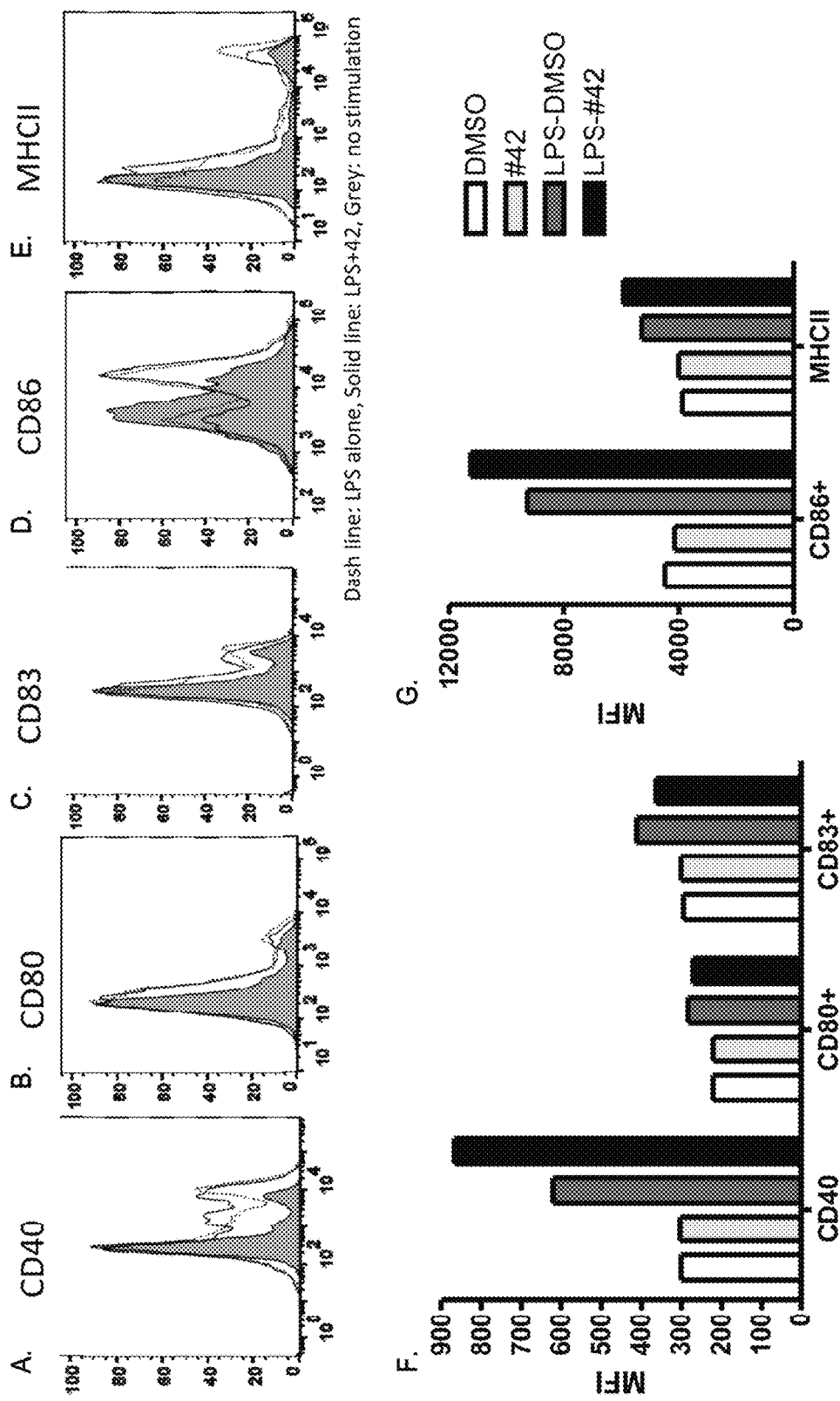
FIGS. 5A-5G. Compound 42 enhances co-stimulatory molecule expression induced by LPS in BDMCs.
Figure 6:
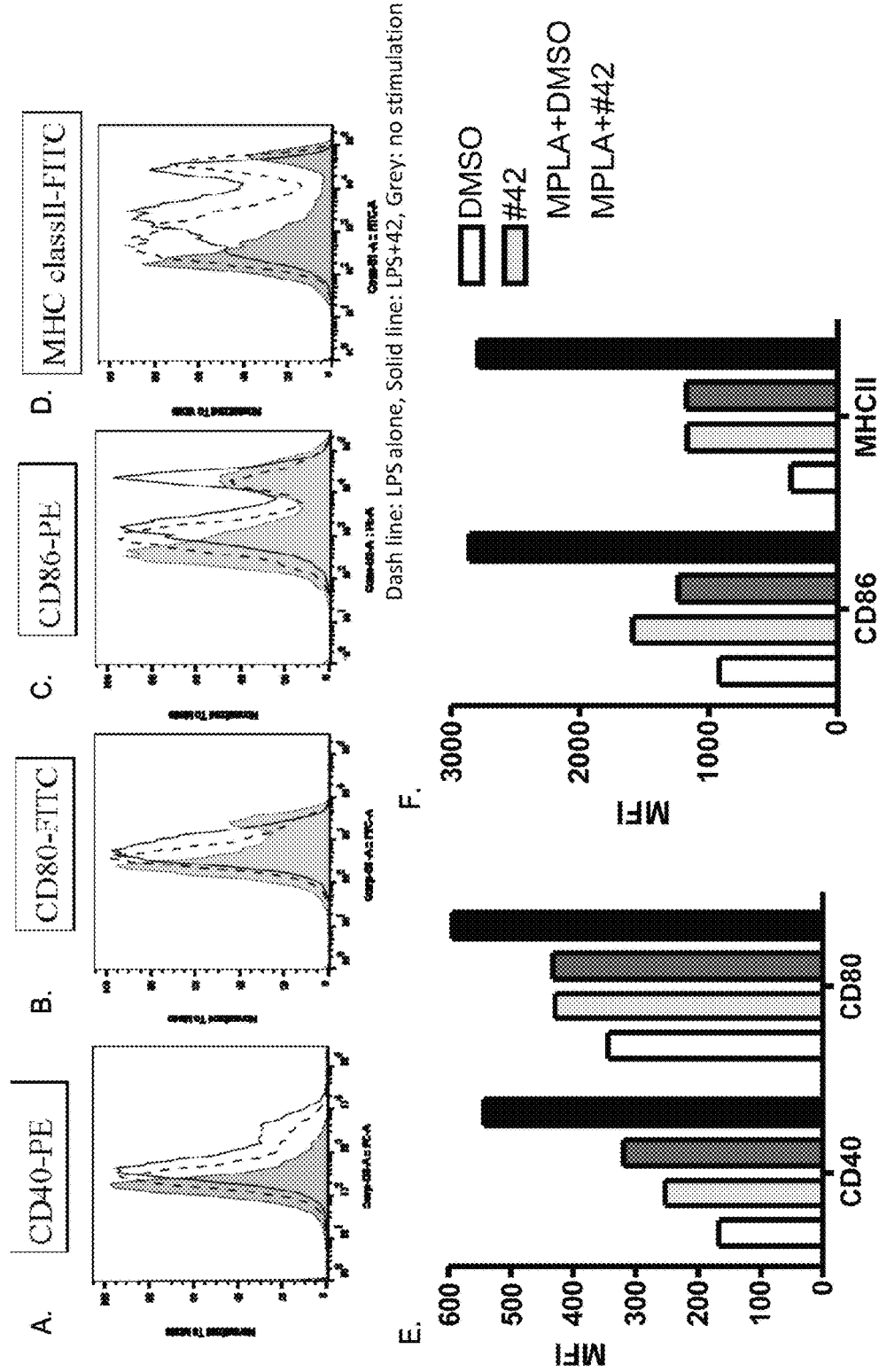
FIGS. 6A-6F. Compound 42 enhances co-stimulatory molecule expression induced by MPLA in BDMCs.
Figure 7:
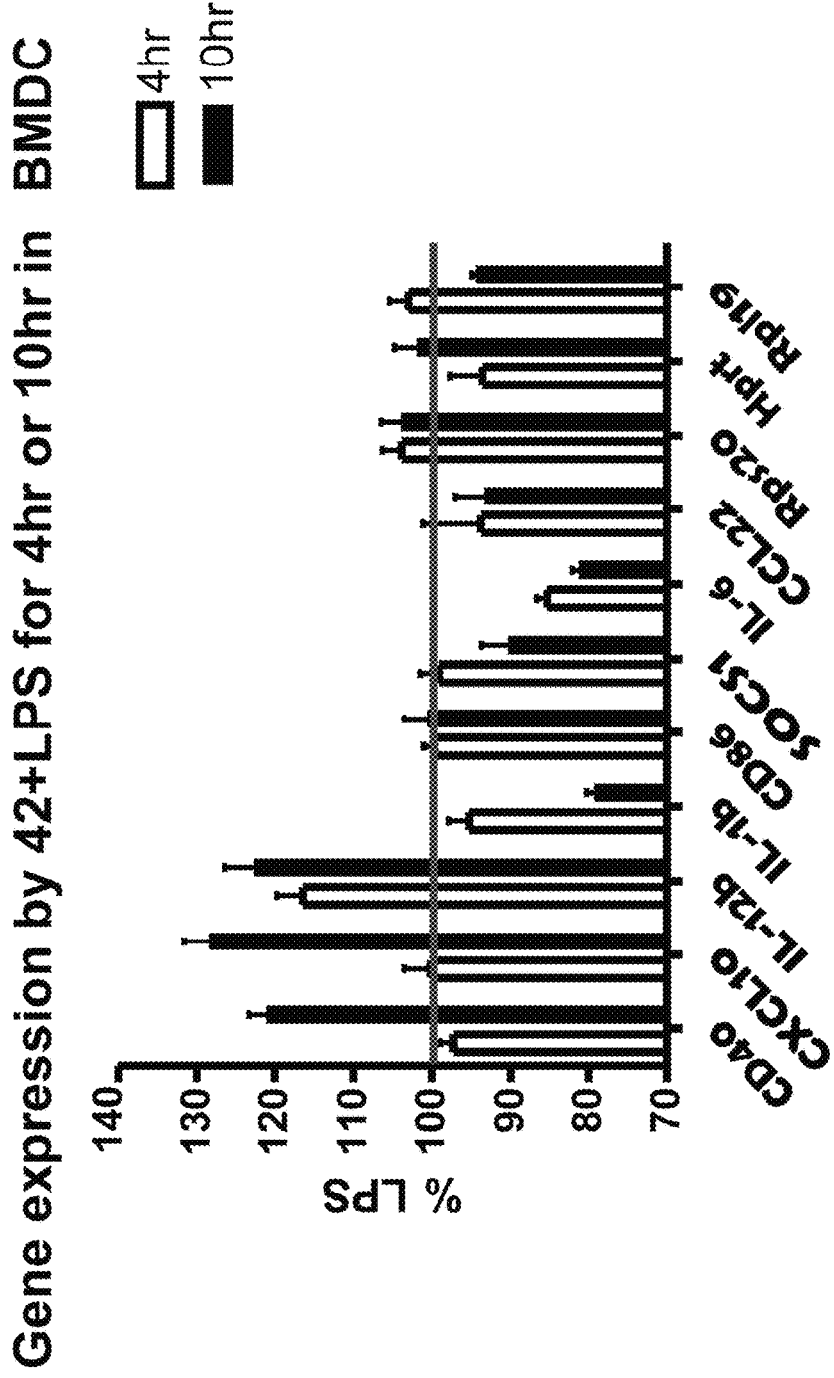
FIG. 7. Gene expression kinetics in BDMCs in cells exposed to LPS or LPS and compound 42.
Figure 8:
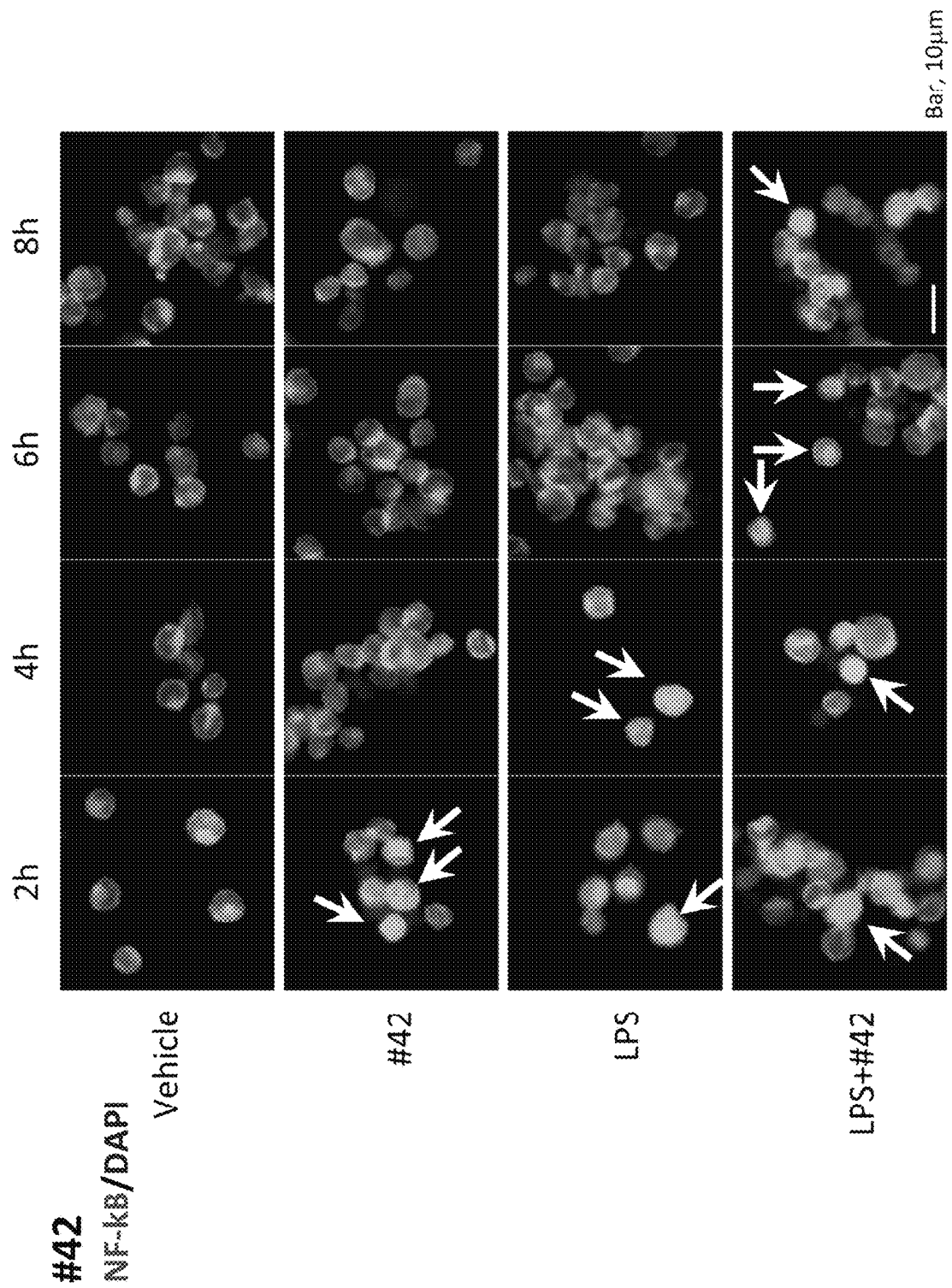
FIG. 8. Immunocytochemistry showing phosphorylation in THP-1 cells exposed to vehicle, LPS, compound 42 or a combination thereof.
Figure 9:
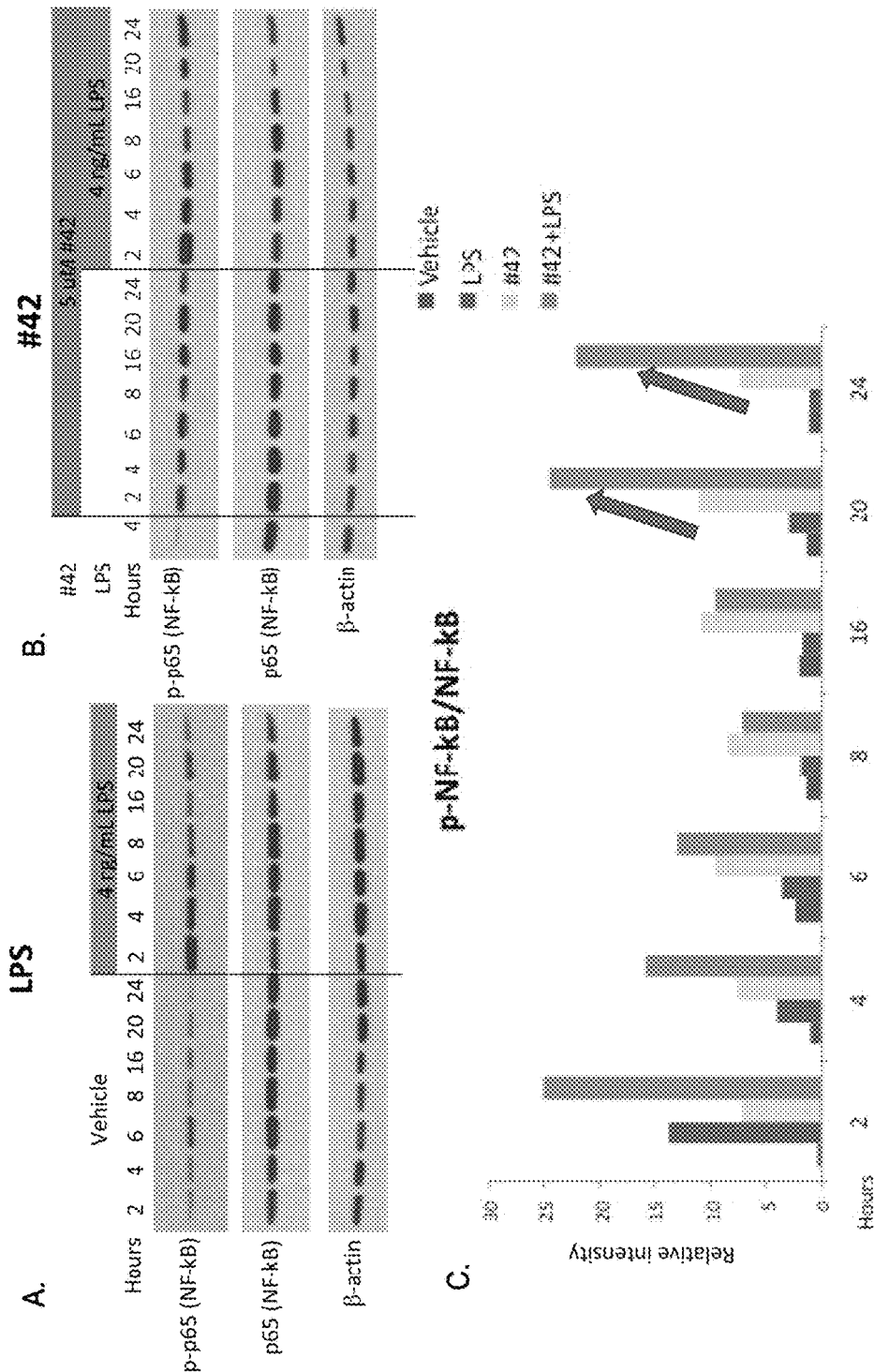
FIGS. 9A-9C. Compound 42 alone induced and sustained phosphorylation of NF-kB.
Figure 12:
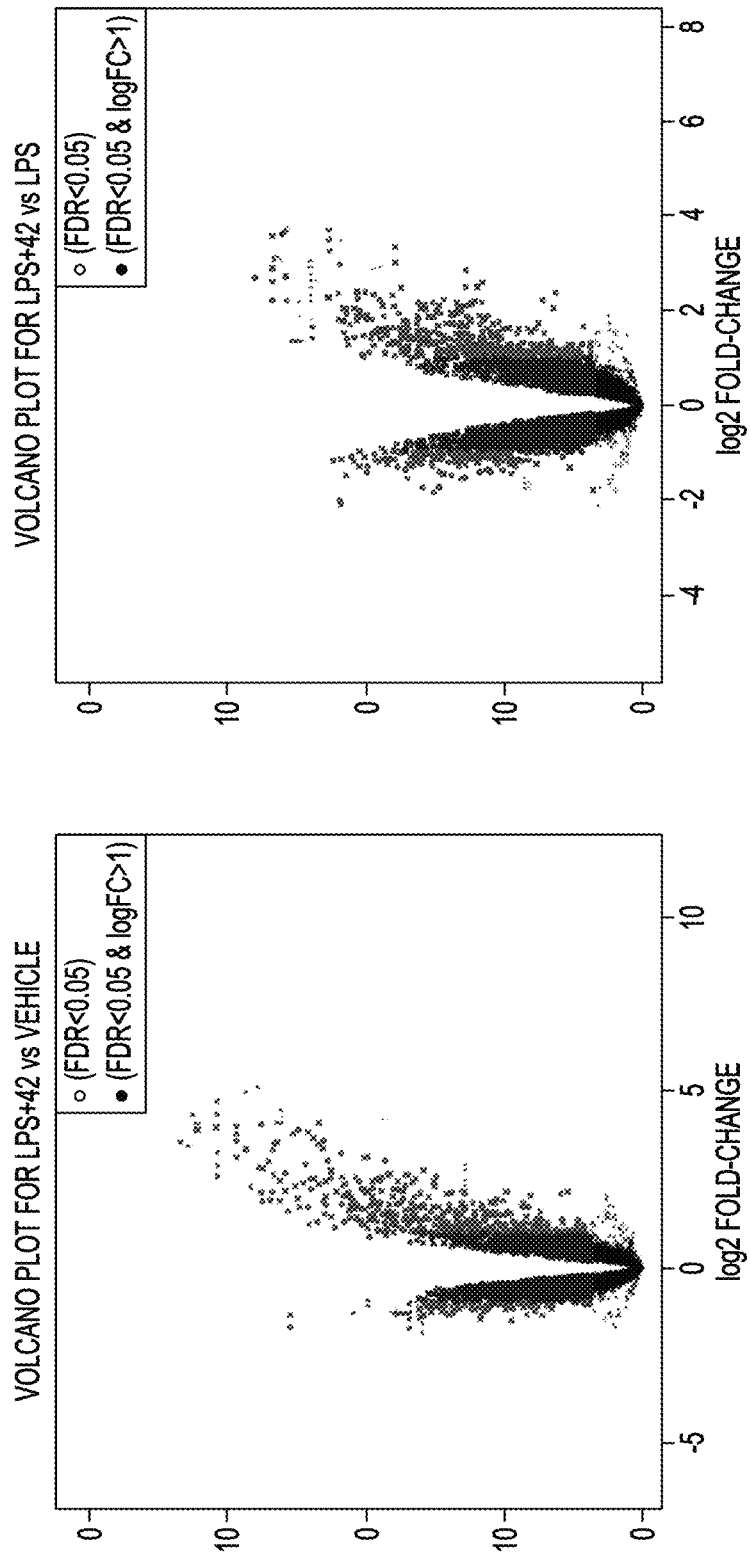
FIG. 12. RNA-seq analysis.
Figure 16A:
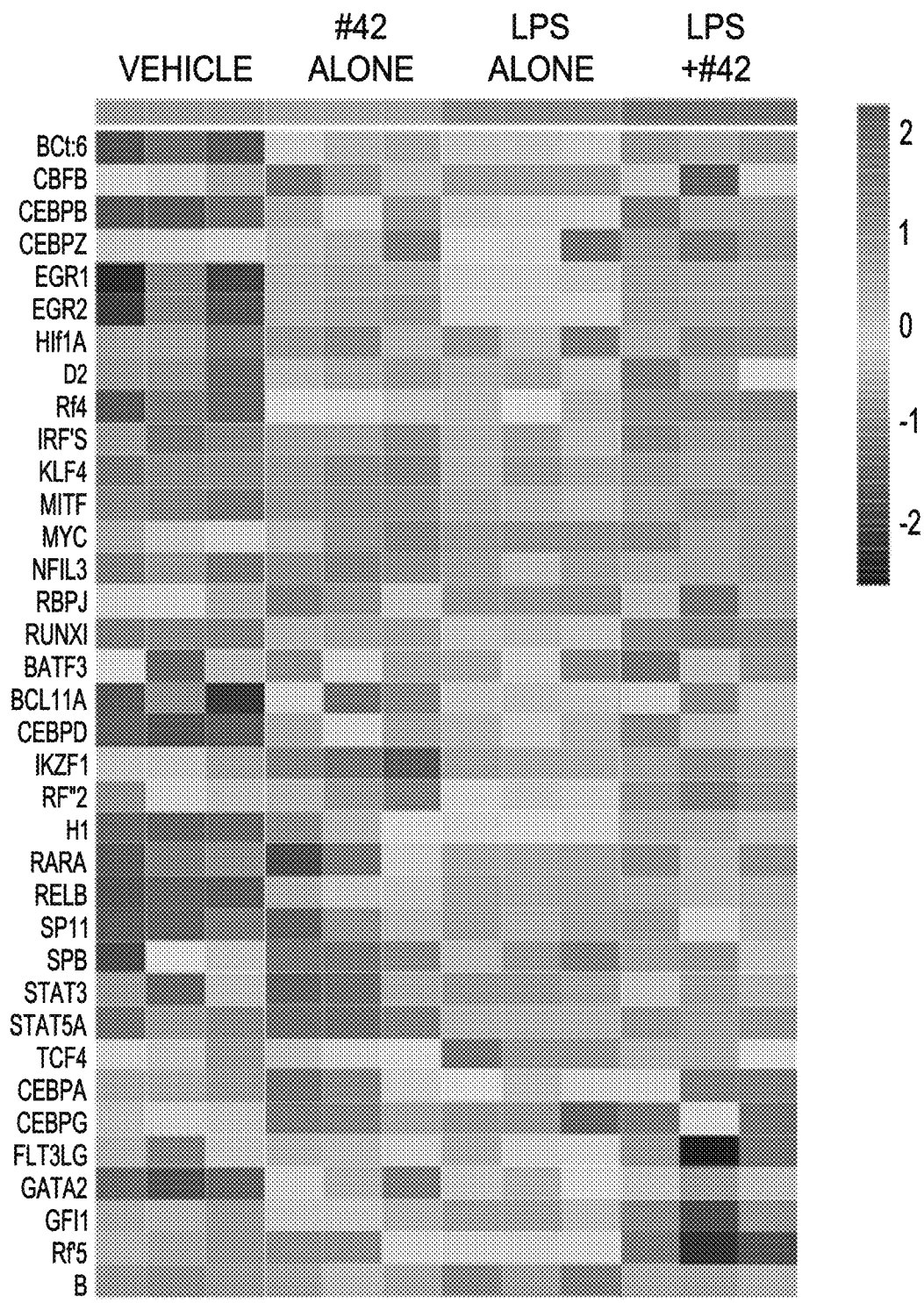
FIGS. 16A-16B. (A) Heat map of expression of factors in THP-1 cells after exposure to vehicle, LPS, compound 42, or a combination of LPS and compound 42. (B) Heat map showing genes associated with differentiation in dendritic cells.
Figure 16B:
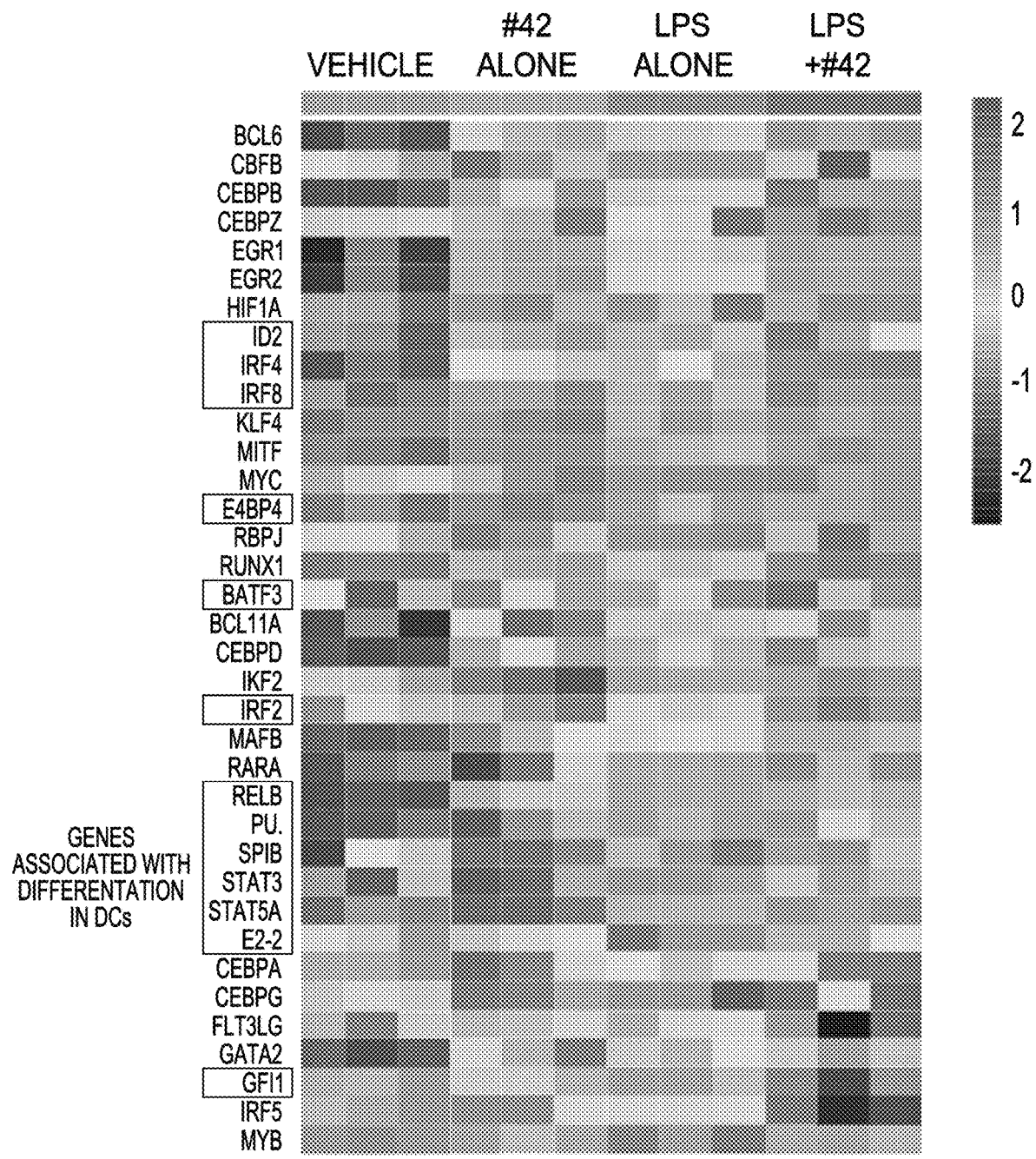
Figure 17:
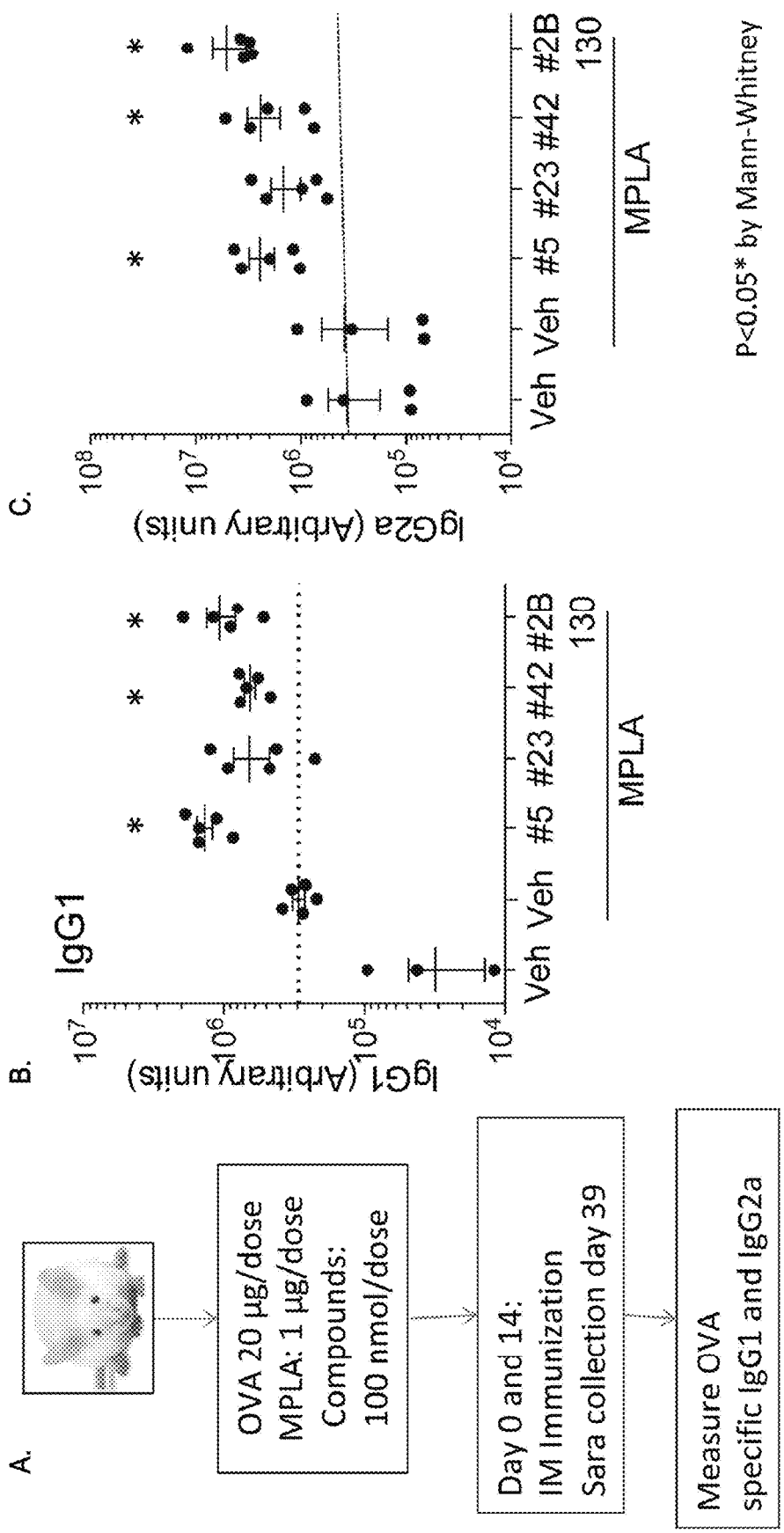
FIGS. 17A-17C. Murine data. A) Schematic of immunization protocol. B-C) IgG1 and IgG2a in animals contacted with MPLA and various compounds or vehicle.
Figure 18:
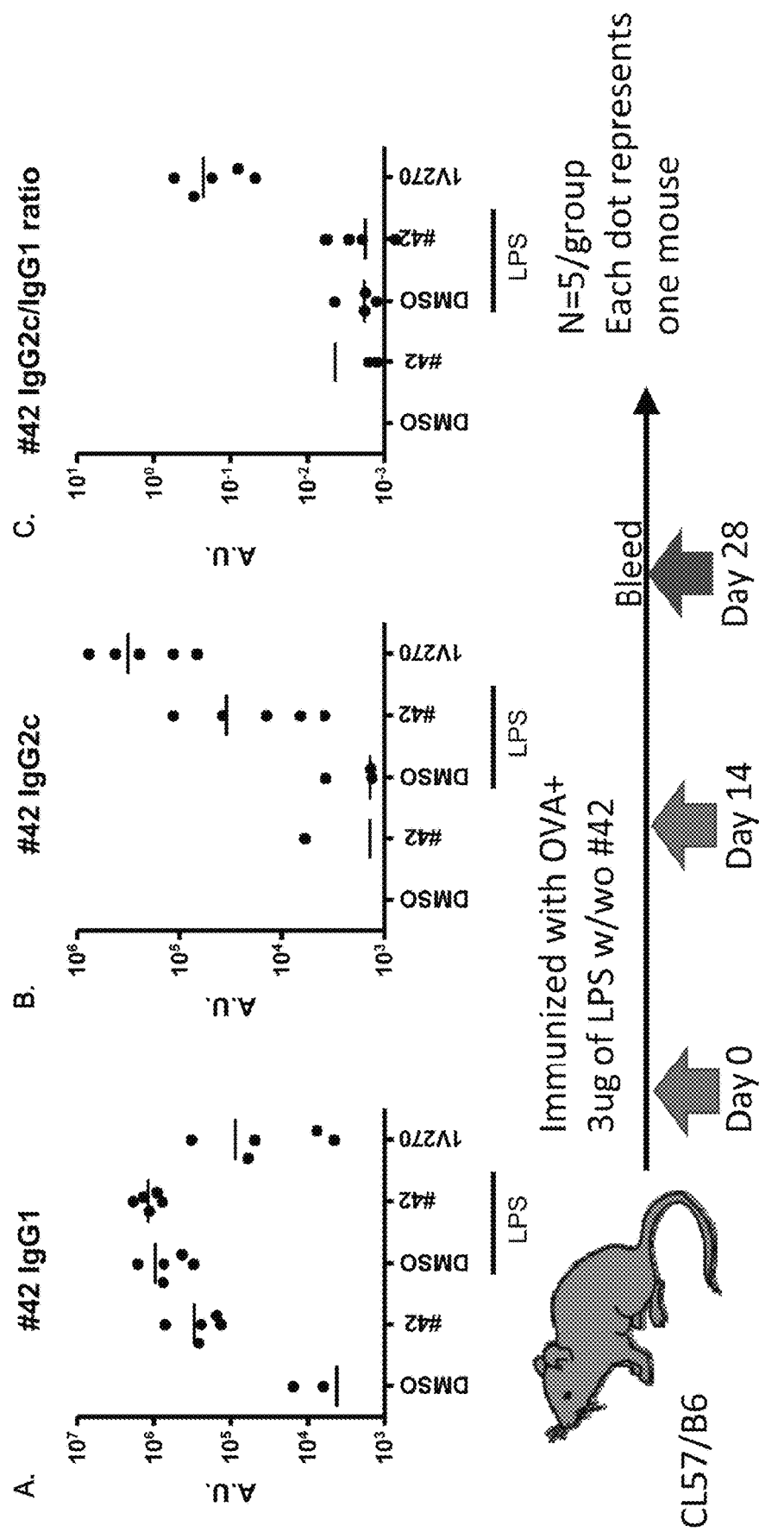
FIGS. 18A-D. Murine data. A) Schematic of immunization protocol. B-D) C57/B6 mice were immunized with OVA and exposed to LPS with or without compound 42.
Figure 19:
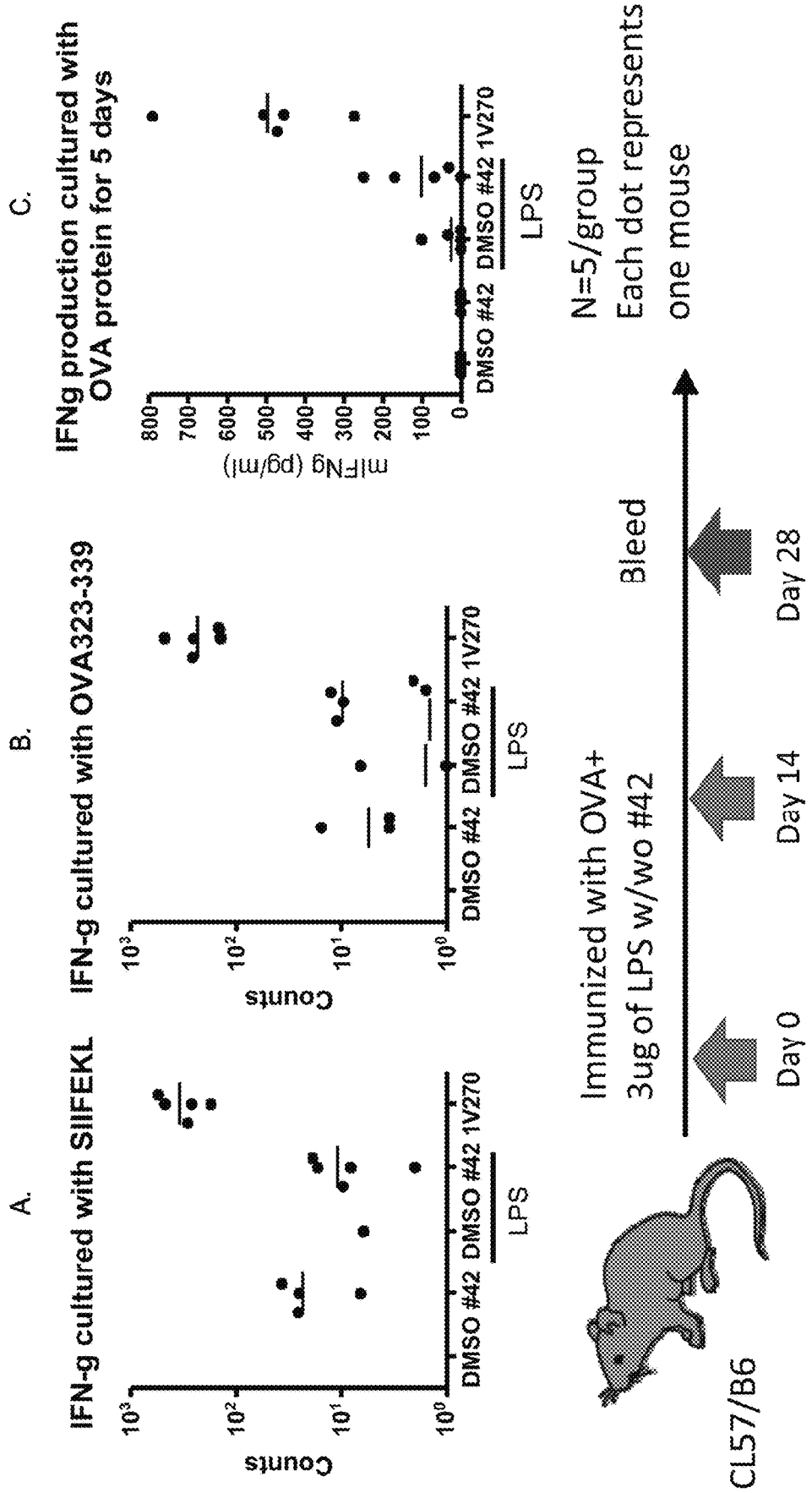
FIGS. 19A-D. Murine data. A) Schematic of immunization protocol. B-D) C57/B6 mice were immunized with OVA and exposed to LPS with or without compound 42.
Figure 20:
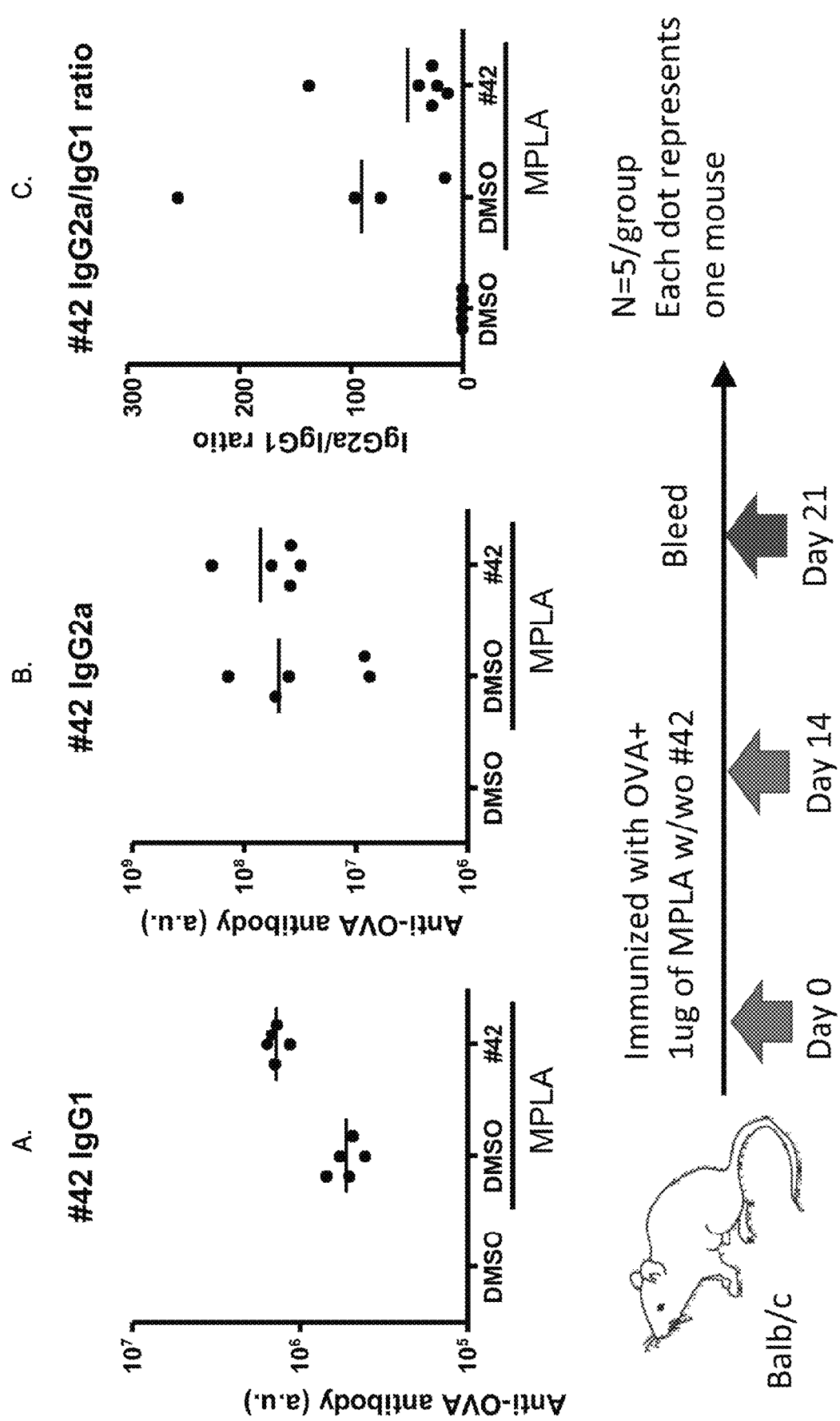
FIGS. 20A-20D. Balb/c mice were immunized with OVA and exposed to MPLA with or without compound 42. IgG1 (A), IgG2a (B) and ratio of IgG1/IgG2a were measured, FIG. 21. Compound #42 is not reactogenic.
Figure 21:
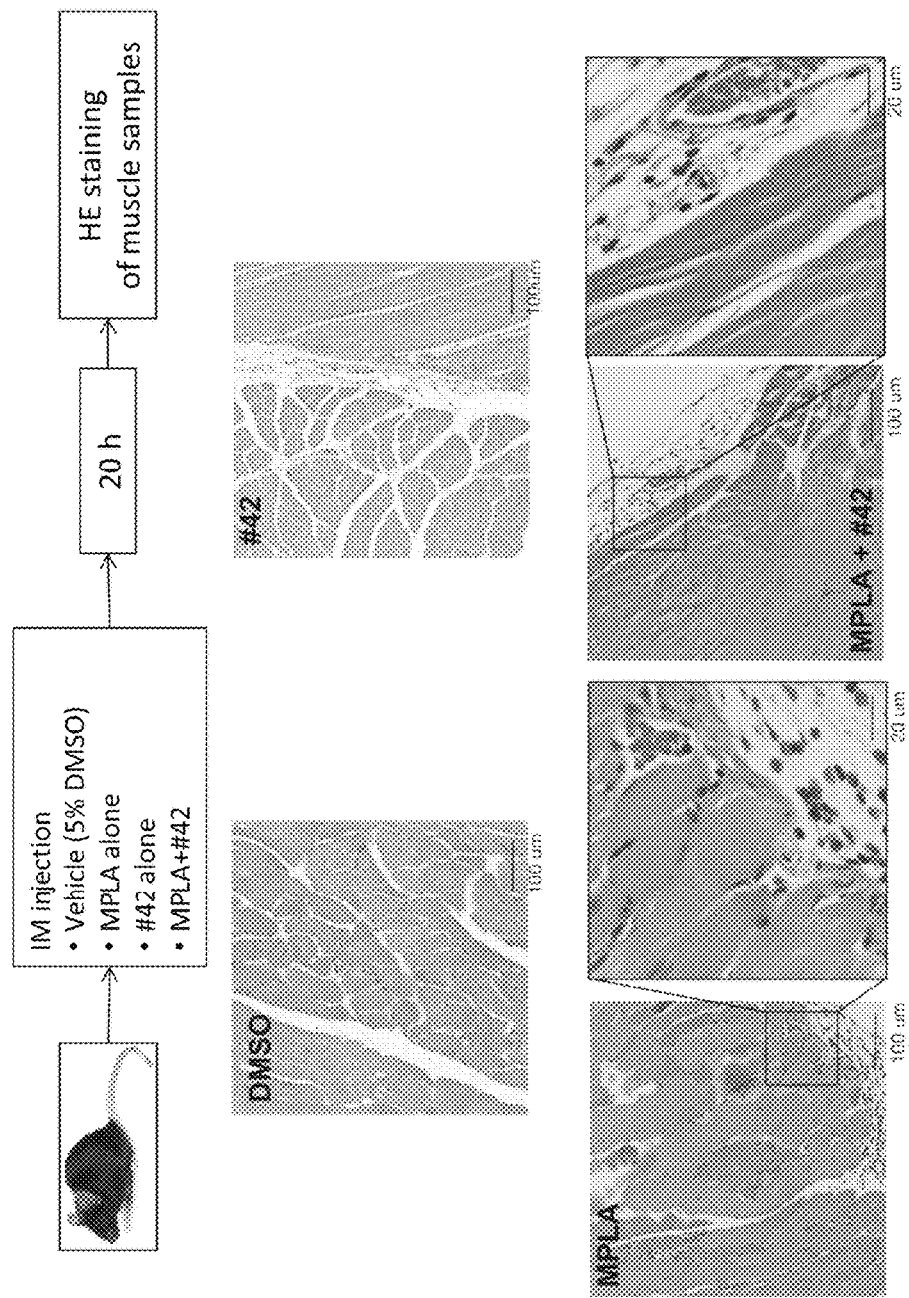

Table 1 shows activity of formula (I) on BMDCs and THP-1 cells. In one embodiment, compound 42 enhanced cytokine production induced by TLR ligands but not by Dectin1 (FIGS. 3-4). In one embodiment, compound 42 enhanced co-stimulatory molecule expression induced by LPS and MPLA (FIGS. 5-8). CD40, CXCL10 and IL-12 are upregulated by 10 hours after exposure (FIG. 7). JNK, P38 and Erk1/2 phosphorylation were induced by compound 42 alone (FIG. 8). Compound 42 alone induced and sustained phosphorylation of NFkB and the combination of LPS and compound 42 were synergistic

TABLE 1

Summary of activity on BMDCs and THP-1 cells.

| | | |
|---|---|---|
| Cytokine production | Enhancement of IL-12, IL-6, and TNFα production induced by LPS, TNFα, TLR2 and TLR7 ligand. | Enhancement of IL-8, TNFα, and IL-1β production induced by LPS, TNFα or IL-1β |
| Co-stimulatory markers | Enhancement of CD40 and CD86 induce by LPS or MPLA | Enhancement of CD40 and CD86 induce by LPS |

TABLE 1-continued

Summary of activity on BMDCs and THP-1 cells.

| Gene expression | Enhancement of CD40, IL-12. CXCL5 expression. | Prolongation of IL-23, IL-8 and CCL5 expression. |
|---|---|---|
| RNA seq | | Induction of CSF-1 and LIF differentiation. |
| Cytotoxicity | Enhancement of cell viability | |
| NF-kB activation | N/A | Prolongation of NF-kB induced by LPS, TNFa, TLR2 and TLR7 ligand (FRET&SEAP) Prolongation of NF-kB phosphorylation and nuclear localization induced by LPS(ICC and WB) |
| MAPK activation | N/A | Phosphorylation of JNK, P38 and Erk1/2 by #42 alone |

Example 2

The present approach towards identifying adjuvants, e.g., those useful as co-adjuvants, focused on small molecules that sustain the activation of a primary adjuvant. The rationale behind the approach is as follows: Upon vaccine administration, local antigen presenting cells (APCs) at the site of injection, such as dendritic cells and Langerhans cells, are activated by adjuvant. These APCs engulf antigen and travel to local draining lymph nodes where the antigen is presented to T cells (Forster et al., 2012). The activation levels of APCs induced by these adjuvants, peaks at 2-6 hours and then decays due to negative feedback mechanisms (Qian et al., 2013; Turnis et al., 2010; Yuk et al., 2011; Ho et al., 2012; Liu et al. 2010; Ma et al., 2010; An et al., 2006; Kondo et al., 2012). Because it takes approximately 12-24 hours for an APC to travel to the lymph node after vaccination (Martin-Fontecha et al., 2009) APCs are arriving during the decay phase of the activation. Thus, prolonging or sustaining the activation of APCs induced by an adjuvant for 12-24 hours will lead to optimal presentation of antigen to the T cells which would enhance the initial immune response and potentially allow for a longer lasting response. This is supported by reports that enhanced responses to vaccinations were observed in mice with genetic disruption of either interleukin-1 receptor-associated kinase-M (IRAK-M), an inhibitor of the nuclear factor kappa B (NF-κB) pathway (Turnis et al., 2010), or of UBP43, a negative regulator of type 1 IFN signaling (Kim et al., 2005). Thus, to address this issue, HTS methods were directed towards identification of co-adjuvants that prolonged activation of an immune response induced by a primary stimulus (Chan et al., 2017; Shukla et al., 2018).

These cell-based HTS campaigns tested protraction of a TLR-4 agonist lipopolysaccharide (LPS) stimulus through the NF-κB pathway (Chan et al., 2017). Compounds that prolonged LPS induced NF-κB signaling included a distinct set of pyrimido[5,4-b]indoles that were also found to be effective co-adjuvants with MPLA, an FDA approved adjuvant, in murine vaccination studies (Chan et al., 2017). A distinct kinetic profile bearing chemotype was identified bearing an aminothiazole sulfamoyl benzamide structure. The further drug development of such hits identified through cell-based phenotypic assays and involved in cell signaling pathways is hampered without the knowledge of the target receptor or the compound's mechanism of action (Schenone et al., 2013).

This necessitated evaluation of Structure-activity relationship studies that were unexplored in the HTS with an aim to identify positions on the scaffold that can tolerate the introduction of small functional groups such as aryl azide or diazirne to make photoreactive probes (Pan et al., 2016; Smith et al., 2015; Sumranjit et al., 2013; Kan et al., 2007; Ban et al., 2016; Kawada et al., 1989; Shukla et al., 2010). These chemical probes would then be useful tools for future mechanistic and functional receptor studies.

Figure 26:
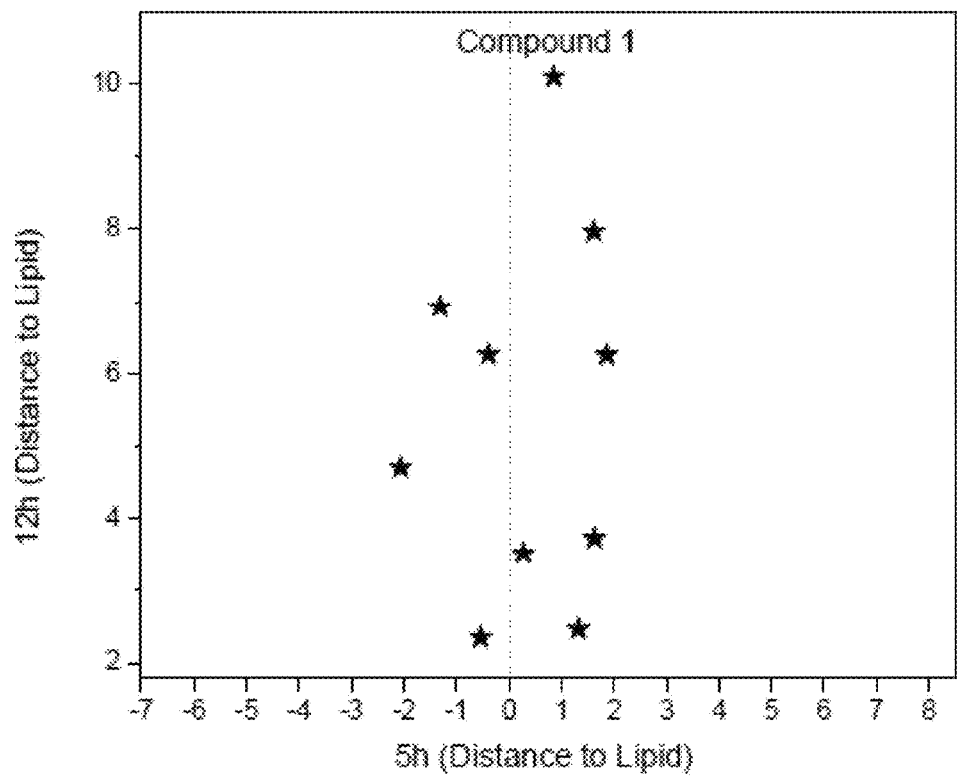
FIG. 26. A scatter plot of NF-κB activity for selected thiazolyl benzamide analogs with LPS at 5 h and 12 h. The most potent compound that enhanced NF-κB activity at prolonged time of 12 h was compound 1.
Figure 27:
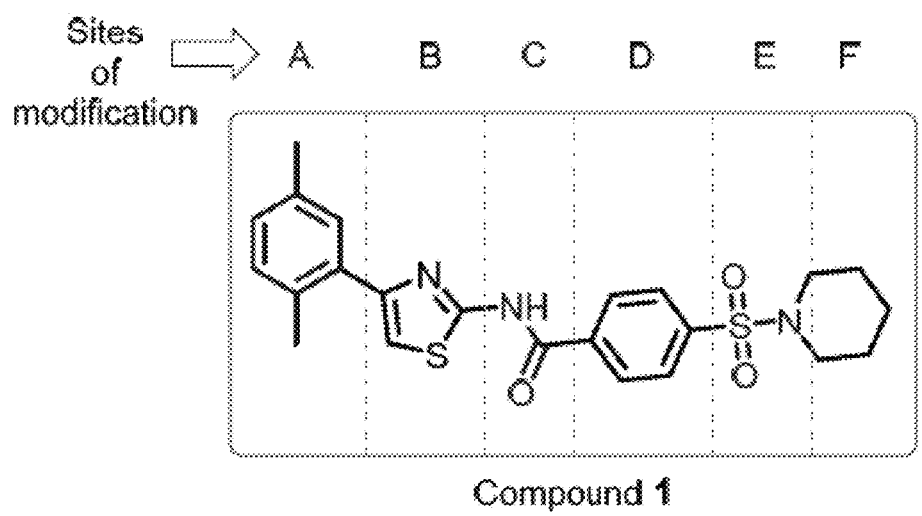
FIG. 27. Structure and sites of modification of compound 1. Structure of compound 1 was conveniently broken down based on the substituents and the synthetic strategy in to six sites (A to F) as shown in alternate blue and black colors. SAR studies on compound 1 were approached by modifying one site at a time.

Results and Discussion: Of the 248 compounds that belong to aminothiaozle sulfamoyl benzamide chemotype evaluated in the original high throughput screening, a set of 10 compounds were active in enhancing NF-κB activity in presence of LPS. These compounds were then subjected to a confirmatory kinetic screening for NF-κB enhancement activity at 5 h and 12 h in presence of LPS. A scatter plot showing activation data for these compounds in cell-based NF-κB FRET assay for 12 h (Y axis) and 5 h (X-axis) incubation is shown in FIG. 26. Unlike previously identified chemotypes that enhanced NF-κB activity, the hits could be clearly classified into 4 groups based on 4 quadrant of the kinetic plot (Chane t al., 2017); here this series of compounds did not statistically affect the activity at 5 h but enhanced the NF-κB activity by LPS at 12 h. Of the 10 compounds evaluated in this confirmation screen, compound 1 was the most potent (FIG. 26) (Compound 1 is also referred herein as #42). The structure of compound 1 bears a 2,5-dimethylphenyl substituent on the 4 position of the thiazole ring and benzoyl-4-(sulfamoylpiperidine) substituent connected at the 2-amino position of the thiazole ring (FIG. 27). Compound 1 was then subjected to structure activity relationship studies by systematically dividing the structure into 6 different sites of modification (sites A, B, C, D, E and F) as shown in FIG. 27. Site A was assigned the 4-substituent of thiazole ring, site B was the thiazole ring itself, site C was the central amide bond in the structure, site D was the benzene ring bearing 1,4-carboxyl and sulfamoyl group, site E was the sulfonamide functional group and site F was the amide substituent on the sulfamoyl group.

The synthesis of compound 1 required the 2 advanced synthons (compounds 4 and 8a) as shown in Scheme 1. These 2 synthons were coupled using HATU reagent via amide bond to yield compound 1. A similar strategy was used for the synthesis of SAR analogs where the advanced synthon 4 was used for syntheses of site A and site B modified compounds while synthon 8a was utilized for syntheses of site D, E and F modified compounds.

The site A modified SAR studies were begun by first eliminating one methyl unit at a time of the 2,5-dimethylphenyl substituent to obtain 2-methyl and 3-methyl substituted compounds 12b and 12c, respectively (Scheme 1). These compounds were evaluated for induction of NF-κB activity in both the presence and absence of LPS to evaluate the enhancing as well as direct inducing effects of the compounds. However, both these des-methyl compounds were found to be inactive under these conditions suggesting a bis-substituted phenyl provides for enhanced activity. Thus, the next 2 compounds, the methyl group at each position was changed with a bromo substituent with aims to verify the functional group compatibility and to use it as a reactive intermediate for further aromatic nucleophilic substitution type reaction. Thus 2-bromo-5-methyl substituted compound 12d and 5-bromo-2-methyl substituted compound 12e were synthesized as shown in Scheme 1. Since the corresponding acetophenone reagents (6d, 6e) for making these two compounds were not commercially available, they were synthesized from carboxylic acid (5d, 5e) precursors by Weinreb amide synthesis, followed by Grignard reaction with methyl magnesium bromide. Both these bromo substituted analogs were active suggesting these can be utilized for further modification. Next, the 2,5-dimethyl substituent was spaced away from thiazole ring spaced by a methylene unit to obtain compounds 12f, however the compound was inactive under these conditions suggesting a bi-aryl conformation allows for enhanced activity. In the next set of compounds, it was probed if the phenyl ring can be replaced with nonpolar aliphatic substituents of small and bulky sizes. Thus 4-thiazole substituted methyl (12g), ethyl (12h), propyl (12i), iso-pentyl (12j) and tert-butyl (12k) analogs were synthesized. None of these molecules had any NF-κB activity under these conditions suggesting that a bis-substituted phenyl group allows for enhanced activity.

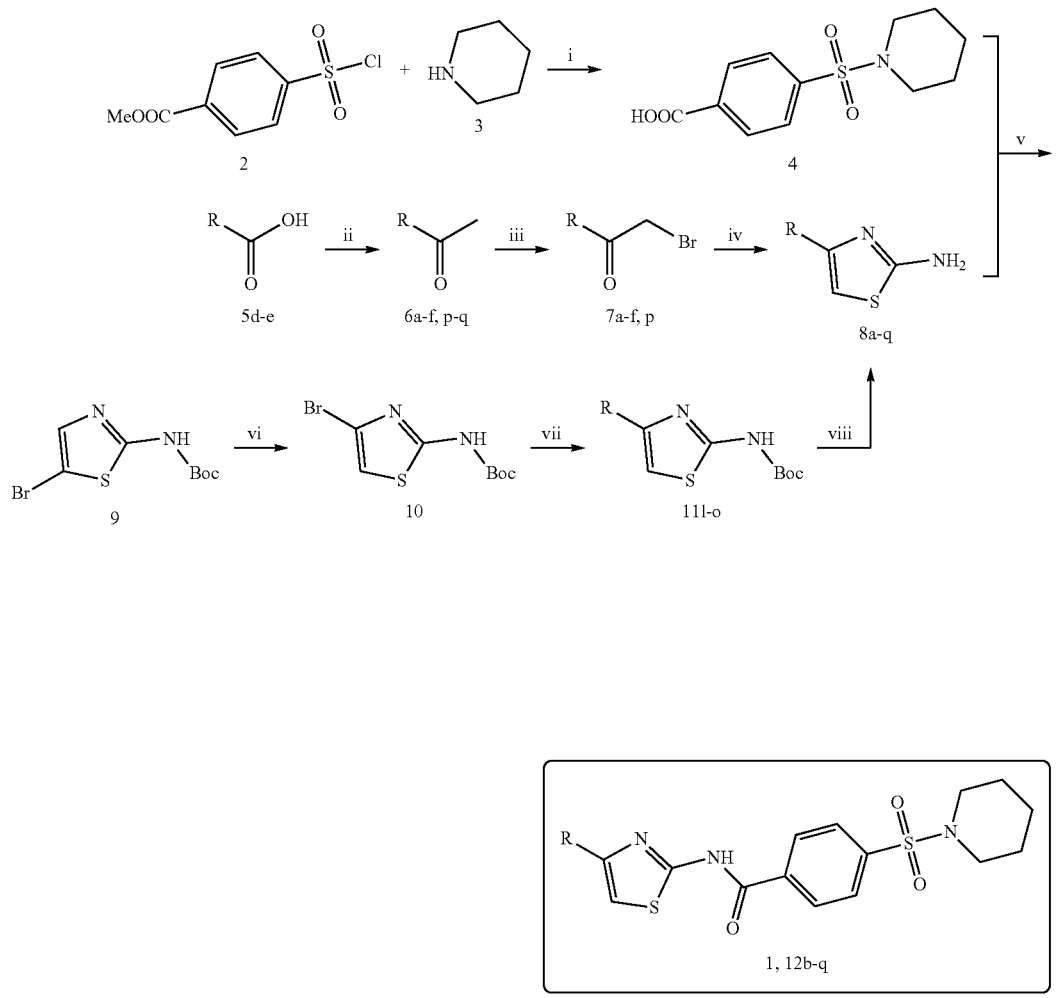

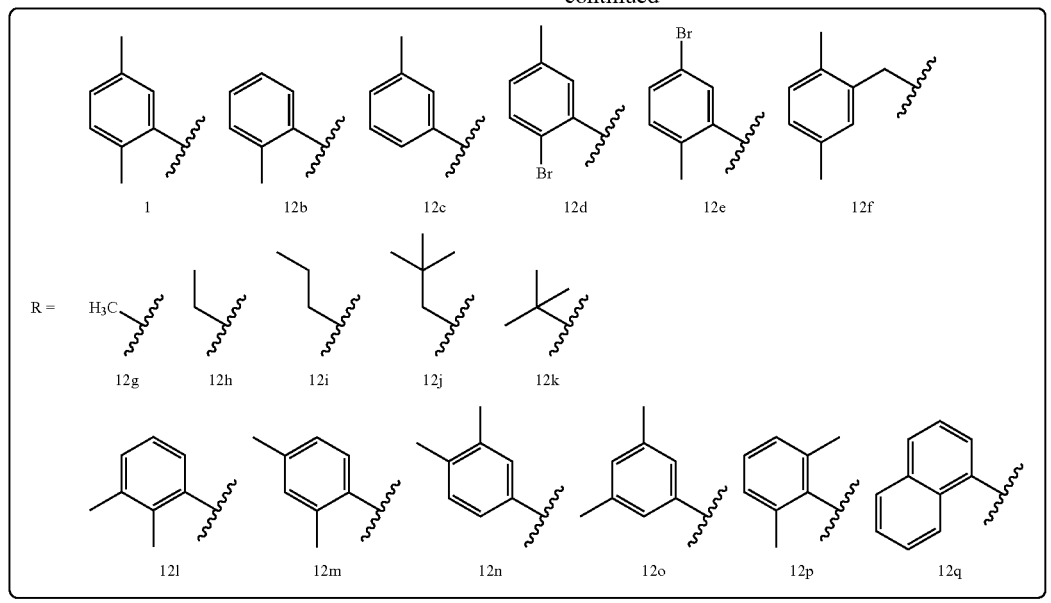

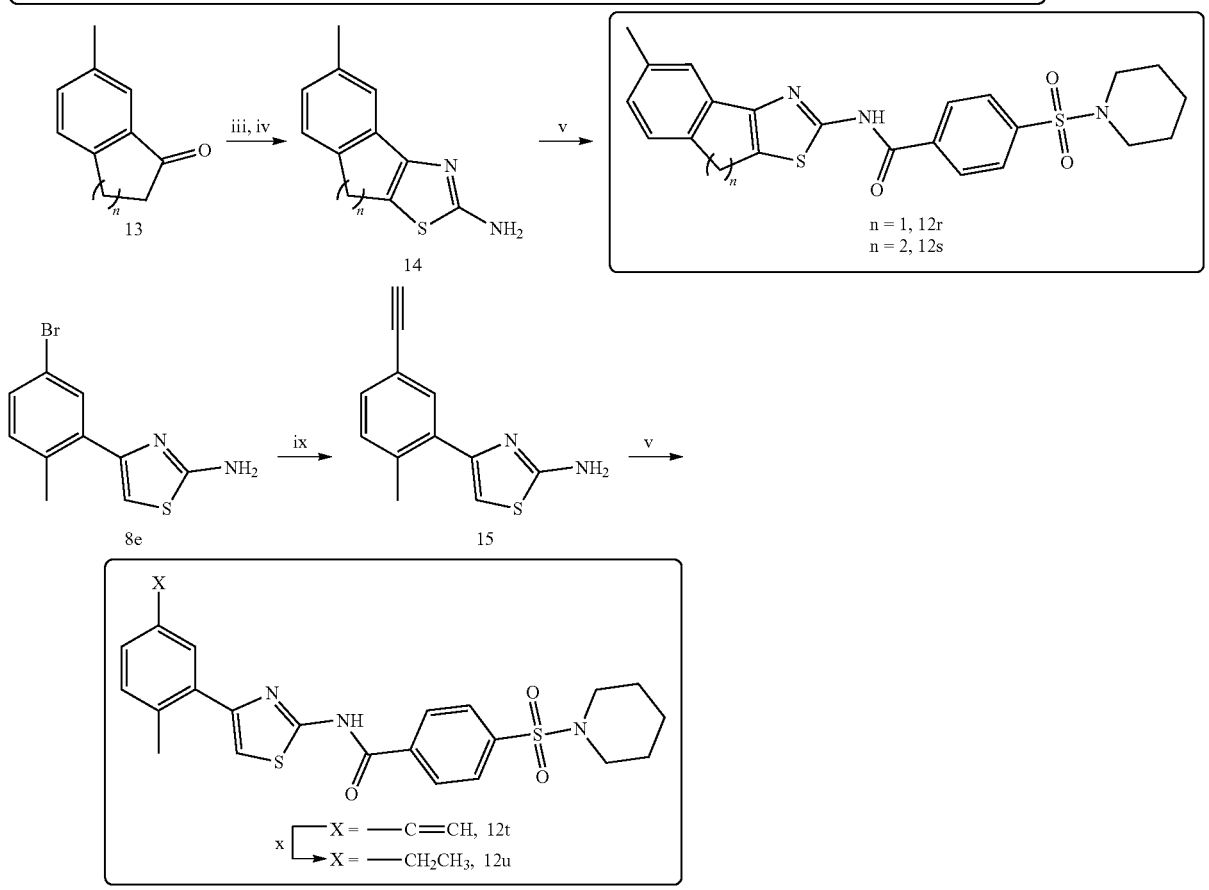

Reagents and conditions: i. (a) Et₃N, CH₂Cl₂, (b) LiOH, MeOH/THF/H₂O; ii. (a) N,O-Dimethylhydroxylamine hydrochloride, HATU, Et₃N, DMF, (b) MeMgBr, THF; iii. Br₂, CHCl₃ iv. thiourea, EtOH, 100° C.; v. HATU, Et₃N, DMF; vi. N,N-diisopropylamine, n-BuLi, THF; vii. (a) RB(OH)₂, Pd(PPh₃)₄, Na₂CO₃, DMF/H₂O; viii. 4N HCl/dioxane; ix. (a) TMS acetylene, CuI, Pd(PPh₃)₄, DMF (b) TBAF, THF; x. Pd/C, H₂, MeOH.

Thus, the substitution of the two methyl groups on the phenyl was varied to identify any pattern correlated with activity. Molecules bearing all the different bis-methyl substituted configurations at ortho (o), meta (m), and para (p) positions were synthesized. This included o,m (2,3-dimethyl, 12l), o,p (2,4-dimethyl, 12m), m,p (3,4-dimethyl, 12n), m,m (3,5-dimethyl, 12o), and o,o (2,6-dimethyl, 12p) analogs as shown in Scheme 1. In order to evaluate an alternate route to synthesis for these analogs from perspective of improving synthetic yields and accessing aryl compounds for which the ketone synthon is not available, the tert-butyl (5-bromothiazol-2-yl)carbamate (9) was synthesized by performing a halogen dance reaction to migrate the bromo to position 4 on the thiazole ring and then it was used as a common precursor for different 'Suzuki coupling' reactions, followed by N-Boc removal using HCl/dioxane and HATU assisted coupling reaction with 4 to obtain the differently substituted bis-methyl analogs 12l-12o. Since the attempts to perform the 'Suzuki coupling' reaction with 2,6-dimethylphenyl boronic acid to obtain compound 12p failed likely due to steric hindrance, the ketone precursor 6p was used to obtain the bis ortho analog 12p. Of all these compounds, only the ortho and meta substitution bearing compounds 12l and 12p retained activity while others were inactive under these conditions. It is to be noted that even compound 1 is o,m (2,5-dimethyl) substituted suggesting that substitution closer to the thiazole ring is tolerated while expansion on the ring at the para position is likely not tolerated. Based on this observation, the o,m position was expanded on the same side of the phenyl ring to obtain a α-naphthyl analog 12q which was found to be equally potent justifying the hypothesis. Encouraged by the acceptance of steric bulk around the thiazole ring, the conformation was locked on the phenyl and the thiazole ring by forming a 5 or 6 membered ring connecting the ortho position of phenyl ring to position 5 of the thiazole to obtain compound 12r and 12s, respectively. However, both these compounds were weakly active suggesting a possibility of a different conformation for optimal activity. SAR learnt was used to derivatize the bromo to expand at the ortho and meta position on the phenyl ring. The attempts to displace the bromo substituent with an ethynyl unit at the ortho position of 12d failed but could obtain the corresponding ethynyl substituted compounds 12t using 'Sonogashira' coupling reaction. These analogs were further reduced using catalytic hydrogenation to obtain the chain expanded 5-ethyl-2-methyl analog 12u. While, the ethynyl analog 12t was inactive under these conditions, releasing the rigidity of the carbon-carbon bond as in 12u resulted in activity.

Figure 28:
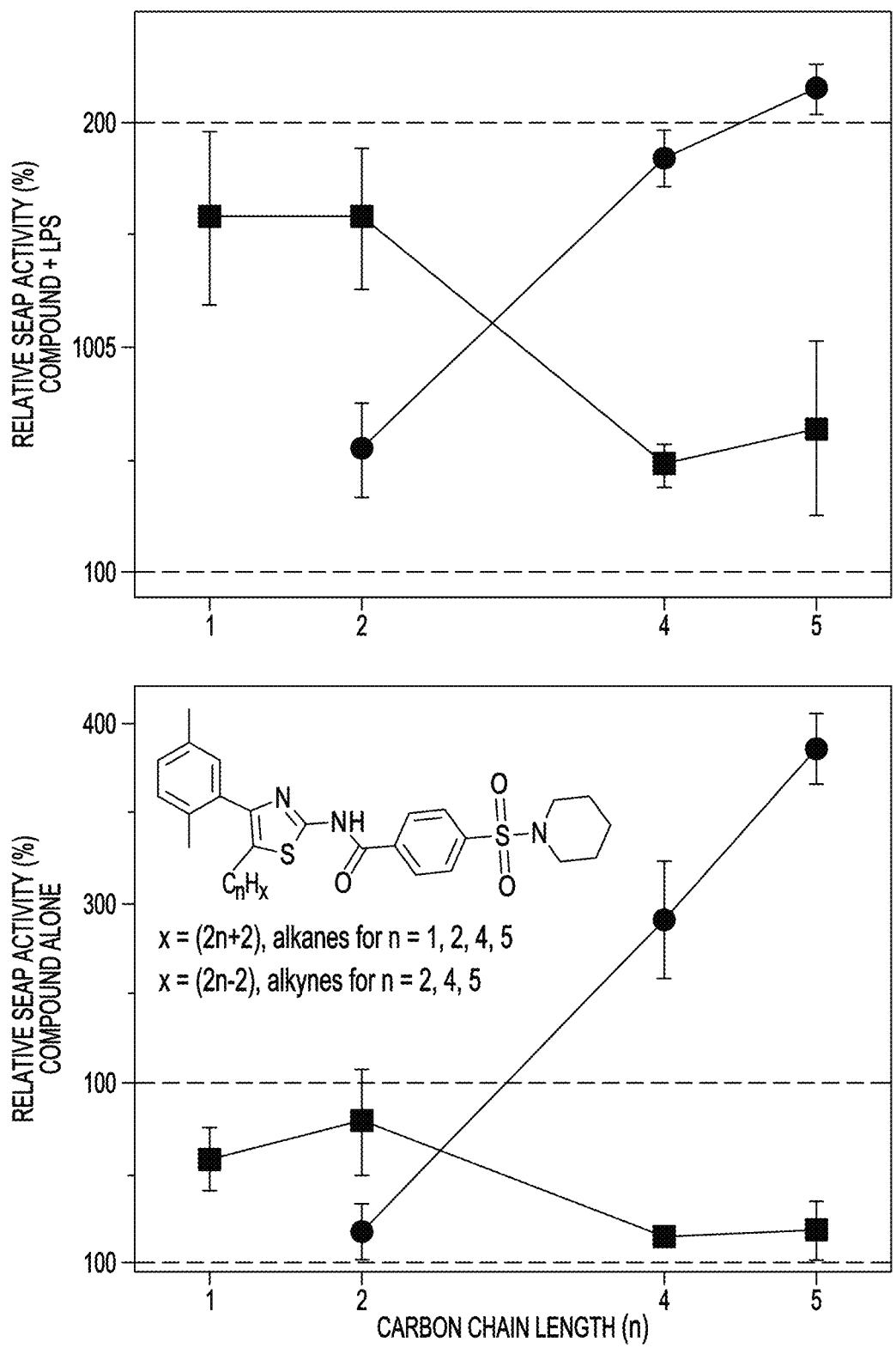
FIG. 28. Chain length dependent activity profile in 5-thiazolyl site B modified analogs with LPS (Top) and without LPS (bottom). Differential activity profile was observed for alkane v/s alkyne bearing analogs at 5-thiazolyl position of compound 1. Chain length (n) dependent reduction in activity was observed for 5-thiazolyl modified alkanes (green squares) but an inverse activity relationship was observed with corresponding alkynes (blue circles). The % activation values in NF-κB induction assays with and without LPS were two point normalized between compound 1 as 200% (grey dotted line) and LPS (10 ng/mL) or DMSO as 100% (grey dotted line). The relative reduction in the activity for terminal alkane compounds was significantly greater than the terminal alkynes for the same chain length suggesting involvement of π-π interactions. NF-κB activity is shown in blue squares and ISRE activity is shown in red circles. Structure of the compounds is shown as inset in the bottom panel with variable chain length 'n' varying from 1, 2, 4 and 5. Data are presented as mean±SD. p<0.01 and *p<0.001 for alkyne bearing compounds compared to alkane bearing compounds for the same chain length using two-way ANOVA followed by Bonferroni post hoc analysis.

Thiazole moiety usually are part of pharmacophore and it was of interest to see an alternate heterocycle could replace it without losing activity. Imidazole analog 18a, different bioisosteric pyridine analogs including 2-amino-6-aryl (18b), 2oamino-5-aryl (18c) and 3-amino-6-aryl (18d) substituted pyridine analogs, were synthesized. In addition, flipping the thiazole moiety yielded 5-phenyl substituted compound 18e and addition of another nitrogen atom at position 5 yielded azathiazole analog 18f (Scheme 2). However, none of these molecules that replaced the thiazole functionality were active under the tested conditions, suggesting that thiazole may be involved in interactions with the receptor component necessary for activity, and so substituting at position 5 on the ring was accomplished. Bromination of compound 8a using N-bromosuccinimide allowed introduction of 5-bromo on the thiazole. The 5-bromo was displaced using different reagents to obtain substituted amine analogs 18g and 18h, 'Suzuki reaction' derived phenyl analog 18i and furan analog 18j, and ethanethiol and ethoxide displaced the 5-bromo to obtain corresponding analogs 18k and 18l, respectively. All of these compounds were completely inactive under the tested conditions except ethoxy analog 18l showed partial activity suggesting linear chain may be tolerated. Thus, a 5-methyl analog 18m was first synthesized 18m using the earlier discussed chemistry as shown in Scheme 2. The 5-bromo-2-aminothaizole was amide linked to obtain the bromo analog (18n) of compound 1, which was derivatized to obtain a series on carboalkyl chains including 2-carbon, 4-carbon and 5-carbon alkynyls 18o, 18p, 18q, respectively and their corresponding alkyl derivatives 18r, 18s, 18t obtained by catalytic hydrogenation of alkynes. As hypothesized, these compounds were potent in inducing NF-κB activity and there was a chain length dependent activity trend as shown in FIG. 28. The smaller alkyl chain analogs 18r and 18s retained activity while the higher analog showed loss in activity. In contrast, the ethylnyl 18o had weak activity while higher chain analogs 18p and 18q were very potent surpassing the activity of compound 1 when tested alone (FIG. 28).

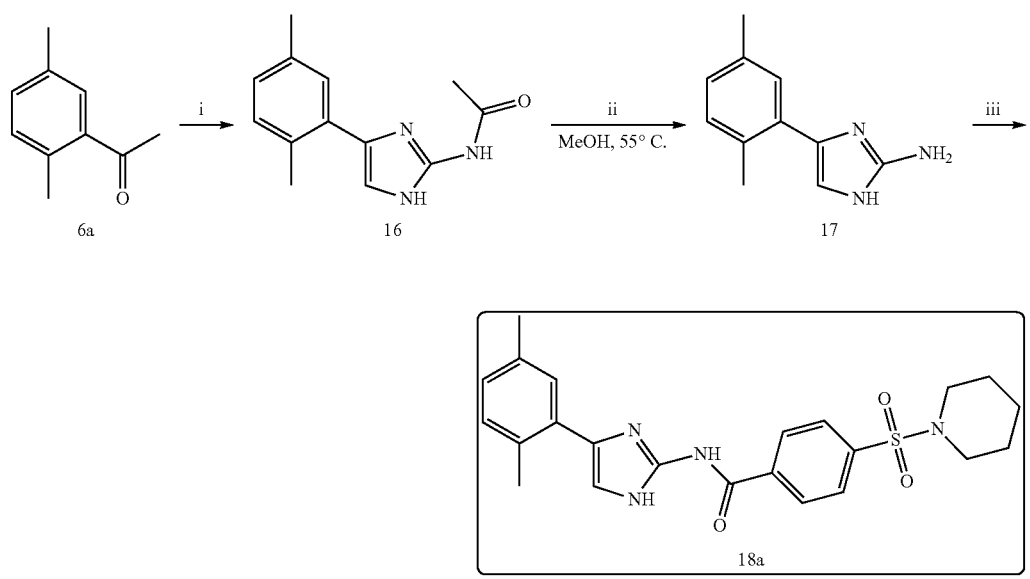

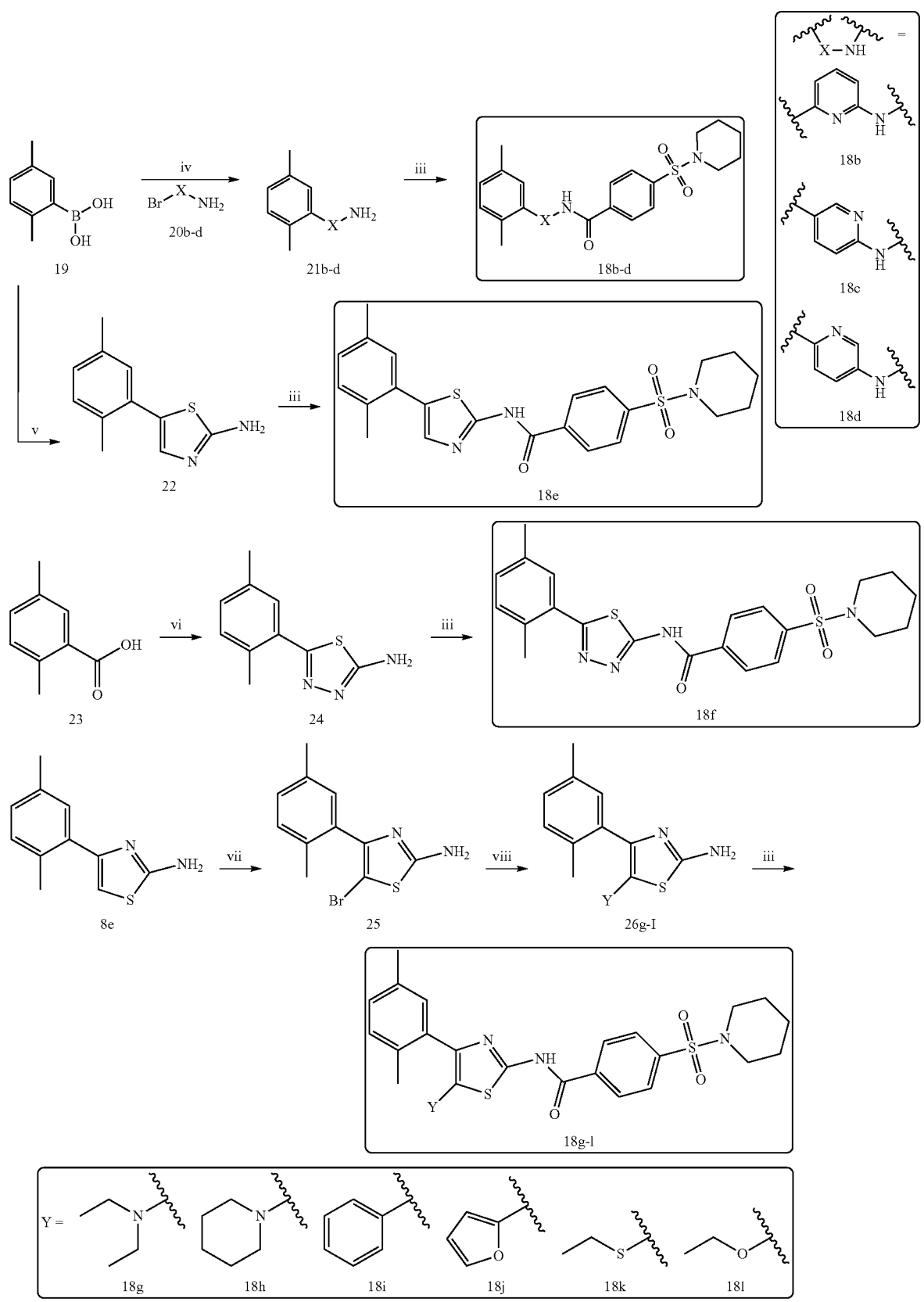

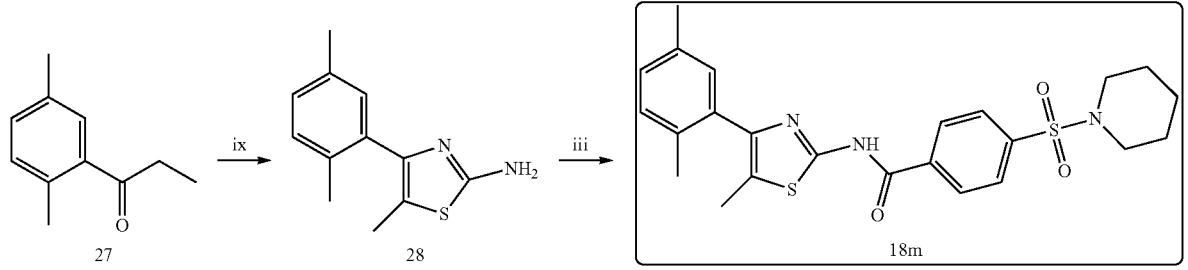

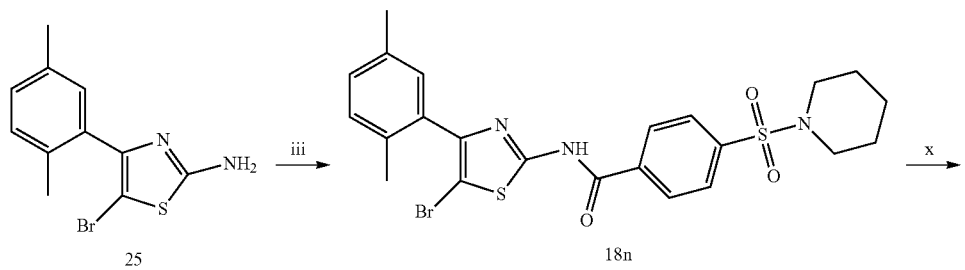

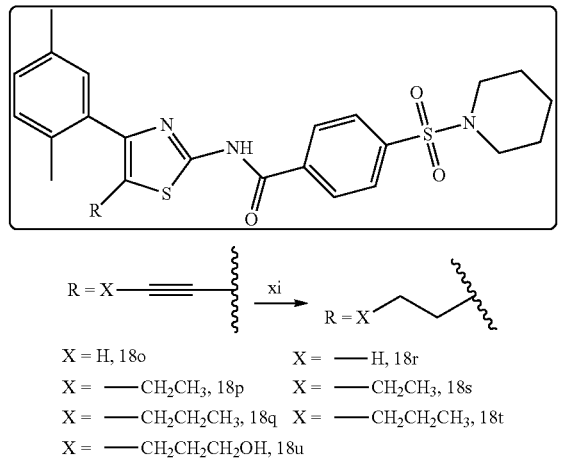

Reagents and conditions: i. (a) Br₂, CHCl₃, (b) 1-acetylguanidine, DMF; ii. 3M HCl, MeOH, 55° C.; iii. 4, HATU, ET3N, DMF, 45° C.; iv. Pd(PPh₃)₄, Na₂CO₃, DMF/H₂O; v. (a) 9, Pd(PPh₃)₄, Na₂CO₃, DMF/H₂O, (b) 4N HCl/dioxane; vi. thiosemicarbazide, POCl₃, 105° C.; vii. N-bromosuccinimide, CH₂Cl₂; vii. For compound 18 g: Pd(dppf)Cl₂, Et₂NH, dioxane, for compound 18h: piperidine, NaH, DMF, for compound 18i and 18j: Y-B(OH)₂, Pd(PPh₃)₄, Na₂CO₃, DMF/H₂O; for compound 18k or 18l: NaY, DMF; ix. (a) Br₂, CHCl₃, (b) thiourea, EtOH, 100° C.; x. For compound 18o: (a) TMS acetylene, Pd(PPh₃)₄, CuI, Et₂NH, (b) TBAF, THF, For compounds 18p-q: RH, Pd(PPh₃)₄, CuI, Et₂NH; xi/ Pd/C, H₂, 50 psi, MeOH.

Next, site C modified compounds required us to make new synthons as the amide linking synthetic strategy utilized so far cannot be used since the effect of changing this amide linkage was of interest. Thus, an amine linked analog 34a and an inverse amide linked compounds 34b were synthesized as shown in Scheme 3. The alkylation of the amide nitrogen yielded N-methyl analog 34c and N-propargyl analog 34d. The importance of the hydrogen bond forming capabilities and positioning of the amide link was evident as all these site C modified analogs were inactive under the tested conditions except the inverse amide linked compound 34b retaining only weak activity.

Scheme 3. Syntheses of site C modified compounds.
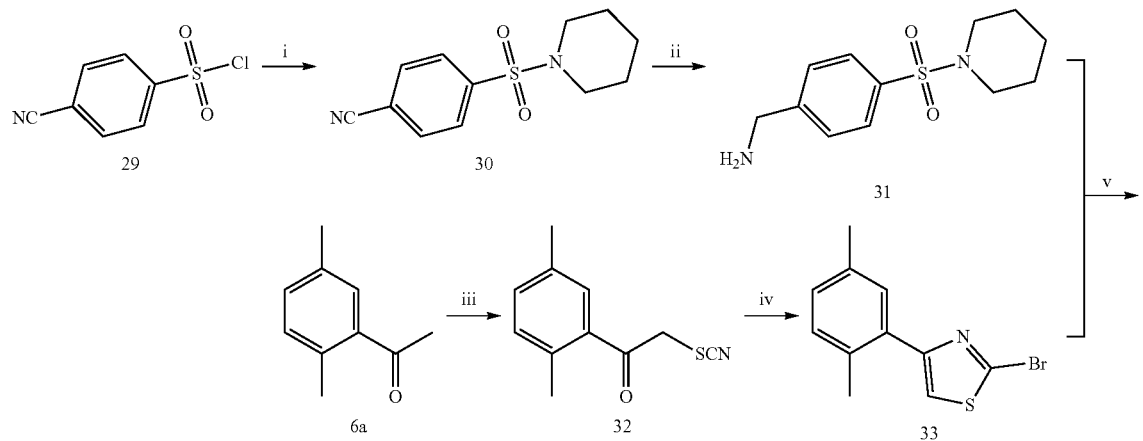
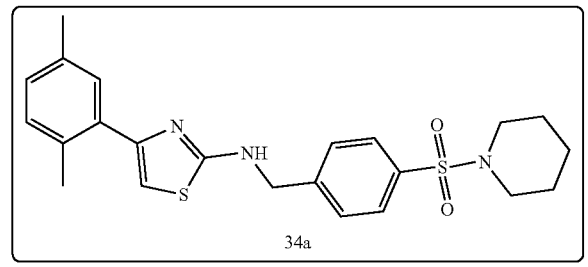
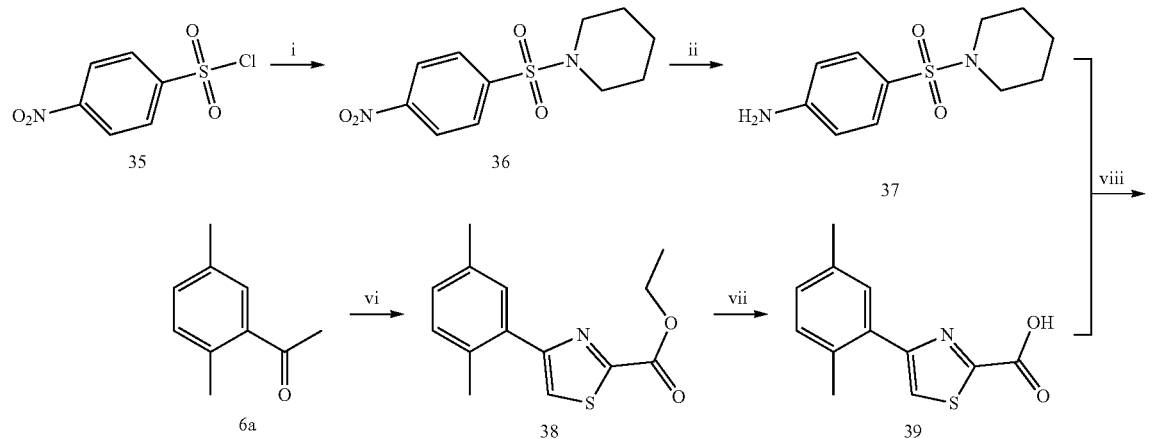
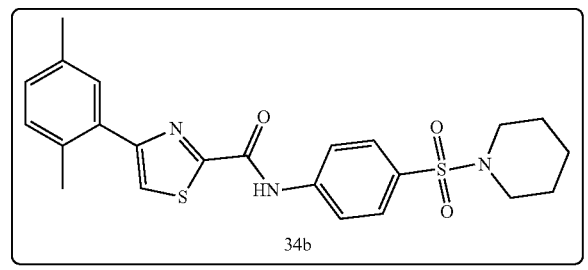

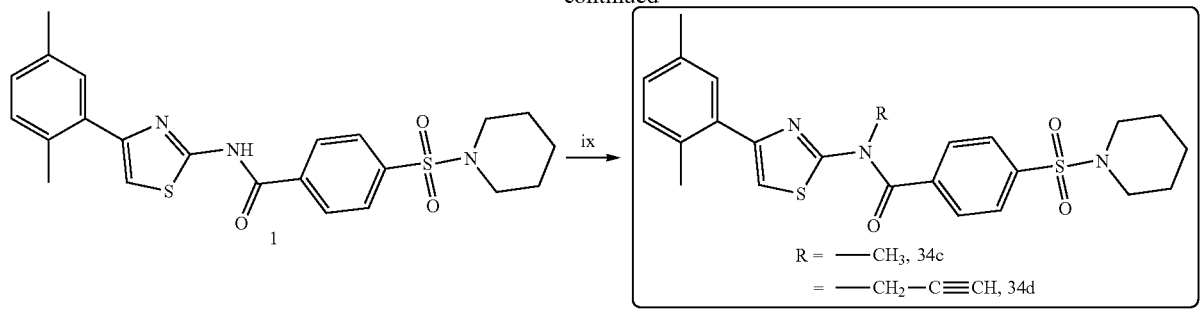

Reagents and conditions: i. K2CO3, DMF; ii. H₂, Pd/C, MeOH; iii. Br₂, CHCl₃, NaSCN; iv. HBr/AcOH, 130° C.; v. Pd(OAc)₂, dioxane; vi. Ethylthioxamate, EtOH, 120° C.; vii. LiOH, MeOH, THF, H₂O; viii. HATU, Et₃N, DMF; ix. for compound 34c: iodomethane, NaH, DMF, for compound 34d: propargyl bromide, NaH, DMF.

Site D modification included bio-isosteric replacement of benzene ring with pyridine to obtain compounds 46a and 46b and thiophene to obtain compound 46c (Scheme 4). Site E modification involved changing the sulfonamide bond. This included elimination of hydrophilic interaction capable atoms like the sulfonamide nitrogen sulfone oxygens to obtain thioether analog 49a, which was oxidized to yield sulfone analog 49b. Replacement of sulfonamide with carbonylamide at position 4 and 3 provided compounds 49c and 49d, respectively as shown in Scheme 4. Surprisingly, none of these modifications at site D or E were tolerated under the tested conditions. Overall, the SAR studies so far suggested that the sulfamoyl benzamide thiazole component consisting of sites B, C, D and E provide for activity and may represent the core pharmacophore. Thus, for curiosity the carbonyl amide bond was swapped with the sulfonamide bond to obtain compound 55 but was also found to be inactive under the tested conditions.

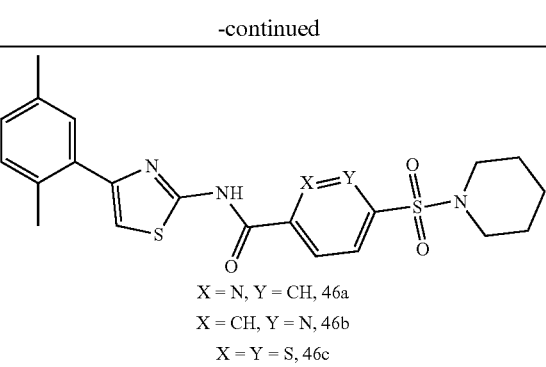

Scheme 4. Syntheses of sites D and E modified compounds.

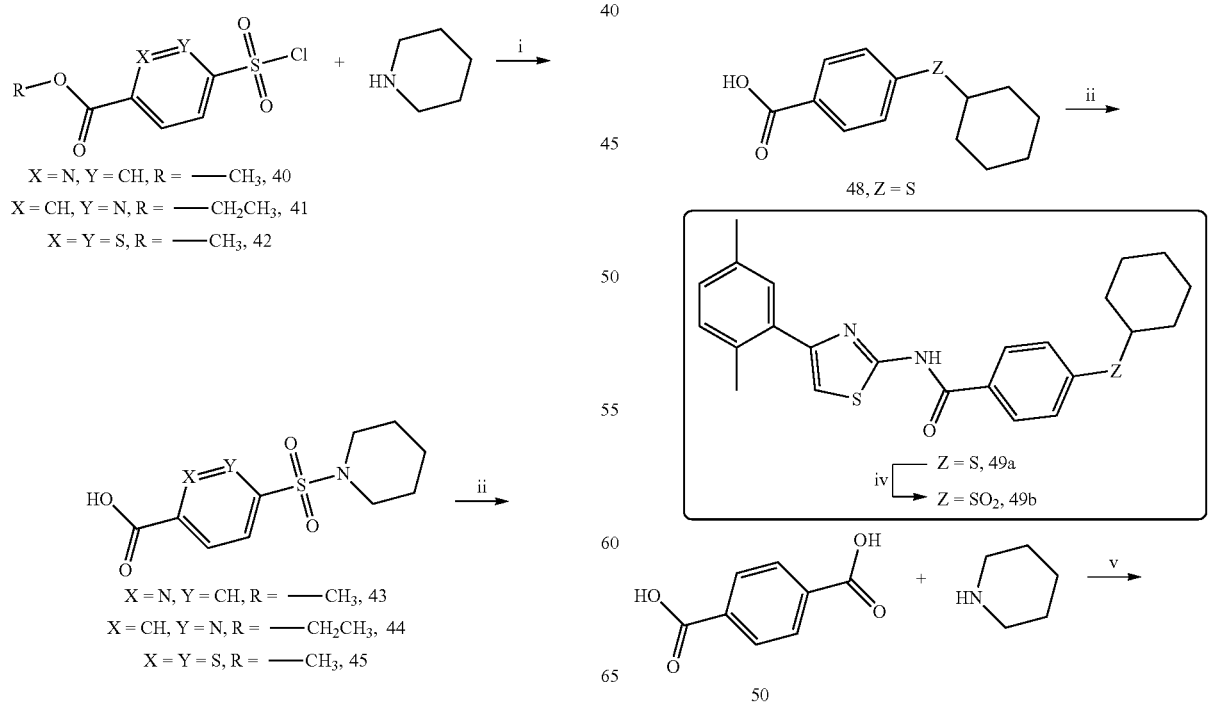

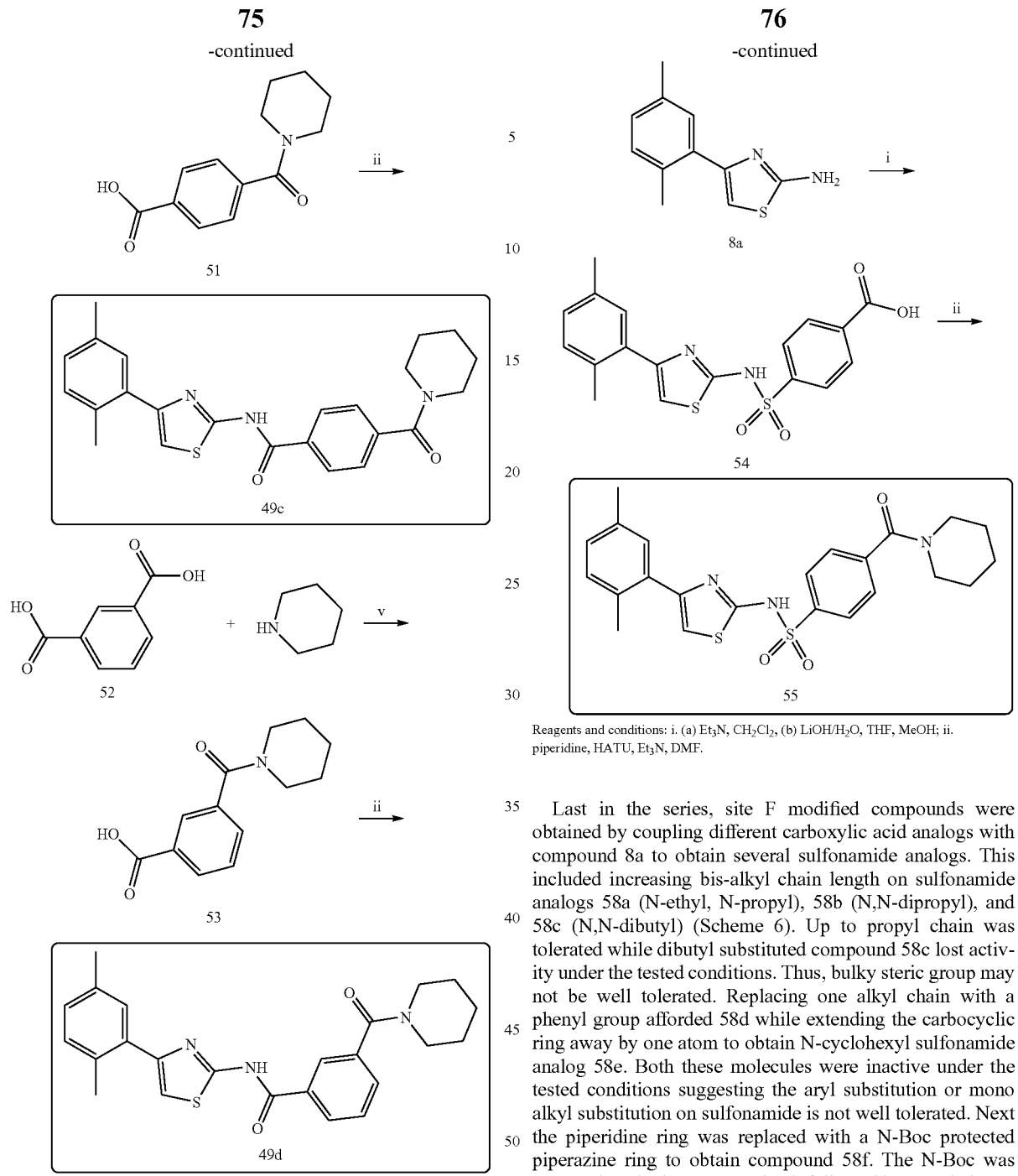

Reagents and conditions: i. (a) Et₃N, CH₂Cl₂, (b) LiOH/H₂O, THF, MeOH; ii. piperidine, HATU, Et₃N, DMF.

Last in the series, site F modified compounds were obtained by coupling different carboxylic acid analogs with compound 8a to obtain several sulfonamide analogs. This included increasing bis-alkyl chain length on sulfonamide analogs 58a (N-ethyl, N-propyl), 58b (N,N-dipropyl), and 58c (N,N-dibutyl) (Scheme 6). Up to propyl chain was tolerated while dibutyl substituted compound 58c lost activity under the tested conditions. Thus, bulky steric group may not be well tolerated. Replacing one alkyl chain with a phenyl group afforded 58d while extending the carbocyclic ring away by one atom to obtain N-cyclohexyl sulfonamide analog 58e. Both these molecules were inactive under the tested conditions suggesting the aryl substitution or mono alkyl substitution on sulfonamide is not well tolerated. Next the piperidine ring was replaced with a N-Boc protected piperazine ring to obtain compound 58f. The N-Boc was removed to obtain compound 58i, followed by acetylation to obtain 58j or alkylation to obtain N-propyl analog 58k (Scheme 6). All the piperazine bearing molecules were found to be inactive under the tested conditions resulting in refocusing on substituted piperidine analogs. Thus, the 4-ethoxy and 4-propyl substituted piperidine analogs 58g and 58h, respectively, were synthesized as shown in Scheme 6. Both these 4-substituted piperidine analogs were active and propyl substituted 58h was very potent when tested alone.

Both the bioactivity data (Table 2) and the SAR studies pointed to the most potent compounds on sites A, B and F as 12d, 18q and 58h, respectively. These structural features were combined in different combinations to obtain hybrid compounds. Combining the structural feature of 2-bromo substitution on the 4-phneylthiazole as in 12d (site A modified compound) with 4-propylpieridine feature as in 58h (site F modified compound) yielded compound 59 as shown in Scheme 7. Similarly, combining Site B and F provided compound 61 and combining site A and B provided compound 64. Inclusive of all the structural features that provided potent activities led us to compound 65 (Scheme 7). All the hybrids were very potent and showed better potency than compound 1.

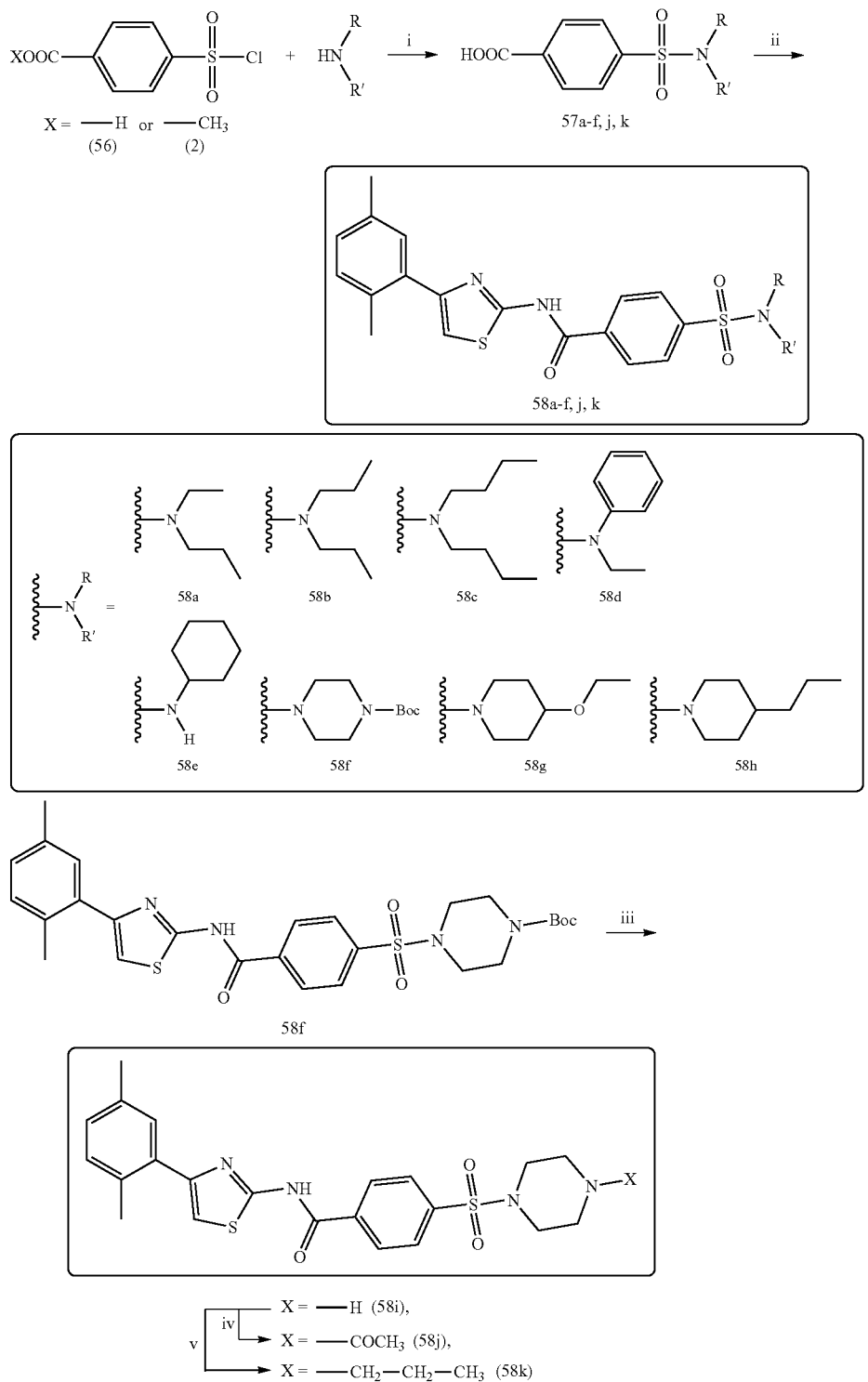

Scheme 6. Syntheses of sites F modifies compounds.

Reagents and condtitions: i. For X = H: Et₃N, CH₂Cl₂, For X = —CH₃ : (a) Et₃N, CH₂Cl₂, (b) LiOH, MeOH, THF, H₂O; ii. 8a, HATU, Et₃N, DMF; iii. 4N HCl/dioxane; iv CH₃COCl, Et₃N, DMF; v. C₃H₇I, K₂CO₃, DMF.

Scheme 7. Synthesis of hybrid analogs.

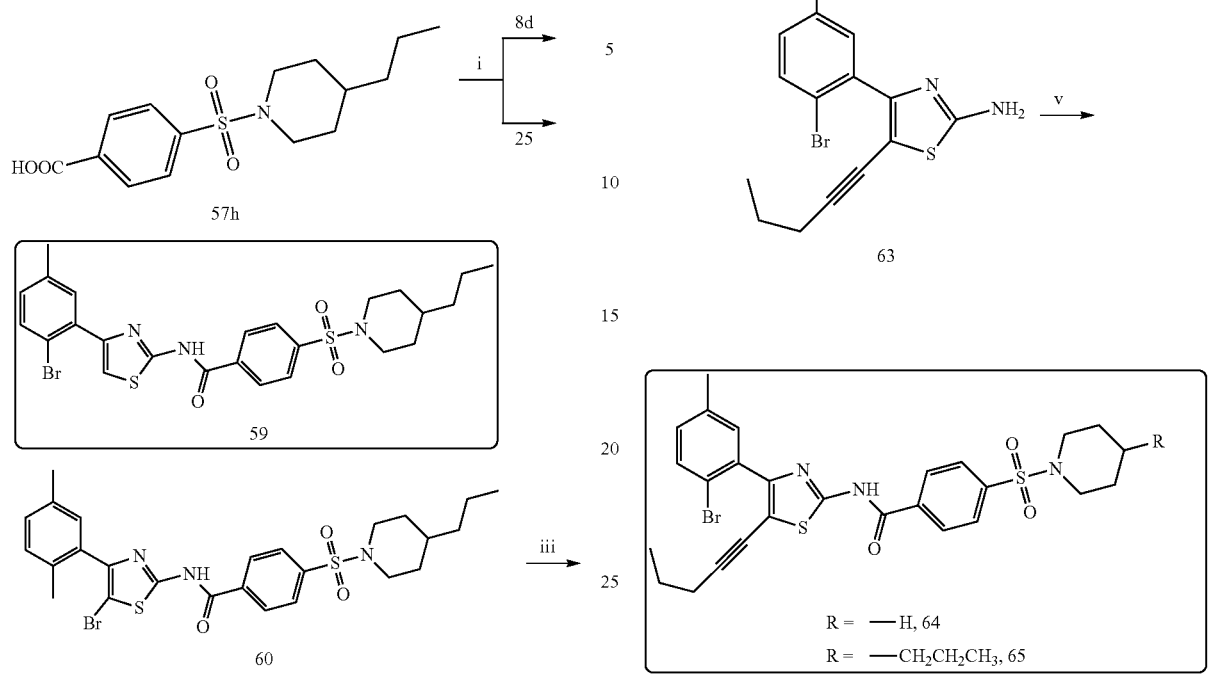

Reagents and conditions: i. (a) HATU, Et₃N, DMF; ii. pentyne, Pd(PPh₃)₄, CuI, DMF; iii 57h, HATU, Et₃N, DMF; iv. N-iodosuccinimide, CH₂Cl₂; v. for compound 64: 4, HATU, Et₃N, DMF and for compound 65: 57 h, HATU, Et₃N, DMF.

Another aspect of SAR studies is to make affinity and photoaffinity probes for target identification by introducing aryl azide and alkyne functional groups. Based on the data, azide functionality was introduced at site A by displacing bromo to obtain 3-azido and 2-azido analogs 67 and 70, respectively as shown in Scheme 8. While 2-azido compound 70 was inactive under the tested conditions, the 3-azido compound 67 retained activity, thus allowing utilization of site A for introducing photoreactive aryl azide functional group.

Scheme 8. Syntheses of aryl azide bearing site A modified analogs.

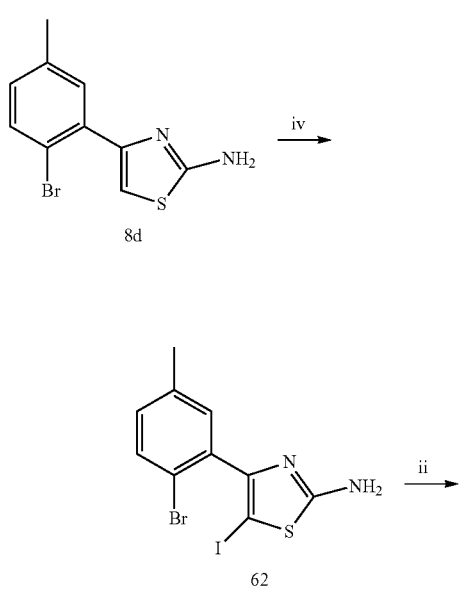

-continued

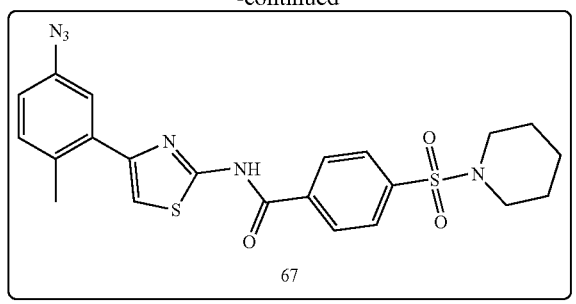

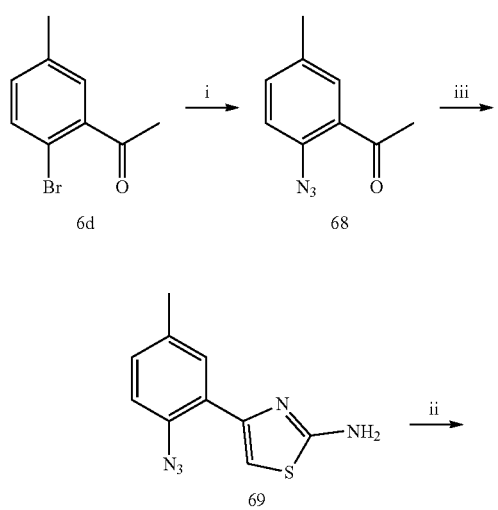

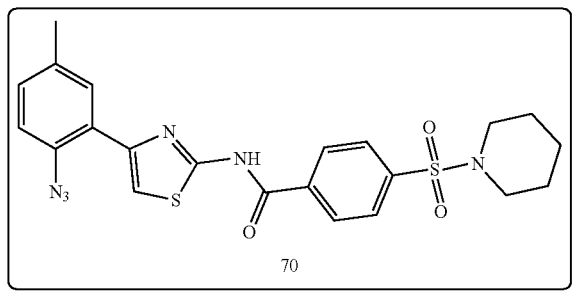

Reagents and conditions: i. CuI, 1,2-Dimethylethylenediamine, NaN₃, DMF, microwave 100° C.; ii. HATU, Et₃N, DMF; iii. (a) Br₂, CHCl₃, (b) thiourea, EtOH, 100° C.

Next, in order to introduce a reactive tag for pull down approaches such as an alkyne, site F. was probed. A series of propargyl bearing compounds such as N-propargyl 72a, N-ethyl,N-propargyl 72b and N-propyl,N-propargyl 72c were synthesized as shown in Scheme 9. While the fully reduced analogs 58a and 58b were active (Table 2), the corresponding alkyne bearing compounds lost their activity under the tested conditions. Thus, position 4 of the piperidine ring was used to introduce the ethyne and diazirine group (another photoreactive functional group) to obtain compounds 72d and 72e, respectively. Both of these molecules were active which allowed for making the photoaffinity probes by combining the active aryl azide attribute of compound 67 and alkyne attribute of compound 72d. This was done by HATU coupling of 66 and 71d to obtain photoaffinity probe 73 as shown in Scheme 10.

Scheme 9. Syntheses of diazirine and alkyne bearing site F modified analogs.

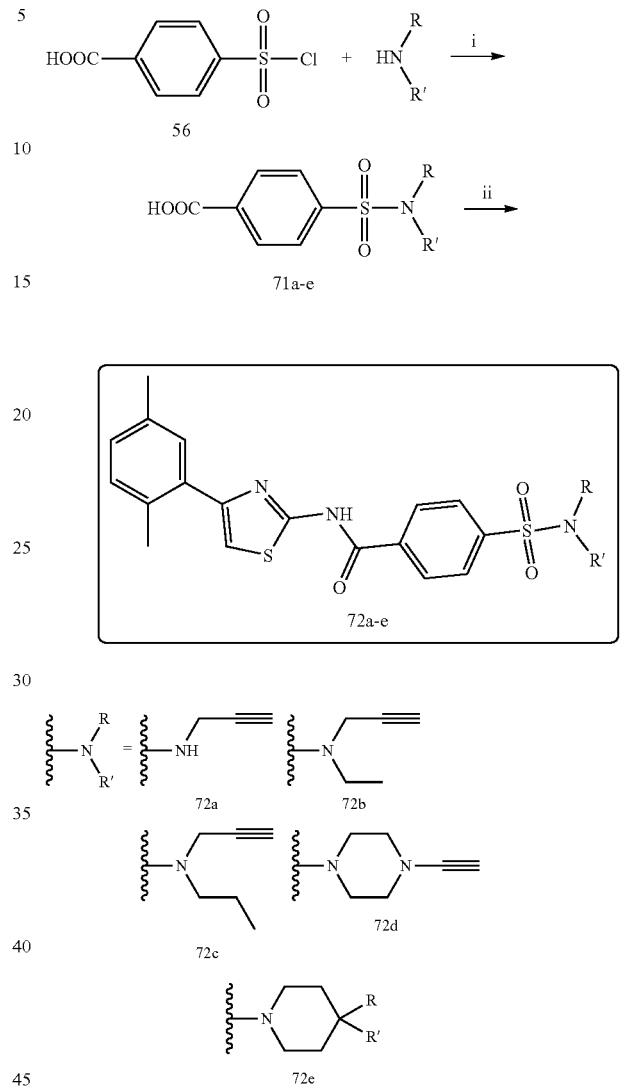

Reagents and conditions: i, Et₃N, CH₂Cl₂; ii. 8a, HATU, Et₃N, DMF.

Scheme 10. Syntheses of photoaffinity probe.

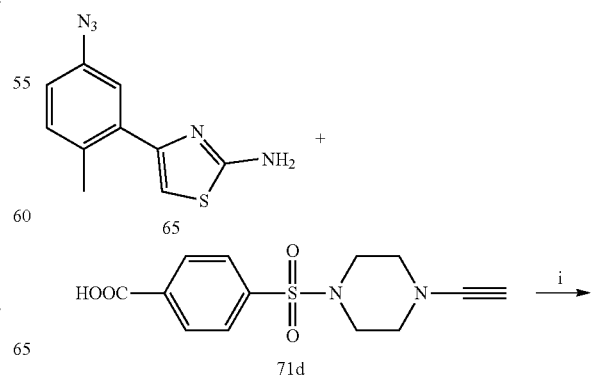

-continued

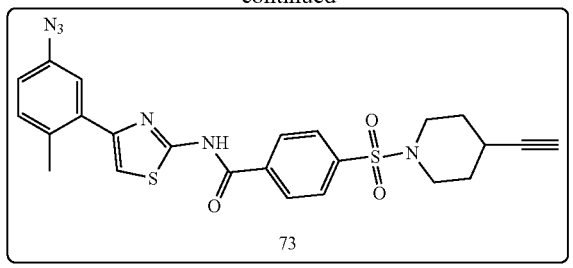

Reagents and conditions: i. HATU, Et₃N, DMF.

TABLE 2

Bioactivity data for all the synthesized compounds.

| Compound number | Modified Site | NF-κB SEAP[a] Compound alone % Activation | SEM | NF-κB SEAP[a] Compound + LPS % Activation | SEM | NF-κB FRET[a] Compound + LPS % Activation | SEM | MTT[a] Compound alone % Viability | SEM |
|---|---|---|---|---|---|---|---|---|---|
| 1   | —  | 200.00 | —    | 200.00 | —    | 200.00 | —    | 102.81 | 3.3  |
| 12b | A  | 99.20  | 0.3  | 104.74 | 0.6  | 100.13 | 2.9  | 95.69  | 1.5  |
| 12c | A  | 99.55  | 0.3  | 98.60  | 1.0  | 78.98  | 3.1  | 96.06  | 1.4  |
| 12d | A  | 253.86 | 12.2 | 222.63 | 4.6  | 197.32 | 5.1  | 98.2.7 | 3.0  |
| 12e | A  | 206.71 | 15.9 | 213.45 | 9.6  | 189.97 | 16.4 | 91.50  | 5.8  |
| 12f | A  | 101.89 | 2.4  | 108.02 | 8.2  | N.T.   | N.T. | 97.02  | 3.0  |
| 12g | A  | 99.87  | 0.3  | 100.52 | 2.1  | 110.48 | 1.6  | 114.29 | 5.6  |
| 12h | A  | 98.67  | 0.4  | 93.99  | 1.2  | 108.38 | 0.8  | 122.75 | 3.8  |
| 12i | A  | 99.20  | 0.1  | 94.17  | 2.1  | 112.46 | 2.9  | 122.66 | 3.6  |
| 12j | A  | 99.47  | 0.1  | 93.88  | 1.0  | 110.62 | 1.7  | 125.52 | 5.6  |
| 12k | A  | 99.47  | 0.3  | 94.13  | 4.0  | N.T.   | N.T. | 127.74 | 3.9  |
| 12l | A  | 194.74 | 22.9 | 157.18 | 0.8  | 206.60 | 15.1 | 98.37  | 4.6  |
| 12m | A  | 98.50  | 0.4  | 86.72  | 0.7  | 161.33 | 29.4 | 101.40 | 5.1  |
| 12n | A  | 98.65  | 0.8  | 98.02  | 3.2  | 128.01 | 14.6 | 97.59  | 4.3  |
| 12o | A  | 98.20  | 0.5  | 93.17  | 1.5  | 170.36 | 33.3 | 92.91  | 4.1  |
| 12p | A  | 185.48 | 4.5  | 208.64 | 8.4  | N.T.   | N.T. | 99.64  | 6.1  |
| 12q | A  | 197.56 | 7.9  | 200.05 | 12.4 | N.T.   | N.T. | 92.71  | 4.4  |
| 12r | A  | 101.50 | 0.9  | 95.58  | 1.3  | 129.01 | 15.7 | 82.46  | 2.6  |
| 12s | A  | 127.97 | 10.5 | 141.38 | 5.1  | 159.62 | 20.3 | 102.16 | 4.1  |
| 12t | A  | 101.27 | 1.2  | 89.96  | 0.6  | 88.20  | 1.0  | 82.42  | 5.8  |
| 12u | A  | 215.74 | 2.5  | 199.72 | 2.7  | N.T.   | N.T. | N.T.   | N.T. |
| 18a | B  | 99.28  | 0.9  | 97.34  | 4.6  | 142.21 | 8.9  | 50.69  | 0.6  |
| 18b | B  | 99.61  | 1.2  | 112.2.9| 4.5  | 146.10 | 9.5  | 93.89  | 1.7  |
| 18c | B  | 98.27  | 0.2  | 97.89  | 1.0  | 73.65  | 7.4  | 92.06  | 3.4  |
| 18d | B  | 98.21  | 0.3  | 97.15  | 1.8  | 58.39  | 1.3  | 95.35  | 2.2  |
| 18e | B  | 98.30  | 0.3  | 95.09  | 0.8  | N.T.   | N.T. | N.T.   | N.T. |
| 18f | B  | 99.71  | 0.2  | 147.69 | 20.0 | N.T.   | N.T. | 89.80  | 5.7  |
| 18g | B  | 97.96  | 0.1  | 98.13  | 0.6  | 92.64  | 0.4  | 94.30  | 5.0  |
| 18h | B  | 99.23  | 0.4  | 99.89  | 1.1  | 99.96  | 3.0  | 89.45  | 2.4  |
| 18i | B  | 98.33  | 0.3  | 98.41  | 0.7  | N.T.   | N.T. | N.T.   | N.T. |
| 18j | B  | 100.30 | 2.5  | 102.38 | 1.1  | 160.49 | 28.4 | 107.56 | 4.8  |
| 18k | B  | 100.75 | 0.8  | 104.47 | 3.9  | 167.51 | 28.3 | 111.74 | 4.1  |
| 18l | B  | 104.09 | 0.2  | 111.42 | 1.9  | N.T.   | N.T. | N.T.   | N.T. |
| 18m | B  | 158.52 | 7.2  | 178.81 | 7.8  | 186.92 | 4.4  | 96.90  | 7.8  |
| 18n | B  | 132.70 | 3.2  | 197.87 | 5.7  | 154.54 | 5.4  | 84.46  | 3.0  |
| 18o | B  | 118.38 | 5.3  | 153.22 | 13.2 | 101.71 | 1.8  | 111.27 | 6.2  |
| 18p | B  | 290.82 | 18.6 | 192.42 | 3.9  | 210.21 | 7.8  | 120.17 | 8.2  |
| 18q | B  | 393.37 | 12.2 | 241.87 | 16.9 | 215.78 | 4.7  | 105.84 | 3.9  |
| 18r | B  | 179.28 | 12.2 | 178.84 | 6.4  | N.T.   | N.T. | 103.66 | 3.1  |
| 18s | B  | 115.96 | 0.7  | 123.89 | 2.8  | 176.96 | 2.6  | 141.98 | 9.7  |
| 18t | B  | 118.95 | 9.3  | 132.14 | 11.1 | 213.25 | 14.7 | 110.37 | 4.4  |
| 18u | B  | 100.16 | 0.3  | 134.22 | 15.6 | N.T.   | N.T. | 104.08 | 3.3  |
| 34a | C  | 99.06  | 0.9  | 101.59 | 0.8  | 106.53 | 3.0  | 85.48  | 2.7  |
| 34b | C  | 98.80  | 0.8  | 104.11 | 2.8  | 134.57 | 9.6  | 91.08  | 1.7  |
| 34c | C  | 100.76 | 1.0  | 104.51 | 3.4  | 143.05 | 15.5 | 97.43  | 3.8  |
| 34d | C  | 100.93 | 0.3  | 97.70  | 0.9  | N.T.   | N.T. | N.T.   | N.T. |
| 46a | D  | 99.19  | 0.7  | 110.58 | 5.2  | 151.90 | 9.9  | 94.46  | 1.2  |
| 46b | D  | 100.00 | 1.1  | 115.20 | 5.3  | 146.35 | 13.2 | 88.57  | 2.0  |
| 46c | D  | 106.14 | 1.6  | 97.19  | 1.2  | N.T.   | N.T. | N.T.   | N.T. |
| 49a | E  | 99.69  | 0.5  | 113.56 | 5.9  | 139.79 | 18.3 | 85.22  | 2.5  |
| 49b | E  | 99.84  | 0.8  | 114.37 | 6.4  | 136.43 | 16.5 | 81.81  | 2.2  |
| 49c | E  | 99.29  | 0.6  | 108.93 | 5.4  | 134.09 | 20.0 | 87.59  | 0.8  |

TABLE 2-continued

Bioactivity data for all the synthesized compounds.

| Compound number | Modified Site | NF-κB SEAP[a] Compound alone | | NF-κB SEAP[a] Compound + LPS | | NF-κB FRET[a] Compound + LPS | | MTT[a] Compound alone | |
|---|---|---|---|---|---|---|---|---|---|
| | | % Activation | SEM | % Activation | SEM | % Activation | SEM | % Viability | SEM |
| 49d | E | 99.60 | 0.5 | 112.31 | 6.7 | 136.46 | 15.7 | 88.06 | 2.9 |
| 55 | C, E | 103.08 | 1.1 | 91.70 | 2.3 | 70.37 | 5.2 | 58.91 | 1.3 |
| 58a | F | 206.86 | 3.1 | 216.90 | 3.5 | 158.36 | 19.1 | 73.63 | 1.5 |
| 58b | F | 243.09 | 22.9 | 260.05 | 18.2 | 190.52 | 10.2 | 83.69 | 3.9 |
| 58c | F | 103.09 | 1.5 | 105.32 | 0.8 | 104.47 | 2.5 | 86.41 | 3.5 |
| 58d | F | 104.80 | 2.5 | 89.81 | 3.7 | 74.73 | 3.5 | 81.42 | 2.3 |
| 58e | F | 98.26 | 0.4 | 94.46 | 1.3 | 52.23 | 1.5 | 93.65 | 5.8 |
| 58f | F | 100.67 | 0.3 | 105.49 | 1.0 | 95.64 | 2.3 | 81.23 | 4.1 |
| 58g | F | 200.27 | 5.4 | 177.62 | 4.4 | 189.46 | 6.4 | 112.63 | 6.6 |
| 58h | F | 517.25 | 34.8 | 247.73 | 6.7 | 218.16 | 6.1 | 111.27 | 7.1 |
| 58i | F | 100.99 | 0.7 | 104.31 | 0.6 | 101.27 | 1.1 | 75.86 | 1.1 |
| 58j | F | 100.82 | 0.4 | 100.55 | 0.4 | 90.73 | 3.0 | 72.09 | 1.4 |
| 58k | F | 101.33 | 0.8 | 109.65 | 0.7 | 100.84 | 3.4 | 50.85 | 3.1 |
| 59 | A, F | 483.54 | 5.2 | 298.03 | 11.4 | 211.88 | 2.4 | 98.59 | 5.7 |
| 61 | B, F | 118.63 | 0.4 | 188.94 | 10.8 | 207.19 | 4.3 | 102.98 | 3.1 |
| 64 | A, B | 348.28 | 37.3 | 286.97 | 6.8 | 196.14 | 5.1 | 101.42 | 2.8 |
| 65 | A, B, F | N.T. | N.T. | N.T. | N.T. | N.T. | N.T. | N.T. | N.T. |
| 67 | A | 176.58 | 10.9 | 158.88 | 6.8 | 168.96 | 9.8 | 90.50 | 1.8 |
| 70 | A | 100.70 | 0.9 | 97.30 | 3.2 | 70.93 | 9.2 | 77.84 | 2.4 |
| 72a | F | 99.23 | 1.1 | 101.68 | 2.2 | 121.36 | 7.5 | 87.46 | 3.1 |
| 72b | F | 105.08 | 1.9 | 109.05 | 1.9 | 129.85 | 3.3 | 81.42 | 2.3 |
| 72c | F | 103.26 | 1.4 | 121.58 | 1.9 | 133.88 | 9.2 | 84.00 | 1.8 |
| 72d | F | 111.91 | 1.6 | 151.72 | 3.7 | 123.22 | 11.6 | 83.27 | 3.5 |
| 72e | F | 143.72 | 10.2 | 168.07 | 9.5 | 168.82 | 5.8 | 84.40 | 4.9 |
| 73 | A, F | 363.46 | 34.5 | 398.29 | 72.7 | 197.10 | 7.8 | 84.53 | 2.0 |

[a]The % activation values in NF-κB induction assays were two point normalized between compound 1 as 200% and LPS (10 ng/mL) as 100%. The mean SEAP response in NF-κB assay for compound 1 + LPS and LPS alone was 3.44 ± 0.08 and 0.56 ± 0.06 µg/mL, respectively. The mean emission ratio in NF-κB for compound 1 alone and DMSO alone was 1.88 ± 0.04 and 0.69 ± 0.05 µg/mL, respectively. The % viability values for compounds in MTT assay was normalized to DMSO as 100%. The mean OD value at 405 nm for DMSO was 1.24 ± 0.03. All raw values used for normalization are represented as mean ± SEM.
N.T. is not yet tested.

Experimental Section:
Chemistry

Materials. Reagents were purchased as at least reagent grade from commercial vendors unless otherwise specified and used without further purification. Solvents were purchased from Fischer Scientific (Pittsburgh, PA) and were either used as purchased or redistilled with an appropriate drying agent. All reagents 2a-g and 3g-o were purchased from commercially available vendors while reagents 3a-f were synthesized from commercially available reagents. Compounds used for structure-activity studies were synthesized according to methods described below and all the compounds were identified to be least 95% pure using HPLC.

Instrumentation. Analytical TLC was performed using precoated TLC silica gel 60 F254 aluminum sheets purchased from EMD (Gibbstown, NJ) and visualized using UV light. Flash chromatography was carried out using with a Biotage Isolera One (Charlotte, NC) system using the specified solvent. Microwave reaction was performed using Biotage Initiator+ (Charlotte, NC). Reaction monitoring and purity analysis were done using an Agilent 1260 LC/6420 Triple Quad mass spectrometer (Santa Clara, CA) with Onyx Monolithic C18 (Phenomenex, Torrance, CA) column. Purity of all final compounds was above 95% (also see LC-MS spectra in Supporting Information for all final compounds). All final compounds were analyzed by high resolution MS (HRMS) using an Agilent 6230 ESI-TOFMS (Santa Clara, CA). 1H and 13C NMR spectra were obtained on a Varian 500 with XSens probe (Varian, Inc., Palo Alto, CA). The chemical shifts are expressed in parts per million (ppm) using suitable deuterated NMR solvents.

Compound 1 and site A modified compounds 12b-f, p-s were synthesized using general procedure used for synthesis of compound 1 as described below.

N-(4-(2,5-dimethylphenyl)thiazol-2-yl)-4-(piperidin-1-ylsulfonyl)benzamide (1). Compound 1 was synthesized using two advanced intermediates 4 and 8a which were synthesized as shown below.

Synthesis of compound 4: 4-(piperidin-1-ylsulfonyl)benzoic acid. To a solution of 4-(chlorosulfonyl)phenyl acetate (2, 500 mg, 2.14 mmol) in anhydrous dichloromethane were added triethylamine (432 mg, 4.28 mmol) and piperidine (3, 200 mg, 2.35 mmol). The reaction mixture was stirred for an hour followed by removal of the solvent to obtain the crude sulfonamide intermediate methyl 4-(piperidin-1-ylsulfonyl)benzoate which was suspended in water and filtered to remove the water soluble impurities, followed by dissolving the residue in 3:1 mixture of MeOH/THF. LiOH (268 mg, 6.4 mmol) dissolved in 0.5 mL of water was added to this solution and stirred for another 2 h followed by removal of the solvent under vacuum. The residue was then dissolved in water and the solution was acidified using 3M HCl to precipitate the product which was purified by filtration to obtain compound 4 as white solid (511 mg, yield=84%).

Synthesis of compound 8a: To a solution of 1-(2,5-dimethylphenyl)ethan-1-one (6a, 2 g, 13.5 mmol) in chloroform was added liquid bromine (2.38 g, 14.9 mmol). The reaction was stirred for an hour, followed by removal of the solvent to obtain crude intermediate 7a which was dissolved in anhydrous EtOH and thiourea was added. The reaction was then heated in microwave at 100° C. for 30 min, followed by removal of the solvent to obtain the residue which was purified using silica gel column chromatography to obtain compound 8a as tan solid (1.8 g, yield=65%).

"HATU coupling" reaction for forming the amide bond will be utilized for syntheses of several other compounds which will follow the protocol shown here for synthesis of compound 1: To a solution of compound 4 (50 mg, 0.19 mmol) in anhydrous DMF were added, 8a (42 mg, 0.21 mmol), HATU (78 mg, 0.21 mmol), and triethylamine (28 mg, 0.28 mmol) and the reaction was heated at 45° C. for 16 h. The solvent was then removed and the residue was suspended in aqueous sodium bicarbonate solution. The precipitate was filtered to obtain crude product which was purified using silica gel column chromatography to yield compound 1 (65 mg, yield=77%) as white solid. MS for $C_{23}H_{26}N_3O_3S_2$ [M+H]$^+$ calculated 456.1, found 456.0.

4-(piperidin-1-ylsulfonyl)-N-(4-(o-tolyl)thiazol-2-yl)benzamide (12b). 1-(o-tolyl)ethan-1-one (6b, 200 mg, 1.49 mmol) was converted to compound 7b which was then reacted with compound 4 (25 mg, 0.093 mmol) to obtain 12b (40 mg, yield=97% for the final step) as off-white solid. MS for $C_{22}H_{24}N_3O_3S_2$ [M+H]$^+$ calculated 442.1, found 442.0.

4-(piperidin-1-ylsulfonyl)-N-(4-(m-tolyl)thiazol-2-yl) benzamide (12c). 1-(m-tolyl)ethan-1-one (6c, 200 mg, 1.49 mmol) was converted to compound 7c which was then reacted with compound 4 (25 mg, 0.093 mmol) to obtain 12c (18 mg, yield=44% for the final step) as tan solid. MS for $C_{22}H_{24}N_3O_3S_2$ [M+H]$^+$ calculated 442.1, found 441.9.

N-(4-(2-bromo-5-methylphenyl)thiazol-2-yl)-4-(piperidin-1-ylsulfonyl)benzamide (12d). Procedure to make compound 6d needed for synthesis of 12d is shown below. To a solution of 2-bromo-5-methylbenzoic acid (5d, 200 mg, 0.93 mmol) in anhydrous DMF were added, HATU (388 mg, 1.02 mmol), triethylamine (235 mg, 2.33 mmol) and N,O-dimethyl hydroxylamine hydrochloride (100 mg, 1.02 mmol). The reaction was stirred for an hour followed by removal of the solvent under vacuum to obtain the residue which was dissolved in EtOAc, washed with aqueous sodium bicarbonate solution and dried over sodium sulfate to obtain the Weinreb amide intermediate. This was dissolved in anhydrous THF followed by the addition of methyl magnesium bromide (1 mL) in anhydrous conditions on ice and the reaction was then heated at 45° C. for 16 h. The reaction was quenched with 3M HCl solution, followed by extraction of compound in EtOAc. The EtOAc fraction was washed with water, dried over sodium sulfate and concentrated under vacuum to obtain the residue which was purified using column chromatography to obtain compound 6d as clear oil. Compound 6d (200 mg, 1.49 mmol) was converted to compound 7d which was then reacted with compound 4 (50 mg, 0.19 mmol) to obtain 12d (37 mg, yield=48% for the final step) as white solid. MS for $C_{22}H_{23}BrN_3O_3S_2$ [M+H]$^+$ calculated 520.0, found 519.9.

N-(4-(5-bromo-2-methylphenyl)thiazol-2-yl)-4-(piperidin-1-ylsulfonyl)benzamide (12e). Compound 12e was synthesized using the same procedure as 12d starting with 5-bromo-2-methylbenzoic acid (5e, 200 mg, 0.93 mmol) to obtain 6e (162 mg, yield=82%) as clear oil. Compound 6e (160 mg, 0.75 mmol) was converted to compound 7e which was then reacted with compound 4 (110 mg, 0.41 mmol) to obtain 12e (79 mg, yield=37% for the final step) as white solid. MS for $C_{22}H_{23}BrN_3O_3S_2$ [M+H$^+$] calculated 520.0, found 519.9.

N-(4-(2,5-dimethylbenzyl)thiazol-2-yl)-4-(piperidin-1-ylsulfonyl)benzamide (12f). Compound 6f (200 mg, 1.24 mmol) was converted to compound 7e which was then reacted with compound 4 (16 mg, 0.07 mmol) to obtain 12f (23 mg, yield=70% for the final step) as white solid. MS for $C_{21}H_{28}N_3O_3S_2$ [M+H]$^+$ calculated 470.1, found 470.0.

Site A modified compounds 12g-k were synthesized starting with compounds 8g-k (purchased from Enamine LLC) respectively using the procedure described above for synthesis of compound 1.

N-(4-methylthiazol-2-yl)-4-(piperidin-1-ylsulfonyl)benzamide (12g). Compound 12g was synthesized using 4-methylthiazol-2-amine (8g, 8.5 mg, 0.074 mmol) and compound 4 (20 mg, 0.074 mmol) as light yellow solid (22 mg, yield=82%). MS for $C_{16}H_{20}N_3O_3S_2$ [M+H]$^+$ calculated 366.1, found 366.0.

N-(4-ethylthiazol-2-yl)-4-(piperidin-1-ylsulfonyl)benzamide (12h). Compound 12h was synthesized using 4-ethylthiazol-2-amine (8h, 9.5 mg, 0.074 mmol) and compound 4 (20 mg, 0.074 mmol) as off-white solid (16 mg, yield=57%). MS for $C_{17}H_{22}N_3O_3S_2$ [M+H]$^+$ calculated 380.1, found 380.0.

4-(piperidin-1-ylsulfonyl)-N-(4-propylthiazol-2-yl)benzamide (12i). Compound 12i was synthesized using 4-propylthiazol-2-amine hydrochloride (8i, 13.3 mg, 0.074 mmol) and compound 4 (20 mg, 0.074 mmol) as white solid (27 mg, yield=93%). MS for $C_{18}H_{24}N_3O_3S_2$ [M+H]$^+$ calculated 394.1, found 394.0.

N-(4-neopentylthiazol-2-yl)-4-(piperidin-1-ylsulfonyl)benzamide (12j). Compound 12j was synthesized using 4-neopentylthiazol-2-amine (8j, 12.6 mg, 0.074 mmol) and compound 4 (20 mg, 0.074 mmol) as off-white solid (26 mg, yield=84%). MS for $C_{20}H_{28}N_3O_3S_2$ [M+H]$^+$ calculated 422.1, found 422.0.

N-(4-(tert-butyl)thiazol-2-yl)-4-(piperidin-1-ylsulfonyl)benzamide (12k). Compound 12k was synthesized using 4-(tert-butyl)thiazol-2-amine hydrochloride (8k, 14.4 mg, 0.074 mmol) and compound 4 (20 mg, 0.074 mmol) as off-white solid (26 mg, yield=86%). MS for $C_{19}H_{26}N_3O_3S_2$ [M+H]$^+$ calculated 408.1, found 408.0.

tert-Butyl (4-bromothiazol-2-yl)carbamate) (10). To a cooled solution of N,N-disopropylamine (1.12 g, 11.1 mmol) in anhydrous THF (20 mL) was slowly added 1.6M n-butyllithium solution in hexanes (690 mg, 10.8 mmol). The reaction was allowed to cool again for 5 min followed by dropwise addition of a solution of tert-butyl (5-bromothiazol-2-yl)carbamate (9, 1 g, 3.6 mmol) in anhydrous THF (20 mL). The reaction was stirred for 30 min, followed by quenching the reaction with addition of 2 mL of water. EtOAc was added and the organic layer was separated. The EtOAc fraction was then washed with saturated NH$_4$Cl solution, brine, dried over sodium sulfate and concentrated under vacuum to obtain residue which was purified using silica gel column chromatography to obtain compounds 10 as tan solid (635 mg, yield=63.5%). MS for $C_8H_{11}BrN_2O_2S$ [M+Na$^+$] calculated 301.0, found 300.8.

N-(4-(2,3-dimethylphenyl)thiazol-2-yl)-4-(piperidin-1-ylsulfonyl)benzamide (12l). The 'Suzuki coupling' reaction was first performed to synthesize 11l as described below To a microwave reaction vial, tetrakis(tiphenylphosphine) palladium(0) (103 mg, 0.09 mmol) and 2,4-dimethylphenylboronic acid (32 mg, 0.22 mmol) were combined and the vial was sealed and evacuated. Compound 10 (50 mg, 0.18 mmol) dissolved in anhydrous DMF was then added to the vial. Separately, sodium carbonate (57 mg, 0.54 mmol) dissolved in water was also added and the vial was filled with argon gas. The reaction mixture was then irradiated in the microwave at 100° C. for 30 min. After concentration, the residue was dissolved in EtOAc and washed with brine, dried over sodium sulfate, and then concentrated under vacuum. The resulting residue was then purified by silica gel column chromatography to obtain compound 11l (22 mg, yield=40%). The N-Boc was then removed by stirring compound 11l (22 mg, 0.072 mmol) in 3 mL of 4N HCl solution in dioxane for 1 h, followed by removal of solvent to obtain residue which was purified using column chromatography to obtain compound 8l (15 mg, yield=87%). The 'HATU coupling' reaction was then performed using 4 (20 mg, 0.074 mmol), 8l (15.5 mg, 0.076 mmol), HATU (34 mg, 0.089 mmol), and DIPEA (22 mg, 0.17 mmol) to obtain compound 12l as white solid (7 mg, yield=21%). MS for $C_{23}H_{26}N_3O_3S_2$ $[M+H]^+$ calculated 456.1, found 456.0.

Compounds 12m-o were synthesized using the same procedure as for compound 12l. N-(4-(2,4-dimethylphenyl)thiazol-2-yl)-4-(piperidin-1-ylsulfonyl)benzamide (12m). The 'Suzuki coupling' reaction was performed using tetrakis(tiphenylphosphine) palladium(0) (103 mg, 0.09 mmol), 2,4-dimethylphenylboronic acid (32 mg, 0.22 mmol), 10 (50 mg, 0.18 mmol) and sodium carbonate (57 mg, 0.54 mmol) to obtain compound 11m (28 mg, yield=51%). %). N-Boc removal on 11m provided 8m (18 mg, yield=96%). The 'HATU coupling' reaction was then performed using 4 (26 mg, 0.1 mmol), 8m (18 mg, 0.088 mmol), HATU (37 mg, 0.097 mmol), and DIPEA (25 mg, 0.194 mmol) to obtain compound 12m as off-white solid (10 mg, yield=23%). MS for $C_{23}H_{26}N_3O_3S_2$ $[M+H]^+$ calculated 456.1, found 456.0.

N-(4-(3,4-dimethylphenyl)thiazol-2-yl)-4-(piperidin-1-ylsulfonyl)benzamide (12n). The 'Suzuki coupling' reaction was performed using tetrakis(triphenylphosphine) palladium(0) (103 mg, 0.09 mmol), 2,4-dimethylphenylboronic acid (32 mg, 0.22 mmol), 10 (50 mg, 0.18 mmol) and sodium carbonate (57 mg, 0.54 mmol) to obtain compound 11n (9 mg, yield=17%). N-Boc removal on 11n provided 8n (6 mg, quantitative yield). The 'HATU coupling' reaction was then performed using 4 (8.7 mg, 0.032 mmol), 8n (6 mg, 0.029 mmol), HATU (12 mg, 0.032 mmol), and DIPEA (8.4 mg, 0.065 mmol) to obtain compound 12n as off-white solid (4.2 mg, yield=32%). MS for $C_{23}H_{26}N_3O_3S_2$ $[M+H]^+$ calculated 456.1, found 456.0.

N-(4-(3,5-dimethylphenyl)thiazol-2-yl)-4-(piperidin-1-ylsulfonyl)benzamide (12o). The 'Suzuki coupling' reaction was performed using tetrakis(triphenylphosphine) palladium(0) (103 mg, 0.09 mmol), 2,4-dimethylphenylboronic acid (32 mg, 0.22 mmol), 10 (50 mg, 0.18 mmol) and sodium carbonate (57 mg, 0.54 mmol) to obtain compound 11o (16 mg, yield=29%). N-Boc removal on 11o provided 8o (12.4 mg, quantitative yield). The 'HATU coupling' reaction was then performed using 4 (11.5 mg, 0.043 mmol), 8o (12.4 mg, 0.052 mmol), HATU (34 mg, 0.09 mmol), and DIPEA (12.6 mg, 0.098 mmol) to obtain compound 12o as off-white solid (16.5 mg, yield=84%). MS for $C_{23}H_{26}N_3O_3S_2$ $[M+H]^+$ calculated 456.1, found 456.0.

N-(4-(2,6-dimethylphenyl)thiazol-2-yl)-4-(piperidin-1-ylsulfonyl)benzamide (12p). 1-(2,6-dimethylphenyl)ethan-1-one (6p, 100 mg, 0.67 mmol) was converted to compound 7p which was then reacted with compound 4 (20 mg, 0.074 mmol) to obtain compound 12p (17 mg, yield=51% for the final step) as white solid. MS for $C_{23}H_{26}N_3O_3S_2$ $[M+H]^+$ calculated 456.1, found 456.0.

N-(4-(naphthalen-1-yl)thiazol-2-yl)-4-(piperidin-1-ylsulfonyl)benzamide (12q). Compound 12q was synthesized using 4-(naphthalen-1-yl)thiazol-2-amine (8q, 25 mg, 0.11 mmol) and compound 4 (29 mg, 0.11 mmol) as light yellow solid (33 mg, yield=63%). MS for $C_{25}H_{24}N_3O_3S_2$ $[M+H^+]$ calculated 478.1, found 478.0.

N-(5-methyl-8H-indeno[1,2-d]thiazol-2-yl)-4-(piperidin-1-ylsulfonyl)benzamide (12r). 2,3-dihydro-1H-inden-1-one (6r, 250 mg, 1.71 mmol) was converted to compound 7r which was then reacted with compound 4 (29 mg, 0.11 mmol) to obtain 12r (12 mg, yield=25% for the final step) as light yellow solid. MS for $C_{23}H_{24}N_3O_3S_2$ $[M+H]^+$ calculated 454.1, found 454.0.

N-(8-methyl-4,5-dihydronaphtho[1,2-d]thiazol-2-yl)-4-(piperidin-1-ylsulfonyl)benzamide (12s). 3,4-dihydronaphthalen-1(2H)-one (6s, 125 mg, 0.78 mmol) was converted to compound 7s which was then reacted with compound 4 (27 mg, 0.1 mmol) to obtain 12s (25 mg, yield=49% for the final step) as light yellow solid. MS for $C_{24}H_{26}N_3O_3S_2$ $[M+H]^+$ calculated 468.1, found 468.0.

N-(4-(5-ethynyl-2-methylphenyl)thiazol-2-yl)-4-(piperidin-1-ylsulfonyl)benzamide (12t). Copper iodide (3.5 mg, 0.018 mmol), tetrakis(triphenylphosphine)palladium(0) (26 mg, 0.037 mmol) were taken in a microwave vial and then the vial was evacuated under vacuum and flushed with argon. Trimethylsilylacetylene (318 mg, 3.23 mmol) and diethylamine (1.5 mL) was then added to the vial. Separately, compound 8e (100 mg, 0.37 mmol) was dissolved in anhydrous DMF and added to the vial. The reaction was then performed on microwave at 100° C. for 1 h. The solvent was then removed and the residue was dissolved in EtOAc, washed with water and brine, dried over magnesium sulfate and concentrated under vacuum to obtain the residue which was purified using silica gel column chromatography to obtain TMS protected intermediate (76 mg). To a solution of this intermediate (67 mg, 0.23 mmol) in anhydrous THF was added a 1M solution of tetra-n-butylammonium fluoride in THF (2 mL) and the reaction was stirred till completion. The reaction was poured into water and compound was extracted with EtOAc. The EtOAc fraction was then concentrated under vacuum, dried over magnesium sulfate to obtain residue which was purified using silica gel column chromatography to obtain compound 15 in quantitative yield. To a solution of compound 4 (20 mg, 0.074 mmol) in anhydrous DMF were added, 15 (16 mg, 0.074 mmol), HATU (34 mg, 0.089 mmol), and triethylamine (22 mg, 0.22 mmol) and the reaction was heated at 45° C. for 12 h. The solvent was then removed and the residue was suspended in aqueous sodium bicarbonate solution. The precipitate was filtered to obtain crude product which was purified using silica gel column chromatography to yield compound 12t as off-white solid (23 mg, yield=67%). MS for $C_{24}H_{24}N_3O_3S_2$ $[M+H]^+$ calculated 466.1, found 466.0.

N-(4-(5-ethyl-2-methylphenyl)thiazol-2-yl)-4-(piperidin-1-ylsulfonyl)benzamide (12u). To a solution of compound 12t (6 mg, 0.013 mmol) in methanol, was added a catalytic amount of palladium on carbon and the flask was subjected to hydrogenation reaction using Paar shaker apparatus for 4 h. The solvent was then filtered to obtain the filtrate which was concentrated under vacuum to obtain compound 12u as off-white solid (3 mg, yield=50%). MS for $C_{24}H_{28}N_3O_3S_2$ $[M+H]^+$ calculated 470.1, found 470.0.

N-(4-(2,5-dimethylphenyl)-1H-imidazol-2-yl)-4-(piperidin-1-ylsulfonyl)benzamide (18a). To a solution of 1-(2,5-dimethylphenyl)ethan-1-one (6a, 200 mg, 1.35 mmol) in chloroform was added liquid bromine (238 mg, 1.49 mmol). The reaction was stirred for an hour, followed by removal of the solvent to obtain crude intermediate which was dissolved in anhydrous EtOH and 1-acetylguanidine (273 mg, 2.7 mmol) was added. The reaction was then heated in microwave at 120° C. for 1 h, followed by removal of the solvent to obtain the residue which was purified using silica gel column chromatography to obtain compound 16 (75 mg, yield=24%). Compound 16 was then dissolved in 50% MeOH/3M HCl and heated at 55° C. for 1 h. The solvent was then removed to obtain compound 17. To a solution of compound 4 (7.5 mg, 0.039 mmol) in anhydrous DMF were added, 17 (10 mg, 0.037 mmol), HATU (16 mg, 0.041 mmol), and triethylamine (8 mg, 0.08 mmol) and the reaction was heated at 45° C. for 12 h. The solvent was then removed and the residue was suspended in aqueous sodium bicarbonate solution. The precipitate was filtered to obtain crude product which was purified using silica gel column chromatography to yield compound 18a as tan solid (4.2 mg, yield=26%). MS for $C_{23}H_{27}N_4O_3S$ [M+H]$^+$ calculated 439.2, found 439.0.

Compounds 18b-d were synthesized using similar protocol as shown below for 18b. Briefly, 'Suzuki coupling' reaction between 19 and 20 yielded 21 which was coupled to 4 using HATU. N-(6-(2,5-dimethylphenyl)pyridin-2-yl)-4-(piperidin-1-ylsulfonyl)benzamide (18b). 2,5-dimethylphenylboronic acid (19, 50 mg, 0.33 mmol), tetrakis(triphenylphosphine)palladium(0) (65 mg, 0.056 mmol) and 2-amino-6-bromopyridine (20b, 48 mg, 0.28 mmol) were taken in a microwave vial. The vial was evacuated under vacuum and anhydrous DMF (1.6 mL) was added. Separately sodium carbonate (89 mg, 0.84 mmol) was dissolved in 0.4 mL of water and added to the vial. The vial was then subjected to microwave heating at 110° C. for 30 min. The solvent was removed under vacuum and the residue was dissolved in EtOAc, washed with water and brine, concentrated under vacuum to obtain the residue which was purified using silica gel column chromatography to obtain compound 21b. To a solution of compound 4 (15 mg, 0.056 mmol) in anhydrous DMF were added, 21b (12 mg, 0.061 mmol), HATU (23 mg, 0.061 mmol), and triethylamine (8.5 mg, 0.084 mmol) and the reaction was heated at 45° C. for 12 h. The solvent was then removed and the residue was suspended in aqueous sodium bicarbonate solution. The precipitate was filtered to obtain crude product which was purified using silica gel column chromatography to yield compound 18b as white solid (14 mg, yield=56%). MS for $C_{25}H_{26}N_3O_3S$ [M+H]$^+$ calculated 450.2, found 450.1.

N-(5-(2,5-dimethylphenyl)pyridin-2-yl)-4-(piperidin-1-ylsulfonyl)benzamide (18c). 18c was synthesized using 19 (50 mg, 0.33 mmol) and 20c (48 mg, 0.28 mmol) to obtain 21c (46 mg). Of which 21 mg of 21c was coupled to compound 4 (25 mg, 0.093 mmol) to obtain compound 18c as off-white solid (18 mg, yield=43%). MS for $C_{25}H_{26}N_3O_3S$ [M+H]$^+$ calculated 450.2, found 450.0.

N-(6-(2,5-dimethylphenyl)pyridin-3-yl)-4-(piperidin-1-ylsulfonyl)benzamide (18d). 18d was synthesized using 19 (50 mg, 0.33 mmol) and 20d (48 mg, 0.28 mmol) to obtain 21d. Of which 25 mg of 21d was coupled to compound 4 (20.3 mg, 0.1 mmol) to obtain compound 18d as yellow solid (16 mg, yield=36%). MS for $C_{25}H_{28}N_3O_3S$ [M+H]$^+$ calculated 450.2, found 450.0.

N-(5-(2,5-dimethylphenyl)thiazol-2-yl)-4-(piperidin-1-ylsulfonyl)benzamide (18e). 2,5-dimethylphenylboronic acid (19, 32 mg, 0.21 mmol), tetrakis(triphenylphosphine)palladium(0) (104 mg, 0.09 mmol) and compound 9 (50 mg, 0.18 mmol) were taken in a microwave vial. The vial was evacuated under vacuum and anhydrous DMF (1.6 mL) was added. Separately sodium carbonate (57 mg, 0.54 mmol) was dissolved in 0.4 mL of water and added to the vial. The vial was then subjected to microwave heating at 110° C. for 60 min. The solvent was removed under vacuum and the residue was dissolved in EtOAc, washed with water and brine, concentrated under vacuum to obtain the residue which was purified using silica gel column chromatography to obtain N-Boc protected intermediate (15 mg), which was stirred in 4N HCl solution in dioxane for 1 h. The solvent was then removed to obtain compound 22. To a solution of compound 4 (16 mg, 0.059 mmol) in anhydrous DMF were added, 22 (10 mg, 0.05 mmol), HATU (38 mg, 0.1 mmol), and DIPEA (14 mg, 0.1 mmol) and the reaction was heated at 45° C. for 12 h. The solvent was then removed and the residue was suspended in aqueous sodium bicarbonate solution. The precipitate was filtered to obtain crude product which was purified using silica gel column chromatography to yield compound 18e as off-white solid (6 mg, yield=27%). MS for $C_{23}H_{26}N_3O_3S_2$ [M+H]$^+$ calculated 456.1, found 456.0.

N-(5-(2,5-dimethylphenyl)-1,3,4-thiadiazol-2-yl)-4-(piperidin-1-ylsulfonyl)benzamide (18f). 2,5-dimethylphenylboronic acid (23, 200 mg, 1.33 mmol) and thiosemicarbazide (182 mg, 2 mmol) were dissolved in 2 mL of phosphorous(V) oxychloride and heated in microwave at 105° C. for 1 h. The solvent was then removed and the residue was purified using silica gel column chromatography to obtain compound 24. To a solution of compound 4 (20 mg, 0.074 mmol) in anhydrous DMF were added, 24 (15 mg, 0.074 mmol), HATU (34 mg, 0.09 mmol), and triethylamine (22 mg, 0.22 mmol) and the reaction was heated at 45° C. for 12 h. The solvent was then removed and the residue was suspended in aqueous sodium bicarbonate solution. The precipitate was filtered to obtain crude product which was purified using silica gel column chromatography to yield compound 18f as tan solid (17 mg, yield=50%). MS for $C_{22}H_{25}N_4O_3S_2$ [M+H]$^+$ calculated 457.1, found 457.0.

5-bromo-4-(2,5-dimethylphenyl)thiazol-2-amine (25). To a solution of compound 8a (1 g, 4.9 mmol) in 50 mL of dichloromethane was slowly added a solution of N-bromosuccinimide (1.13 g, 6.35 mmol) in 20 mL of dichloromethane and the reaction was stirred for 30 minutes. The solvent was then removed and the residue was purified using column chromatography to obtain compound 25 (750 mg, 55%). MS for $C_{11}H_{11}BrN_2S$ [M+H]$^+$ calculated 283.0, found 282.93.

N-(5-(diethylamino)-4-(2,5-dimethylphenyl)thiazol-2-yl)-4-(piperidin-1-ylsulfonyl)benzamide (18g). Compound 25 (25 mg, 0.088 mmol), 1,1'-Bis(diphenylphosphino)ferrocene]dichloropalladium(II) (Pd(dppf)Cl$_2$, 6.5 mg, 0.01 mmol) were taken in a microwave vial, sealed, evacuated under vacuum and purged with argon. Diethylamine (646 mg, 8.8 mmol) and 0.9 mL of dioxane was then added to the vial and heated in microwave at 100° C. for 1.5 h. The solvent was then removed and the residue was extracted in EtOAc, washed with water and brine, concentrated under vacuum to obtain a residue which was purified using column chromatography to obtain compound 26g (7.2 mg, yield=30%). The 'HATU coupling' reaction was then performed using 4 (5 mg, 0.019 mmol), 26g (5 mg, 0.018 mmol), HATU (7.6 mg, 0.02 mmol), and DIPEA (4.7 mg, 0.036 mmol) to obtain compound 18g as yellow solid (5.6 mg, yield=62%). MS for $C_{27}H_{35}N_4O_3S_2$ [M+H]$^+$ calculated 527.2, found 527.1.

N-(4-(2,5-dimethylphenyl)-5-(piperidin-1-yl)thiazol-2-yl)-4-(piperidin-1-ylsulfonyl)benzamide (18h). To a solution of piperidine (24 mg, 0.28 mmol) in anhydrous DMF, was added 60% dispersion of sodium hydride in mineral oil (22 mg, 0.56 mmol). Compound 25 (40 mg, 0.14 mmol) was separately dissolved in anhydrous DMF and added to above reaction. The reaction was stirred for 1 h, followed by removal of the solvent. The residue was dissolved in EtOAc, washed with water, brine and concentrated under vacuum to obtain residues which was purified using silica gel column chromatography to obtain compound 26h (55.7 mg, yield=15%). The 'HATU coupling' reaction was then performed using 4 (6 mg, 0.022 mmol), 26h (5.7 mg, 0.02 mmol), HATU (9.1 mg, 0.024 mmol), and triethylamine (3 mg, 0.03 mmol) to obtain compound 18h as yellow solid (4 mg, yield=37%). MS for $C_{29}H_{35}N_4O_3S_2$ [M+H]$^+$ calculated 539.2, found 539.1.

N-(4-(2,5-dimethylphenyl)-5-phenylthiazol-2-yl)-4-(piperidin-1-ylsulfonyl)benzamide (18i). Phenylboronic acid (26 mg, 0.22 mmol), tetrakis(triphenylphosphine)palladium (0) (102 mg, 0.088 mmol) and compound 25 (50 mg, 0.18 mmol) were taken in a microwave vial. The vial was evacuated under vacuum and anhydrous DMF (1.6 mL) was added. Separately sodium carbonate (56 mg, 0.53 mmol) was dissolved in 0.4 mL of water and added to the vial. The vial was then subjected to microwave heating at 110° C. for 60 min. The solvent was removed under vacuum and the residue was dissolved in EtOAc, washed with water and brine, concentrated under vacuum to obtain the residue which was purified using silica gel column chromatography to obtain compound 26i (10.4 mg, yield=21%). The 'HATU coupling' reaction was then performed using 4 (7.7 mg, 0.029 mmol), 26i (7.3 mg, 0.029 mmol), HATU (19.8 mg, 0.052 mmol), and DIPEA (7.4 mg, 0.058 mmol) to obtain compound 18i as white solid (6.7 mg, yield=43%). MS for $C_{29}H_{30}N_3O_3S_2$ [M+H]$^+$ calculated 532.2 found 532.1.

N-(4-(2,5-dimethylphenyl)-5-(furan-2-yl)thiazol-2-yl)-4-(piperidin-1-ylsulfonyl)benzamide (18j). Compound 18j was synthesized using the same procedure as 18i starting with 2-furanylboronic acid (24 mg, 0.21 mmol) and compound 25 (50 mg, 0.18 mmol) to obtain compounds 26j (9.7 mg, yield=17%). The 'HATU coupling' reaction was then performed using 4 (6 mg, 0.022 mmol), 26j (5 mg, 0.019 mmol), HATU (14 mg, 0.037 mmol), and DIPEA (5.3 mg, 0.041 mmol) to obtain compound 18j as tan solid (2.7 mg, yield=27%). MS for $C_{27}H_{28}N_3O_4S_2$ [M+H]$^+$ calculated 522.1, found 522.0.

N-(4-(2,5-dimethylphenyl)-5-(ethylthio)thiazo-2-yl)-4-(piperidin-1-ylsulfonyl)benzamide (18k). To a solution of compound 25 (20 mg, 0.071 mmol) in anhydrous DMF, was added sodium ethanthiolate (9 mg, 0.11 mmol) and stirred for 1 h. The solvent was then removed and the residue was dissolved in EtOAc, washed with water and brine, concentrated under vacuum to obtain the residue which was purified using silica gel column chromatography to obtain compound 26k (10.3 mg, yield=55%). The 'HATU coupling' reaction was then performed using 4 (12.6 mg, 0.047 mmol), 26k (10.3 mg, 0.039 mmol), HATU (30 mg, 0.079 mmol), and DIPEA (11.1 mg, 0.087 mmol) to obtain compound 18k as yellow solid (9.9 mg, yield=49%). MS for $C_{25}H_{30}N_3O_3S_3$ [M+H]$^+$ calculated 516.1, found 515.9.

N-(4-(2,5-dimethylphenyl)-5-ethoxythiazol-2-yl)-4-(piperidin-1-ylsulfonyl)benzamide (18l). To a cooled solution of sodium ethoxide (12 mg, 0.18 mmol) in anhydrous ethanol was added a solution of compound 25 (25 mg, 0.088 mmol) in anhydrous ethanol. The reaction was stirred for 1 h followed by removal of solvent under vacuum. The residue was dissolved in EtOAc, washed with water and brine, dried over sodium sulfate, concentrated under vacuum to obtain residue which was purified using C18 reverse phase column chromatography to obtain compound 26l (4.9 mg, yield=23%). The 'HATU coupling' reaction was then performed using 4 (5.3 mg, 0.02 mmol), 26l (4.9 mg, 0.02 mmol), HATU (8.25 mg, 0.022 mmol), and DIPEA (5.1 mg, 0.04 mmol) to obtain compound 18l as yellow solid (3.6 mg, yield=36%). MS for $C_{25}H_{30}N_3O_4S_2$ [M+H]$^+$ calculated 500.2. found 500.1.

N-(4-(2,5-dimethylphenyl)-5-methylthiazol-2-yl)-4-(piperidin-1-ylsulfonyl)benzamide (18m). Compound 18m was synthesized using the same procedure as compound 1. 1-(2,5-dimethylphenyl)propan-1-one (27, 100 mg, 0.62 mmol) was converted to compound 28 which was then reacted with compound 4 (20 mg, 0.075 mmol) to obtain 18m (26 mg, yield=74% for the final step) as off-white solid. MS for $C_{24}H_{28}N_3O_3S_2$ [M+H$^+$] calculated 470.1 found 470.1.

N-(5-bromo-4-(2,5-dimethylphenyl)thiazol-2-yl)-4-(piperidin-1-ylsulfonyl)benzamide (18n). The 'HATU coupling' reaction was then performed using 4 (250 mg, 0.93 mmol), 25 (263 mg, 0.93 mmol), HATU (423 mg, 1.12 mmol), and triethylamine (141 mg, 1.4 mmol) to obtain compound 18n as tan solid (305 mg, yield=62%). MS for $C_{23}H_{25}BrN_3O_3S_2$ [M+H]$^+$ calculated 534.0, found 533.9.

N-(4-(2,5-dimethylphenyl)-5-ethynylthiazol-2-yl)-4-(piperidin-1-ylsulfonyl)benzamide (18o). The 5-bromo displacement by alkyne was performed using 'Sonogashira coupling' reaction. Copper iodide (1.37 mg, 0.007 mmol), tetrakis(triphenylphosphine)palladium(0) (10.1 mg, 0.009 mmol) were taken in a microwave vial and then the vial was evacuated under vacuum and flushed with argon. Trimethylsilylacetylene (205 mg, 2.09 mmol) and diethylamine (1.5 mL) was then added to the vial. Separately, compound 18n (77 mg, 0.14 mmol) was dissolved in anhydrous DMF and added to the vial. The reaction was then performed on microwave at 100° C. for 2 h. The solvent was then removed and the residue was dissolved in EtOAc, washed with water and brine, dried over magnesium sulfate and concentrated under vacuum to obtain the residue which was purified using silica gel column chromatography to obtain TMS protected intermediate (74 mg, yield=95%). The trimethylsilyl (TMS) functional group removal was performed by stirring the solution of this intermediate (74 mg, 0.13 mmol) in anhydrous THF and 1M solution of tetra-n-butylammonium fluoride in THF (2 mL) till completion. The reaction was poured into water and compound was extracted with EtOAc. The EtOAc fraction was then concentrated under vacuum, dried over magnesium sulfate to obtain residue which was purified using silica gel column chromatography to obtain compound 18o as orange solid (59 mg, yield=95%). MS for $C_{25}H_{26}N_3O_3S_2$ [M+H]$^+$ calculated 480.1, found 480.0.

Compounds 18p, 18q, and 18u were synthesized using the same 'Sonogashira coupling' procedure as compound 18o.

N-(5-(but-1-yn-1-yl)-4-(2,5-dimethylphenyl)thiazol-2-yl)-4-(piperidin-1-ylsulfonyl)benzamide (18p). 'Sonogashira coupling' reaction was performed using copper iodide (1.72 mg, 0.009 mmol), tetrakis(tiphenylphosphine)palladium(0) (10.8 mg, 0.009 mmol), 1-butyne (100 mg, 1.85 mmol) obtained by condensing the gas in cold sealed flask, diisopropylamine (1.5 mL) and compound 18n (50 mg, 0.09 mmol) to obtain compound 18p as white solid (12.5 mg, yield=27%). MS for $C_{27}H_{30}N_3O_3S_2$ [M+H]$^+$ calculated 508.2, found 508.0.

N-(4-(2,5-dimethylphenyl)-5-(pent-1-yn-1-yl)thiazol-2-yl)-4-(piperidin-1-ylsulfonyl)benzamide (18q). 'Sonogashira coupling' reaction was performed using copper iodide (1.03 mg, 0.005 mmol), tetrakis(triphenylphosphine)palladium(0) (6.5 mg, 0.005 mmol), 1-pentyne (11.5 mg, 0.17 mmol), diisopropylamine (0.45 mL) and compound 18n (30 mg, 0.05 mmol) to obtain compound 18q as light yellow solid (20.5 mg, yield=78%). MS for $C_{28}H_{32}N_3O_3S_2$ [M+H]$^+$ calculated 522.2, found 522.0.

N-(4-(2,5-dimethylphenyl)-5-ethylthiazol-2-yl)-4-(piperidin-1-ylsulfonyl)benzamide (18r). To a solution of compound 18o (59 mg, 0.12 mmol) in methanol was added a catalytic amount of palladium on carbon. The reaction was subjected to hydrogenation on Parr hydrogenation apparatus using hydrogen gas at 50 psi pressure for 6 hours. The solvent was then removed, and the residue was purified using silica gel column chromatography to obtain compound 18r as tan solid (24 mg, yield=42%). MS for $C_{25}H_{30}N_3O_3S_2$ [M+H]$^+$ calculated 484.2, found 484.0.

Compound 18s and 18t were synthesized using the same hydrogenation procedure as 18r. N-(5-butyl-4-(2,5-dimethylphenyl)thiazol-2-yl)-4-(piperidin-1-ylsulfonyl)benzamide (18s). Compound 18p (6 mg, 0.012 mmol) was subjected to hydrogenation to obtain compound 18s as white solid (4 mg, yield=65%). MS for $C_{27}H_{34}N_3O_3S_2$ [M+H]$^+$ calculated 512.2, found 512.1.

N-(4-(2,5-dimethylphenyl)-5-pentylthiazol-2-yl)-4-(piperidin-1-ylsulfonyl)benzamide (18t). Compound 18q (10 mg, 0.019 mmol) was subjected to hydrogenation to obtain compound 18t as white solid (6 mg, yield=60%). MS for $C_{28}H_{36}N_3O_3S_2$ [M+H]$^+$ calculated 526.2, found 526.1.

N-(4-(2,5-dimethylphenyl)-5-(5-hydroxypent-1-yn-1-yl) thiazol-2-yl)-4-(piperidin-1-ylsulfonyl)benzamide (18u). 'Sonogashira coupling' reaction was performed using copper iodide (15 mg, 0.079 mmol), tetrakis(tiphenylphosphine) palladium(0) (9 mg, 0.008 mmol), 4-pentyn-1-ol (264 mg, 3.14 mmol), diethylamine (1.5 mL) and compound 18n (42 mg, 0.079 mmol) to obtain compound 18u as light yellow solid (12 mg, yield=28%). MS for $C_{28}H_{36}N_3O_4S_2$ [M+H]$^+$ calculated 538.2, found 538.1.

4-(2,5-dimethylphenyl)-N-(4-(piperidin-1-ylsulfonyl) benzyl)thiazol-2-amine (34a). Compound 34a was synthesized using two advanced intermediates 31 and 33 which were synthesized as shown below.

Synthesis of compound 31. To a solution of 4-cyanobenzenesulfonyl chloride (29, 200 mg, 0.995 mmol) in anhydrous DMF were added potassium carbonate (275 mg, 1.99 mmol) and piperidine (3, 93 mg, 1.095 mmol). The reaction mixture was stirred for an hour followed by removal of the solvent to obtain the residue which was purified using silica gel column chromatograph to obtain compound 30. To a solution of compound 30 (100 mg, 0.4 mmol) in methanol was added di-tert-butyl dicarbonate (131 mg, 0.6 mmol) and a catalytic amount of palladium on carbon. The reaction was subjected to hydrogenation on Parr hydrogenation apparatus using hydrogen gas at 50 psi pressure for 4 h. The solvent was then removed, and the residue was purified using silica gel column chromatography to obtain compound the N-Boc protected intermediate which was dissolved in 4N HCV/dioxane solution and stirred for 1 h to obtain 31 as white solid (40 mg, yield=35%).

Synthesis of compound 33. To a solution of compound 7a (25 mg, 0.11 mmol) in ethanol was added potassium thiocyanate (16 mg, 0.16 mmol) and the reaction was heated in microwave at 80° C. for 30 min. The solvent was then removed under vacuum and water was added to precipitate the product which was isolated by filtration to obtain compound 32. To the solution of compound 32 (28 mg, 0.14 mmol) in acetic acid (0.5 mL) was 0.5 mL of HBr solution in acetic acid. The reaction was heated at 130° C. for 1 h, followed by removal of the solvent. The product was then precipitated in water and collected by filtration to obtain compound 33 (12.5 mg, yield=33%).

Synthesis of compound 34a. Compound 34a was then obtained by 'Buckwald-Hartwig coupling' reaction using compounds 31 and 33. Compound 31 (15 mg, 0.05 mmol), compound 33 (12.5 mg, 0.047 mmol), bis(dibenzylideneacetone)palladium(0) (Pd(dba)2, 8 mg, 0.014 mmol), (2,2'-bis(diphenylphosphino)-1,1'-binaphthyl (BINAP, 15 mg, 0.023 mmol) and sodium tert-butoxide (14 mg, 0.14 mmol) were taken in a microwave vial, sealed and air was evacuated under vacuum. Dioxane (0.5 mL) was then added and the reaction was heated in microwave at 100° C. for 1 h. The solvent was then removed and the residue was dissolved in EtOAc, washed with water and brine, dried over sodium sulfate, concentrated under vacuum to obtain residues which was purified using silica gel column chromatography to obtain compound 34a a tan solid (4 mg, yield=18%). MS for $C_{23}H_{28}N_3O_2S_2$ [M+H]$^+$ calculated 442.2, found 442.0.

4-(2,5-dimethylphenyl)-N-(4-(piperidin-1-ylsulfonyl) phenyl)thiazole-2-carboxamide (34b). Compound 34b was synthesized using two advanced intermediates 37 and 39 which were synthesized as shown below.

Synthesis of compound 37. To a solution of 4-nitrobenzenesulfonyl chloride (35, 200 mg, 0.91 mmol) in anhydrous DMF were added potassium carbonate (250 mg, 1.81 mmol) and piperidine (3, 85 mg, 0.995 mmol). The reaction mixture was stirred for an hour followed by removal of the solvent to obtain the residue which was precipitated in water to obtain compound 36 (84 mg, yield=34%) by filtration. To a solution of compound 36 (80 mg, 0.3 mmol) in 50% EtOAC/methanol was added a catalytic amount of palladium on carbon. The reaction was subjected to hydrogenation on Parr hydrogenation apparatus using hydrogen gas at 50 psi pressure for 4 h. The solvent was then removed, and the residue was purified using silica gel column chromatography to obtain compound the 37 as tan solid (42 mg, yield=58%).

Synthesis of compound 39. To a solution of compound 7a (150 mg, 0.66 mmol) in ethanol was added ethyl thiooxamate (98 mg, 0.79 mmol) and the reaction was heated in microwave at 120° C. for 30 min. The solvent was then removed under vacuum and water was added to precipitate the product which was isolated by filtration to obtain compound 38 (101 mg, yield=59%). To the solution of compound 38 (96 mg, 0.37 mmol) in THF was added an aqueous solution of lithium hydroxide (46 mg, 1.1 mmol). The reaction was stirred for 12 h, followed by removal of solvent under vacuum. Water was then added and the solution was acidified to precipitate the product which was collected by filtration to obtain compound 39 as yellow solid (71 mg, yield=82%).

Synthesis of compound 34b. Compound 34a was then obtained by 'HATU coupling' reaction using compounds 37 (17.3 mg, 0.07 mmol), 39 (16 mg, 0.069 mmol), HATU (31 mg, 0.082 mmol) and triethylamine (14 mg, 0.14 mmol) as off-white solid (6.4 mg, yield=20%). MS for $C_{23}H_{26}N_3O_3S_2$ [M+H]$^+$ calculated 456.1, found 456.0.

N-(4-(2,5-dimethylphenyl)thiazol-2-yl)-N-methyl-4-(piperidin-1-ylsulfonyl)benzamide (34c). To a solution of compound 1 (17 mg, 0.037 mmol) in anhydrous DMF were added 60% suspension of sodium hydride in mineral oil (1.6 mg, 0.04 mmol) and iodomethane (6.3 mg, 0.044 mmol). The reaction was stirred for 1 h, followed by removal of solvent under vacuum to obtain residue which was purified using column chromatography to obtain compound 34c as off-white solid (7.5 mg, yield=43%). MS for $C_{24}H_{28}N_3O_3S_2$ [M+H]$^+$ calculated 470.1, found 470.0.

N-(4-(2,5-dimethylphenyl)thiazol-2-yl)-4-(piperidin-1-ylsulfonyl)-N-(prop-2-yn-1-yl)benzamide (34d). To a solution of compound 1 (10 mg, 0.022 mmol) in anhydrous DMF were added 60% suspension of sodium hydride in mineral oil (0.8 mg, 0.033 mmol) 80% propargyl bromide solution in toluene (3.93 mg, 0.026 mmol). The reaction was stirred for 1 h, followed by removal of solvent under vacuum to obtain residue which was purified using column chromatography to obtain compound 34d as off-white solid (5.1 mg, yield=47%). MS for $C_{19}H_{25}ClNO_6SNa$ [M+H]$^+$ calculated 494.2, found 494.1.

N-(4-(2,5-dimethylphenyl)thiazol-2-yl)-5-(piperidin-1-ylsulfonyl)picolinamide (46a). To a solution of methyl 5-(chlorosulfonyl)picolinate (40, 80 mg, 0.34 mmol) in anhydrous DMF were added, potassium carbonate (70 mg, 0.51 mmol) and piperidine (3, 30 mg, 0.36 mmol). The reaction was stirred for 1 h, followed by removal of the solvent. Water was added to precipitate solid which was collected by filtration to obtain methyl ester intermediate (32 mg, yield=33%) which was dissolved in 1:1 THF/MeOH and aqueous solution of lithium hydroxide (14 mg, 0.58 mmol) was added. After stirring for 30 minutes, solvent was removed, water was added and acidified using 3N aqueous HCl solution to precipitate the solid which was collected by filtration to obtain compound 43 (27 mg, yield=89%). The 'HATU coupling' reaction was then performed using 43 (27 mg, 0.1 mmol), 8a (21.5 mg, 0.105 mmol), HATU (42 mg, 0.11 mmol) and triethylamine (22 mg, 0.22 mmol) to obtain compound 46a as yellow solid (39 mg, yield=85%). MS for $C_{22}H_{25}N_4O_3S_2$ [M+H]$^+$ calculated 457.1, found 456.9.

N-(4-(2,5-dimethylphenyl)thiazol-2-yl)-6-(piperidin-1-ylsulfonyl)nicotinamide (46b). To a solution of ethyl 6-(chlorosulfonyl)nicotinate (41, 80 mg, 0.32 mmol) in anhydrous DMF were added, potassium carbonate (66 mg, 0.48 mmol) and piperidine (3, 28.5 mg, 0.34 mmol). The reaction was stirred for 1 h, followed by removal of the solvent. Water was added to precipitate solid which was collected by filtration to obtain ethyl ester intermediate (50 mg, yield=53%) which was dissolved in 1:1 THF/MeOH and aqueous solution of lithium hydroxide (14 mg, 0.5 mmol) was added. After stirring for 30 minutes, solvent was removed, water was added and acidified using 3N aqueous HCl solution to precipitate the solid which was collected by filtration to obtain compound 44 (25 mg, yield=55%). The 'HATU coupling' reaction was then performed using 44 (7 mg, 0.026 mmol), 8a (6 mg, 0.029 mmol), HATU (11 mg, 0.026 mmol) and triethylamine (6 mg, 0.057 mmol) to obtain compound 46b as off-white solid (4 mg, yield=34%). MS for $C_{22}H_{25}N_4O_3S_2$ [M+H]$^+$ calculated 457.1, found 457.0.

N-(4-(2,5-dimethylphenyl)thiazol-2-yl)-5-(piperidin-1-ylsulfonyl)thiophene-2-carboxamide (46c). To a solution of methyl 5-(chlorosulfonyl)thiophene-2-carboxylate (42, 25 mg, 0.1 mmol) in anhydrous dichloromethane were added, triethylamine (21 mg, 0.21 mmol) and piperidine (3, 17.5 mg, 0.21 mmol). The reaction was stirred for 1 h, followed by removal of the solvent. Water was added to precipitate solid which was collected by filtration to obtain methyl ester intermediate which was dissolved in 1:1 THF/MeOH and aqueous solution of lithium hydroxide (7.5 mg, 0.31 mmol) was added. After stirring for 30 minutes, solvent was removed, water was added and acidified using 3N aqueous HCl solution and the product was extracted using EtOAc. The EtOAc fraction was then separated, dried using sodium sulfate, concentrated under vacuum to obtain compound 45 (7 mg, yield=25%) The 'HATU coupling' reaction was then performed using 45 (5.6 mg, 0.021 mmol), 8a (4.3 mg, 0.021 mmol), HATU (10 mg, 0.025 mmol) and triethylamine (3 mg, 0.032 mmol) to obtain compound 46c as white solid (6 mg, yield=62%). MS for $C_{21}H_{24}N_3O_3S_3$ [M+H]$^+$ calculated 462.1, found 462.0.

4-(cyclohexylthio)-N-(4-(2,5-dimethylphenyl)thiazol-2-yl)benzamide (49a). To a solution of 4-mercaptobenzoic acid (47, 50 mg, 0.32 mmol) in anhydrous DMF were added, bromocyclohexane (56 mg, 0.34 mmol) and potassium carbonate (67 mg, 0.49 mmol). The reaction was stirred for 1 h followed by removal of solvent under vacuum to obtain residue which was purified using silica gel column chromatography to yield compound 48 (15 mg, yield=20%). The 'HATU coupling' reaction was then performed using 48 (13 mg, 0.055 mmol), 8a (13 mg, 0.061 mmol), HATU (23 mg, 0.061 mmol) and triethylamine (8 mg, 0.083 mmol) to obtain compound 49a as light yellow solid (9 mg, yield=39%). MS for $C_{24}H_{27}N_2OS_2$ [M+H]$^+$ calculated 423.1, found 423.0.

4-(cyclohexylsulfonyl)-N-(4-(2,5-dimethylphenyl)thiazol-2-yl)benzamide (49b). To a solution of compounds 49a (7 mg, 0.017 mmol) in 4:1 mixture of $CH_2Cl_2$/Methanol was added 3-chloroperoxybenzoic acid (15 mg, 0.083 mmol). The reaction was heated at 45° C. for 30 minutes, followed by removal of solvent under vacuum to obtain residue which was purified using silica gel column chromatography to obtain compound 49b as off-white solid (5.5 mg, yield=71%). (MS for $C_{24}H_{27}N_2O_3S_2$ [M+H]$^+$ calculated 455.1, found 455.0.

N-(4-(2,5-dimethylphenyl)thiazol-2-yl)-4-(piperidine-1-carbonyl)benzamide (49c). To a solution of terephthalic acid (50, 200 mg, 1.81 mmol) in anhydrous DMF were added, piperidine (3, 171 mg, 1.98 mmol), HATU (755 mg, 1.98 mmol) and triethylamine (364 mg, 3.61 mmol). The reaction was stirred for 1 h followed by removal of the solvent. Waster was then added to precipitate the HATU byproduct and the bis amide side product which were removed by filtration. The aqueous layer was then acidified using 3N aqueous HCl to precipitate the solid which was collected by filtration to obtain compound 51. The 'HATU coupling' reaction was then performed using 51 (26 mg, 0.11 mmol), 8a (25 mg, 0.12 mmol), HATU (46.6 mg, 0.12 mmol) and triethylamine (22.5 mg, 0.22 mmol) to obtain compound 49c as white solid (9.2 mg, yield=20%). MS for $C_{24}H_{26}N_3O_2S$ [M$^+$] calculated 420.2, found 420.0.

N-(4-(2,5-dimethylphenyl)thiazol-2-yl)-3-(piperidine-1-carbonyl)benzamide (49d). Compound 49d was synthesized using the same procedure as for 29c starting with isophthalic acid (52, 300 mg, 1.81 mmol), (3, 171 mg, 1.98 mmol), HATU (755 mg, 1.98 mmol) and triethylamine (364 mg, 3.61 mmol) to obtain compound 53 which was purified by silica gel column chromatography. The 'HATU coupling' reaction was then performed using 53 (23 mg, 0.098 mmol), 8a (20 mg, 0.098 mmol), HATU (41 mg, 0.11 mmol) and triethylamine (20 mg, 0.196 mmol) to obtain compound 49d as off-white solid (12 mg, yield=29%). MS for $C_{24}H_{26}N_3O_2S$ [M+H]$^+$ calculated 420.2, found 420.0.

N-(4-(2,5-dimethylphenyl)thiazol-2-yl)-4-(piperidine-1-carbonyl)benzenesulfonamide (55). To a solution of 4-(chlorosulfonyl)phenyl acetate (2, 50 mg, 0.214 mmol) in anhydrous dichloromethane were added triethylamine (32 mg, 0.32 mmol) and compound 8a (44 mg, 0.321 mmol). The reaction mixture was heated at 45° C. for 16 h followed by removal of the solvent to obtain the crude sulfonamide intermediate 4-(N-(4-(2,5-dimethylphenyl)thiazol-2-yl)sulfamoyl)benzoic acid which was suspended in water and filtered to remove the water soluble impurities to obtain the methyl ester intermediate (21 mg, yield=24%). This intermediate (21 mg, 0.052 mmol) was dissolved in 3:1 mixture of MeOH/THF and LiOH (4 mg, 0.156 mmol) dissolved in 0.2 mL of water was added to this solution. The reaction was stirred for another 2 h followed by removal of the solvent under vacuum. The residue was then dissolved in water and the solution was acidified using 3M HCl to precipitate the product which was purified by filtration to obtain compound 54 (13 mg, yield=64%). The 'HATU coupling' reaction was then performed using 54 (13 mg, 0.034 mmol), piperidine (3, 2.84 mg, 0.034 mmol), HATU (14 mg, 0.037 mmol) and triethylamine (5.1 mg, 0.05 mmol) to obtain compound 55 as tan solid (15 mg, yield=97%). MS for $C_{23}H_{26}N_3O_3S$ [M+H]$^+$ calculated 456.1, found 456.0.

N-(4-(2,5-dimethylphenyl)thiazol-2-yl)-4-(N-ethyl-N-propylsulfamoyl)benzamide (58a). To a solution of 4-(chlorosulfonyl)benzoic acid (56, 100 mg, 0.45 mmol) in anhydrous DMF were added, potassium carbonate (68 mg, 0.495 mmol) and N-ethylpropan-1-amine (39 mg, 0.45 mmol). The reaction was heated at 45° C. for 30 minutes followed by removal of solvent under vacuum. Water as then added and the solution was acidified with 3N HCl to precipitate the solid which was collected by filtration to obtain crude compound 57a. The 'HATU coupling' reaction was then performed using 57a (23 mg, 0.083 mmol), 8a (17 mg, 0.083 mmol), HATU (35 mg, 0.091 mmol) and triethylamine (12.6 mg, 0.13 mmol) to obtain compound 58a as glassy oil (27 mg, yield=71%). MS for $C_{23}H_{28}N_3O_3S_2$ [M+H]$^+$ calculated 458.1, found 458.0.

N-(4-(2,5-dimethylphenyl)thiazol-2-yl)-4-(N,N-dipropylsulfamoyl)benzamide (58b). Compound 58b was synthesized using the same procedure as 58a starting with compound 58 (100 mg, 0.45 mmol), potassium carbonate (68 mg, 0.495 mmol) and dipropylamine (50 mg, 0.5 mmol) to obtain compound 57b. The 'HATU coupling' reaction was then performed using 57b (17.5 mg, 0.06 mmol), 8a (12.5 mg, 0.06 mmol), HATU (26 mg, 0.067 mmol) and triethylamine (9 mg, 0.09 mmol) to obtain compound 58b as glassy oil (19 mg, yield=67%). MS for $C_{24}H_{30}N_3O_3S_2$ [M+H$^+$] calculated 472.2, found 471.9.

4-(N,N-dibutylsulfamoyl)-N-(4-(2,5-dimethylphenyl)thiazol-2-yl)benzamide (58c). Compound 58c was synthesized using the same procedure as 58a starting with compound 56 (100 mg, 0.45 mmol), potassium carbonate (68 mg, 0.497 mmol) and dibutylamine (64 mg, 0.497 mmol) to obtain compound 57c. The 'HATU coupling' reaction was then performed using 57c (20 mg, 0.064 mmol), 8a (13 mg, 0.064 mmol), HATU (27 mg, 0.071 mmol) and triethylamine (9.7 mg, 0.096 mmol) to obtain compound 58c as off-white solid (16 mg, yield=50%). MS for $C_{26}H_{34}N_3O_3S_2$ [M+H]$^+$ calculated 500.2, found 500.1.

N-(4-(2,5-dimethylphenyl)thiazol-2-yl)-4-(N-ethyl-N-phenylsulfamoyl)benzamide (58d). To a solution of methyl 4-(chlorosulfonyl)benzoate (2, 50 mg, 0.214 mmol) in anhydrous $CH_2Cl_2$ were added, triethylamine (32 mg, 0.321 mmol) and N-ethylaniline (26 mg, 0.214 mmol). The reaction was stirred for 30 minutes followed by removal of solvent under vacuum. Water as then added to precipitate the solid which was collected by filtration to obtain the methyl ester intermediate. This intermediate was then dissolved in 3:1 MeOH/THF and an aqueous solution of LiOH (27 mg, 0.642 mmol) was added. The reaction was stirred for 4 h followed by removal of solvent under vacuum. Water was then added and the solution was acidified with 3N HCl to precipitate the solid which was collected by filtration to obtain crude compound 57d. The 'HATU coupling' reaction was then performed using 57d (20 mg, 0.066 mmol), 8a (13.5 mg, 0.066 mmol), HATU (27 mg, 0.072 mmol) and triethylamine (10 mg, 0.098 mmol) to obtain compound 58d as white solid (26 mg, yield=80%). MS for $C_{26}H_{26}N_3O_3S_2$ [M+H]$^+$ calculated 492.1, found 492.1.

4-(N-cyclohexylsulfamoyl)-N-(4-(2,5-dimethylphenyl)thiazol-2-yl)benzamide (58e). Compound 58e was synthesized using the same procedure as 58a starting with compound 56 (100 mg, 0.45 mmol), potassium carbonate (68 mg, 0.497 mmol) and cyclohexylamine (49 mg, 0.497 mmol) to obtain compound 57e. The 'HATU coupling' reaction was then performed using 57e (13.5 mg, 0.048 mmol), 8a (9.7 mg, 0.048 mmol), HATU (20 mg, 0.052 mmol) and triethylamine (7.2 mg, 0.072 mmol) to obtain compound 58e as off-white solid (6.6 mg, yield=29%). MS for $C_{24}H_{28}N_3O_3S_2$ [M+H$^+$] calculated 470.1, found 470.0.

tert-butyl 4-((4-((4-(2,5-dimethylphenyl)thiazol-2-yl)carbamoyl)phenyl)sulfonyl)piperazine-1-carboxylate (58). Compound 58f was synthesized using the same procedure as 58d starting with compound 2 (100 mg, 0.43 mmol), triethylamine (65 mg, 0.65 mmol), tert-butyl piperazine-1-carboxylate (87 mg, 0.47 mmol) and LIOH (31 mg, 1.29 mmol) to obtain compound 57f. The 'HATU coupling' reaction was then performed using 57f (75 mg, 0.203 mmol), 8a (41 mg, 0.203 mmol), HATU (85 mg, 0.223 mmol) and triethylamine (31 mg, 0.31 mmol) to obtain compound 58f as white solid (109 mg, yield=96%). MS for $C_{27}H_{33}N_4O_5S_2$ [M+H]$^+$ calculated 557.2, found 557.1.

N-(4-(2,5-dimethylphenyl)thiazol-2-yl)-4-((4-ethoxypiperidin-1-yl)sulfonyl)benzamide (58g). Compound 58g was synthesized using the same procedure as 58d starting with compound 2 (100 mg, 0.43 mmol), triethylamine (130 mg, 1.29 mmol), 4-ethoxypiperidine hydrochloride (78 mg, 0.47 mmol) and LiOH (31 mg, 1.29 mmol) to obtain compound 57g. The 'HATU coupling' reaction was then performed using 57g (25 mg, 0.08 mmol), 8a (16 mg, 0.08 mmol), HATU (37 mg, 0.097 mmol) and triethylamine (16 mg, 0.16 mmol) to obtain compound 58g as off-white solid (35 mg, yield=88%). MS for $C_{25}H_{30}N_3O_4S_2$ [M+H]$^+$ calculated 500.2, found 500.0.

N-(4-(2,5-dimethylphenyl)thiazol-2-yl)-4-((4-propylpiperidin-1-yl)sulfonyl)benzamide (58h). Compound 58h was synthesized using the same procedure as 58d starting with compound 2 (100 mg, 0.43 mmol), triethylamine (87 mg, 0.86 mmol), 4-propylperidine (60 mg, 0.47 mmol) and LiOH (31 mg, 1.29 mmol) to obtain compound 57h. The 'HATU coupling' reaction was then performed using 57h (25 mg, 0.08 mmol), 8a (16 mg, 0.08 mmol), HATU (37 mg, 0.097 mmol) and triethylamine (16 mg, 0.16 mmol) to obtain compound 58g as off-white solid (33 mg, yield=82%). MS for $C_{26}H_{32}N_3O_3S_2$ [M+H]$^+$ calculated 498.2, found 498.0.

N-(4-(2,5-dimethylphenyl)thiazol-2-yl)-4-(piperazin-1-ylsulfonyl)benzamide (58i). Compound 58f (105 mg, 0.189 mmol) was stirred in 4N HCl solution in dioxane for 30 minutes. The solvent was then removed to obtain hydrochloride salt of compound 58i as tan solid in quantitative yield. MS for $C_{22}H_{25}N_4O_3S_2$ [M+H]$^+$ calculated 457.1, found 457.0.

4-((4-acetylpiperazin-1-yl)sulfonyl)-N-(4-(2,5-dimethylphenyl)thiazol-2-yl)benzamide (58j). To a solution of compound 58i (20 mg, 0.041 mmol) in anhydrous THF were added, triethylamine (10.4 mg, 0.1 mmol) and acetyl chloride (4 mg, 0.049 mmol). The reaction was stirred for 1 h followed by removal of solvent under vacuum to obtain residue which was purified using silica gel column chromatography to obtain compound 58j as tan solid (16 mg, yield=78%). MS for $C_{24}H_{27}N_4O_4S_2$ [M+H]$^+$ calculated 499.1, found 499.0.

N-(4-(2,5-dimethylphenyl)thiazol-2-yl)-4-((4-propylpiperazin-1-yl)sulfonyl)benzamide (58k). To a solution of compound 58i (20 mg, 0.041 mmol) in anhydrous THF were added, triethylamine (10.4 mg, 0.1 mmol) and 1-iodopropane (7.7 mg, 0.045 mmol). The reaction was stirred for 4 h followed by removal of solvent under vacuum to obtain residue which was purified using silica gel column chromatography to obtain compound 58k as tan solid (5 mg, yield=25%). MS for $C_{25}H_{31}N_4O_3S_2$ [M+H]$^+$ calculated 499.2, found 499.1.

N-(4-(2-bromo-5-methylphenyl)thiazol-2-yl)-4-((4-propylpiperidin-1-yl)sulfonyl)benzamide (59). The 'HATU coupling' reaction was performed using 57h (17 mg, 0.055 mmol), 8d (15 mg, 0.055 mmol), HATU (25 mg, 0.066 mmol) and triethylamine (11.3 mg, 0.11 mmol) to obtain compound 59 as oil (9.1 mg, yield=30%). MS for $C_{25}H_{29}BrN_3O_3S_2$ [M+H]$^+$ calculated 562.1 found 561.8.

N-(4-(2,5-dimethylphenyl)-5-(pent-1-yn-1-yl)thiazol-2-yl)-4-((4-propylpiperidin-1-yl)sulfonyl)benzamide (61). The 'HATU coupling' reaction was performed using 57h (12 mg, 0.039 mmol), 25 (10.9 mg, 0.039 mmol), HATU (17.5 mg, 0.046 mmol) and triethylamine (7.8 mg, 0.077 mmol) to obtain compound 60 (12 mg, yield=53%). 'Sonogashira coupling' reaction was performed using copper iodide (0.2 mg, 0.001 mmol), tetrakis(triphenylphosphine)palladium(0) (2.41 mg, 0.002 mmol), 1-pentyne (4.2 mg, 0.06 mmol), diisopropylamine (0.45 mL) and compound 60 (12 mg, 0.021 mmol) to obtain compound 61 as tan solid (4.9 mg, yield=41%). MS for $C_{31}H_{38}N_3O_3S_2$ [M+H]$^+$ calculated 564.2, found 564.1.

N-(4-(2-bromo-5-methylphenyl)-5-(pent-1-yn-1-yl)thiazol-2-yl)-4-(piperidin-1-ylsulfonyl)benzamide (64). To a solution of compound 8d (144 mg, 0.54 mmol) in anhydrous dichloromethane was slowly added a solution of N-iodosuccinimide (144 mg, 0.64 mmol) in 5 mL of dichloromethane and the reaction was stirred for 30 minutes. The solvent was then removed and the residue was purified using column chromatography to obtain compound 62 (160 mg, yield=76%). 'Sonogashira coupling' reaction was then performed using copper iodide (1.2 mg, 0.006 mmol), tetrakis(triphenylphosphine)palladium(0) (14.7 mg, 0.02 mmol), 1-pentyne (43 mg, 0.63 mmol), diisopropylamine (0.45 mL) and compound 62 (50 mg, 0.13 mmol) to obtain compound 63 (7 mg, yield=16%). The 'HATU coupling' reaction was then performed using 4 (4.2 mg, 0.023 mmol), 63 (7 mg, 0.021 mmol), HATU (9.5 mg, 0.025 mmol) and triethylamine (16 mg, 0.42 mmol) to obtain compound 64 as tan solid (3.1 mg, yield=25%). MS for $C_{27}H_{29}BrN_3O_3S_2$ [M+H]$^+$ calculated 586.1, found 586.0.

N-(4-(2-bromo-5-methylphenyl)-5-(pent-1-yn-1-yl)thiazol-2-yl)-4-((4-propylpiperidin-1-yl)sulfonyl)benzamide (65). The 'HATU coupling' reaction was then performed using 57h (7.6 mg, 0.024 mmol), 63 (7.4 mg, 0.022 mmol), HATU (10.1 mg, 0.026 mmol) and triethylamine (4.5 mg, 0.045 mmol) to obtain compound 65 as yellow solid (6.4 mg, yield=46%). MS for $C_{30}H_{35}BrN_3O_3S_2$ [M+H]$^+$ calculated 628.1, found 627.9.

N-(4-(5-azido-2-methylphenyl)thiazol-2-yl)-4-(piperidin-1-ylsulfonyl)benzamide (67). To a Compound 8e (50 mg, 0.186 mmol), sodium azide (49 mg, 0.746 mmol) and copper iodide (106 mg, 0.558 mmol) were taken in a microwave vial, sealed and evacuated under vacuum. Separately, 1,2-dimethylethylenediamine (66 mg, 0.744 mmol) was dissolved in DMF (1.2 mL) and was added to the vial. The reaction was heated in microwave at 100° C. for 15 min. Solvent was then removed and the residue was dissolved in EtOAc, washed with water and brine, dried over sodium sulfate and evaporated under vacuum to obtain crude compound which was purified using silica gel column chromatography to obtain compound 66 (9 mg, yield=21%). The 'HATU coupling' reaction was then performed using 4 (10 mg, 0.037 mmol), 66 (8.6 mg, 0.037 mmol), HATU (15.4 mg, 0.041 mmol) and triethylamine (5.6 mg, 0.056 mmol) to obtain compound 67 as orange solid (10 mg, yield=56%). MS for $C_{22}H_{23}N_6O_3S_2$ [M+H]$^+$ calculated 483.1, found 483.0.

N-(4-(2-azido-5-methylphenyl)thiazol-2-yl)-4-(piperidin-1-ylsulfonyl)benzamide (70). To a solution of 1-(2-azido-5-methylphenyl)ethan-1-one (68, 17 mg, 0.097 mmol) in chloroform was added liquid bromine (17 mg, 0.11 mmol). The reaction was stirred for an hour, followed by removal of the solvent to obtain crude brominated intermediate which was dissolved in anhydrous EtOH and thiourea (15 mg, 0.194 mmol) was added. The reaction was then heated in microwave at 100° C. for 30 min, followed by removal of the solvent to obtain the residue which was purified using silica gel column chromatography to obtain compound 69 (11 mg, yield=49%). The 'HATU coupling' reaction was then performed using 4 (13 mg, 0.047 mmol), 69 (11 mg, 0.047 mmol), HATU (20 mg, 0.052 mmol) and triethylamine (7 mg, 0.071 mmol) to obtain compound 70 as light yellow solid (9 mg, yield=40%). MS for $C_{22}H_{23}N_6O_3S_2$ [M+H]$^+$ calculated 483.1, found 483.0.

N-(4-(2,5-dimethylphenyl)thiazol-2-yl)-4-(N-(prop-2-yn-1-yl)sulfamoyl)benzamide (72a). Compound 72a was synthesized using the same procedure as 58a starting with compound 56 (50 mg, 0.23 mmol), potassium carbonate (32 mg, 0.23 mmol) and propargylamine hydrochloride (23 mg, 0.25 mmol) separately treated with triethylamine (27 mg, 0.27 mmol) to obtain compound 71a (26 mg, yield=47%). The 'HATU coupling' reaction was then performed using 71a (22 mg, 0.09 mmol), 8a (19 mg, 0.09 mmol), HATU (38 mg, 0.101 mmol) and triethylamine (14 mg, 0.135 mmol) to obtain compound 72a as off-white solid (12 mg, yield=31%). MS for $C_{21}H_{20}N_3O_3S_2$ [M+H]$^+$ calculated 426.1, found 425.9.

N-(4-(2,5-dimethylphenyl)thiazol-2-yl)-4-(N-ethyl-N-(prop-2-yn-1-yl)sulfamoyl)benzamide (72b). Compound 72b was synthesized using the same procedure as 58d starting with compound 2 (100 mg, 0.43 mmol), triethylamine (109 mg, 1.08 mmol), N-ethylprop-2-yn-1-amine hydrochloride (51 mg, 0.43 mmol) and LiOH (40 mg, 0.96 mmol) to obtain compound 71b (82 mg, yield=71%). The 'HATU coupling' reaction was then performed using 71b (23 mg, 0.086 mmol), 8a (17.6 mg, 0.086 mmol), HATU (36 mg, 0.095 mmol) and triethylamine (17 mg, 0.17 mmol) to obtain compound 72b as off-white solid (32 mg, yield=82%). MS for $C_{23}H_{24}N_3O_3S_2$ [M+H]$^+$ calculated 454.1, found 454.0.

N-(4-(2,5-dimethylphenyl)thiazol-2-yl)-4-(N-(prop-2-yn-1-yl)-N-propylsulfamoyl)benzamide (72c). Compound 72c was synthesized using the same procedure as 58d starting with compound 2 (90 mg, 0.39 mmol), triethylamine (99 mg, 0.98 mmol), N-propylprop-2-yn-1-amine hydrochloride (52 mg, 0.39 mmol) and LiOH (40 mg, 0.96 mmol) to obtain compound 71c (78 mg, yield=71%). The 'HATU coupling' reaction was then performed using 71c (20 mg, 0.071 mmol), 8a (14.5 mg, 0.071 mmol), HATU (30 mg, 0.078 mmol) and triethylamine (11 mg, 0.11 mmol) to obtain compound 72c as off-white solid (25 mg, yield=75%). MS for $C_{24}H_{26}N_3O_3S_2$ [M+H]$^+$ calculated 468.1, found 468.0.

N-(4-(2,5-dimethylphenyl)thiazol-2-yl)-4-((4-ethynylpiperidin-1-yl)sulfonyl)benzamide (72d). Compound 72d was synthesized using the same procedure as 58d starting with compound 2 (90 mg, 0.39 mmol), triethylamine (117 mg, 1.15 mmol), 4-ethynylpiperidine hydrochloride (71 mg, 0.488 mmol) and LiOH (36 mg, 0.86 mmol) to obtain compound 71d (72 mg, yield=63%). The 'HATU coupling' reaction was then performed using 71d (25 mg, 0.085 mmol), 8a (17.5 mg, 0.085 mmol), HATU (36 mg, 0.094 mmol) and triethylamine (17 mg, 0.17 mmol) to obtain compound 72d as white solid (27.5 mg, yield=67%). MS for $C_{25}H_{26}N_3O_3S_2$ [M+H]$^+$ calculated 480.1, found 480.0.

4-((1,2,6-triazaspiro[2.5]oct-1-en-6-yl)sulfonyl)-N-(4-(2,5-dimethylphenyl)thiazol-2-yl)benzamide (72e). Compound 72e was synthesized using the same procedure as 58d starting with compound 2 (5 mg, 0.021 mmol), triethylamine (5.3 mg, 0.053 mmol), 1,2,6-triazaspiro[2.5]oct-1-ene hydrochloride (3.14 mg, 0.021 mmol) and LiOH (4 mg, 0.063 mmol) to obtain compound 71e (6 mg, yield=97%). The 'HATU coupling' reaction was then performed using 71e (6 mg, 0.021 mmol), 8a (4.8 mg, 0.024 mmol), HATU (10 mg, 0.026 mmol) and triethylamine (3.6 mg, 0.038 mmol) to obtain compound 72e as white solid (9.5 mg, yield=94%). MS for $C_{23}H_{24}N_5O_3S_2$ [M+H]$^+$ calculated 482.1, found 482.0.

N-(4-(5-azido-2-methylphenyl)thiazol-2-yl)-4-((4-ethynylpiperidin-1-yl)sulfonyl)benzamide (73). The 'HATU coupling' reaction was performed using 71d (15 mg, 0.05 mmol), 65 (12 mg, 0.05 mmol), HATU (21 mg, 0.056 mmol) and triethylamine (8 mg, 0.077 mmol) to obtain compound 73 as off-white solid (12 mg, yield=47%). MS for $C_{24}H_{23}N_6O_3S_2$ [M+H]$^+$ calculated 507.1, found 507.0.

Biology: Cell Lines and Reagents

The THP1-Blue™ NF-κB cell line was purchased from Invivogen (San Diego, CA) which contains a stably integrated NF-κB-inducible secreted embryonic alkaline phosphatase (SEAP). ISRE-bla THP-1 cell line was generated by us as described earlier.37 QuantiBlue was purchased from Invivogen, MTT (3-[4,5-dimethylthiazol-2-yl]-2,5-dipheyl tetrazolium bromide) was purchased from Acros Organics, LPS (lps-eb) from Invivogen, and IFN-α from R&D Systems (#11200-2).

Measurement of NF-κB Activation Using THP1-Blue™ NF-κB Cells

THP1-Blue™ NF-κB cells were plated in 96-well plates at 105 cells/well in 100 μl RPMI supplemented with 10% fetal bovine serum (FBS, Omega Scientific, Inc., Tarzana, CA), 100 U/mL penicillin, 100 μg/ml streptomycin (Thermo Fisher Scientific) and Normocin (Invivogen). LPS was prepared in assay medium at a concentration of 20 μg/mL. Tested compounds were dissolved in DMSO at 1 mM as a stock solution and were further diluted in the LPS solution to a final concentration of 10 μM. 100 μL of this solution was then transferred to the plated cells to obtain a final concentration of LPS at 10 μg/mL and compound at 5 μM (0.05% DMSO). The culture supernatants were harvested after a 20 h incubation period. SEAP activity in the culture supernatants was determined by a colorimetric assay using QuantiBlue (Invivogen). Plate absorbance was read at 630 nm using a Tecan Infinite M200 plate reader (Männedorf, Switzerland). The SEAP concentration was directly proportional to NF-κB activity, which was 2-point normalized to yield activity of compound 1+LPS as 200% and activity for LPS as 100%.

Cell Viability Assay

THP-1 cells were plated in 96-well plates (105 cells/well) in 100 μL RPMI supplemented with 10% FBS, 100 U/mL penicillin and 100 μg/ml streptomycin. Compounds were dissolved in DMSO at 1 mM stock solution and were further diluted to 10 μM in the assay medium. 100 μL of this solution was added to the cells to obtain a final compound concentration of 5 μM (0.05% DMSO). After 18 h incubation, a solution of MTT in assay media (0.5 mg/mL) was added to each well and further incubated for 4 to 6 h, followed by addition of cell lysis buffer (15% w/v SDS and 0.12% v/v 12N HCl aqueous solution), incubated overnight, and then absorbance measured at 570 nm using 650 nm as reference using Tecan Infinite M200 plate reader.

Statistical Analysis

Data are represented as mean t standard error of the mean (SEM). Origin 7 (Origin Lab, Northampton, MA) graphing software was used for figure preparation while Prism 4 (GraphPad, San Diego, CA) software was used for statistical calculations.

Abbreviations

APC, antigen presenting cells; AS04, Adjuvant System 04; DMF, N,N-dimethylformamide; DMSO, dimethyl sulfoxide; ELISA, enzyme-linked immunosorbent assay; FDA, Food and Drug Administration; FRET, Förster resonance energy transfer; HRMS, high resolution mass spectrometry; HTS, high-throughput screening; IFN, interferon; Ig, immunoglobulin; IL, interleukin; IRAK-M, interleukin-1 receptor-associated kinase-M; ISRE, interferon stimulating response element; LPS, lipopolysaccharide; MPLA, monophosphoryl Lipid A; MTT, (3-[4,5-dimethylthiazol-2-yl]-2,5-dipheyl tetrazolium bromide); NF-κB, nuclear factor kappa B; NLR, nucleotide-binding oligomerization domain-like receptors (NLRs); OD, optical density; OVA, ovalbumin; PRR, pattern recognition receptors; RLR, RIG-I-like receptors; RR, response ratio; SAR, structure-activity relationship; SEAP, secreted embryonic alkaline phosphatase; THF, tetrahydrofuran; TLC, thin layer chromatography; TLR, Toll-like receptor.

Example 3

In one embodiment, a sulfonamide derivative comprises:

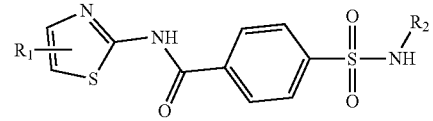

In one embodiment, R1 is aryl or heteroaryl group. In one embodiment, R1 is C5-C7 aryl. In one embodiment, R1 is a substituted aryl. In one embodiment, R1 is substituted C5-C7 aryl. In one embodiment, R1 is C5-C7 heteroaryl. In one embodiment, R1 is a substituted heteroaryl. In one embodiment, R1 is substituted C5-C7 heteroaryl. In one embodiment, R1 is a C5-C7 aryl that is substituted with a C1-C6 alkyl. In one embodiment, R1 is a C5-C7 aryl that is substituted with an unsubstituted C1-C6 alkyl.

In one embodiment, R2 is aryl, heteroaryl or a C4-C7 cyclic group. In one embodiment, R1 is C5-C7 heterocycle. In one embodiment, R1 is a substituted heterocycle. In one embodiment, R1 is non substituted C5-C7 heterocycle. In one embodiment, R1 is C5-C7 heterocycle. R1 is a substituted heteroaryl. In one embodiment, R1 is substituted C5-C7 heteroaryl.

REFERENCES

Alving et al., *Curr. Opin. Immunol.*, 24:310 (2012).
An et al., *Immunity*, 25:919 (2006).
Ban et al., *Bioconjug. Chem.*, 27:1911 (2016).
Basto & Leitao, *J. Immunol. Res.*, _:_ (2014).
Beran, *Expert Opin. Biol. Ther.*, 8:235 (2008).
Chan et al., *ACS Comb. Sci.*, 19:533 (2017).
Chan et al., *Bioconjugate Chem.*, 20:1194 (2009).
Chan et al., *J. Med. Chem.*, 56:4206 (2013).
Ebensen et al., *Front Cell Infect. Microbiol.*, 9:31 (2019).
Fabrizi et al., *Clin. Res. Hepatol. Gastroenterol.*, _:_ (2019).
Forster et al., *Trends Immunol.*, 33:271 (2012).
Fraser et al., *Expert Rev. Vaccines*, 6:559 (2007).
Ho et al., *Front Immunol.*, 9:2874 (2018).
Ho et al., *Nat. Immunol.*, 13:379 (2012).

Hyer & Janssen, *Open Forum Infect. Dis.*, 5:S677 (2018).
Ignacio et al., *Bioconjug. Chem.*, 29:587 (2018).
Kan et al., *Org. Lett.*, 9:2055 (2007).
Kawada et al., *J. Med. Chem.*, 32:256 (1989).
Kim et al., *J. Immunol.*, 175:847 (2005).
Kondo et al., *Trends Immunol.*, 33:449 (2012).
Levast et al., *Vaccines (Basel)*, 2:297 (2014).
Lin et al., *Pediatr. Infect. Dis. J.*, 37:e93 (2018).
Liu et al., *J. Immunol.*, 185:7244 (2010).
Ma et al., *J. Immunol.*, 184:6053 (2010).
Maisonneuve et al., *Proc. Natl. Acad. Sci. USA*, 11:12294 (2014).
Martin-Fontecha et al., *Handb. Exp. Pharmacol.*, _:31 (2009).
Mutwiri et al., *Expert Rev. Vaccines*, 10:95-(2011).
Pan et al., *Nat. Prod. Rep.*, 33:612 (2016).
Pavot et al., *Biomaterials*, 75:327 (2016).
Probst et al., *Vaccine*, 5:1964 (2017).
Proietti et al., *J. Immunol.*, 169:375 (2002).
Qian & Cao, *Ann. NY Acad. Sci.*, 1283:67 (2013).
Reed et al., *Nat. Med.*, 19:1597 (2013).
Schenone et al., *Nat. Chem. Biol.*, 9:232 (2013).
Schwarz et al., *Bjog*, 122:107 (2015).
Shukla et al., *ACS Med. Chem. Lett.*, U:1156 (2018).
Shukla et al., *Bioorg. Med. Chem. Lett.*, 20:6384 (2010).
Shukla et al., *PLoS One*, 7:e43612 (2012).
Shukla et al., *SLAS Discov.*, 23:960 (2018).
Smith & Collins, *Future Med. Chem.*, 7:159 (2015).
Sumranjit & Chung, *Molecules*, 18:10425 (2013).
Tovey & Lallemand, *Methods Mol. Biol.*, 626:287 (2010).
Tumis et al., *J. Immunol.*, 185:4223 (2010).
Vasilakos & Tomai, *Expert Rev. Vaccines*, 12:809 (2013).
Wheeler et al., *Lancet Infect. Dis.*, 16:1154 (2016).
Yuk et al., *Nat. Immunol.*, 12:742 (2011).

All publications, patents and patent applications are incorporated herein by reference. While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

What is claimed is:

1. A compound having the structure of Formula (I), or a salt thereof, $$A^1\text{-}Q\text{-}L^1\text{-}A^2\text{-}L^2\text{-}Z \qquad \text{Formula I}$$

wherein
A1 has the structure

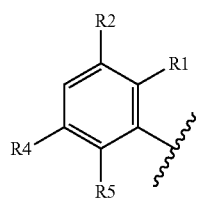

Formula B wherein each of R1, R2, R4, and R5 is independently H, fluoro, chloro, bromo, iodo, azido, hydroxyl, amino, thio, trifluoromethyl, trifluoromethoxy, cyano, nitroso, nitro, carboxy, sulfonate, phosphate, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl, or any adjacent two of R1, R2, R4, and R5 form a fused aryl ring together with the carbon atoms to which they are attached;

at least one of R1 and R5 is other than H; and at least two of R1, R2, R4, and R5 is other than H; or wherein A1 has the structure

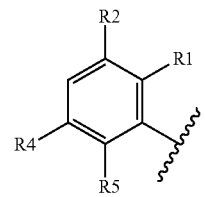

Formula B wherein each of R1, R2, R4, and R5 is independently H, fluoro, chloro, bromo, iodo, azido, trifluoromethyl, trifluoromethoxy, cyano, methyl, vinyl, ethynyl, C2-C10 alkyl, C3-C10 alkenyl, C3-C10 alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl, or any adjacent two of R1, R2, R4, and R5 form a fused aryl ring together with the carbon atoms to which they are attached;

at least one of R1 and R5 is other than H; and at least two of R1, R2, R4, and R5 is other than H; or wherein A1 has the structure

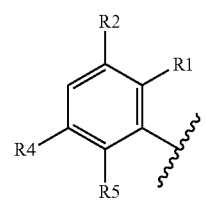

Formula B wherein each of R1, R2, R4, and R5 is independently H, methyl, fluoro, chloro, bromo, iodo, azido, trifluoromethyl, trifluoromethoxy, cyano, methyl, vinyl, ethynyl, C2-C10 alkyl, C3-C10 alkenyl, C3-C10 alkynyl, or any adjacent two of R1, R2, R4, and R5 form a fused benzo ring together with the carbon atoms to which they are attached;

at least one of R1 and R5 is other than H; and at least two of R1, R2, R4, and R5 is other than H; or wherein A1 has the structure

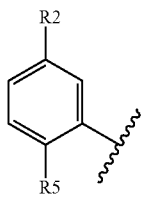

Formula C wherein each of R2 and R5 is independently methyl, fluoro, chloro, bromo, iodo, azido, trifluoromethyl, trifluoromethoxy, cyano, methyl, vinyl, ethynyl, C2-C10 alkyl, C3-C10 alkenyl, C3-C10 alkynyl; or wherein A1 has the structure

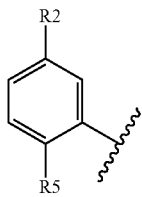

Formula C wherein each of R2 and R5 is independently methyl or bromo;
Q is a divalent or trivalent thiazole;
L1 is a divalent group selected from amide, carbamate, urea, thioamide, thiocarbamate, thiourea, or a dithiocarbamate;
A2 is a divalent aryl or heteroaryl;
L2 is a divalent sulfone, sulfoxide, thioether, carbonyl, amide, ester, or aminomethyl; and
Z is an alkylamine, arylamine, diarylamine, N,N-alkylarylamine, or a cyclic amine of Formula G

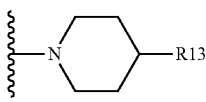

Formula G wherein R13 is H, fluoro, chloro, bromo, iodo, azido, trifluoromethyl, trifluoromethoxy, cyano, nitro, carboxy, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl arylsulfonyl, arylamino, N,N-alkylarylamino, arylcarbonyl, or aminosulfonyl or of Formula F

Formula F wherein R11 and R12 form a morpholine, aziridine, azetidine, azepine, pyrrolidine, or piperidine ring together with the nitrogen atom to which R11 and R12 are attached.

2. The compound of claim 1, or a salt thereof, wherein
L1 is a divalent amide;
A2 is a divalent aryl;
L2 is a divalent sulfone, sulfoxide, thioether, or carbonyl; and
Z is an alkylamine, arylamine, dialkylamine, diarylamine, N,N-alkylarylamine, or a non-aromatic cyclic amine of Formula G, or
wherein
L1 is a divalent amide;
A2 is a phenylene;
L2 is a divalent sulfone; and
Z is a dialkylamine or a non-aromatic cyclic amine.

3. The compound of claim 1, or a salt thereof, wherein Q has the structure

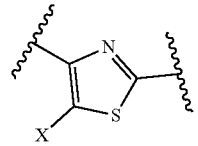

Formula D wherein X is H, fluoro, chloro, bromo, iodo, azido, trifluoromethyl, trifluoromethoxy, cyano, nitro, carboxy, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl; or
wherein Q has the structure:

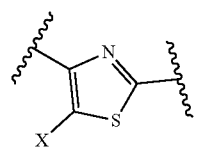

Formula D wherein X is H, methyl, vinyl, ethynyl, C2-C10 alkyl, C3-C10 alkenyl, C3-C10 alkynyl, alkyloxy, alkylthio, alkylamino, dialkylamino, or aryl; or
wherein Q has the structure

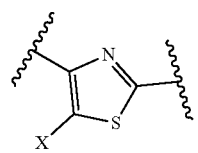

Formula D wherein X is a linear alkyl, linear alkenyl, linear alkynyl, linear alkyloxy, or linear alkylthio.

4. The compound of claim 1, or a salt thereof, wherein L1 has the structure

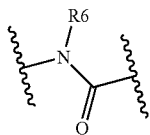

wherein R6 is H, alkyl, alkenyl, or alkynyl or wherein L1 is a divalent sulfone linkage having the structure

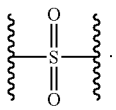

5. The compound of claim 1, or a salt thereof, wherein A2 has the structure

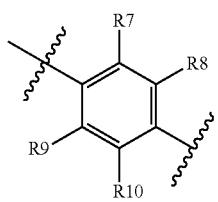
Formula E1

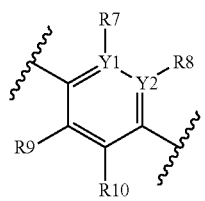
Formula E2

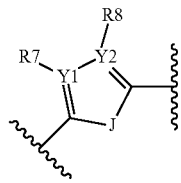
Formula E3 wherein
Y1 is C or N, and if Y1 is N then R7 is absent;
Y2 is C or N, and if Y2 is N then R8 is absent;
J is O or S; and
each of R7, R8, R9, and R10 is independently H, fluoro, chloro, bromo, iodo, azido, hydroxyl, amino, thio, trifluoromethyl, trifluoromethoxy, cyano, nitroso, nitro, carboxy, sulfonate, phosphate, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthiol, arylsulfinyl, arylsulfonyl, arylamino, N,N-alkylarylamino, arylcarbonyl, or aminosulfonyl, or any adjacent two of R7, R8, R9, and R10 form a fused aryl ring together with the carbon atoms to which they are attached or wherein A2 is a 1,4-phenylene having the structure

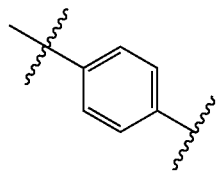

6. The compound of claim 1, or a salt thereof, wherein A2 is a 1,4-phenylene having the structure

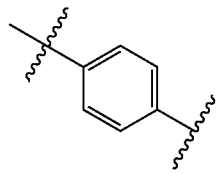

7. The compound of claim 1, or a salt thereof, wherein L1 is a divalent sulfone linkage having the structure

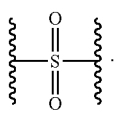

8. The compound of claim 1, or a salt thereof, wherein Z has the structure

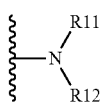
Formula F wherein or R11 and R12 form a morpholine, aziridine, azetidine, azepine, pyrrolidine, or piperidine ring together with the nitrogen atom to which R11 and R12 are attached.

9. The compound of claim 1, or a salt thereof, having the structure of Formula (II)
wherein

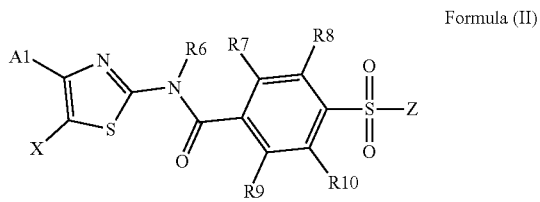
Formula (II)

R6 is H, alkyl, alkenyl, or alkynyl;
each of R7, R8, R9, and R10 is independently H, fluoro, chloro, bromo, iodo, azido, hydroxyl, amino, thio, trifluoromethyl, trifluoromethoxy, cyano, nitroso, nitro, carboxy, sulfonate, phosphate, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthiol, arylsulfinyl, arylsulfonyl, arylamino, N,N-alkylarylamino, arylcarbonyl, or aminosulfonyl, or any adjacent two of R7, R8, R9, and R10 form a fused aryl ring together with the carbon atoms to which they are attached;

X is H, fluoro, chloro, bromo, iodo, azido, trifluoromethyl, trifluoromethoxy, cyano, nitro, carboxy, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl; and Z as defined in claim 1.

10. The compound of claim 9, or a salt thereof, having the structure of Formula (III)

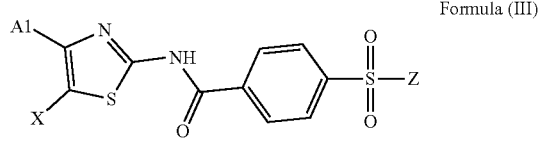

Formula (III)

wherein

X is H, fluoro, chloro, bromo, iodo, azido, trifluoromethyl, trifluoromethoxy, cyano, nitro, carboxy, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl; and Z is as defined in claim 1.

11. The compound of claim 1, or a salt thereof, having the structure of Formula (IV)

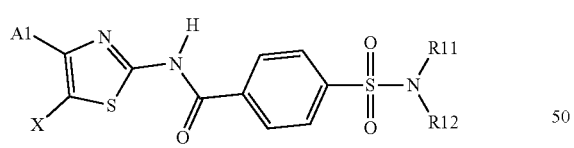

Formula (IV)

wherein

X is H, fluoro, chloro, bromo, iodo, azido, trifluoromethyl, trifluoromethoxy, cyano, nitro, carboxy, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl; and R11 and R12 form a morpholine, aziridine, azetidine, azepine, pyrrolidine, or piperidine ring together with the nitrogen atom to which R11 and R12 are attached.

12. The compound of claim 1, or a salt thereof, having the structure of Formula (V)

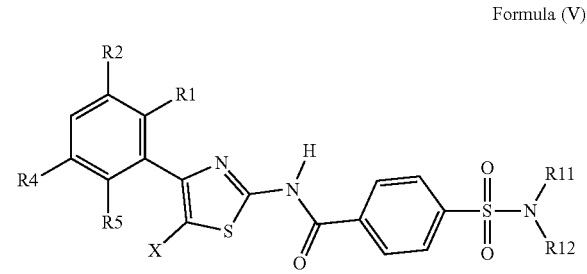

Formula (V)

wherein

X is H, fluoro, chloro, bromo, iodo, azido, trifluoromethyl, trifluoromethoxy, cyano, nitro, carboxy, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl;

each of R1, R2, R4, and R5 is independently H, methyl, fluoro, chloro, bromo, iodo, azido, trifluoromethyl, trifluoromethoxy, cyano, methyl, vinyl, ethynyl, C2-C10 alkyl, C3-C10 alkenyl, C3-C10 alkynyl, or any adjacent two of R1, R2, R4, and R5 form a fused benzo ring together with the carbon atoms to which they are attached;

at least one of R1 and R5 is other than H;

at least two of R1, R2, R4, and R5 is other than H; and

R11 and R12 form a morpholine, aziridine, azetidine, azepine, pyrrolidine, or piperidine ring together with the nitrogen atom to which R11 and R12 are attached.

13. The compound of claim 1, or a salt thereof, having the structure of Formula (VI)

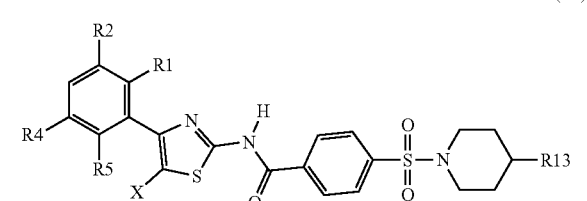

Formula (VI)

wherein

X is H, fluoro, chloro, bromo, iodo, azido, trifluoromethyl, trifluoromethoxy, cyano, nitro, carboxy, alkyl, alkenyl, alkynyl, alkyloxy, alkylthio, alkylsulfinyl, alkylsulfonyl, alkylamino, dialkylamino, alkyloxycarbonyl, alkylaminocarbonyl, acyl, amido, formyl, hydroxyalkyl, hydroxyalkenyl, hydroxyalkynyl, aryl, aryloxy, arylthio, arylsulfinyl, arylsulfonyl, arylamino, N,N-alkylarylamino, arylcarbonyl, or aminosulfonyl;

each of R1, R2, R4, and R5 is independently H, methyl, fluoro, chloro, bromo, iodo, azido, trifluoromethyl, trifluoromethoxy, cyano, methyl, vinyl, ethynyl, C2-C10 alkyl, C3-C10 alkenyl, C3-C10 alkynyl, or any adjacent two of R1, R2, R4, and R5 form a fused benzo ring together with the carbon atoms to which they are attached;

at least one of R1 and R5 is other than H;
at least two of R1, R2, R4, and R5 is other than H; and
R13 is H, methyl, vinyl, ethynyl, C2-C10 alkyl, C3-C10 alkenyl, C3-C10 alkynyl, C1-C10 alkyloxy, or a geminally-bound diazirine.

14. A photoaffinity probe comprising a compound of claim 1.

15. A method of enhancing or prolonging an immune response in a mammal, comprising: administering to the mammal an effective amount of a composition comprising a compound of formula (I)-(VI).

16. The method of claim 15 wherein the immune response is to a microbe or to a cancer in the mammal.

17. The method of claim 15 wherein the mammal is a human.

* * * * *